United States Patent
Yang et al.

(10) Patent No.: US 10,774,268 B2
(45) Date of Patent: Sep. 15, 2020

(54) BITUMEN PRODUCTION IN PARAFFINIC FROTH TREATMENT (PFT) OPERATIONS WITH NEAR INFRARED (NIR) MONITORING

(71) Applicant: FORT HILLS ENERGY L.P., Calgary (CA)

(72) Inventors: Xiaoli Yang, Calgary (CA); Shawn Van Der Merwe, Calgary (CA)

(73) Assignee: Fort Hills Energy, L.P., Calgary, AB (CA)

( * ) Notice: Subject to any disclaimer, the term of this patent is extended or adjusted under 35 U.S.C. 154(b) by 0 days.

(21) Appl. No.: 15/726,115

(22) Filed: Oct. 5, 2017

(65) Prior Publication Data
US 2018/0127658 A1 May 10, 2018

(30) Foreign Application Priority Data

Oct. 19, 2016 (CA) .................................. 2946027

(51) Int. Cl.
| | |
|---|---|
| *G01N 21/3577* | (2014.01) |
| *G01N 21/359* | (2014.01) |
| *C10G 1/00* | (2006.01) |
| *C10G 33/04* | (2006.01) |
| *C10G 33/08* | (2006.01) |
| *C10G 1/04* | (2006.01) |
| *G01N 21/3504* | (2014.01) |

(52) U.S. Cl.
CPC ............ *C10G 1/008* (2013.01); *C10G 1/045* (2013.01); *C10G 1/047* (2013.01); *C10G 33/04* (2013.01); *C10G 33/08* (2013.01); *G01N 21/3504* (2013.01); *G01N 21/359* (2013.01); *G01N 21/3577* (2013.01); *C10G 2300/1033* (2013.01); *C10G 2300/208* (2013.01); *G01N 2201/129* (2013.01)

(58) Field of Classification Search
CPC ... C10G 1/008; G01N 21/3577; G01N 21/359
See application file for complete search history.

(56) References Cited

U.S. PATENT DOCUMENTS

| | | |
|---|---|---|
| 4,178,243 A | 12/1979 | Messer |
| 4,931,175 A | 6/1990 | Krofta |
| 7,067,811 B2 | 6/2006 | Long et al. |
| 8,039,518 B2 | 10/2011 | Hellberg et al. |
| 8,568,515 B2 | 10/2013 | Mantilla et al. |
| 2011/0042268 A1 | 2/2011 | Stark et al. |
| 2014/0042100 A1 | 2/2014 | Rytwo |
| 2014/0197316 A1* | 7/2014 | Kadali ............. G01N 21/274 250/339.11 |
| 2014/0311889 A1 | 10/2014 | Zaher et al. |

OTHER PUBLICATIONS

Y. Long and T. Dabros, Monitoring the Settling of Water-Solids-Asphaltenes Aggregates Using In-Line Probe Coupled with a Near-Infrared Spectrophotometer, 19 Energy and Fuels 1542-1547 (2005).*

* cited by examiner

*Primary Examiner* — Randy Boyer
(74) *Attorney, Agent, or Firm* — BakerHostetler

(57) ABSTRACT

Techniques described herein relate to producing bitumen while monitoring various aspects of paraffinic froth treatment (PFT) operations using near infrared (NIR) spectrometry and chemometric analysis to continuously monitor and enable measurements of physical and chemical properties of various streams in PFT operations, which can be done in real time online and can facilitate process control. NIR spectrometry can be used to acquire NIR spectra measurements from a PFT process stream and the NIR spectra measurements and chemometric analysis can, in turn, be used to determine composition characteristics of the PFT process stream as well as operational features of a PFT process unit. For example, NIR spectra can be used to determine upward velocity in a PFT settler to facilitate settler operation for diluted bitumen quality control. NIR spectra can be obtained using reflectance or transmission probes which can be positioned within particular phase of a stratified PFT process stream.

19 Claims, 90 Drawing Sheets

| Number | RMSECV | Rank | Regions | | | Preprocessing |
|---|---|---|---|---|---|---|
| 514 | 0.0199 | 6 | 8624.4 - 8151.5 | 7706.4 - 6788.4 | 5878.1 - 4497.3 | Multiplicative scattering connec. |
| 595 | 0.0199 | 6 | 8624.4 - 8151.5 | 7706.4 - 6788.4 | 5878.1 - 4497.3 | Multiplicative scattering connec. |
| 634 | 0.0199 | 6 | 8624.4 - 8151.5 | 7706.4 - 6788.4 | 5878.1 - 4497.3 | Multiplicative scattering connec. |
| 421 | 0.02 | 8 | 7706.4 - 6788.4 | 5878.1 - 4952.5 | | Vector normalization (SNV) |
| 401 | 0.02 | 8 | 7706.4 - 6788.4 | 5878.1 - 4952.5 | | Vector normalization (SNV) |
| 501 | 0.0204 | 6 | 7706.4 - 6788.4 | 5878.1 - 4497.3 | | Multiplicative scattering connec. |
| 431 | 0.0204 | 9 | 7706.4 - 6325.6 | 5878.1 - 4952.5 | | Vector normalization (SNV) |
| 411 | 0.0204 | 9 | 7706.4 - 6325.6 | 5878.1 - 4952.5 | | Vector normalization (SNV) |
| 390 | 0.0204 | 9 | 7706.4 - 6325.6 | 5878.1 - 4952.5 | | Vector normalization (SNV) |
| 419 | 0.0206 | 9 | 7251.3 - 6325.6 | 5878.1 - 4952.5 | | Vector normalization (SNV) |
| 399 | 0.0206 | 9 | 7251.3 - 6325.6 | 5878.1 - 4952.5 | | Vector normalization (SNV) |
| 369 | 0.0207 | 9 | 7706.4 - 7243.5 | 6788.4 - 4952.5 | | Vector normalization (SNV) |
| 392 | 0.0207 | 9 | 7706.4 - 7243.5 | 6788.4 - 4952.5 | | Vector normalization (SNV) |
| 624 | 0.0207 | 6 | 9079.5 - 8181.5 | 7706.4 - 5788.4 | 5878.1 - 4497.3 | Multiplicative scattering connec. |
| 604 | 0.0207 | 6 | 9079.5 - 8181.5 | 7706.4 - 5788.4 | 5878.1 - 4497.3 | Multiplicative scattering connec. |

FIG. 23

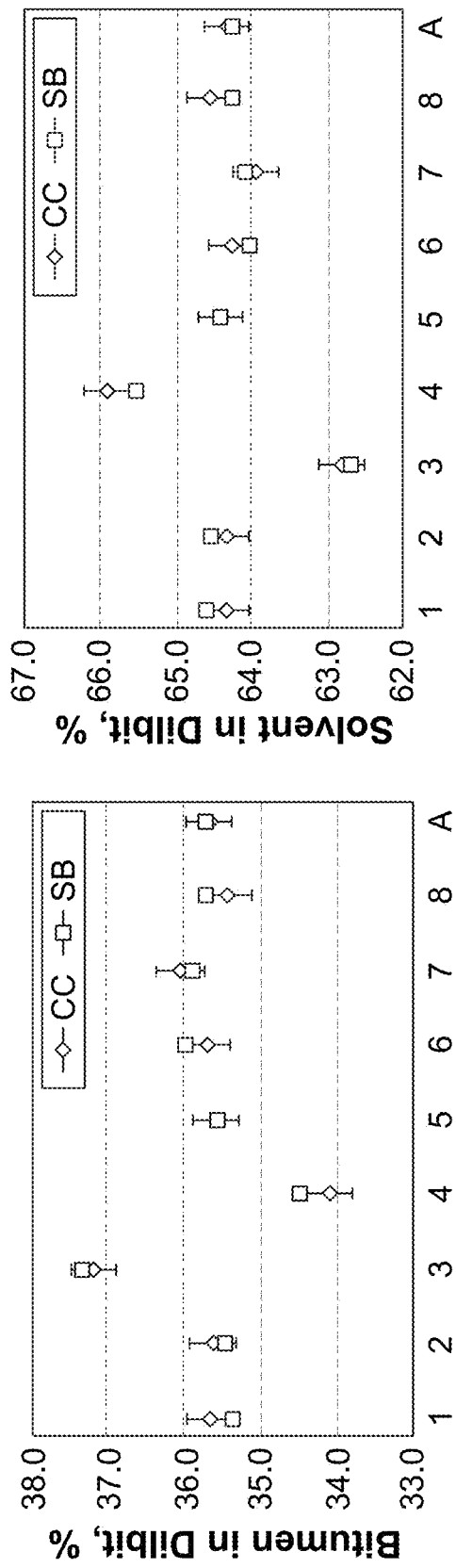
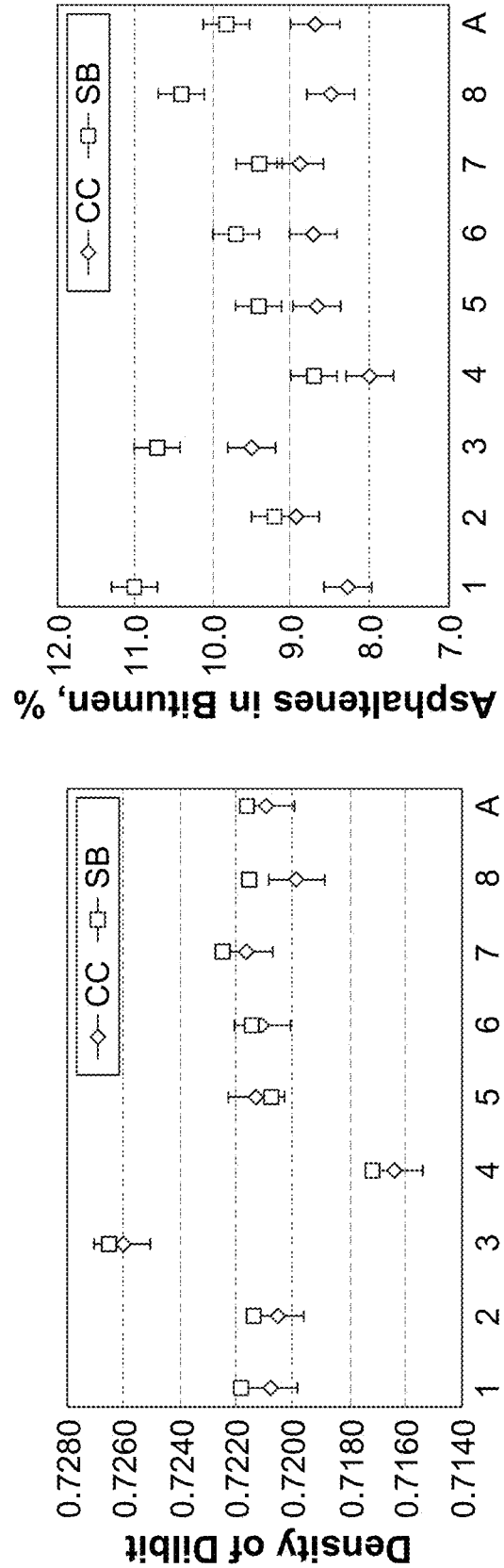
FIG. 77a
FIG. 77b
FIG. 77c
FIG. 77d

BITUMEN PRODUCTION IN PARAFFINIC FROTH TREATMENT (PFT) OPERATIONS WITH NEAR INFRARED (NIR) MONITORING

TECHNICAL FIELD

The technical field generally relates to monitoring streams, components or operational parameters in paraffinic froth treatment (PFT) operations using near infrared (NIR) based techniques for bitumen or heavy oil production.

BACKGROUND

Bitumen froth can be generated by separating oil sands slurry into a bitumen froth component and a solids-enriched tailings component, which may be performed in a flotation unit. The bitumen froth still includes water and mineral solids that should be removed to meet storage and pipeline criteria. In PFT, a paraffinic solvent is added to the bitumen froth in order to dilute bitumen components and help remove water and mineral solids. Paraffinic solvent acts differently compared to naphthenic solvents, notably in that paraffinic solvents induce precipitation of asphaltenes which form flocs composed of asphaltenes, water and solids. After adding paraffinic solvent to the bitumen froth, the resulting diluted froth can be supplied to a settler vessel that produces a diluted bitumen overflow and a tailings underflow including asphaltenes. While removal of the heavier asphaltene components from the diluted bitumen can have benefits, PFT operations also have number of challenges due to the ability of paraffins to precipitate asphaltenes.

In PFT operations, bitumen froth is diluted with solvent and separated into diluted bitumen and a solvent diluted tailings component in a froth separation unit (FSU), which can include two or three settlers arranged in a counter-current configuration. The diluted bitumen can then be supplied to a solvent recovery unit (SRU) to produce recovered solvent and solvent recovered bitumen, while the solvent diluted tailings component can be supplied to a tailings solvent recovery unit (TSRU) to produce recovered solvent and solvent recovered tailings. The solvent recovered tailings can be further processed or can be supplied to a tailings disposal site for settling.

In the context of PFT operations, there are challenges related to monitoring various streams, components and operational parameters, in order to implement process control strategies. For example, the diluted bitumen should generally include less than 0.1 wt % water and less than 0.1 wt % of fine mineral solids in the diluted bitumen overflow from the FSU. The solvent-to-bitumen (S/B) ratio of the diluted bitumen is also an important parameter that affects asphaltene precipitation and settling characteristics which eventually affects the quality of bitumen product. Variable froth composition and separation unit upsets can increase the likelihood of off-specification streams and can reduce the efficiency of the bitumen extraction process.

SUMMARY

In some implementations, there is provided a process for producing a bitumen product via a paraffinic froth treatment (PFT) operation, including: adding a paraffinic solvent to a bitumen froth to produce a solvent diluted bitumen froth; feeding the solvent diluted bitumen froth into a settling vessel wherein solvent diluted bitumen material flows upward and forms a lighter phase zone, and mineral solids and water settle downward and form a heavier phase zone; withdrawing a diluted bitumen overflow from the settling vessel; withdrawing a solvent diluted underflow from the settling vessel; processing the diluted bitumen overflow to produce the bitumen product; locating a near infrared (NIR) probe within an upper hydrocarbon phase stratum of a stratified PFT process stream; acquiring NIR spectral measurements from the NIR probe; and adjusting the PFT operation for producing the bitumen product based on the NIR spectral measurements.

Various other processes for producing a bitumen product are also provided and can leverage NIR measurement techniques described herein. In one example, a process producing a bitumen product via a paraffinic froth treatment (PFT) operation includes: adding a paraffinic solvent to a bitumen froth to produce a solvent diluted bitumen froth; feeding the solvent diluted bitumen froth into a settling vessel wherein solvent diluted bitumen material flows upward and forms a lighter phase zone, and mineral solids and water settle downward and form a heavier phase zone; withdrawing a diluted bitumen overflow from the lighter phase zone in the settling vessel; withdrawing a solvent diluted underflow from the heavier phase zone in the settling vessel; processing the diluted bitumen overflow to produce the bitumen product; acquiring near infrared (NIR) spectral measurements from the solvent diluted bitumen material; determining settling characteristics of the settling vessel based on the NIR spectral measurements, wherein the settling characteristics comprise upward velocity within the lighter phase zone in the settling vessel; and adjusting the PFT operation based on the settling characteristics.

Another example of a paraffinic froth treatment (PFT) process includes adding paraffinic solvent to bitumen froth to produce diluted froth; in a froth separation unit (FSU), separating the diluted froth into a diluted bitumen stream and a diluted tailings stream; separating the diluted tailings stream into a recovered solvent stream and a solvent recovered tailings; separating the diluted froth into a recovered solvent stream and a bitumen product; and controlling at least one operating condition of the PFT process based on at least one physicochemical characteristic that is derived from near infrared (NIR) spectral measurements obtained from at least one PFT process stream.

Various features of PFT processes and bitumen production methods are described further herein. Such processes can employ one or more NIR based measurement and adjustment techniques to enhance operational performance.

In some implementations, there is provided a process for monitoring a stream in a paraffinic froth treatment (PFT) operation, comprising locating a near infrared (NIR) probe within an upper hydrocarbon phase stratum of a stratified PFT process stream; and acquiring NIR spectral measurements from the NIR probe.

In some implementations, the NIR probe is located within a horizontal section of a pipe section transporting the PFT process stream. In some implementations, the NIR probe is located at or proximate an inner wall of the pipe section. In some implementations, the NIR probe is located within an upper semi-circle section of the pipe section. In some implementations, the NIR probe is located in spaced relation away from a top 12 o'clock location of the pipe section. In some implementations, the NIR probe is located in between a 10 o'clock and an 11 o'clock location of the pipe section. In some implementations, the pipe section has a diameter of at least 6 inches, at least 8 inches, or 6 to 8 inches. In some implementations, the pipe section is spaced away downstream from flow impediments and unit operations.

In some implementations, the PFT process stream comprises an aqueous phase that forms a lower stratum. In some implementations, the PFT process stream comprises a vapour component that accumulates at a top region above the upper hydrocarbon phase stratum.

In some implementations, the NIR probe is a reflectance probe. In some implementations, the NIR probe is a transmittance probe.

In some implementations, the PFT process stream comprises bitumen froth, diluted bitumen froth, diluted bitumen overflow, solvent diluted underflow, or solvent diluted tailings. In some implementations, the PFT process stream is a diluted bitumen overflow stream withdrawn from a first stage settling vessel that is part of a two-stage froth separation unit (FSU).

In some implementations, the stratified PFT process stream flows through a PFT process pipe and the NIR probe is located within the PFT process pipe.

In some implementations, the stratified PFT process stream flows through a bypass line and/or a slip stream line, and the NIR probe is located within the bypass line and/or a slip stream line.

In some implementations, there is provided a process for monitoring a settling vessel in a paraffinic froth treatment (PFT) operation, comprising acquiring near infrared (NIR) spectral measurements from a diluted bitumen material produced by the settling vessel; and determining upward velocity characteristics of the settling vessel based on the NIR spectral measurements.

In some implementations, there is provided a process for monitoring a settling vessel in a paraffinic froth treatment (PFT) operation, comprising acquiring near infrared (NIR) spectral measurements from an overflow material produced by the settling vessel; and determining settling characteristics of the settling vessel based on the NIR spectral measurements.

In some implementations, the settling characteristics comprise upward velocity within the settling vessel. In some implementations, the overflow material comprises a diluted bitumen stream and the settling vessel comprises a first stage froth separation vessel. In some implementations, the NIR spectral measurements are obtained using an NIR probe located within the settling vessel.

In some implementations, the process also includes determining water content or solids content of the overflow material based on the upward velocity. In some implementations, determining the settling characteristics comprises developing an NIR calibration model. In some implementations, the NIR calibration model is a multivariable calibration model developed by: processing both laboratory measured data and associated NIR data using a chemometric method; and using at least one of quality assurance and quality control (QA/QC) analyses, a multiple scatter correction data processing method, a first derivative data processing method, a vector normalization data processing method, and a combination thereof.

In some implementations, there is provided a process for monitoring paraffin content in a hydrocarbon-containing stream in a paraffinic froth treatment (PFT) system, comprising acquiring near infrared (NIR) spectral measurements from a hydrocarbon-containing stream, wherein a paraffinic solvent concentration in the hydrocarbon-containing stream is below 1000 ppm; and determining the paraffinic solvent concentration in the hydrocarbon-containing stream based on the NIR spectral measurements.

In some implementations, the hydrocarbon-containing stream comprises a PFT start-up hydrocarbon. In some implementations, PFT start-up hydrocarbon is diesel. In some implementations, the PFT start-up hydrocarbon comprises aromatic hydrocarbons. In some implementations, the hydrocarbon-containing stream comprises a bitumen product stream. In some implementations, determining the paraffinic solvent concentration comprises developing an NIR calibration model. In some implementations, the NIR calibration model is a multivariable calibration model developed by: processing both laboratory measured data and associated NIR data using a chemometric method; and using at least one of quality assurance and quality control (QA/QC) analyses, a constant offsite elimination, a straight line subtraction, a multiple scatter correction data processing method, a first and second derivative data processing method, and a combination thereof.

In some implementations, there is provided a process for monitoring paraffin content in a hydrocarbon-containing stream in a paraffinic froth treatment (PFT) system, comprising acquiring near infrared (NIR) spectral measurements from a hydrocarbon-containing stream; and determining the paraffinic solvent concentration in the hydrocarbon-containing stream based on the NIR spectral measurements.

In some implementations, there is provided a process for monitoring a process-aid in a paraffinic froth treatment (PFT) operation, comprising acquiring near infrared (NIR) spectral measurements from a PFT process stream; and determining process-aid dosage based on the NIR spectral measurements.

In some implementations, the PFT process stream is a diluted bitumen overflow stream. In some implementations, determining the process-aid dosage comprises developing an NIR calibration model. In some implementations, the NIR calibration model is a multivariable calibration model developed by: processing both laboratory measured data and associated NIR data using a chemometric method; and using at least one of quality assurance and quality control (QA/QC) analyses, a multiple scatter correction data processing method, a first derivative data processing method, a vector normalization, and a combination thereof. In some implementations, determining the process-aid dosage comprises: developing a first NIR calibration model between the NIR spectral measurements and a physicochemical characteristic of the PFT process stream; and developing a second calibration model between the physicochemical characteristic and the process-aid activity. In some implementations, the physicochemical characteristic comprises water content, mineral solids content and/or asphaltene aggregate size.

In some implementations, there is provided a process for monitoring a paraffinic froth treatment (PFT) operation, comprising acquiring near infrared (NIR) spectral measurements from a PFT process stream; and determining paraffinic solvent content, asphaltene content, bitumen content, water content, and or solids content of the PFT process stream based on the NIR spectral measurements.

In some implementations, the PFT process stream is a diluted bitumen stream. In some implementations, determining paraffinic solvent content, asphaltene content, bitumen content, water content, and or solids content of the PFT process stream comprises developing an NIR calibration model. In some implementations, the NIR calibration model is a multivariable calibration model developed by: processing both laboratory measured data and associated NIR data using a chemometric method; and using at least one of quality assurance and quality control (QA/QC) analyses, a multiple scatter correction data processing method, a first derivative data processing method, a vector normalization, and a combination thereof.

In some implementations, there is provided a process for monitoring a paraffinic froth treatment (PFT) operation, comprising acquiring near infrared (NIR) spectral measurements from a PFT process stream; and determining at least one physicochemical characteristic of the PFT process stream based on the NIR spectral measurements.

In some implementations, the physicochemical characteristic is at least one of density, solvent-to-bitumen ratio, component concentration, flow velocity, and asphaltene agglomerate size. In some implementations, the component concentration comprises at least one of bitumen content, paraffinic solvent content, asphaltene content, mineral solids content, water content, soluble-water content and free-water content. In some implementations, the PFT process stream is a bitumen froth stream, a diluted bitumen froth stream, a diluted bitumen stream, a recovered solvent stream, a bitumen product stream, or an underflow tailings stream. In some implementations, acquiring the NIR spectral measurements comprises directing a light source toward the PFT process stream; capturing radiation emitted back after interaction with the PFT process stream; and processing the radiations captured after interaction with the PFT process stream to provide the NIR spectral measurements.

In some implementations, determining physicochemical characteristic of the PFT process stream comprises developing an NIR calibration model. In some implementations, the NIR calibration model is a multivariable calibration model developed by: processing both laboratory measured data and associated NIR data using a chemometric method; and using at least one of quality assurance and quality control (QA/QC) analyses, a constant offsite elimination, straight line subtraction, min-max normalization, vector normalization, multiple scatter correction, a first or second derivative, a combination thereof. In some implementations, the NIR calibration model is developed using the following the steps: collecting samples of diluted bitumen from a PFT process; measuring density, solvent content, bitumen content and asphaltenes content of each of the collected samples of diluted bitumen; taking NIR measurements of each of the collected samples; compiling the measured density, paraffinic solvent content, asphaltene content, bitumen content, water content, and/or solids content with the corresponding NIR measurements; developing a preliminary NIR calibration model for density, paraffinic solvent content, asphaltene content, bitumen content, water content, and/or solids content prediction, using a chemometrics method; identifying and removing outlier data to increase accuracy of the preliminary model using a QA/QC analysis; identifying and removing additional outlier data using a statistical tool to further increase accuracy of the preliminary model; and improving the accuracy of the preliminary model using multiple scatter correction, first derivative, vector normalization, and/or a combination thereof.

In some implementations, there is provided a process for monitoring a paraffinic froth treatment (PFT) operation, comprising acquiring near infrared (NIR) spectral measurements from a PFT process stream; and determining at least one physicochemical characteristic of the PFT process stream based on the NIR spectral measurements; and determining at least one parameter of an unit based on the NIR spectral measurements.

In some implementations, the PFT process stream is a diluted froth, or diluted bitumen overflow stream produced by a separator. In some implementations, the separator comprises a gravity settling vessel. In some implementations, the physicochemical characteristic comprises a component concentration. In some implementations, the component concentration comprises paraffinic solvent content, bitumen content, asphaltene content, water content, or solids content. In some implementations, the at least one parameter of the separator comprises a flow characteristic within the separator. In some implementations, the flow characteristic comprises an upward flow velocity of diluted bitumen. In some implementations, there process also includes determining water content or solids content of the diluted bitumen overflow based on the determined upward flow velocity of the diluted bitumen.

In some implementations, there is provided a process for monitoring a hydrocarbon-containing stream used in a paraffinic froth treatment (PFT) system, comprising obtaining near infrared (NIR) spectral measurements of the hydrocarbon-containing stream, which comprises a residual component; and determining a residual component content in the hydrocarbon containing stream using an NIR calibration model correlating the NIR spectral measurements with the residual component content in the hydrocarbon containing stream, wherein the residual component content is below 1 wt % and the standard deviation of the NIR calibration model is below 0.05 wt %.

In some implementations, the standard deviation of the NIR calibration model is below 70 ppm. In some implementations, the residual component comprises paraffinic solvent and the hydrocarbon-containing stream comprises a bitumen product stream, a hydrocarbon start-up stream, an aromatic hydrocarbon stream, toluene, a bitumen-containing hydrocarbon mixture, or diesel. In some implementations, the paraffinic solvent is pentane.

In some implementations, there is provided a process for monitoring asphaltenes agglomerates size in a paraffinic froth treatment (PFT) process stream, comprising obtaining near infrared (NIR) spectral measurements of the PFT process stream; determining an upward flow velocity of the overflow diluted bitumen using a NIR calibration model correlating the NIR spectral measurements to the upward flow velocity; and determining asphaltene agglomerate sizes based on the estimated upward flow velocity.

In some implementations, there is provided a process for monitoring a paraffinic froth treatment (PFT) operation, comprising obtaining near infrared (NIR) spectral measurements of a PFT process stream comprising a paraffinic solvent; and determining soluble-water content in paraffinic solvent based on the NIR spectral measurements; measuring total water content in the paraffinic solvent; and determining non-soluble water content in the paraffinic solvent by based on the determined soluble-water content and the total water content. In some implementations, the process also includes determining the non-soluble water content comprises subtracting the soluble-water content from the total water content. In some implementations, the total water content is measured using laboratory titration techniques.

In some implementations, there is provided a process for monitoring a paraffinic froth treatment (PFT) operation, comprising obtaining near infrared (NIR) spectral measurements of a PFT process stream comprising a paraffinic solvent; and determining soluble-water content in paraffinic solvent based on the NIR spectral measurements.

In some implementations, there is provided a process for monitoring zone settling behaviour in a settling unit of a paraffinic froth treatment (PFT) operation, comprising obtaining near infrared (NIR) spectral measurements of material within the settling unit via an NIR probe located within a settling chamber of the settling unit; and determining a zone settling behaviour characteristic within the settling chamber based on the NIR spectral measurements.

In some implementations, the zone settling behaviour characteristic comprises a velocity. In some implementations, the zone settling behaviour characteristic comprises an upward flow velocity. In some implementations, the zone settling behaviour characteristic comprises an interface location, movement and/or composition, the interface being defined between an upper hydrocarbon phase fraction and a lower aqueous phase fraction.

In some implementations, the settling unit comprises a first stage gravity settler of a froth separation unit (FSU). In some implementations, the settling unit comprises a second stage gravity settler of a froth separation unit (FSU).

In some implementations, there is provided a process for controlling a paraffinic froth treatment (PFT) operation, comprising monitoring the PFT operation as defined above or herein; and adjusting at least one PFT process parameter based on the determined non-soluble water content.

In some implementations, there is provided a paraffinic froth treatment (PFT) process, comprising adding paraffinic solvent to bitumen froth to produce diluted froth; separating the diluted froth into a diluted bitumen stream and a diluted tailings stream; separating the diluted tailings stream into a recovered solvent stream and a solvent recovered tailings; separating the diluted froth into a recovered solvent stream and a bitumen product; and controlling the PFT process based on at least one physicochemical characteristic that is derived from near infrared (NIR) spectral measurements obtained from at least one PFT process stream.

In some implementations, the process also includes monitoring the PFT operation as defined above or herein. In some implementations, the process includes adjusting at least one operating condition of the PFT process in response to the physicochemical characteristic determined by NIR. In some implementations, the adjusted operating condition comprises feed rate of diluted froth into the froth separation unit (FSU), dosage of process-aid, flow rate of an overflow and/or underflow stream, or solvent-to-bitumen (S/B) ratio, or a combination thereof.

BRIEF DESCRIPTION OF DRAWINGS

FIG. 13 is three overlapped NIR spectra over a five minute period with −Zoomed in.

FIG. 23 is a picture of an optimization tool listing error values for frequency ranges and rank

FIGS. 77(*a-d*) are comparisons of lab results of two samples collected at the same time frame.

DETAILED DESCRIPTION

The techniques described herein relate to processes of producing bitumen from bitumen froth in conjunction with the use of methods of monitoring various aspects of paraffinic froth treatment (PFT) operations. In particular, the use of near infrared (NIR) spectrometry and chemometric analysis to continuously monitor and enable measurements of physical and chemical properties of various streams in PFT operations, which can be done in real time online and can facilitate process control. In addition, NIR spectrometry can be used to acquire NIR spectra measurements from a PFT process stream and the NIR spectra measurements and chemometric analysis can, in turn, be used to determine both composition characteristics of the PFT process stream as well as operational features of a PFT process unit which may be upstream.

Figure 1A:
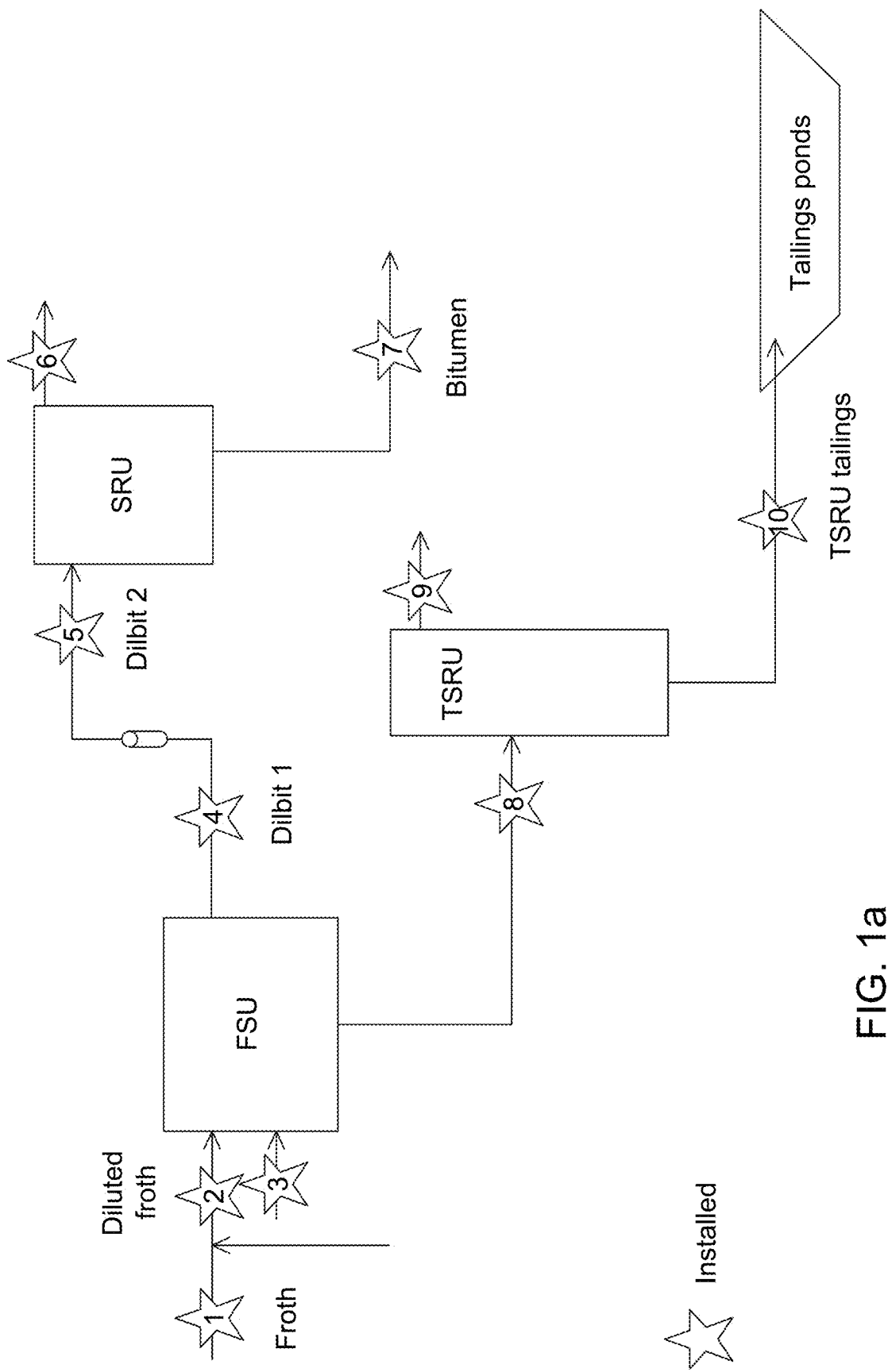
FIGS. 1a to 1c are schematics illustrating parts of PFT processes.
Figure 1B:
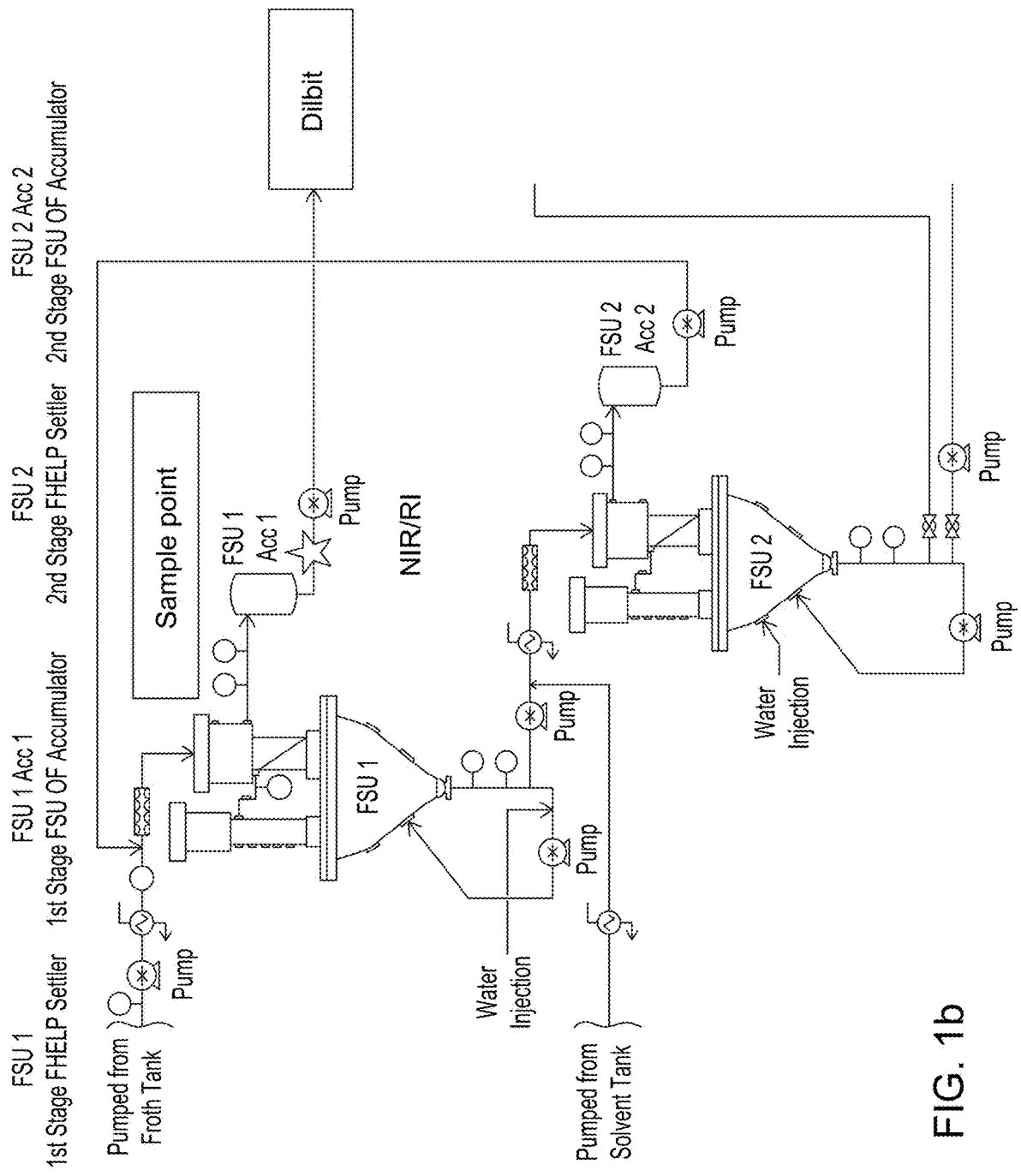

"PFT process stream" means any fluid stream involved in the PFT process. More particularly, as shown in FIG. 1*a*, the PFT process stream can include bitumen froth, diluted bitumen froth, first or second stage overflow streams in the FSU, first or second stage underflow streams in the FSU, recovered solvent from the SRU, TSRU or VRU, diesel-containing streams used for start-up or cleaning the PFT vessels or lines, bitumen product, or TSRU tailings. The PFT process stream may be a two-phase fluid containing a hydrocarbon phase and an aqueous phase, or a single-phase fluid in some cases. In a preferred implementation, the PFT process stream is diluted bitumen overflow from the first stage settling vessel of the FSU.

Chemometrics is a method used for developing NIR calibration models for chemical systems. Chemometric methods facilitate processing laboratory or other data along with NIR spectral measurements to provide a calibration baseline model (also called a preliminary model). In some implementations, chemometric methods are used to develop multivariable calibration models using appropriate statistical tools, such as OPUS/QUANT Spectroscopy Software (by Bruker™), for example.

Bitumen content, solvent content, solvent-to-bitumen ratio (S/B), density, and asphaltenes content can be determined using strong NIR calibration models built using chemometric methods. In addition, NIR spectral measurements have been used to estimate the flux or upward velocity in the FSU settling vessel, certain water contents, solids contents, certain residual component contents in hydrocarbon-containing streams, and asphaltene agglomerates size via the development of NIR calibration models showing suitable correlations. In PFT operations, S/B ratio is an important parameter to determine the amount of asphaltene precipitation and the product quality, and is therefore usually used for both operational control and product quality control. Therefore, reliable NIR monitoring of S/B and asphaltenes content in diluted bitumen have been developed for facilitating enhanced PFT process control.

Monitoring the quality of the diluted bitumen is important in PFT operations. In this regard, one benefit of NIR monitoring online/inline is that it can significantly reduce turnaround time when the product quality becomes off-specification, through adjusting operational conditions to control product quality. Reliable online/inline measurement can replace manual sampling, reduce human errors related to laboratory analysis, and minimize safety risks associated with sample collection.

In pilot tests, conventional NIR monitoring methods have not been able to detect water and solids content at the low levels that can occur in PFT operations. While conventional NIR models have not been reliable regarding the determination of water content and solids content because of poor lab analysis and sample handling resulting in weak correlations, techniques described herein provide water and solids models that allow continuous and online monitoring of the diluted bitumen quality and other PFT process streams. Extended study of bench scale settling tests and Stokes' Law have been leveraged to provide reasonable prediction for water content and solids content in diluted bitumen. NIR based techniques can thus facilitate monitoring of the variation of water content and solids content in diluted bitumen. As such, NIR based techniques are a powerful tool for implementation of online/inline product quality control and for online/inline operational control. Various other relevant characteristics of PFT process streams and PFT unit can be monitored via NIR based techniques, as will be explained in detail below.

NIR Spectrometry and Process Control Implementations

Referring to FIG. 1a, various NIR based measurement and monitoring techniques can be implemented in connection with PFT operations. NIR probes can be implemented at various points in the PFT process. For example, a first NIR probe may be provided to determine composition of froth before dilution with the paraffinic solvent. A second NIR probe may be provided to determine composition of diluted froth as the feed of a froth separation unit (FSU). A third NIR probe may be provided within an FSU vessel (e.g., first stage separation vessel) to determine composition of diluted froth and/or diluted bitumen, and to monitor the interface between hydrocarbon phase and aqueous phase in the FSU. Fourth and fifth NIR probes may be provided to determine composition and S/B ratio of a diluted bitumen overflow stream produced by the FSU and supplied to a solvent recovery unit (SRU). Additional NIR probes may also be provided to measure physical and chemical properties of other streams such as FSU tailings, tailings solvent recovery unit (TSRU) tailings, TSRU recovered solvent, bitumen product, SRU recovered solvent, or vapor recovery unit (VRU) solvent.

In some implementations, the NIR probes are used to obtain NIR spectral data that can be used to monitor PFT process stream compositions as well as operating parameters of PFT units, examples of which will be further described below. The NIR probes and associated analysers and controllers can be automated to provide continuous data acquisition and control, or can be manual or semi-manual to provide more periodic data acquisition and control. The NIR probes can be installed to provide NIR online or at-line measurements. The NIR probes can be used online, where the probes are physically integrated on pipes located upstream or downstream any unit of the PFT operation or with respect to slip streams. The NIR probes can also be integrated within one or more vessels.

Figure 2:
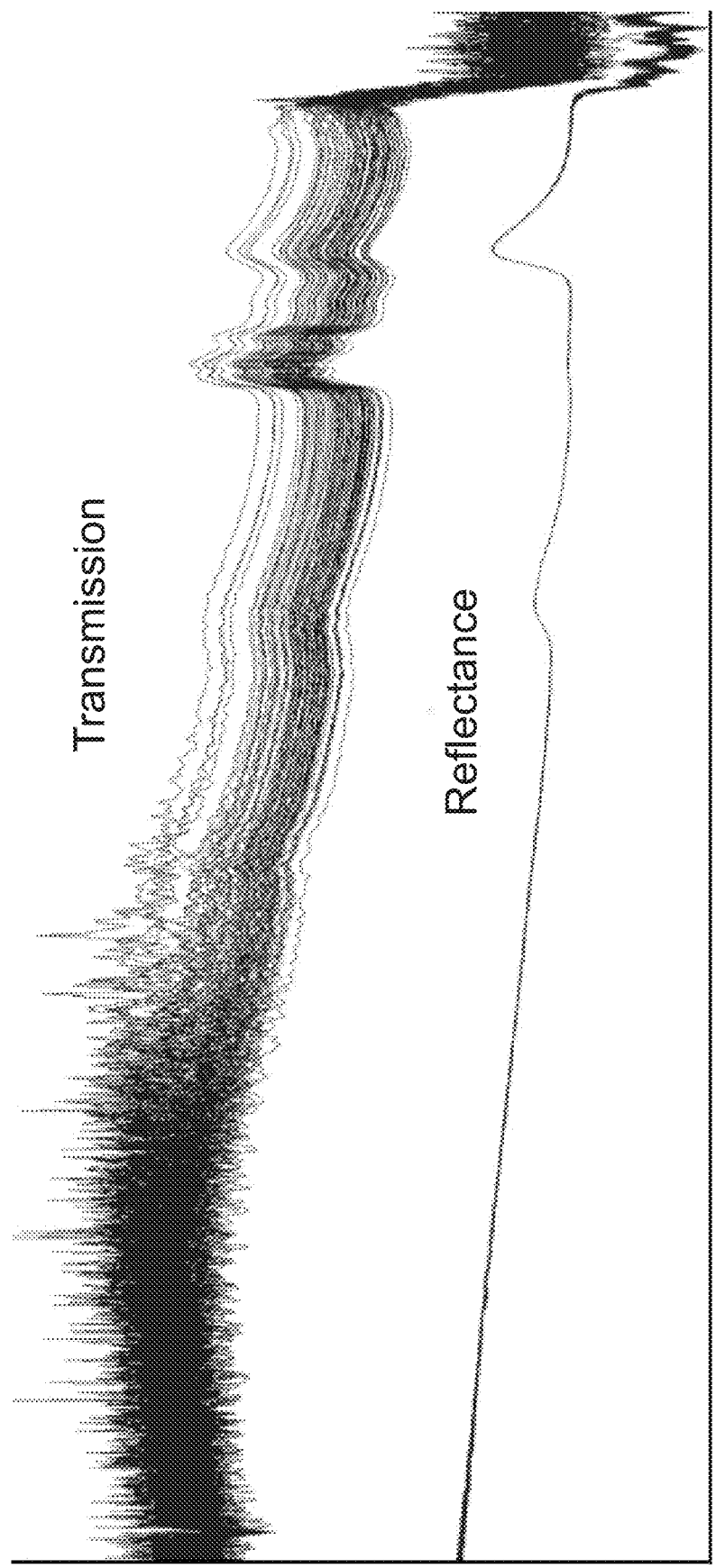
FIG. 2 is a graph comparing transmission and reflectance spectra for NIR spectra over a period of time

Transmission-type NIR probes (transmission probes) and/or reflectance-type NIR probes (reflectance probes) can be used. It was found that reflectance-type NIR probes provided sharp, clear, stable spectra; while transmission probes were sensitive but provided noisy data, as illustrated in FIG. 2.

It should be noted that the two different types of NIR probes may be used for different applications within PFT, e.g., for different concentration ranges. In some implementations, a transmission probe can be selected to measure concentrations lower than 1000 ppm. A reflectance probe, which is more robust and easier to maintain but less sensitive, can be selected to measure concentrations above 1000 ppm. In some implementations, one or both types of probes may be present in a PFT process. For example, a reflectance probe may be present to detect a high concentration corresponding to a safety or upset limit, while a transmission probe may be present to detect lower operational concentrations that may be expected during normal operation (e.g., for fine-tuning). For instance, pentane content in start-up hydrocarbon fluids such as diesel, can be too low to be accurately measured with reflectance NIR, and a transmission probe would be preferred. Transmission and reflectance probes can be located at different points in the PFT process to monitor different streams, or both transmission and reflectance probes can be located at the same point and optionally integrated within the same probe structure for online implementation.

In some implementations, the PFT process includes multiple NIR probes at different locations. The NIR based measurements can facilitate online monitoring of relevant process characteristics and optimizing the PFT process. Online NIR measurements can facilitate rapid data acquisition of process variables that are relevant to the control of PFT process stream quality, and thus can avoid delays related to laboratory-based sampling and measurement techniques.

The term "NIR measurements" as used herein, encompasses spectral measurements such as NIR spectra. Depending on the type of probe used, i.e. reflectance probe or transmission probe, NIR spectra may be reflectance spectra or transmission spectra. In some implementations, the NIR spectral measurements include at least one NIR spectrum. It may include a plurality of NIR spectra; in such scenarios, the NIR measurements may comprise an average NIR spectrum derived from the plurality of NIR spectra.

In some scenarios, NIR based monitoring techniques can be used to determine composition of various streams in the PFT process. Based on the NIR derived compositions, it is possible to control at least one operating condition of the PFT process, e.g., to improve or control quality of PFT process streams. For example, the operating condition can include feed flow rate, solvent-to-bitumen ratio, process-aid content, paraffinic solvent composition, outlet flow rates, for any unit of the PFT process. The operating condition can be adjusted such that the NIR derived composition does not reach an upset limit.

In some implementations, the PFT product is diluted bitumen from a FSU. However, techniques described herein in relation to the monitoring and control of FSU and diluted bitumen can be adapted to other PFT units and streams.

NIR Probe Orientation and Location

In some implementations, NIR spectral measurements of a PFT process stream can be acquired by positioning the NIR probe within a pipe section through which a two-phase PFT process stream flows. In particular, the pipe section is selected and the NIR probe is positioned within the pipe section to be in contact with a stratified hydrocarbon phase of the PFT process stream, thereby not being in contact with or acquiring spectral data from the aqueous phase. The radiation source is directed at the hydrocarbon phase and the detector receives the NIR radiation from the hydrocarbon phase.

PFT process streams include hydrocarbon, mineral and aqueous components, which may tend to stratify inline under certain circumstances. Within the overall PFT system, there can be various equipment, instrumentation and piping configurations that may promote stratification or mixing of the two phases at different points in the process. Valves, pipe bends, mixers, and the like tend to cause the two phases to mix together, while straight horizontal pipe sections can promote stratification of the hydrocarbon phase and the aqueous phase to respectively form upper and lower strata within the pipe section.

In some implementations, the NIR probe is installed online in a pipe section at sufficient distance after a flow impediment (e.g., valve, vessel or pipe bend), where the two phases (hydrocarbon and aqueous) are stratified. The NIR probe location and orientation is provided to ensure that it is analyzing the hydrocarbon phase. In some implementations, the NIR probe can be oriented toward the hydrocarbon phase to minimize or avoid exposure to the water phase. The radiation source emitted by the probe is directed toward the hydrocarbon phase of the PFT process stream.

In some implementations, the NIR probe is installed in straight horizontal pipe section where the PFT process stream is stratified. In some implementations, the NIR probe is installed in a horizontal pipe section spaced away from elbows, valves or vertical sections where the flow regime would cause mixing and destratification of the phases.

In some implementations, the NIR probe locations can be based on CFD modelling regarding the separation of immiscible systems, mathematical models, and/or empirical testing. CFD models, for example, can help understand how immiscible systems flow in pipes. For instance, it has been found that for large size lines and high velocities in the line, the flow tends to be stratified in the horizontal direction. According to tests, it was found that separate layers formed at 6 to 8 pipe diameters downstream from a turbulence point in the pipeline. This behavior allows placing the probe in the upper region of the pipe section to ensure that the probe stays within the hydrocarbon phase which is lighter than the aqueous phase. In some implementations, the NIR probes that are placed in-line can be located at least 6, 7, 8, 9 or 10 pipe diameters downstream of a turbulence point.

In terms of the NIR probe location within the cross-section of a pipeline, it can be useful to consider the pipe's circular cross-section which has an upper region and a lower region separated by a horizontal chord. The upper and lower regions can be defined depending on the composition of the PFT process stream and the degree of stratification, for example. Locations around the pipe's cross-section will be described using a clock position analogy below.

In some implementations, the 12 o'clock position is avoided since non-condensable vapors that may be present can be at the top of the pipe and could thus interfere with the NIR probe. In a preferred implementation, the NIR probe is installed close to the inner pipe wall between the 10 o'clock and the 11 o'clock position (or the 1 o'clock and 2 o'clock position).

The position of the NIR probe can depend on the volumetric proportions between the immiscible phases within the pipe section. In some implementations, the PFT process stream is a diluted bitumen overflow stream, which is substantially only hydrocarbon phase (generally at least 98%) and thus the aqueous phase is minor. In such implementations, the NIR probe may be placed in a position chosen over a larger surface of the pipe, e.g., between the 7 o'clock position and the 5 o'clock position avoiding region around the 6 o'clock position as well as the 12 o'clock position as mentioned above. Nevertheless, since breakthroughs of the aqueous phase into the hydrocarbon phase due to high flux may occur, the NIR probe can be generally installed at the 9 o'clock position or above.

In some implementations, the NIR probe can be installed on a sample bypass loop or slip stream line. The NIR probe can thus be isolated from the operational unit and pipeline, which can facilitate removal, maintenance and/or troubleshooting of the probe, if required, while the PFT process unit is online. For example, for removal or maintenance, the bypass or slip stream line can be shut off and the PFT operation can continue uninterrupted. The bypass or slip stream line can also be configured so that the NIR probe is installed at a desired cross-sectional location (e.g., around 11 o'clock) and a desired longitudinal location (e.g., at least 6 pipe diameters downstream from a turbulence point) to acquire the measurements of interest. Providing NIR probes associated with bypass or slip stream lines can also facilitate adjusting sample conditions, controlling bitumen/diesel composition via diesel addition, and cleaning (e.g., flushing) of the NIR probe for instance by flushing the sample line instead of the process line to prevent plugging and/or fouling of the probes.

The NIR measurements that are obtained are used to construct NIR correlation models, determine various physicochemical characteristics of PFT process streams, and ensure quality control or operational control of the PFT process.

NIR Monitoring of PFT Process Streams and Units

Various PFT streams and units can be monitored using NIR methods. In general, NIR spectral measurements are obtained and used to determine one or more physical or chemical characteristics of the PFT process stream and/or an upstream PFT unit. The characteristics can be determined using a NIR calibration models having a correlation allowing for accurate estimation of the characteristics, and the measurements can be used for process control strategies to maintain performance and efficiency.

Generally, PFT processes produce high quality, partially de-asphalted bitumen products, with low solids and water contents. This can eliminate the need for upgrading the bitumen product before selling to a high-conversion refinery, for example. Solvent diluted bitumen produced in a PFT process needs to meet quality specifications before being commercialized. Generally, final bitumen product should contain less than 0.5 wt % of solids and water, have a viscosity below 350 cP and a density below 940 kg/m$^3$. These specifications may be enabled and controlled by monitoring various parameters and physicochemical characteristics in the PFT process. For example, the presence of more than 10 wt % of asphaltenes in diluted bitumen increases the diluted bitumen viscosity and hinders its flow within the pipe. Low viscosity allows the diluted bitumen to be pumped even at low temperature. Other characteristics, such as S/B ratio, are also of importance for certain PFT process streams.

As explained above, the PFT process includes various separation vessels in the FSU, SRU, TSRU and other unit operations of the process. Separation vessels have certain operating parameters that can be monitored and controlled to maintain performance. For example, in settling vessels the upward velocity of the overflow stream is a parameter that can be monitored to assess performance and detect upsets in the settling process.

The physicochemical characteristic of the PFT process stream can be a physical property, such as density, viscosity, or asphaltene agglomerate size or size distribution. The physicochemical characteristic can be a dynamic characteristic, such as a flow velocity or a settling velocity within a unit of the PFT process, e.g., an upward velocity of the diluted bitumen overflow for a settling vessel. The physicochemical characteristic can be a chemical composition, such as bitumen content, paraffinic solvent content, asphaltene content, mineral solids content, water content (soluble-water content, or free-water content). It has been found that certain water chemistry characteristics (e.g., chloride content) may also be determined using NIR spectral measurements.

Obtaining NIR spectral measurement can include the use of an NIR probe as described further above. In some implementations, at least one NIR probe is installed online, positioned in an upper region of a horizontal pipe section and within a hydrocarbon stratum; and a light source (e.g., laser beam) is emitted by the NIR probe into the PFT process stream. The probe may be a reflectance probe or a transmission probe, and can be selected depending on the nature of the PFT process stream and the characteristic to be determined.

The light emitted by the NIR probe interacts with the PFT process stream and the resulting radiation is captured by an NIR detector. The radiation received after interaction with the PFT process stream is captured and can be analysed by an NIR analyser, which provides the NIR spectral measurements. Any NIR analyser fitted with a fiber optic probe can be used to analyse the detected IR radiation and provide the NIR spectral measurements. For example, a Matrix-F FT-NIR spectrometer (Bruker®) with transmission and reflectance probes may be used to take NIR spectral measurements.

In some implementations, the NIR spectral measurements are continuously obtained during operation of the PFT process, and the physicochemical characteristics of interest are continuously determined. Once the NIR spectral measurements are obtained, they can be used to monitor the PFT process characteristics based on NIR calibration models. More regarding the calibration models will be discussed further below.

The NIR calibration models may be built using chemometric methods, laboratory analyses of collected or prepared samples, and corresponding NIR reflectance or transmission spectral measurements. In some implementations, the NIR calibration models are multivariable calibration models, and may be prepared using density QC/QA analysis. In addition, methods that include statistical tools, linear offset subtraction, straight line subtraction, vector normalization, min-max normalization, multiple scatter correction (MSC), first derivative and second derivative data processing methods, and/or a combination of data processing methods may be used, to emphasize chemical information derived from the NIR measurements and improve precision and accuracy of the determined characteristics.

In some implementations, a series of NIR calibration models using chemometric methods and based on reflectance spectra may be developed to determine the concentration of bitumen, pentane, and asphaltenes in diluted bitumen. Chemometric methods may also been used to develop the NIR models for S/B ratio and density in diluted bitumen based on reflectance spectra. It has also been found that NIR may also be used to determine the upward velocity of the diluted bitumen overflow, and to determine the water content and mineral solids content in diluted bitumen. The multi-functionality of an NIR probe and associated calibration models can facilitate monitoring of physical and chemical properties of various PFT streams as well as relevant parameters of PFT processing units.

NIR Based Determination of Bitumen, Solvent and Asphaltene Contents

In some implementations, NIR techniques are used to monitor bitumen, solvent and/or asphaltene contents in a PFT process stream. In PFT operations, the addition of a paraffinic solvent (e.g., $C_5$ alkanes such as n-pentane and iso-pentane) to the bitumen froth induces the precipitation of asphaltene flocs or aggregates. The composition and behavior of the resulting fluids can be relatively complex and challenging to handle. In addition, there can be certain target concentration levels of such hydrocarbon components in certain PFT process streams. For example, the target asphaltene content in the diluted bitumen overflow stream can be less than 10 wt %, in order to provide certain quality requirements for downstream processing and handling. In addition, S/B ratio is an important parameter that influences the quantity of asphaltene precipitation. In the FSU settling vessels, the settling rate of the asphaltene agglomerates is a function of the solvent composition, the process temperature and the S/B ratio.

Bitumen, solvent and asphaltenes (precipitated and non-precipitated) can be present in various PFT process streams, including diluted froth, diluted bitumen overflow, bitumen product, as well as underflow and tailings streams.

In some implementations, the NIR model is a multivariable calibration model. The NIR spectra include overtones and combination bands of the fundamental molecular absorptions found in the mid infrared region. NIR spectra include generally overlapping vibrational bands that may appear non-specific and poorly resolved. Therefore, qualitative and quantitative NIR spectroscopic methods advantageously include the application of multivariate calibration algorithms and statistical methods to model NIR spectral response to chemical or physical properties of the samples used for calibration. In multivariate analysis, the entire spectrum is analyzed and the model distinguishes each component present based on the series of peaks, slopes, and shapes within the spectrum, rather than by analysis at a particular wavelength or narrow range for each component.

Figure 12:
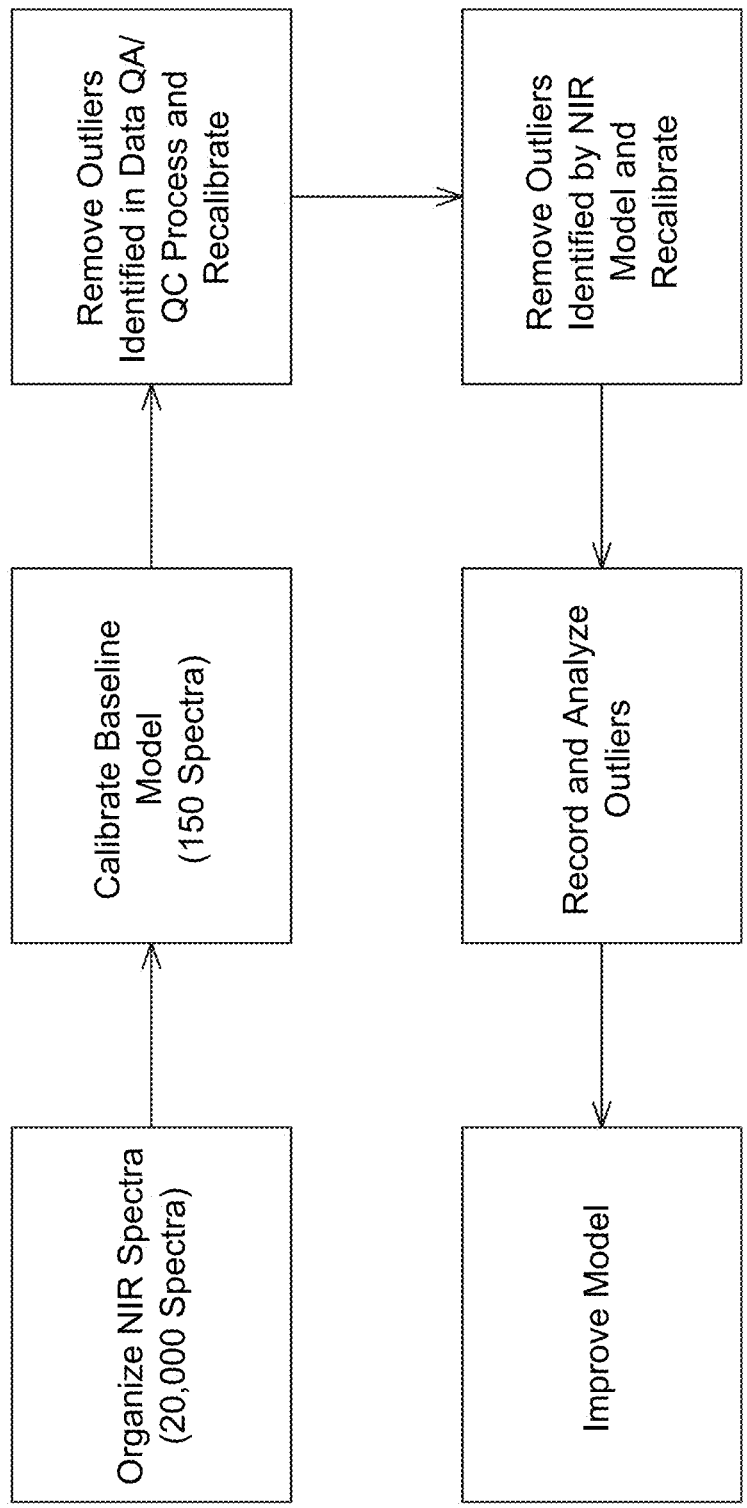
FIG. 12 is a flow chart of NIR model building work process.

In terms of developing calibration models for such hydrocarbon components, the NIR calibration model can correlate the NIR spectral measurements with the concentration of the relevant hydrocarbon component measured. The NIR calibration model can be developed by correlating NIR measurements with laboratory analyses. As illustrated in FIG. 12, the NIR model development can include certain steps, e.g., organizing NIR spectra; calibrating a baseline model; removing outliers identified in quality assurance/quality control (QA/QC) analyses; removing outliers identified by the NIR model and recalibrating; recording and analyzing outliers; and further improvement to the model. Various model development, refinement and validation techniques can be used.

In some implementations, NIR models can be developed by compiling laboratory analyses for the measurements of density, S/B ratio, and each individual concentration (bitumen, solvent, asphaltenes, etc.) in the PFT process stream (e.g., diluted bitumen) with NIR spectral measurements, using a chemometric method.

It was found that the incorporation of QA/QC laboratory data facilitated development of a reliable model. QA/QC analysis allows identifying and removing outlier data that may decrease the accuracy of the correlation model. The term "outlier data" refers to any observations that are distant from other observations in a random sample from a population, and may indicate measurement variability and/or experimental errors. In some implementations, a density-driven QA/QC analysis can be used to improve the NIR correlation models for S/B or asphaltene content.

Figure 8:
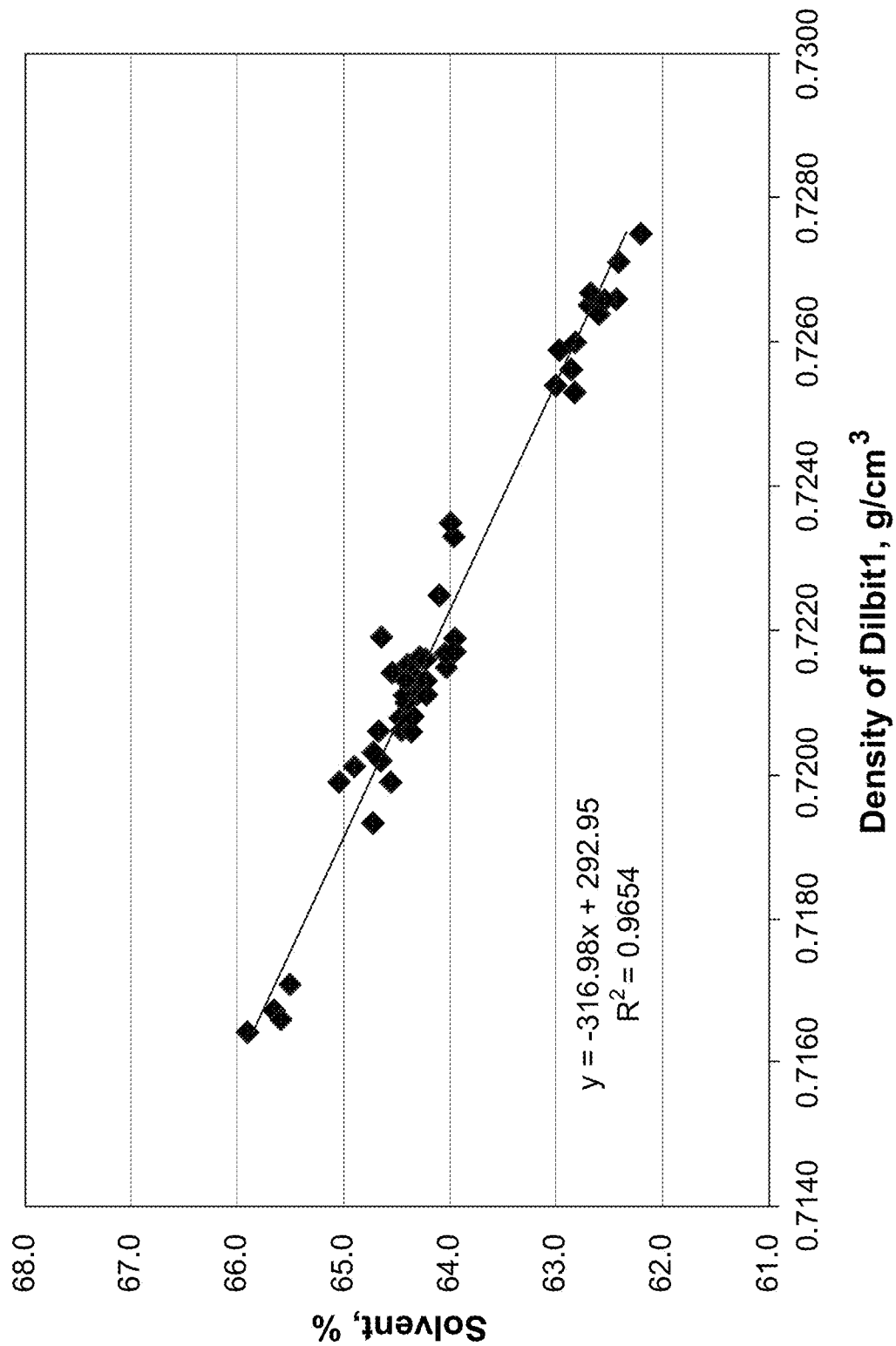
FIG. 8 is a graph showing a final correlation of density vs. % of solvent in diluted bitumen.
Figure 9:
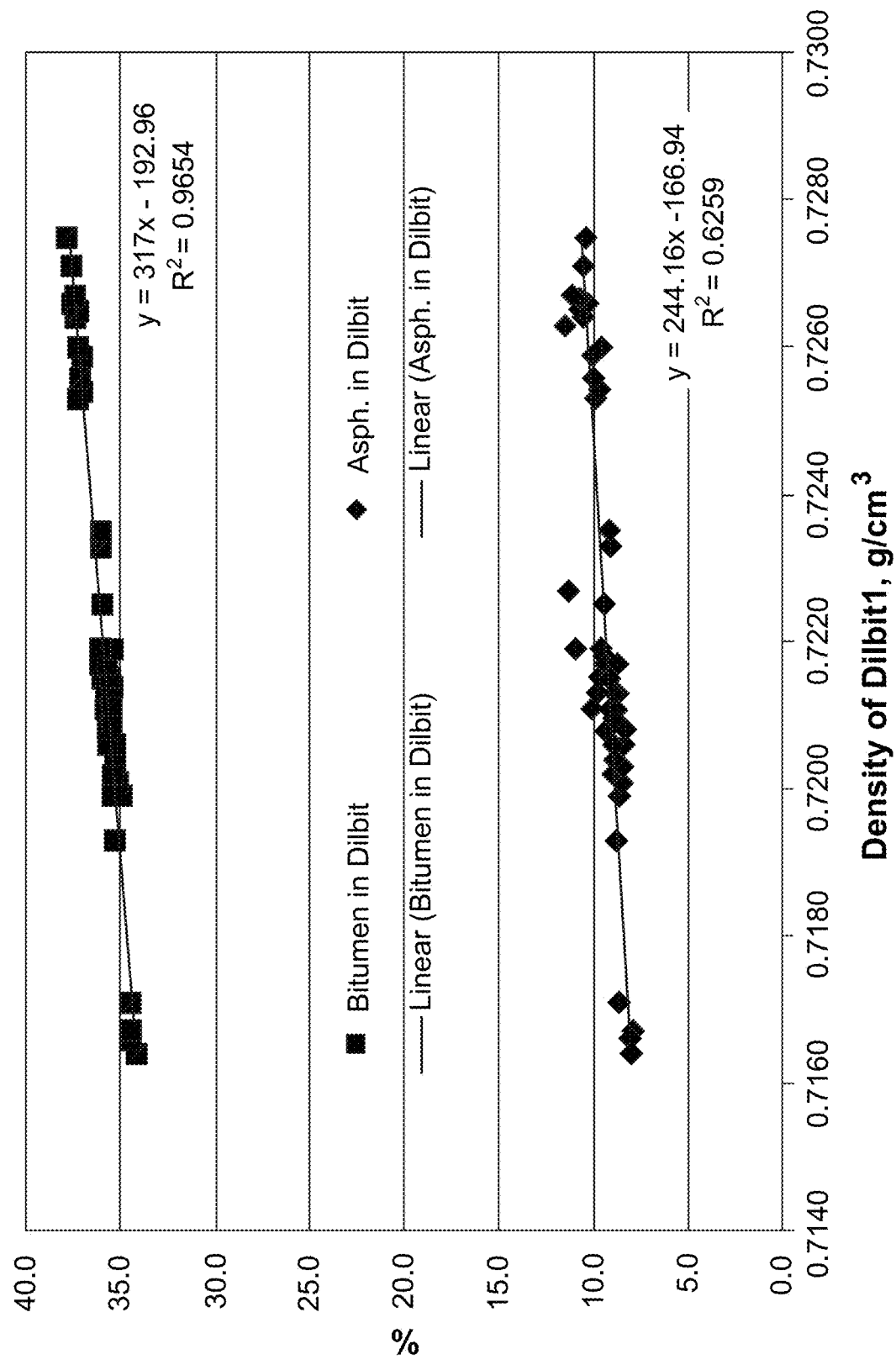
FIG. 9 is a graph showing a correlation of density vs. % of bitumen and % of asphaltenes in diluted bitumen.

It has been found that reliable NIR models can be developed for measuring density of the diluted bitumen. Because a strong correlation exists between the density and bitumen, solvent and asphaltene contents in diluted bitumen, density may be used to verify the accuracy and reliability of the generated values and it is thus facilitated to obtain reliable NIR calibration models for bitumen, solvent and asphaltenes contents, as well as for S/B. For example, FIGS. 8 and 9 show the strong correlation between density and solvent, bitumen and asphaltenes contents after removal of outlier data. In some implementations, the NIR model is further improved by identifying and removing additional outlier data using statistical tools.

Multivariable correlation models facilitate developing accurate estimations of bitumen, solvent and asphaltenes content as a function of NIR measurements. Correlation models may be improved based on different data processing methods. In some implementations, Multiple Scatter Correction (MSC) method, First Derivative (1D) method, vector normalization method, and/or a combination of these methods (as mentioned above) may be used.

The MSC method is suitable to the NIR spectra generated by light scattering of the colloidal particles in the medium. Asphaltenes-water-solids agglomerates exist in diluted froth or diluted bitumen, and they will affect the apparent NIR absorption. The 1D method will emphasize the chemical information of diluted bitumen such as bitumen, solvent and asphaltenes in NIR spectra. In the meantime, this method could eliminate the temperature impact on the spectra. However, it could eliminate the NIR absorption generated by light scattering from the particles in the medium.

NIR calibration models having strong correlations have been developed to determine density, solvent content, bitumen content, S/B ratio, and asphaltenes content in diluted bitumen. An example of modeling process is described in more detail in the Experimentation section further below.

Figure 28:
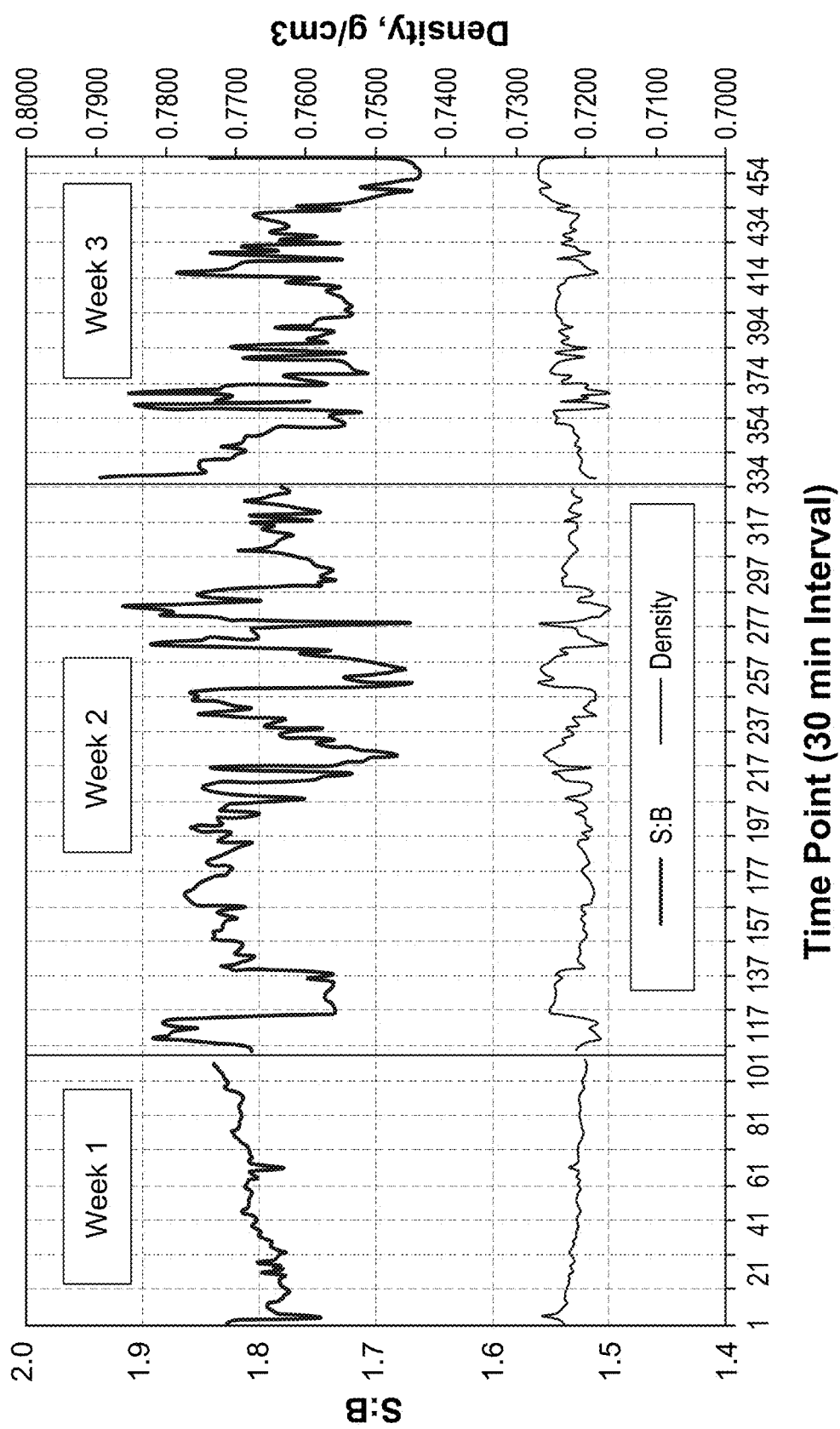
FIG. 28 is a graph of NIR predicted S/B ratio and density minus outliers during week A, B and C.
Figure 29:
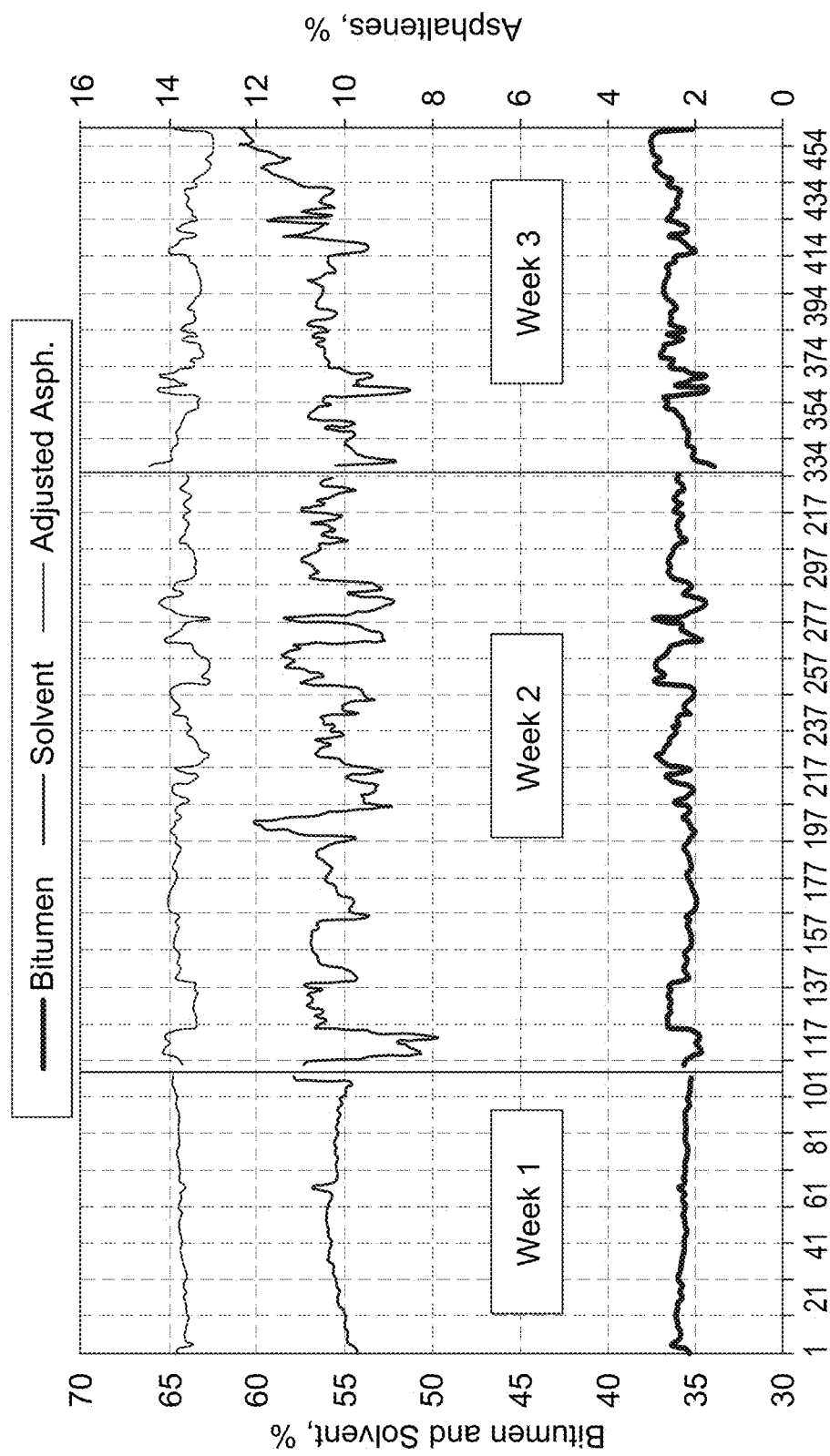
FIG. 29 is a graph of NIR predicted bitumen, solvent, asphaltenes contents minus outliers during week A, B and C.
Figure 30:
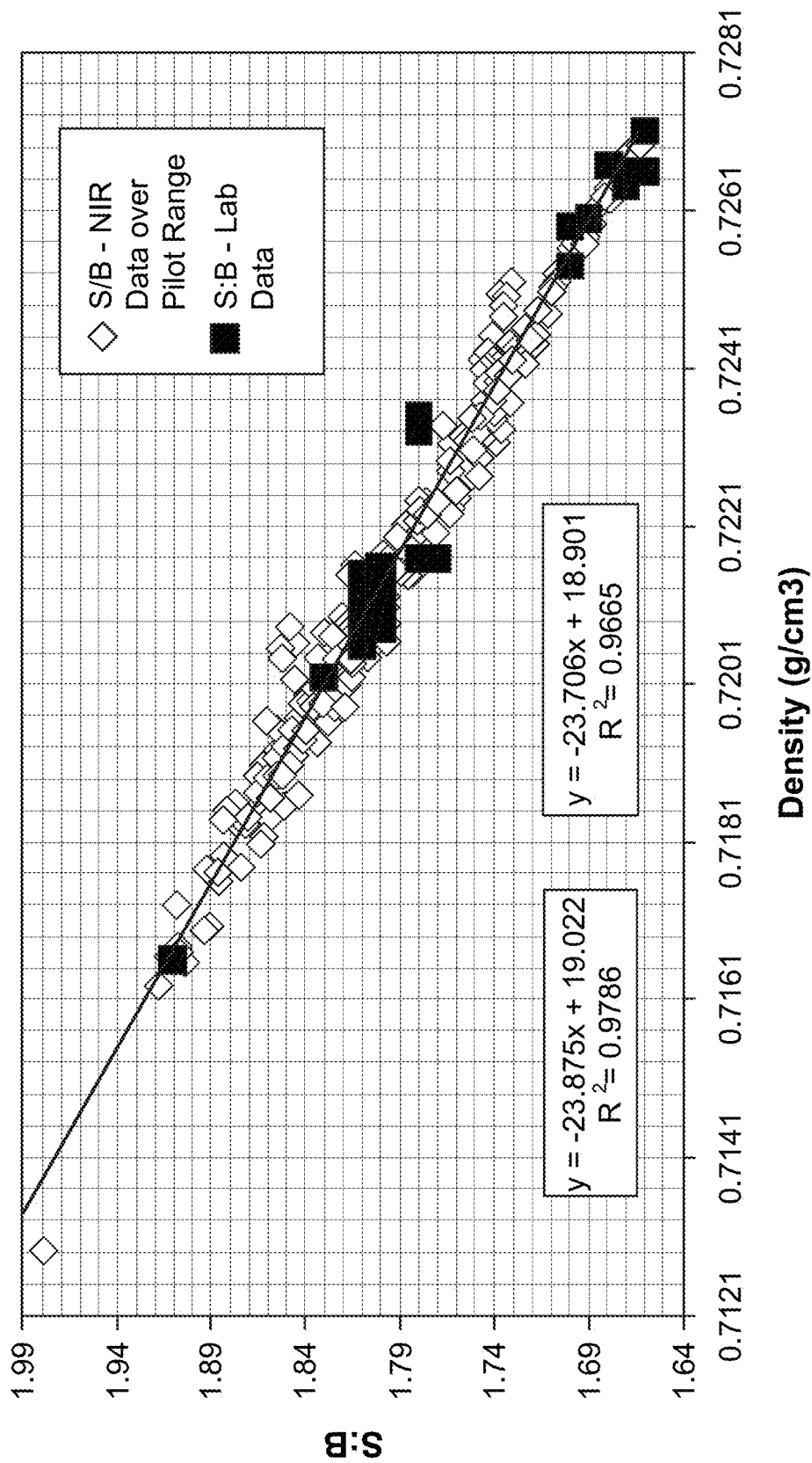
FIGS. 30 to 33 are comparisons of the correlation between density and S/B ratio for NIR prediction vs. lab data, for MSC model (FIG. 31), 1D model (FIG. 32), MSC model with adjusted asphaltenes content (FIG. 33), 1D model with adjusted asphaltenes content (FIG. 34).
Figure 31:
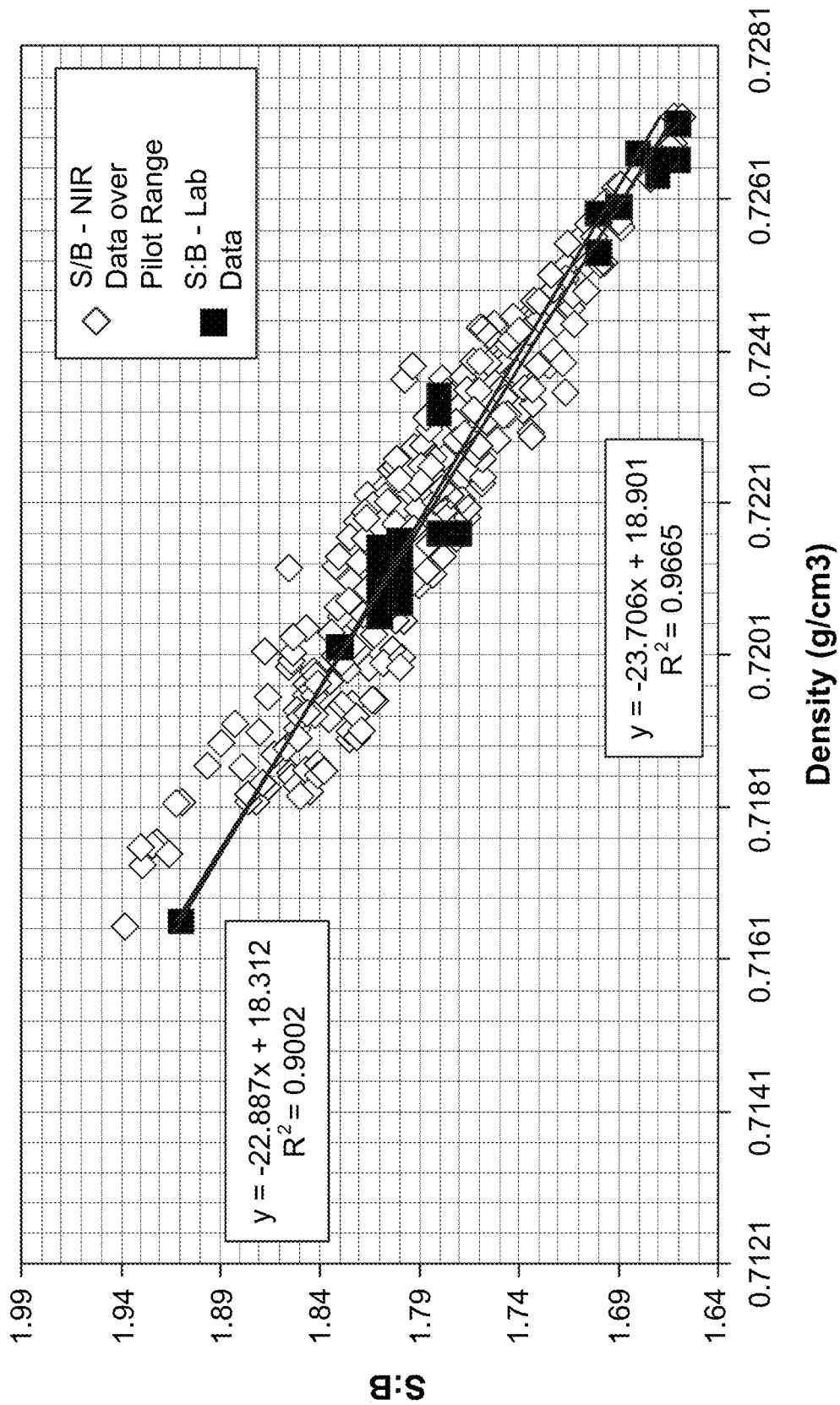
Figure 32:
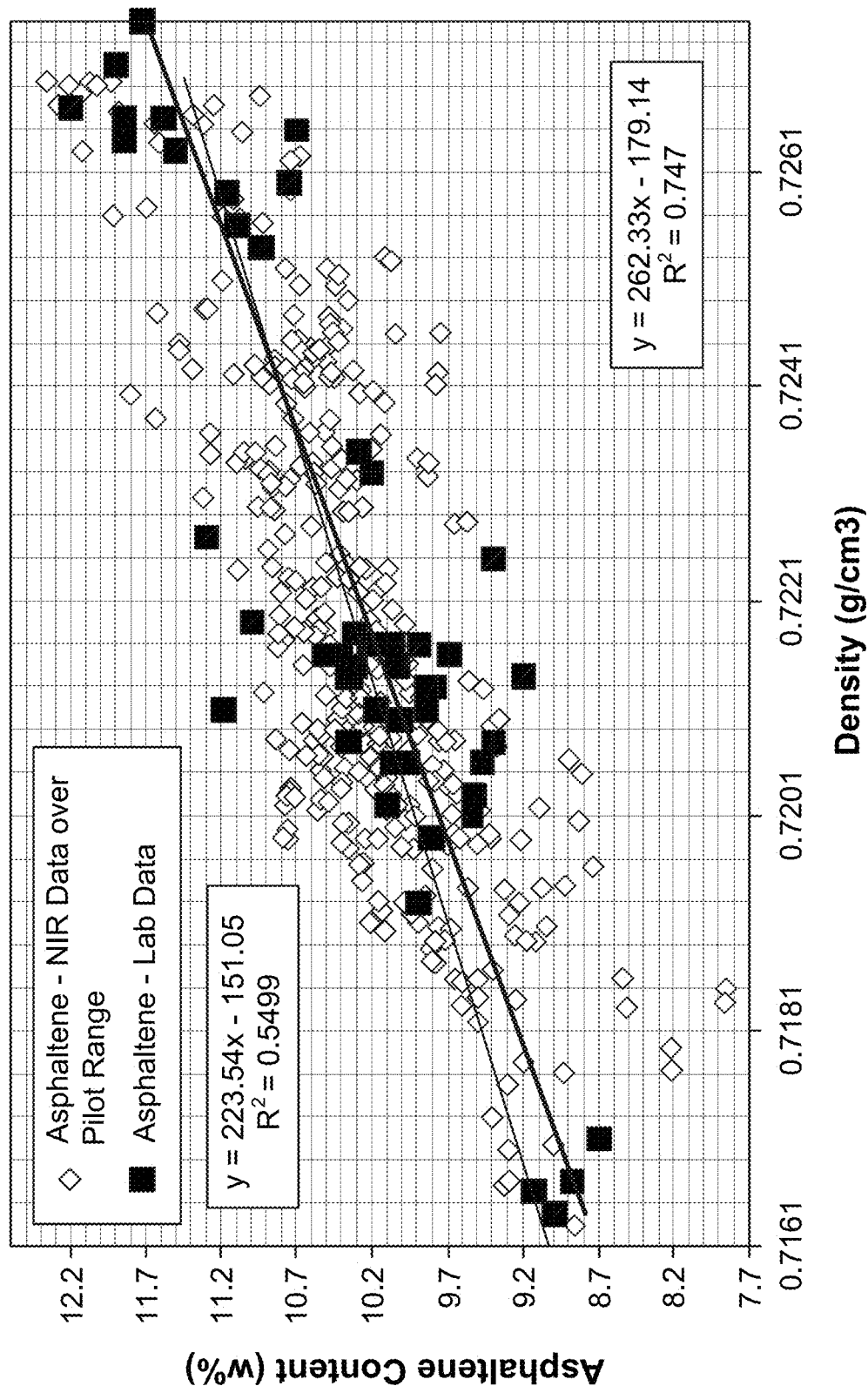
Figure 33:
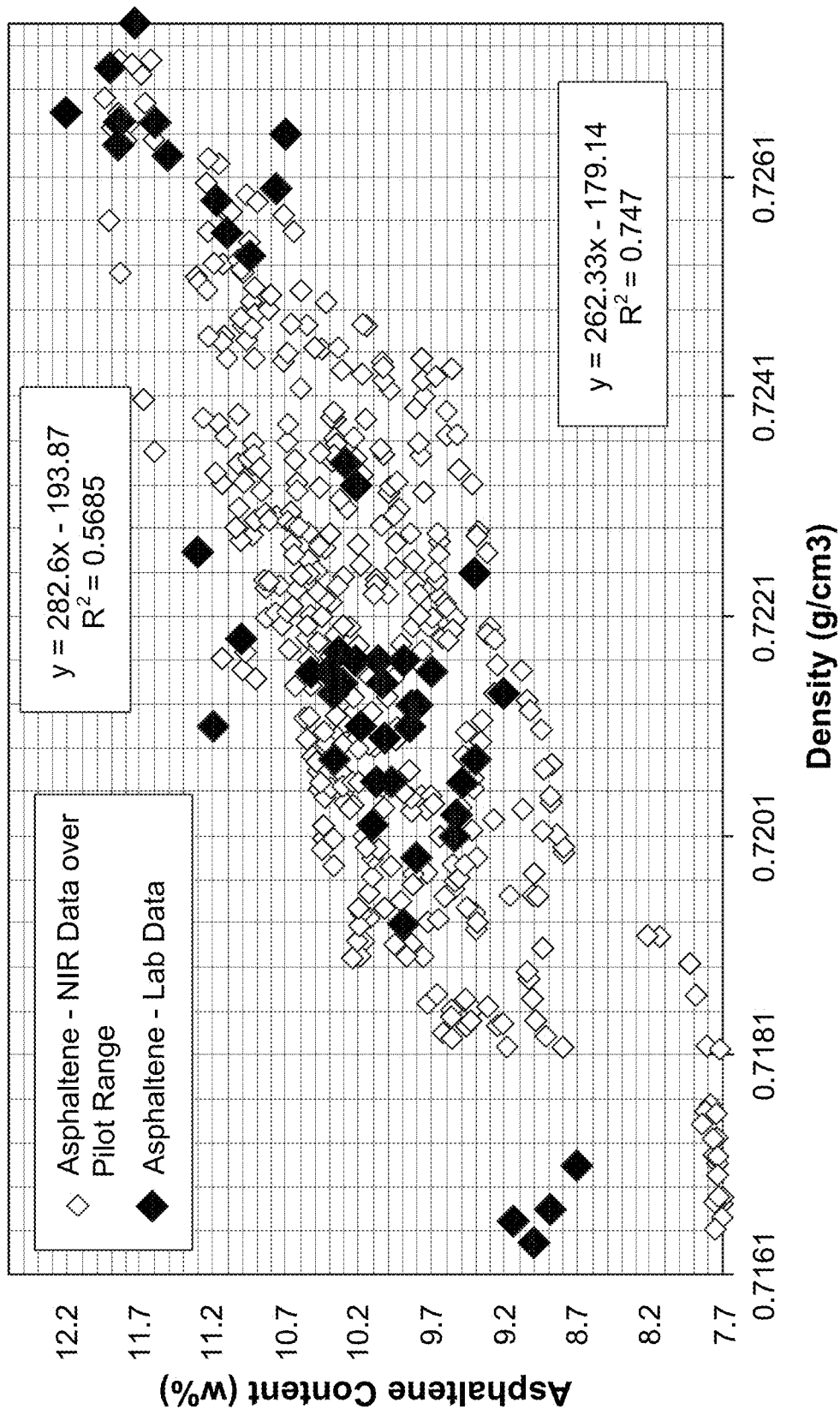

In some implementations, and as shown in FIGS. 28 and 29, using NIR correlation models can facilitate predicting both the density and the composition of the diluted bitumen (e.g., solvent, bitumen and asphaltene contents). The density and the different component concentrations may be predicted continuously and online, thereby allowing real time detection of the density and composition of the diluted bitumen in order to facilitate PFT process control.

In terms of PFT process control, there may be a controller or associated equipment that receives the NIR-derived process data (e.g., density or hydrocarbon concentration) and adjusts at least one upstream or downstream process parameter. The control can thus be feedback or feedforward. In some implementations, the NIR-derived process data is obtained for diluted bitumen overflow stream, and the adjustment of the PFT process includes adjusting operation of the FSU (e.g., S/B ratio, flow rates of the various inlets and outlets of the first or second stage settling vessels, etc.). Adjusting operation of the SRU can also be performed in some cases, for example by adjusting process parameters to deal with the given composition of the diluted bitumen stream.

Controlling the PFT process may be performed to maintain or increase the quality of the diluted bitumen. As the quality of the diluted bitumen is related to S/B ratio and/or asphaltene content and upward flux, once these contents and parameters are determined using NIR measurements and NIR correlation models, operational conditions may be adjusted to keep the contents within predetermined quality specifications. For example, if elevated asphaltene content is detected, the S/B ratio of the diluted froth and/or of the underflow of the first stage settling vessel, can be increased in order to increase asphaltene precipitation and removal from the resulting diluted bitumen. In turn, S/B ratios can be increased by introducing more pure solvent into the FSU (e.g., into the bitumen froth or into the first stage underflow) and/or by increasing the flow rate of the solvent-enriched second stage settler overflow that is recycled back into the bitumen froth. Other operating parameters can be adjusted in order to reduce asphaltene content in the diluted bitumen.

In some implementations, controlling the PFT process includes adjusting at least one of the following operating parameters: the flow rate of the bitumen froth feed supplied to the FSU, the S/B ratio, the solvent composition, flow rates of the outlet streams of the FSU (e.g., underflows and overflows), and process-aid content in the diluted bitumen. Depending on the PFT process stream being monitored, the process control actions may vary. For example, when the TSRU tailings are monitored, the process control actions may include adjusting feed or outlet flow rates of the two TSRU separation vessels, steam injection rate, recirculation rate of a portion of the underflow of one or both separation vessels, etc. For example, if TSRU tailings have a detected solvent content above target values, recirculation can be increased to increase residence time in the vessels which can promote liberation of solvent for recovery as an overhead stream and thereby reduce solvent content in the TSRU tailings. In an example of feedforward control, the SRU could be adjusted to respond to elevated solvent and/or asphaltene contents in order to reduce potential asphaltene precipitation and fouling in the SRU vessels. In addition, the PFT system can be outfitted with various optional recycle lines that periodically enable part or all of a process stream to be recycled when the composition does not accord with specifications; thus, such recycle lines can be activated in response to NIR based composition data. Furthermore, the quantity of process-aids (e.g., dispersants, demulsifiers, defoamers, and other surfactants, etc.) can be adjusted based on the NIR data in order to modify the behavior of certain components in the PFT separation units and thereby control the composition of the resulting PFT process stream. For example, monitoring water and solids in diluted bitumen can allow optimizing the dosage of demulsifier and asphaltene dispersant, or limiting foam formation in TSRU by controlling the usage of defoamer.

NIR Based Determination of PFT Separator Parameters

While determining component concentrations using NIR techniques can be useful for process control, there are several other parameters that are relevant to efficient PFT process performance. For example, in some implementations, NIR spectral measurements can be used to determine parameters of PFT units, such as separators. In the case of gravity settlers, for instance, which are typically used as the settling vessels in the FSU, it has been found that settling flow characteristics can be reliably and accurately correlated with NIR spectral measurements.

In some implementations, NIR spectral measurements are used to determine the upward velocity of the diluted bitumen overflow in the first stage settling vessel of the FSU. In addition, the upward velocity can be correlated with solids and water content in the diluted bitumen which can further facilitate process control, particularly of the FSU.

As briefly explained above, with addition of the paraffinic solvent asphaltenes present in the bitumen froth are precipitated in the form of aggregates, and the water and fine mineral solids are also bound to the asphaltene agglomerates. Thus, the asphaltene-water-solids aggregates are formed and settle downward in the settling vessels of the FSU for removal as underflow streams. As a result, a diluted bitumen stream with low solids and water contents is produced. In some scenarios, PFT processes can produce diluted bitumen containing less than 0.1 wt % of solids or water. While this low water and solids content is advantageous for the quality and value of the diluted bitumen stream, it presents some challenges in terms of monitoring such low concentrations in the diluted bitumen stream. In addition, solids content and water content in diluted bitumen are relevant parameters as they are related to the amount of asphaltenes rejected (i.e., if more asphaltenes are rejected, less solids and water are typically left in diluted bitumen).

Figure 10A:
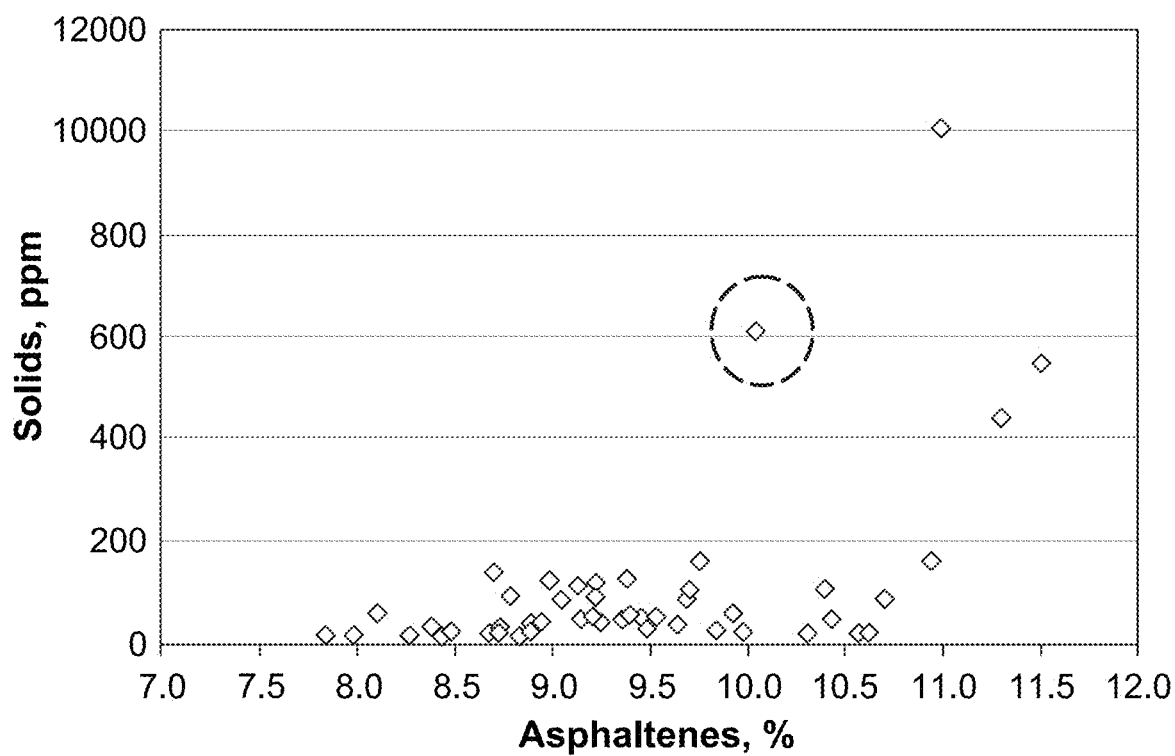
FIGS. 10a and 10b are two graphs showing the relationship of % of asphaltenes vs. % of solids and water in diluted bitumen.
Figure 10B:
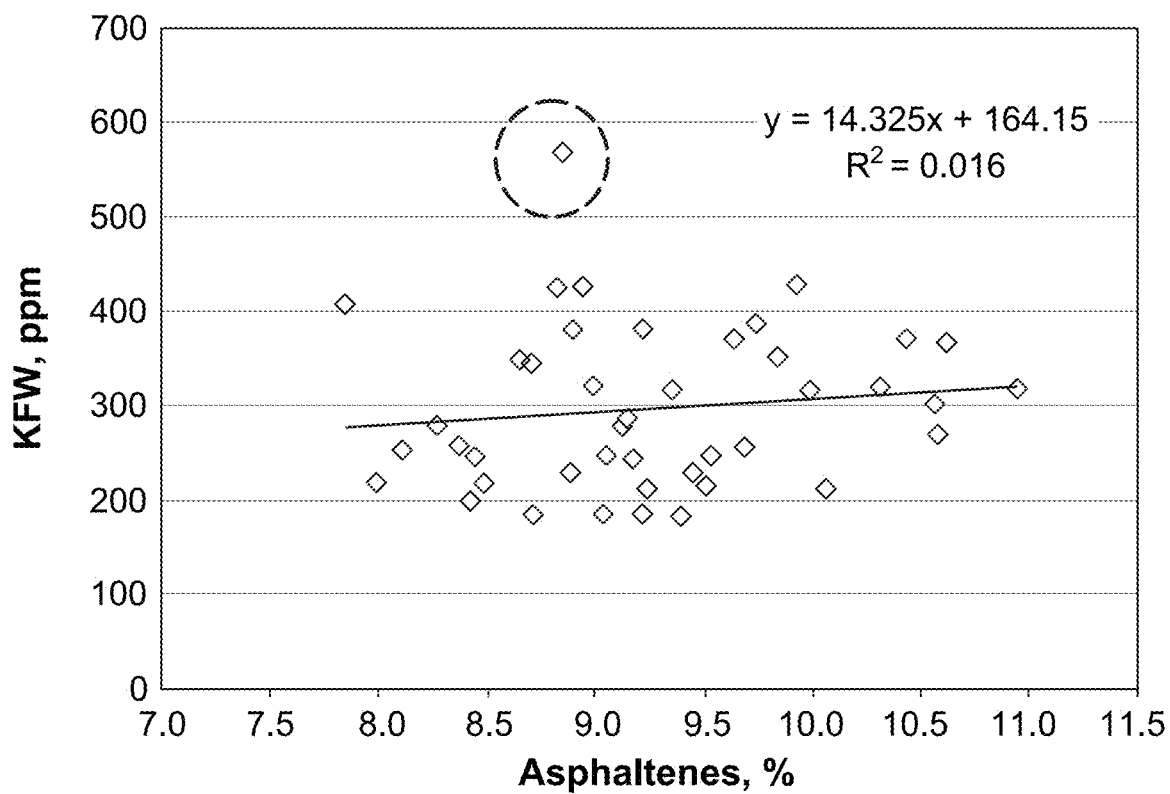
Figure 11:
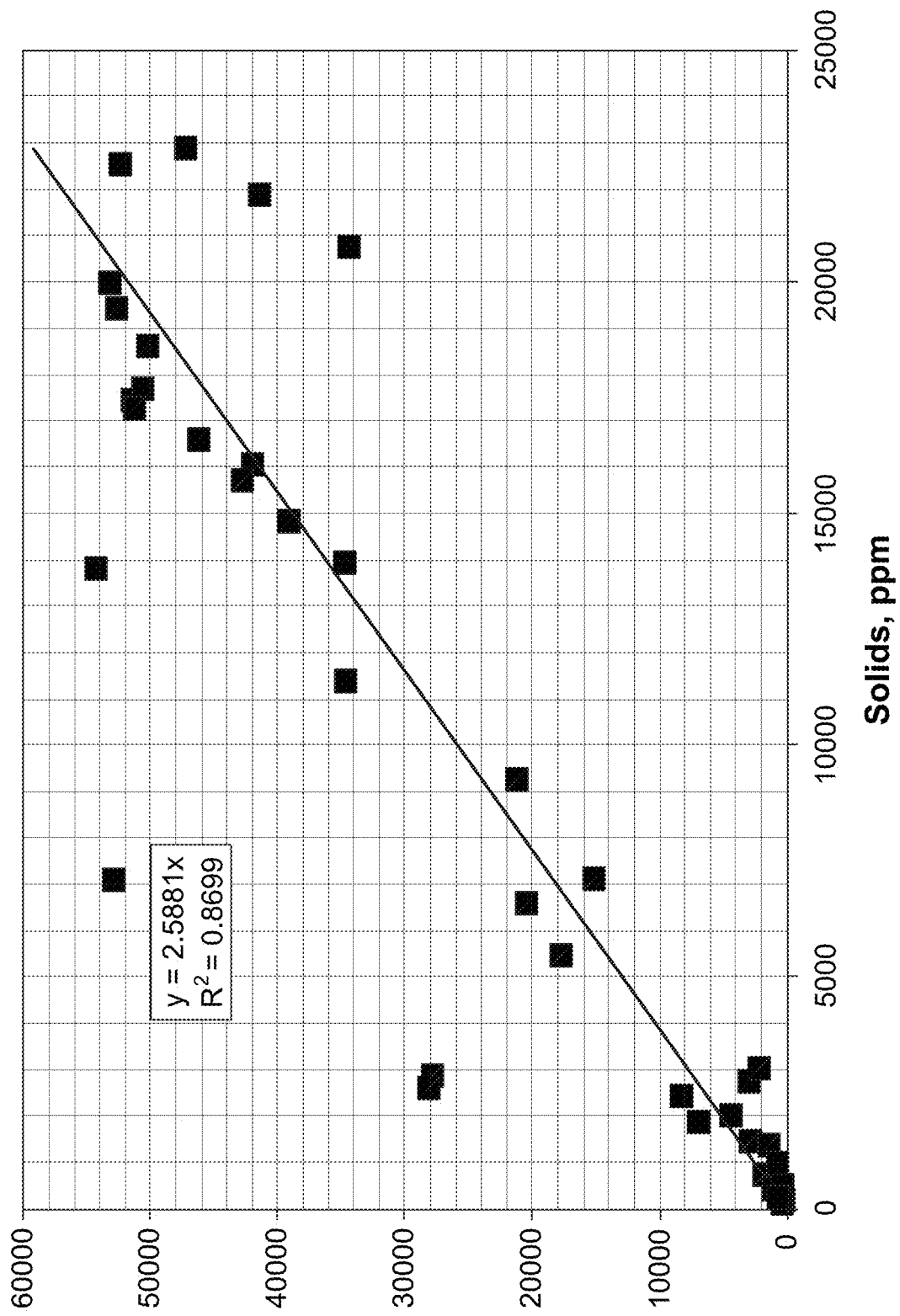
FIG. 11 is a graph showing the relationship of % of solids vs. % of Karl Fisher water (KFW) in diluted froth or diluted bitumen in PFT settling tests.

FIGS. 10 to 11 illustrate certain relations between solids and water content and asphaltene content in diluted bitumen (also referred to as "dilbit"). FIG. 10 illustrates the relation between asphaltenes content and solids content and water content in diluted bitumen from laboratory results. FIG. 11 illustrates a correlation between Karl Fisher Water (KFW) and filterable solids settling tests. However, because both water content and solids content are very low in diluted bitumen, measurements and resulting correlations can have reduced accuracy and reliability.

It has been found that there is a strong correlation between NIR measurements and the upward velocity (also referred to herein as the "flux") of the diluted bitumen overflow. In addition, since the upward velocity and the asphaltenes settling velocity, are related to the water content and the solids content, this aspect of the NIR techniques may be used to provide information on water and solids contents in diluted bitumen. Thus, the quality of a diluted bitumen overflow stream can be monitored by obtaining NIR spectral data and determining upward velocity based on the NIR data. The quality can also be monitored by further determining a compositional feature of the diluted bitumen overflow stream based on the determined upward velocity, particularly water and mineral solids contents. In turn, this stream quality information can be used for PFT process control. In some implementations, NIR calibration models based on NIR spectra can be developed based on Stokes' Law and the estimated flux in the settling vessel, and these models can then be used to estimate water and solids contents in the diluted bitumen.

Figure 1C:
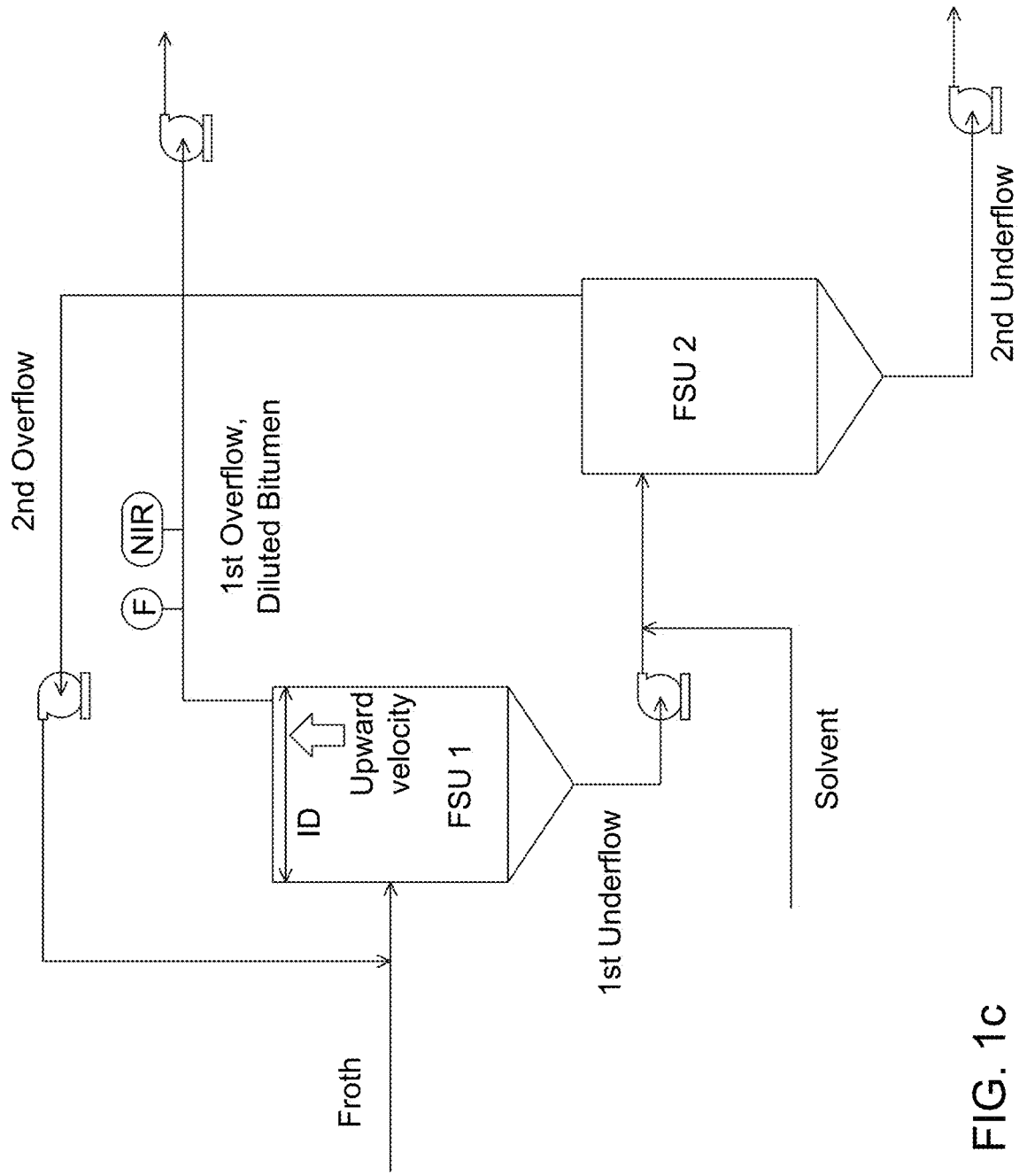

As briefly described above, in PFT operations, gravity settlers are used in the FSU to separate water, mineral solids and precipitated asphaltenes from diluted bitumen by gravity-assisted density difference. Often, two-stage or three-stage settler configurations are used where a downstream settler receives the underflow from the upstream settler and downstream settler overflows are recycled upstream. The first stage settler produces an overflow stream that is the diluted bitumen, while the last downstream settler produces an underflow stream that is the solvent diluted tailings supplied to the TSRU. FIG. 1c illustrates an example of a two-stage counter-current configuration. In the FSU settlers, the precipitated asphaltenes entrap micron-sized water droplets and fine mineral solids into asphaltenes agglomerates.

Zone settling behavior can be observed in the FSU settlers. At steady-state conditions, the interface between the overflow and the feed to the settler remains at a constant level. This means that the overflow velocity is less than the settling velocity of the asphaltenes agglomerates. FIG. 1c shows an FSU operation and the concept of the upward velocity of the overflow diluted bitumen in the first stage settler referred to as "FSU 1". In operation, upward velocity rates correspond to settling rates. With an increase in the feed flow rate into the FSU, the velocity of the overflow product also increases. At higher velocity rates, more water droplets and mineral solids may be carried into the overflow, which results in the reduction of overflow and product quality.

Therefore, the upward velocity of the overflow is a relevant parameter for FSU operational control. Conventionally, the upward velocity is calculated based on the ratio of the overflow volumetric flow rate to the overflow cross-sectional area available for the separation in the given gravity settler. During operation, however, the cross-sectional area of the FSU vessels could be gradually reduced due to fouling in the gravity settler walls, for example. The real upward velocity could deviate from the calculated upward velocity, and delayed reaction in adjusting the upward velocity may sacrifice the diluted bitumen quality.

As will be described in further detail in the Experimentation section below, it has been found that NIR reflectance spectra strongly correspond with the upward velocity of the overflow diluted bitumen, which facilitates determining the upward velocity of the overflow diluted bitumen using NIR correlation models.

Figure 58:
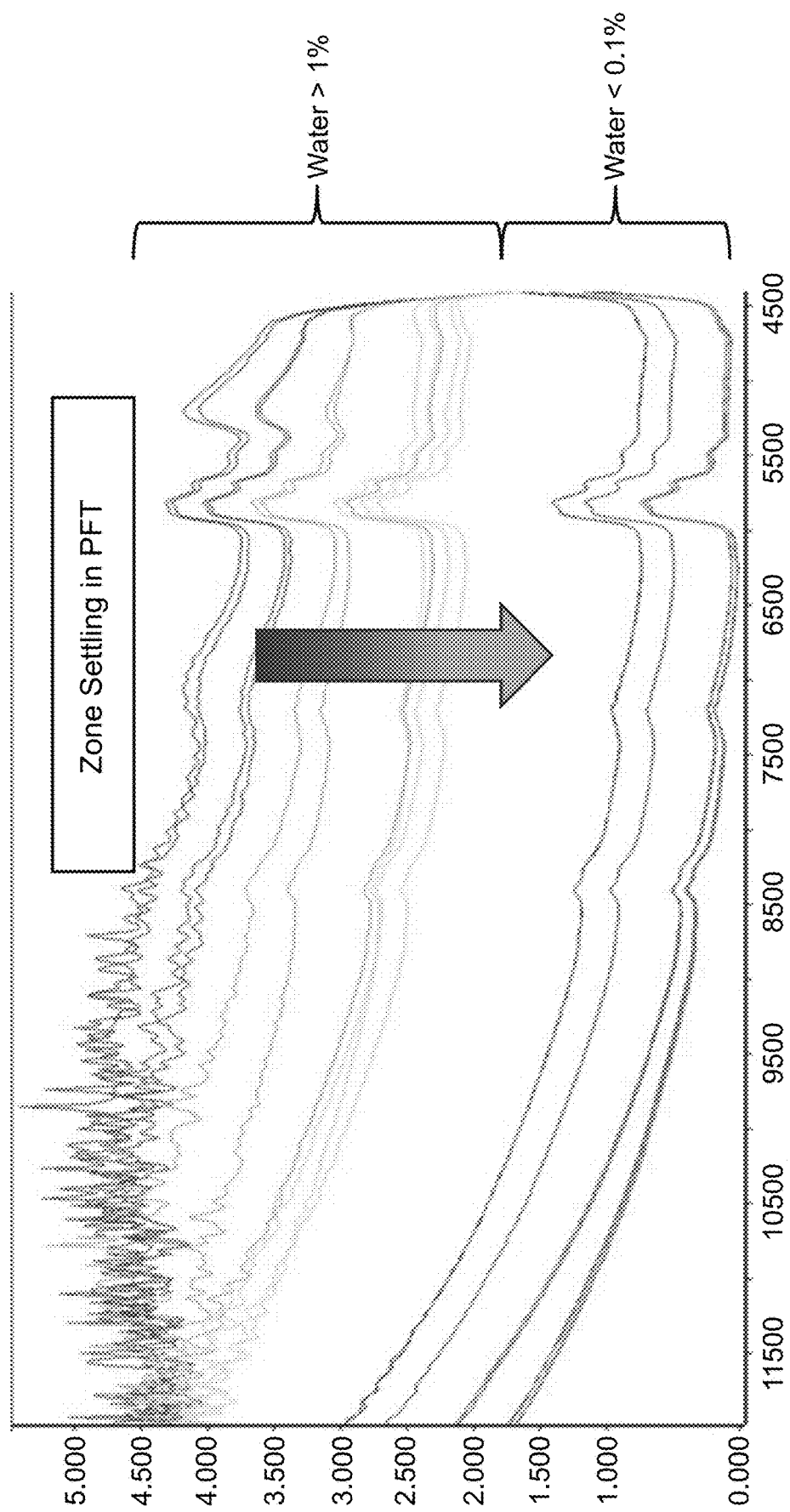
FIG. 58 is a group of NIR spectra showing variation of NIR spectra before and after the asphaltenes/water/solids agglomerates zone passed by NIR probe.

In terms of developing the NIR calibration model for upward velocity, an NIR probe was installed in the FSU in the horizontal position within the lighter phase zone (i.e., upper diluted bitumen zone). With settling of the asphaltenes agglomerates, the supernatant phase (or overflow) becomes cleaner and cleaner as is flow upward in the settling vessel, with solids and water being entrapped with asphatenes to form agglomerates that flow downward toward the underflow. As shown in FIG. 58, the absorbance, slope and shape of NIR spectra are different depending on the settling advancement.

In some implementations, an NIR probe can be installed in the FSU to determine the level of the interface between the diluted bitumen and the aqueous phase with asphaltene agglomerates in the FSU based on the composition of diluted bitumen and diluted froth, as shown in FIG. 1a (NIR probe 3). Online monitoring of the level of the interface can prevent to over-feeding the first stage FSU which could push the interface too high to upset the FSU operation which would eventually deteriorate the quality of diluted bitumen. A similar method can be applied for the second stage FSU settler even though its overflow has a much higher solvent content.

In some implementations, NIR calibration models are developed based on the NIR spectral measurements' change with the settling behavior. NIR spectral measurements and laboratory composition analyses of collected samples can be carried out for a settling process, and then the composition measured using laboratory analysis and their corresponding NIR spectral measurements can be compiled and processed using chemometric methods.

Figure 59:
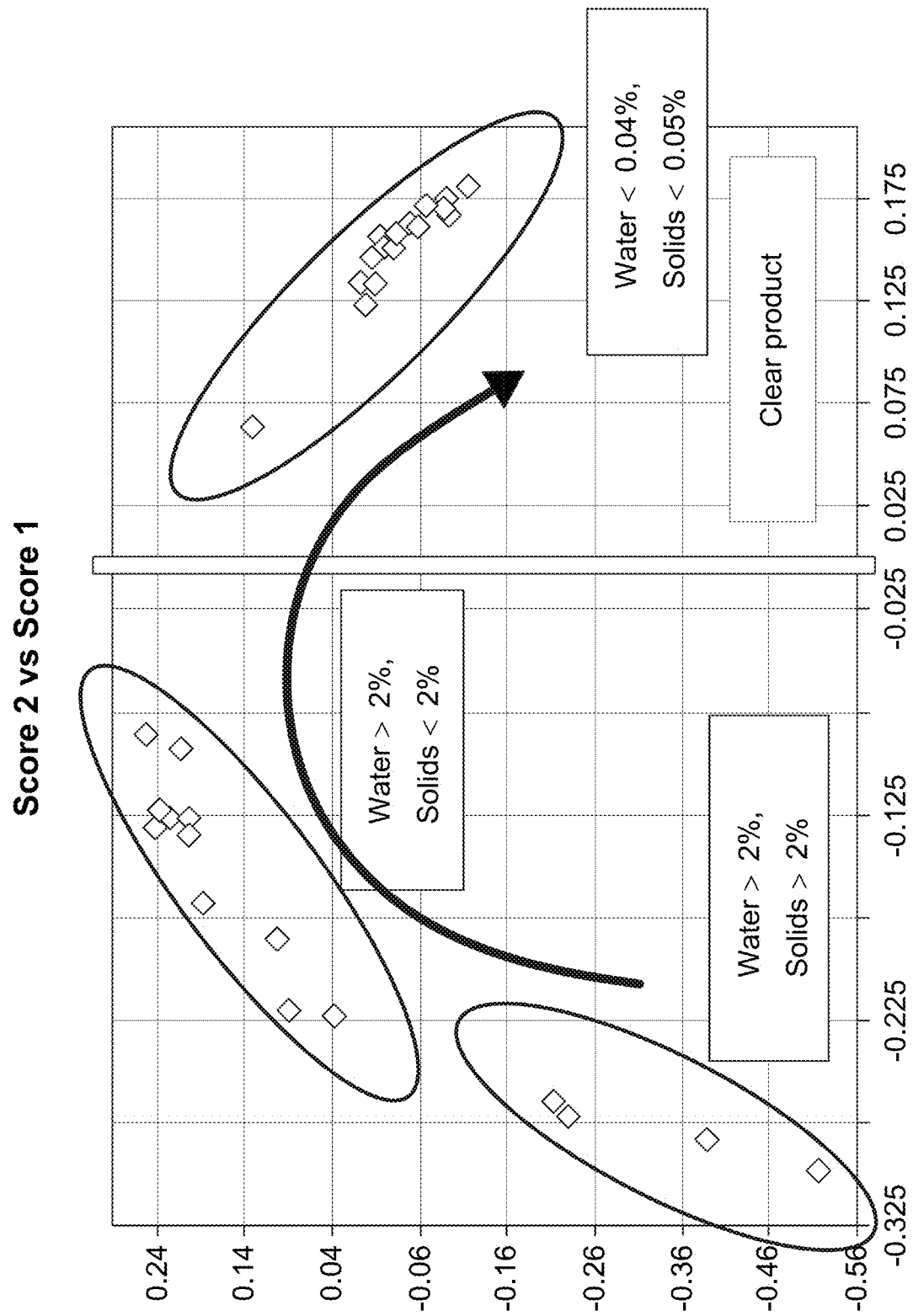
FIG. 59 is a PCA plot generated using Chemometric method based on NIR spectra in zone settling study in PFT.

In some implementations, a principal component analysis (PCA) is then carried out to generate PCA spectral plots based on NIR spectra and models, such as illustrated in FIG. 59. The PCA spectral plot includes a plurality of nodes, each node corresponding to a stage of the settling advancement and its associated water and solids contents in the diluted bitumen overflow. It has been found that the nodes define a pattern where location of the node depends on the water and solids contents. For example, FIG. 59 shows the PCA spectral plot generated according to the NIR spectra of FIG. 58. The conversion of the NIR measurements of FIG. 58 in the PCA plot of FIG. 59 is based on a chemometric method. According to water and solids content in the supernatant phase, the score loading and location of the nodes in the PCA plot shows a clear pattern which correspond to the zone movement in the FSU settler. Referring to FIG. 59, the curved line with an arrow shows the variation of water and solids contents in the supernatant phase with the zone settling. According to this analysis, it is possible to find the right operational window and give the threshold zone when the product quality tends to get worse. For example, when the location is at the right side of the vertical line in FIG. 59, water and solids contents in diluted bitumen are low, and the diluted bitumen is good quality. It is also possible to continuously monitor and identify trends to take early remedial action, e.g., if the trend on the graph of FIG. 59 is tending toward the left (i.e., reducing in quality) then corrective action can be taken to stay within the "clear product" node.

Figure 34:
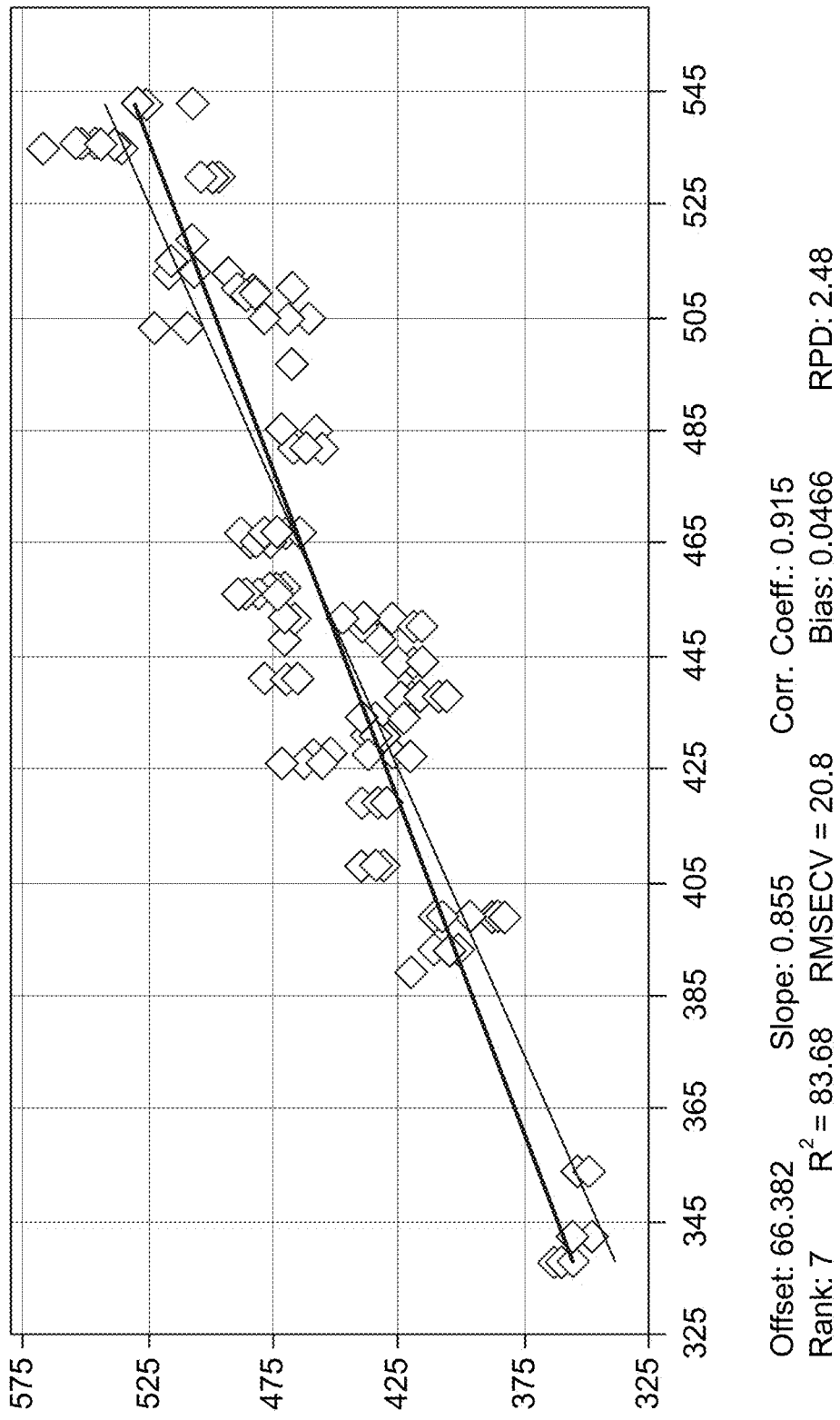
FIG. 34 is a cross validation for final flux model.
Figure 35:
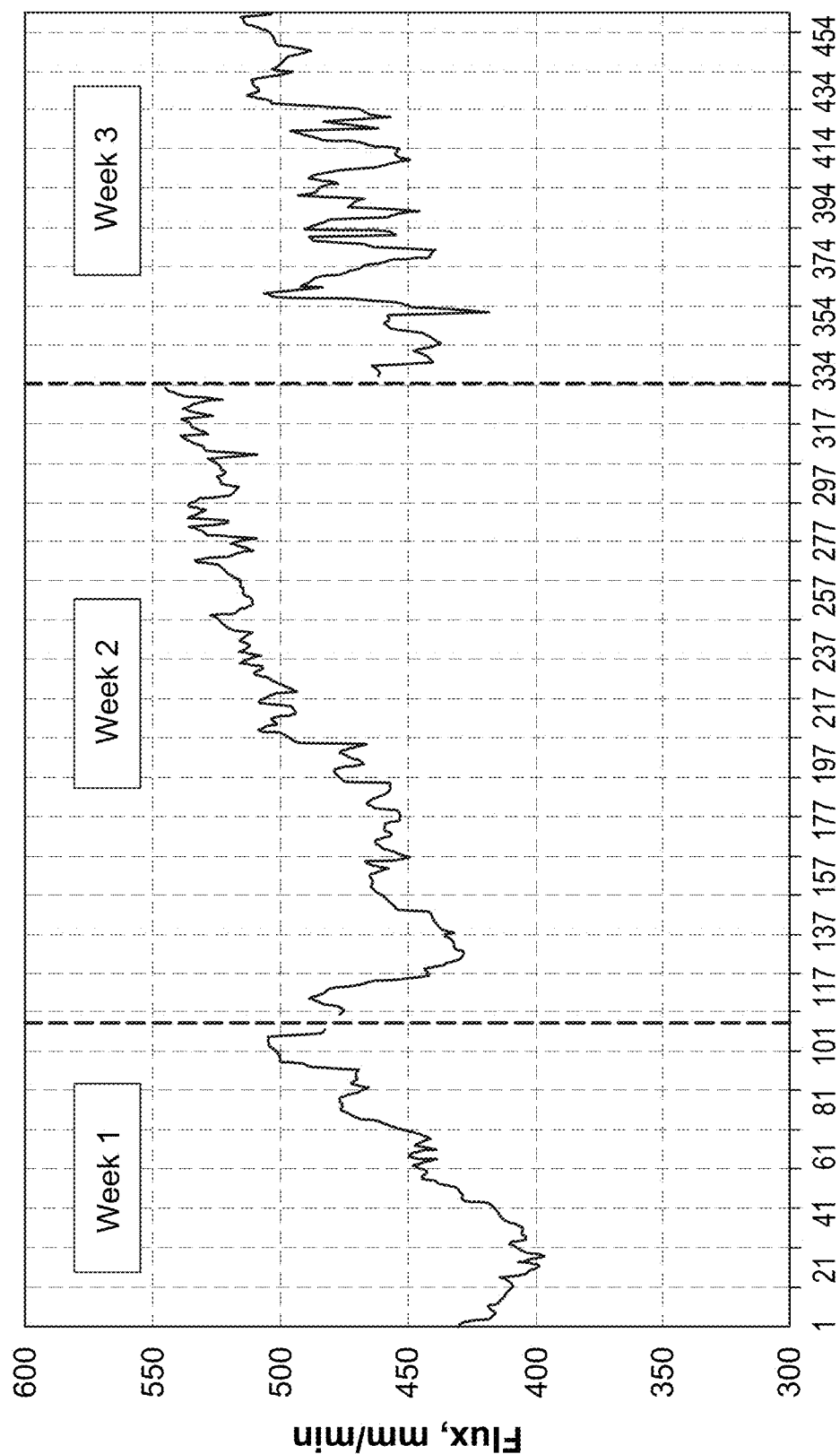
FIG. 35 is a graph of the NIR predicted flux during Week A, B and C.

As shown in FIG. 34, which presents the upward velocity estimated by an NIR model as a function of true upward velocity, it was found that NIR models can help determine flux rates of the FSU overflow with appropriate accuracy for process control. The mechanism for this measurement may be attributed to the light scattering of the physical size of asphaltenes aggregations or asphaltenes/water/solids agglomerates in the medium. This finding also extends the application of NIR techniques in the context of PFT operations. Monitoring the flux rate facilitates detection of upset conditions in the FSU, so that corrective action can be taken before the diluted bitumen quality is significantly compromised.

In some implementations, compositional information of the diluted bitumen, such as water content and solids content, can be determined based on the previously determined settler characteristics, such as upward velocity. It has been found that the upward velocity of the FSU settler overflow has a generally linear relation to water and solids contents. Once the upward velocity is estimated, one can derive the water and/or solids contents of the diluted bitumen overflow based on the estimated upward velocity.

By way of further explanation, it is noted that typical bitumen froth is approximately 60 wt % of bitumen, 30 wt % of water, and 10 wt % of solids although such concentrations can vary depending on various factors. Most water in the froth is "free water" and relatively easy to precipitate out. Less than 10% of the water is in emulsified water droplets. The mineral solids are dominated by clays, carbonates and heavy minerals, having particle sizes less than 10 microns. In PFT, when the froth is diluted with a paraffinic solvent, a portion of the asphaltenes is precipitated out from the hydrocarbon phase as agglomerates along with water droplets and fine solids. The size of these agglomerates directly affects water and solids removal from the diluted bitumen and the quality of the diluted bitumen.

In usual operational conditions, the Reynolds (Re) number is in the order of 0.9. When Re is below 1.0, the system is well within the range of applicability of the so-called "creeping flow" regime, in which inertial effects can be neglected and Stokes' Law is suitable for describing the flow. According to Stokes' Law, the critical size ($d_c$) of the agglomerates released from diluted bitumen can be calculated based on the density ($\rho_f$) and viscosity ($\mu_f$) of diluted bitumen, and the density ($\rho_c$) of agglomerates. For example, the calculated critical size of agglomerates increases with increasing flux, as shown in Table 9 of Experimentation 3 further below. Stokes' Law is as follows:

$$u_c = \frac{g(\rho_c - \rho_f)d_c^2}{18\mu_f}$$

Because water content and solids content in diluted bitumen linearly corresponds to the flux in the FSU settler, instant water and solids contents in diluted bitumen may be obtained in accordance with the flux determined at that time. In some implementations, NIR measurements are taken continuously using online NIR probes and the upward velocity is continuously determined. Therefore, it is possible to monitor the water and solids contents, which may be quite low (e.g., below 0.5 wt % or below 0.1 wt %), in real time and take immediate corrective actions in response to upset conditions in the PFT process.

In terms of process control, various control strategies can be implemented based on the upward velocity information and/or the water and solids content information obtained through NIR techniques. Many of the process control examples mentioned further above could be implemented. In addition, when upward velocity information indicates a trend toward lower quality overflow, the corrective action can include reducing flow rate of the diluted froth feed into the settler vessel, although other parameters can be adjusted. In some scenarios, the FSU operating parameters can be adjusted with a view to maximizing overflow rates while keeping the overflow quality within pre-determined specifications. In the case where the upward velocity is above a target value, for which water and solids contents in the diluted bitumen may be too high (e.g., above 0.5 wt %), the diluted froth feed rate can be decreased, the S/B ratio can be increased and/or the amount of process-aid can be adjusted.

NIR Based Determination of Residual Components

NIR based techniques can be used to determine the concentration of various other residual components in PFT process streams. As described above, residual water and mineral solids present in diluted bitumen can be determined. Other residual components can also be detected, such as the quantity of paraffinic solvent (e.g., pentane) that is present in a PFT start-up fluid or a hydrocarbon fluid for PFT turn-down, maintenance or cleaning (e.g., diesel). Thus, NIR spectral measurements of the start-up fluid can be obtained; and then the concentration of a residual component can be determined based on the NIR spectral measurements. The quantity of residual solvent in the bitumen product stream can also be monitored by NIR based techniques.

The bulk fluid in which the residual component is present can be a hydrocarbon-containing fluid, such as diesel, toluene, naphtha, etc., and may be used in context of starting up or winding down the PFT operation. For example, diesel may be used during start-up of the PFT process to bring the system up to a target temperature. After preheating, the diesel needs to be removed from the system while the normal operating streams are introduced. It is preferable to keep the content of paraffinic solvent, bitumen, and any other hydrocarbon mixture at relatively low levels in the recovered diesel. It is also desired to minimize the amount of diesel that may remain in the PFT system.

The NIR probe used for taking the NIR measurements may be a transmission probe or a reflectance probe, and may be located on a dedicated outlet line for removing the diesel or on one of the downstream lines of the PFT system, for example. In some implementations, a reflectance probe is used to take the NIR measurements to facilitate stable spectra to be obtained. When determining pentane content in diesel, transmission probes may also be used, allowing acquisition of more reliable and accurate models in the case of residual content. The NIR probes for obtaining these measurements can be installed in cross-sectional and longitudinal locations, as described above, and/or can also be installed in a bypass or slip stream line, as described above.

In SRU operation, correctly detecting pentane, diesel or diluted bitumen concentrations in the relevant stream is important for the operation to determine the appropriate handling of the bitumen product stream, e.g., whether the bitumen product is ready to discharge to a farm tank or should rather be recycled back into the PFT process for further purification particularly when the PFT plant is in start-up, upset, and/or shutdown modes. It has been found that using NIR reflectance spectra can help determine accurate pentane-in-diesel and diesel-in-dilbit contents.

In some implementations, pentane-in-diesel content, bitumen-in-diesel content, and/or diesel-in-dilbit content are determined based on NIR techniques. Depending on various factors, the ratio of pentane-in-diesel content, bitumen-in-diesel content, and/or diesel-in-dilbit content can be from 0-100%. In some implementations, a reflectance probe can be used to measure components that are present above 1%. When measuring lower levels (e.g., less than 0.1%) of one or more components, a transmission probe is preferable. In some implementations, target levels for the residual components are as follows: bitumen content in diesel is less than 0.1 wt %, pentane content in diesel is less than 0.1 wt %, and diesel content in bitumen is less than 0.1 wt % or less than 1 wt %.

In some implementations, NIR calibration models are developed depending on the residual component and the target level or threshold to be detected. For example, in the case of pentane in diesel, different NIR calibration models may be used when the pentane content is either below or above 0.1 wt %. In the case of diluted bitumen or bitumen in diesel, different NIR calibration models may be used when the bitumen content is below 0.1 wt % or between 0.1 wt % and 1 wt %, and/or above 1 wt %.

Detecting less than 1000 ppm pentane either in diesel or in bitumen product is relevant for both safety purposes and meeting regulatory requirements. The paraffinic extraction process ideally operates with very little solvent loss from the system. It was previously believed that NIR could not determine less than 1 wt % pentane in bitumen, for example using a univariate data processing method, and conventional monitoring methods thus consisted of using a headspace with Gas Chromatography (GC) measurements, which significantly increases the constraints of engineering design and implementation as well as operational cost. However, it was found that such low pentane levels can be detected and monitored using NIR based techniques with chemometric analysis.

In some implementations, the residual content to be monitored is residual pentane content, and the bulk component is diesel, bitumen or a bitumen-containing mixture that is diluted with another hydrocarbon. Such bitumen-containing mixtures may be a 10/90 bitumen/toluene mixture, a 20/80 bitumen/diesel mixture, or a mixture of bitumen and various other hydrocarbons that can include other paraffins. In some implementations, the content of pentane to be determined is below 1000 ppm.

In some implementations, the probe used to obtain the NIR measurements is a transmission NIR probe. It has been found that transmission spectra provide more reliable and accurate results when pentane is less than 0.1 wt %. The content of pentane can be directly measured using transmission probes.

In some implementations, chemometric methods can be used to develop NIR calibration models that allow estimating the residual content in the hydrocarbon-containing stream. For example, a series of samples including different residual component contents in a hydrocarbon product may be prepared. In some implementations, the residual content is measured using accurate analytical methods (such as gas chromatography, for example); and then NIR spectral measurements of each of the samples are taken using a transmission probe. The NIR measurements are compiled with the corresponding laboratory measured residual contents. Both laboratory data and NIR spectral data are process using chemometric methods to develop an NIR calibration model. An example of modelling process is described in more detail in Experimentation 3 further below.

During PFT operation, the online NIR measurements can be used with developed NIR calibration model to determine the residual pentane content in diesel, bitumen or bitumen-containing mixture. Because the NIR measurements are online measurements, the residual content may be determined continuously and in real time, and the quality of the hydrocarbon-containing stream is monitored in a continuous manner.

In terms of process control, the residual component concentrations can be used to adjust the PFT process, including the start-up mode or other operating modes. For example, when pentane levels are above a desired target level in bitumen product, the bitumen product can be recycled for further solvent recovery in the SRU. If pentane content is elevated in diesel, the diesel stream can be recycled back to recover additional solvent. In addition, if it is detected that pentane content is increasing and yet is in the acceptable target range, the PFT process can be adjusted to stabilize solvent recovery and ensure that the PFT process stream remains within the operating window in terms of pentane content.

In some implementations, other residual components in PFT process streams may be monitored. For example, residual water content in SRU underflow and water content in recovered solvent streams (e.g., TSRU overhead, SRU overhead and VRU underflow) may be determined using NIR measurements and NIR calibration models.

NIR Based Determination and Control for PFT Process-Aids

Because of their viscous and adhesive nature, the asphaltene flocs tend to agglomerate and can increase the risk of plugging or fouling in PFT equipment, and can also hamper solvent recovery by entrapping solvent within the flocs. Therefore, process-aids, such as dispersants, demulsifiers, defoamers or other surfactants or suitable chemical additives can be used in PFT processes. The surfactants can be selected and used based on various factures, such as operating temperatures, S/B ratios, system configuration, and so on.

Figure 60:
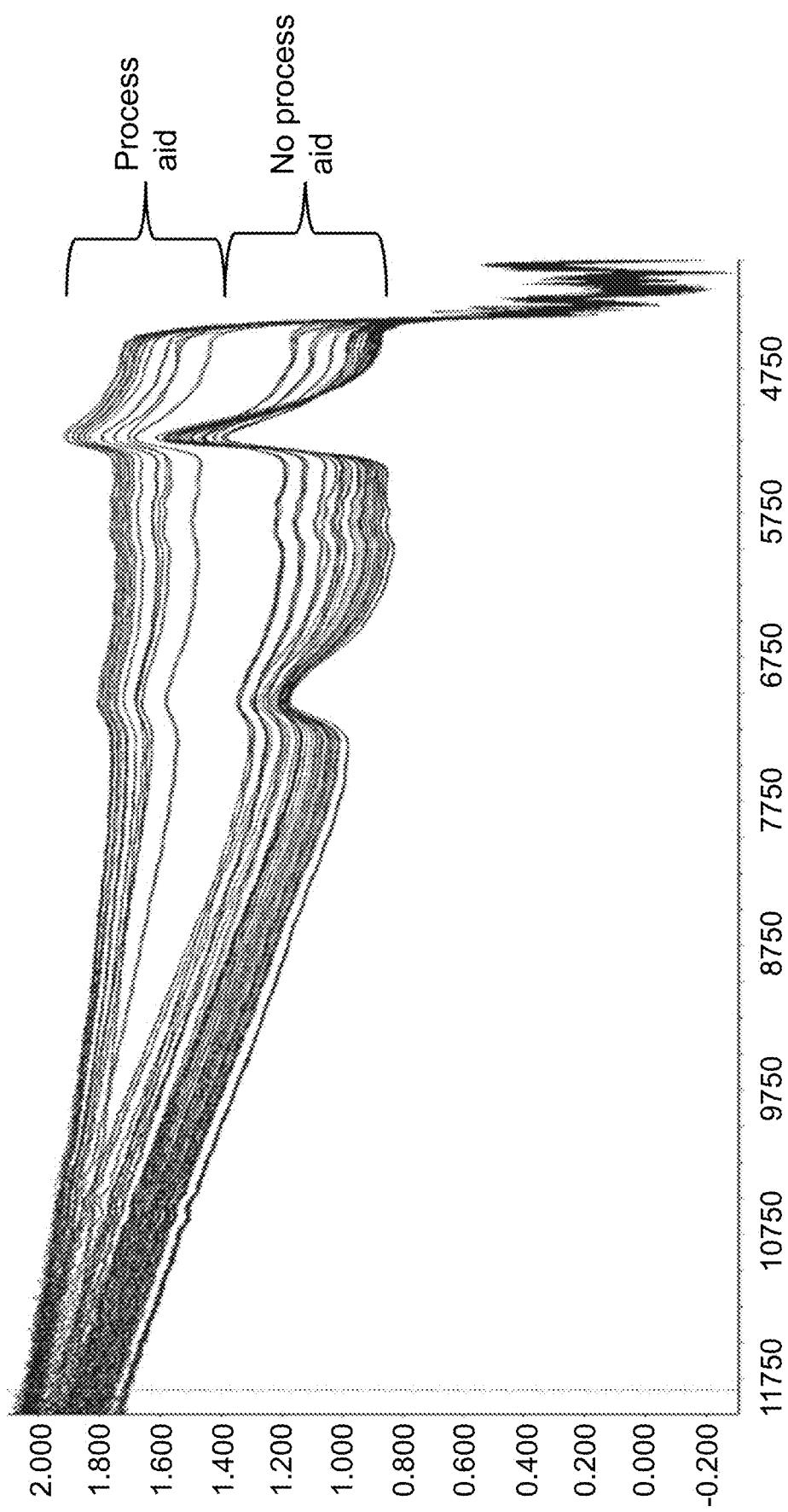
FIG. 60 is a group of NIR spectra of diluted bitumen with or without a process-aid.
Figure 61:
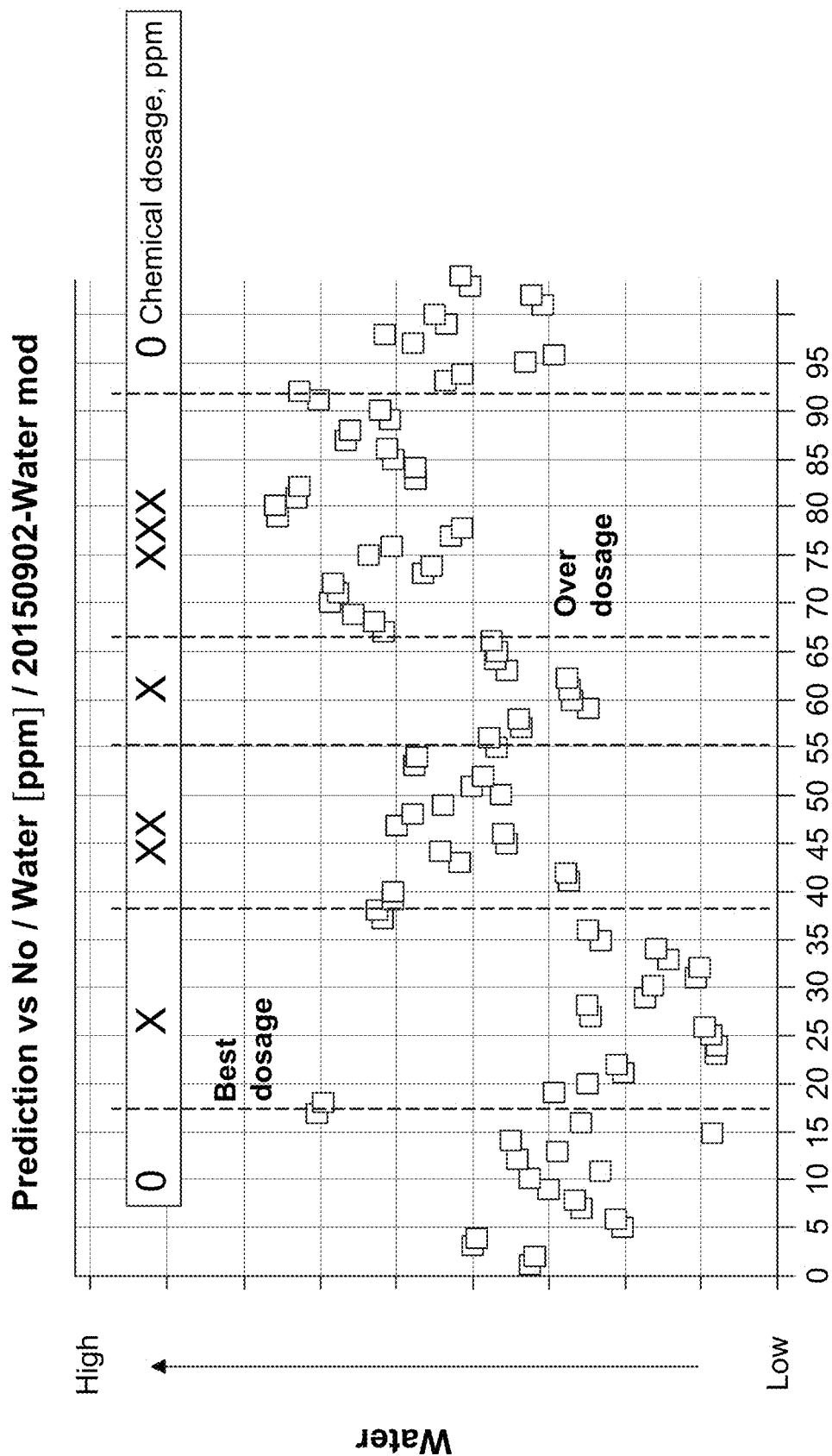
FIG. 61 is a graph of water content in diluted bitumen vs. the dosage of a process aid addition.

It has been found that the NIR spectra of diluted bitumen show different patterns with the addition of process-aid, as shown in FIG. 60. Therefore, according to the pattern change of NIR spectra, the presence and/or performance of the process-aid can be monitored. For example, FIG. 61 shows water content in diluted bitumen as a function of the dosage of process-aid measured by NIR. The profile of water content in diluted bitumen can thus track the best dosage of chemical addition, and prevent a process-aid overdose which could reduce product quality for example.

Thus, in the PFT process, the process-aid dosage can be monitored using NIR techniques. One can thus obtain NIR spectral measurements as described herein, and determine a physicochemical characteristic of an overflow stream, which may be related to the process-aid dosage. The physicochemical characteristic may be a compositional property of the PFT process stream (e.g., water content, solids content) or a size of the asphaltenes agglomerates. In some implementations, one can determine water and solids content or asphaltene agglomerates size based on the upward velocity previously determined, and then such characteristics can be used to determine the dosage of process-aid.

In some implementations, the process-aid is an asphaltene dispersant and its dosage in an FSU settling vessel is monitored using NIR techniques. NIR spectral measurements are obtained from the diluted bitumen overflow. The asphaltene dispersant dosage may be monitored based on the water and/or solids content of the diluted bitumen, or based on the size of the asphaletene agglomerate precipitating in the FSU. Both water and solids contents as well as asphaltenes agglomerate size may be determined using the previously determined upward velocity of the overflow diluted bitumen, as described herein.

Furthermore, asphaltene aggregate size can be correlated to S/B ratio. The S/B ratio affects the quantity of asphaltenes precipitating and also the corresponding structure of the aggregate. It is to be noted that temperature and the type of solvent will also play a role (e.g., a lighter solvents will produce larger and denser asphaltene clusters than heavier solvents). According to Stokes' Law, which describes the drag behavior of a particle, the settling velocity of the asphaltene agglomerates is a function of the critical size of the asphaltenes agglomerates, the diluted bitumen viscosity, and the difference of density between the diluted bitumen and the asphaltene agglomerates. In a PFT process, the settling velocity generally corresponds to the upward velocity of the overflow diluted bitumen. The increased flux of diluted bitumen (at fixed S/B and for a chosen solvent) will potentially drag greater quantities of solids and water with it.

In some implementations, water and solids contents and asphaltenes agglomerates size are determined by using Stokes' Law along with a previously determined upward velocity of the overflow diluted bitumen. This allows monitoring the asphaltene dispersant dosage of the PFT process. In some implementations, the sizes of asphaltenes agglomerates are inferred rather than directly measuring the size, which could be done for example with laser-based techniques. The asphaltenes agglomerates size may be less than 100 µm.

When the process-aid dosage is monitored according to the methods described herein, corresponding actions may be taken in response to the determined performance of the process-aid. For example, one can control the PFT process to optimize the process-aid dosage and control quality of PFT process streams. The PFT process may be controlled to increase or decrease the dosage of the process-aid, or to increase the activity by modifying other process parameters such as the FSU feed rate or S/B ratio. It is noted that diluted bitumen product quality does not related to higher asphaltene precipitation rates. Thus, in certain scenarios, controlling the PFT process can include adjusting at least one of the feed rate of the diluted froth into the FSU, the S/B ratio, the solvent composition, and process-aid dosage (e.g., dosage in the diluted bitumen froth), so as to decrease the asphaltene agglomerate settling rate and therefore the upward velocity of the overflow diluted bitumen.

NIR Based Determination for Asphaltenes or Asphaltenes Agglomerates

Using NIR based techniques, the size of the asphaltenes agglomerates can be monitored, and actions may be taken in response to the measurements. Agglomerate size is a factor that can influence settling, and can be modified to enhance settling performance. In terms of process control, process-aids can be added to control the size of the agglomerates. In the case where the asphaltene agglomerate size is below a threshold, the feed rate can be decreased, the S/B can be increased and/or the amount of process-aid can be adjusted.

NIR Based Determination of Solubilized Water Versus Non-Solubilized Water

In PFT processes, bitumen froth can typically contain approximately 30 wt % water. Water chemistry of the "froth water" is relevant for a number of reasons, including its impact on process operation and on equipment. For example, higher chloride levels in the water phase can lead to higher corrosion risks and associated disadvantages. In some scenarios, the froth water chemistry can be generally similar to the recycle water (RCW) chemistry, RW being the water used in primary extraction to remove bitumen from oil sands ore. A certain amount of RCW can be used for flushing the pipelines and vessels in PFT (which can also be referred to as secondary extraction) and for making up flow for the system during abnormal operational conditions.

Water content in diluted bitumen can be divided soluble-water content and non-soluble water (including free water and emulsified water) content. The soluble-water present in hydrocarbon phases would be intimately associated with the hydrocarbon phase. As soluble-water is miscible with hydrocarbons, it forms a homogeneous phase and the soluble-water would not settle. Soluble-water is generally considered as "pure" water carried in the hydrocarbon phase, and may simply follow the hydrocarbon phase's flow through the unit operation, e.g., upward in the settling vessel. Non-soluble water, including "free" and/or "emulsified" water, is process water (e.g., RCW) that may be carried over if the flux in the settling vessel becomes too high or if process-aids are overdosed. Non-soluble water also includes salts that can corrode equipment. The free- and/or emulsified-water is generally present in the hydrocarbon phase as droplets that will tend to sink in the hydrocarbon phase due to density differences. It is therefore of interest to control free-water and/or emulsified water content which would be the bulk carrier of problematic salts.

Soluble-water content may be influenced by the temperature of the hydrocarbon phase and hydrocarbon composition, since temperature affects solubility. Free-water and emulsified-water, which are more damaging in terms of the quality of the PFT process streams (e.g., the diluted bitumen and the bitumen product), can be limited in PFT process streams by adjusting certain operational conditions, e.g., changing flux rates, S/B ratio, and/or using a different solvent or process-aids such as demulsifiers and/or asphaltene dispersant.

Figure 74:
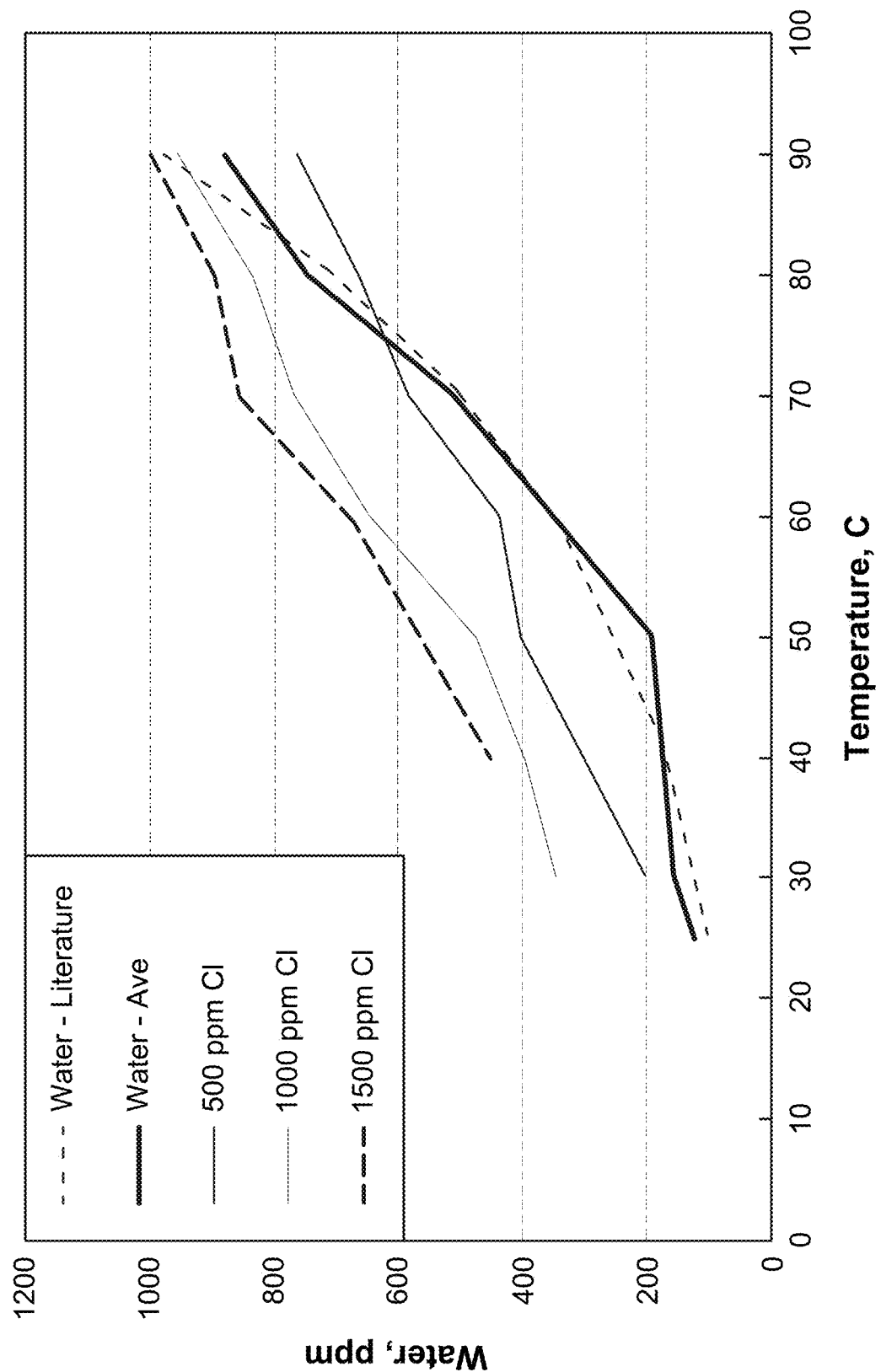
FIG. 74 is a graph showing the impact of the concentration of NaCl and temperature on the solubility of water in pentane.

In this context, NIR can be used to measure whether any impurities (e.g., inorganic salts such as sodium chloride or calcium naphthenate) in water will affect water solubility in pentane. It has been found that these impurities may affect the solubility of water in pentane (see soluble water content in pentane as a function of the chloride content and the temperature in FIG. 74).

Quantitatively determining the soluble-water content in pentane, while measuring the total water in diluted bitumen, can allow obtaining the free-water and emulsified-water content by subtracting soluble water content from the total water content in diluted bitumen. In this manner, a more accurate measure of non-soluble water can be obtained, which can then be used in process control strategies. It has been found that NIR probes can detect soluble-water in pentane, and that it is possible to determine the source of water in the PFT process stream. It has also been found that that soluble water can be detected independently of free water and emulsified water.

In some implementations, the soluble-water content is determined based on NIR techniques. The NIR spectral measurements can be obtained and interpreted using NIR calibration models to determine soluble water content. In some implementations, the NIR calibration model is developed using chemometric methods that allow determination of a correlation between the NIR spectral measurements and the soluble-water. The free- and emulsified-water content is then determined by subtracting the soluble water content from the total water content that can also be measured using NIR methods, as described herein.

Figure 62:
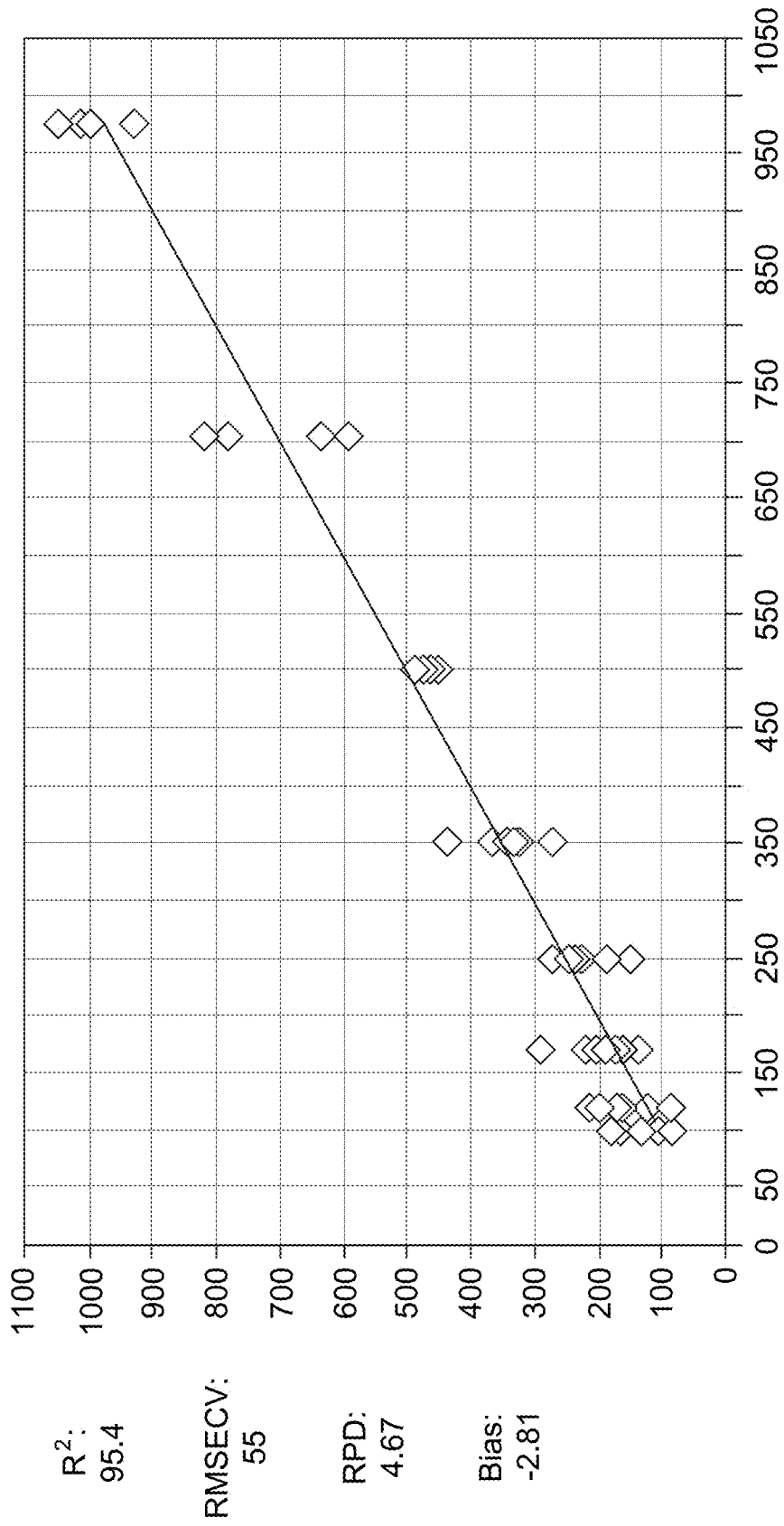
FIG. 62 is a cross validation for NIR model of predicted soluble water vs. literature value of soluble water in pentane.

The diluted bitumen overflow includes pentane, and the soluble-water content in pentane may be estimated by NIR techniques. As shown in FIG. 62, where predicted values of soluble-water content are compared to theoretical values from water solubility in pentane studies found in the literature, an NIR calibration model predicting soluble-water content may be developed to estimate the soluble-water content in pentane.

Figure 63:
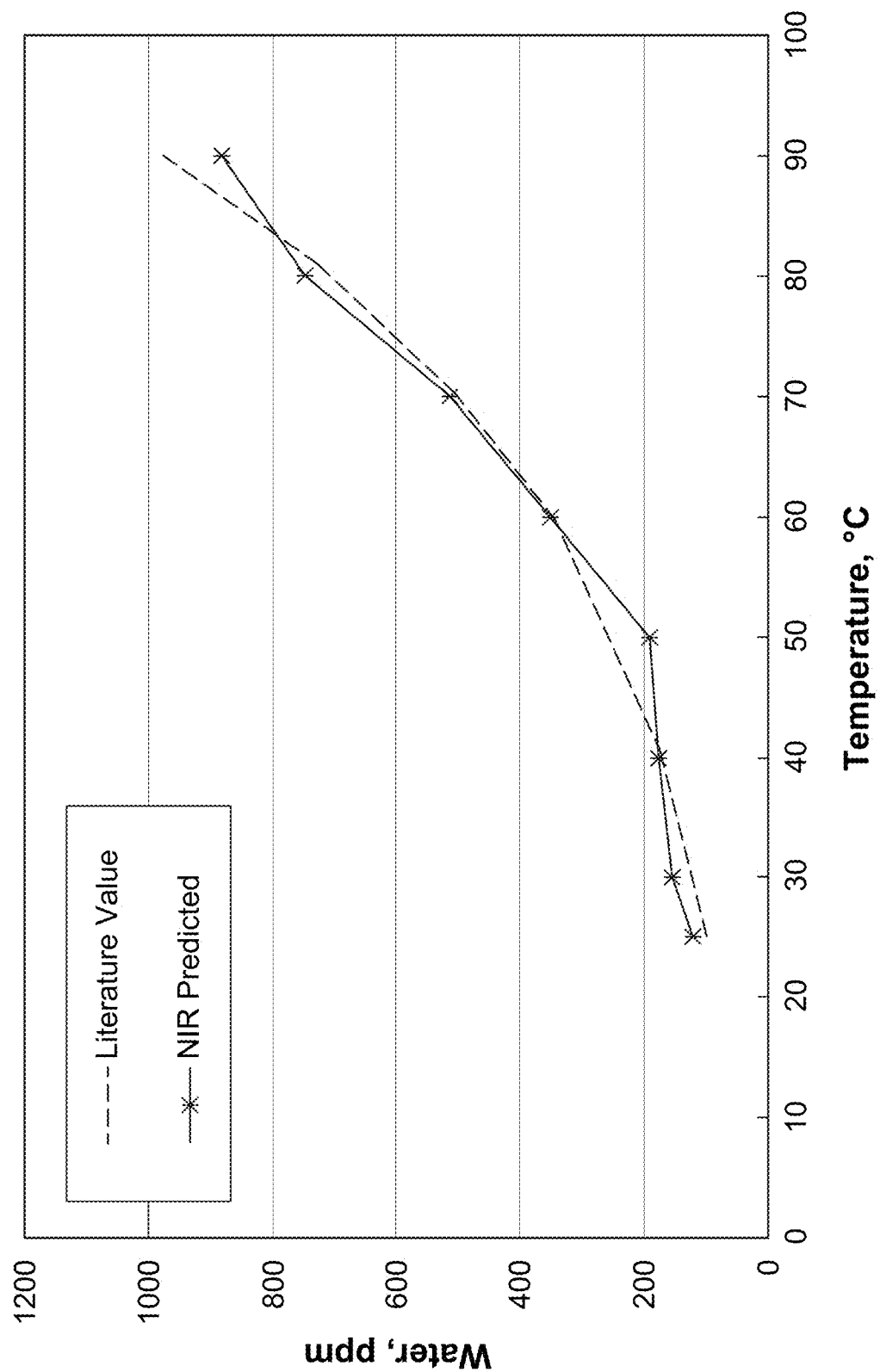
FIG. 63 is comparison of predicted soluble water in pentane with temperature vs. literature value.
Figure 64:
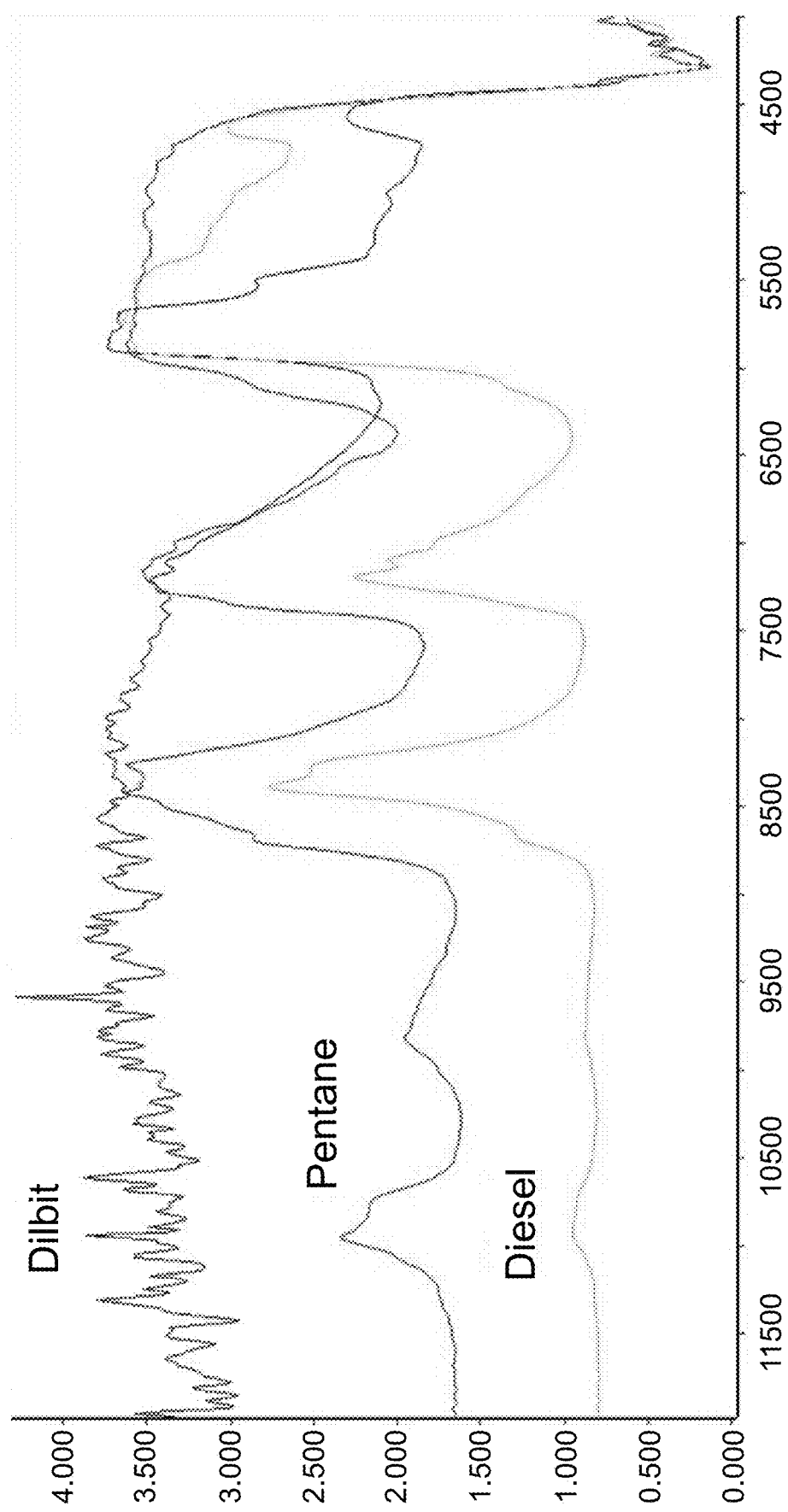
FIG. 64 is NIR reflectance spectra of diluted bitumen, diesel and pentane.
Figure 65:
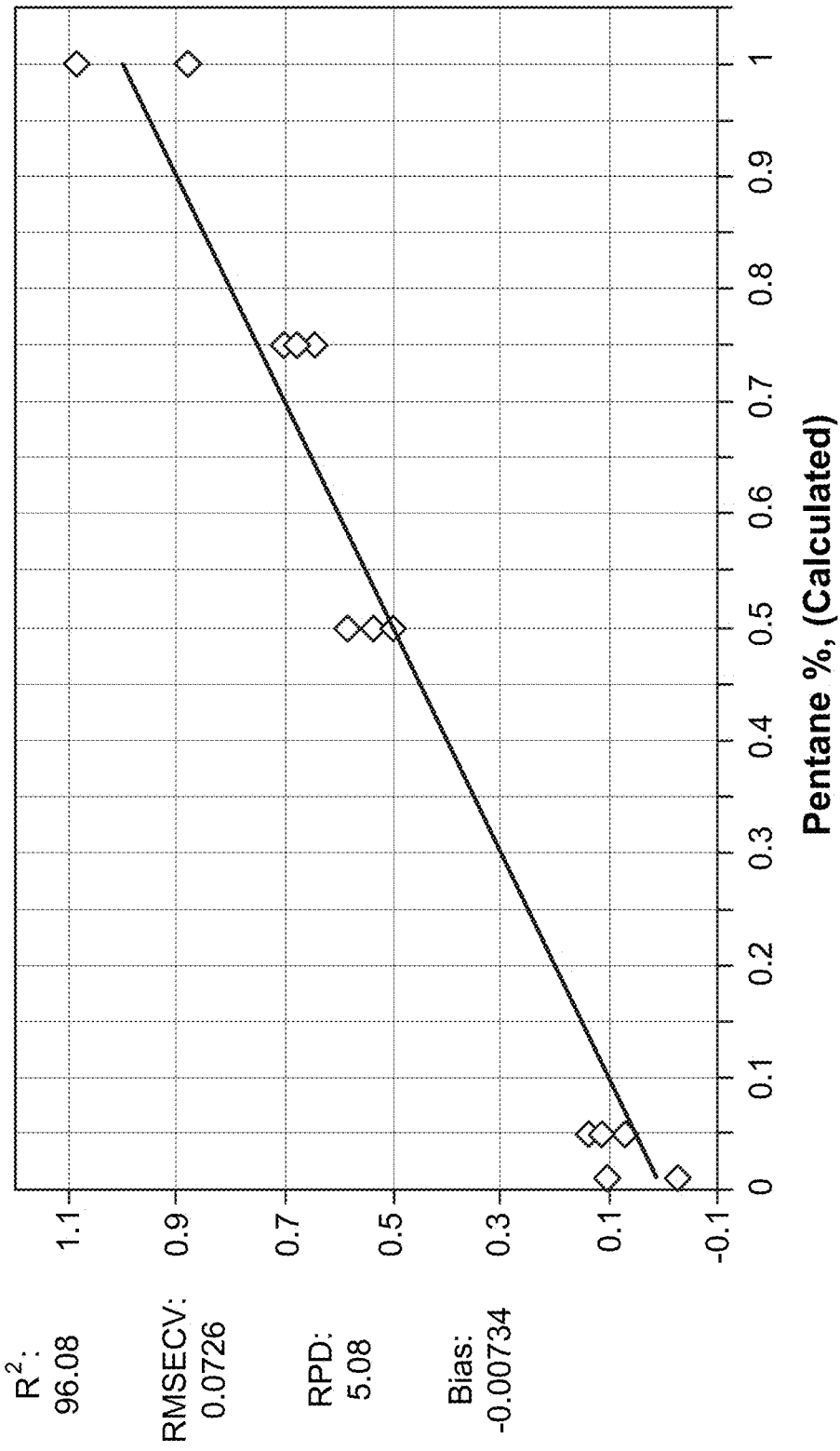
FIG. 65 is a cross validation for NIR model of <1% pentane in diesel with SD of 0.0726%.
Figure 66:
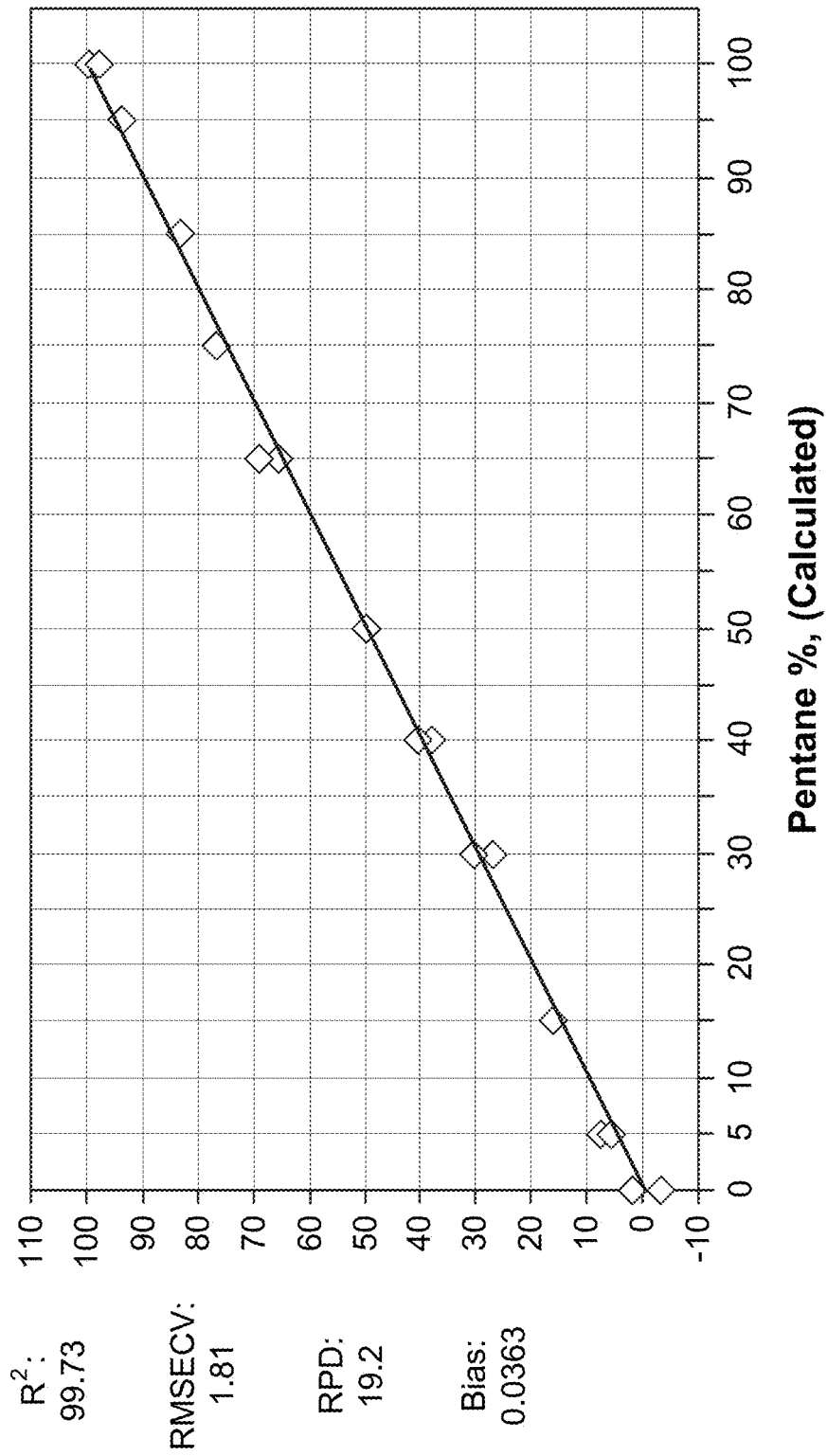
FIG. 66 is a cross validation for NIR model of pentane-diesel mixing (0-100%) with SD at 1.81%.
Figure 67:
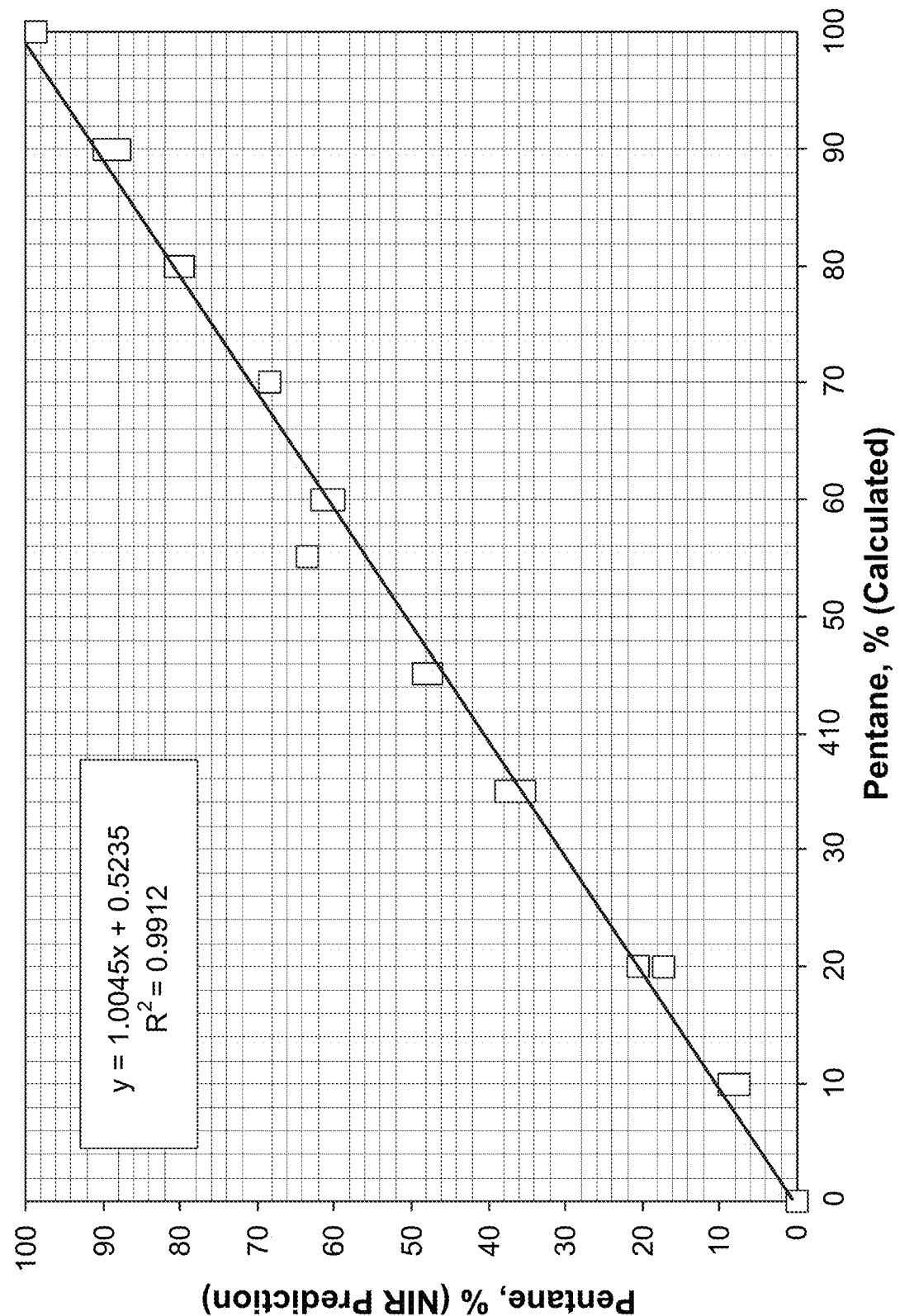
FIG. 67 is a comparison between NIR predicted concentration and the concentration of the sample prepared.

FIG. 63 shows the evolution of the predicted soluble-water content in pentane with temperature. The soluble-water content matches the literature values, thereby showing that soluble-water content may effectively be estimated using NIR based techniques.

In terms of process control, once the total water content is determined, and according to the determination of soluble water in pentane or in diluted bitumen, the free- and emulsified-water content (non-soluble water content) can be determined by subtracting the soluble-water content from the total water content. The PFT process can be controlled in accordance with this determined non-soluble water content (rather than the total water content) in order to target the reduction of free-water and emulsified-water in the diluted bitumen and/or bitumen product. In some implementations, the PFT process is controlled by adjusting operational conditions, such as at least one of diluted bitumen froth feed rate, S/B ratio, process-aid dosage, solvent composition, and operational temperature, based on the determined non-soluble water content. The operating conditions can be adjusted in order to minimize non-soluble water content in the diluted bitumen and/or bitumen product or keep the non-soluble water content below a target threshold. Enhanced precision of process control can thus be achieved in terms of control based on the water content of the diluted bitumen or bitumen product.

EXPERIMENTATION, MODELLING & RESULTS

Various aspects of NIR spectrometry have been studied in the context of PFT operations. Experimentation, chemometric modelling information, and other results are described below. Note that different spectral calibration models are used to detect high concentrations vs. low concentrations of the same component.

In each of the following experimentation summaries, a Bruker Matrix FT-NIR analyzer with transmission and reflectance probes was used for NIR measurements and analyses. Also, Bruker OPUS Spectroscopy software was used for processing NIR spectra.

In order to evaluate the feasibility and reliability of using online NIR analyzers for operational control and product/stream quality control, the following steps were conducted and the results are discussed and summarized in the experimentation summaries below:
1. QA/QC of Laboratory Data for NIR Modeling—Verification of the density data integrity, and use of the strong relationship between density, and hydrocarbon content (bitumen, solvent and asphaltenes), to identify potential errors in the lab data;
2. Building NIR Models—Building chemometric models for each component (bitumen content, solvent content, asphaltenes content, solids content, water content), and for S/B and density using the OPUS/QUANT software in calibrating the NIR spectra via their respective laboratory data;
3. Quantitative Analysis of Unknown Samples—Using developed NIR models to predict S/B, density, and the composition of diluted bitumen.
4. Comparing with RI Measurement—The NIR generated S/B were compared to the RI generated S/B to identify a possible correlation between the outputs of both monitoring instruments.

Experimentation 1: NIR Calibration Model for Measuring Solvent/Bitumen/Asphaltene Content in Diluted Bitumen QA/QC of Lab Data for NIR Modeling Quality assurance and quality control (QA/QC) was realized to confirm and ensure accuracy of the calibration model. A series of diluted bitumen samples was collected for mass balance calculation. The density and the composition of these samples were analyzed by a density meter, and by Dean-Stark analysis. Theoretically, the density of diluted bitumen is determined by the contents of solvent, bitumen and asphaltenes etc.; therefore a good correlation between the density and these components is expected. Therefore, the integrity of the lab data may be verified using a density correlation.

Figure 3:
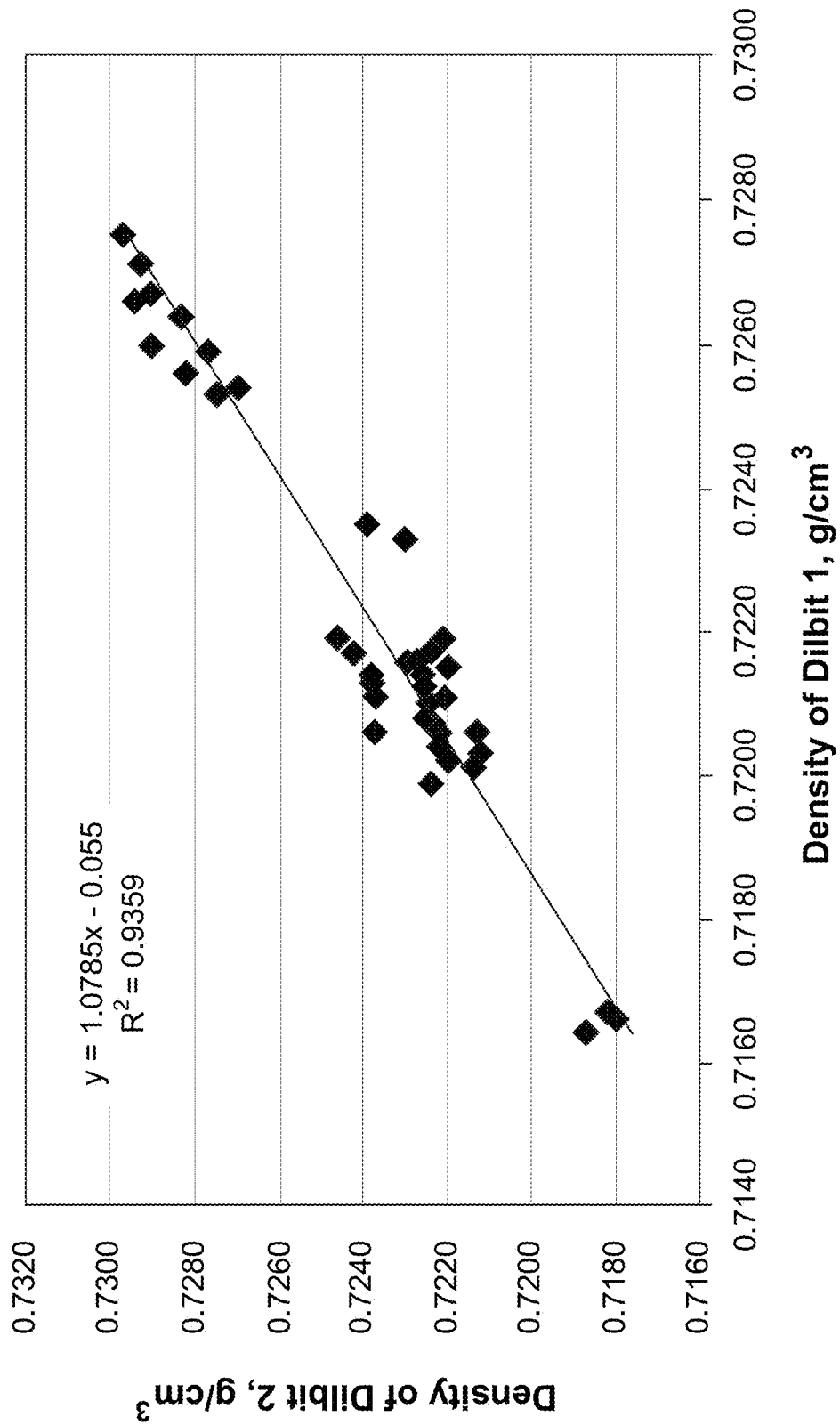
FIG. 3 is a graph showing the correlation of two sets of densities of diluted bitumen.

In order to collect representative samples, the density measurement of FSU diluted bitumen (referred as Dilbit 1 in FIG. 3) was used to determine the operation condition and timing for mass balance sample collection. Therefore two sets of density measurements were obtained. FIG. 3 shows that there is a strong correlation between densities of FSU diluted bitumen (referred as Dilbit 2) for mass balance calculation and the density of Dilbit 1.

Figure 4:
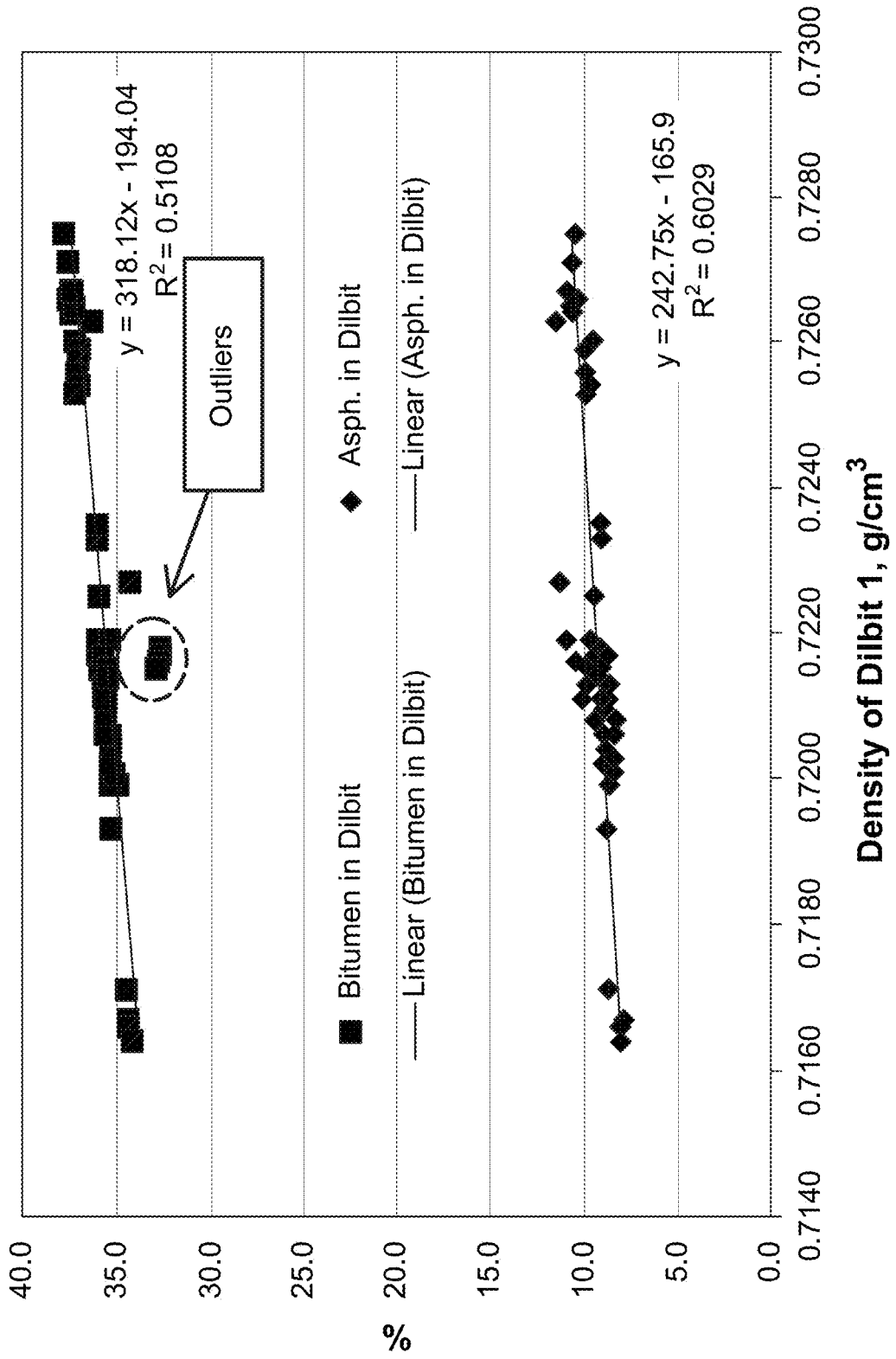
FIG. 4 is a graph showing the correlation of density vs. % of bitumen and % of asphaltenes in diluted bitumen.
Figure 5:
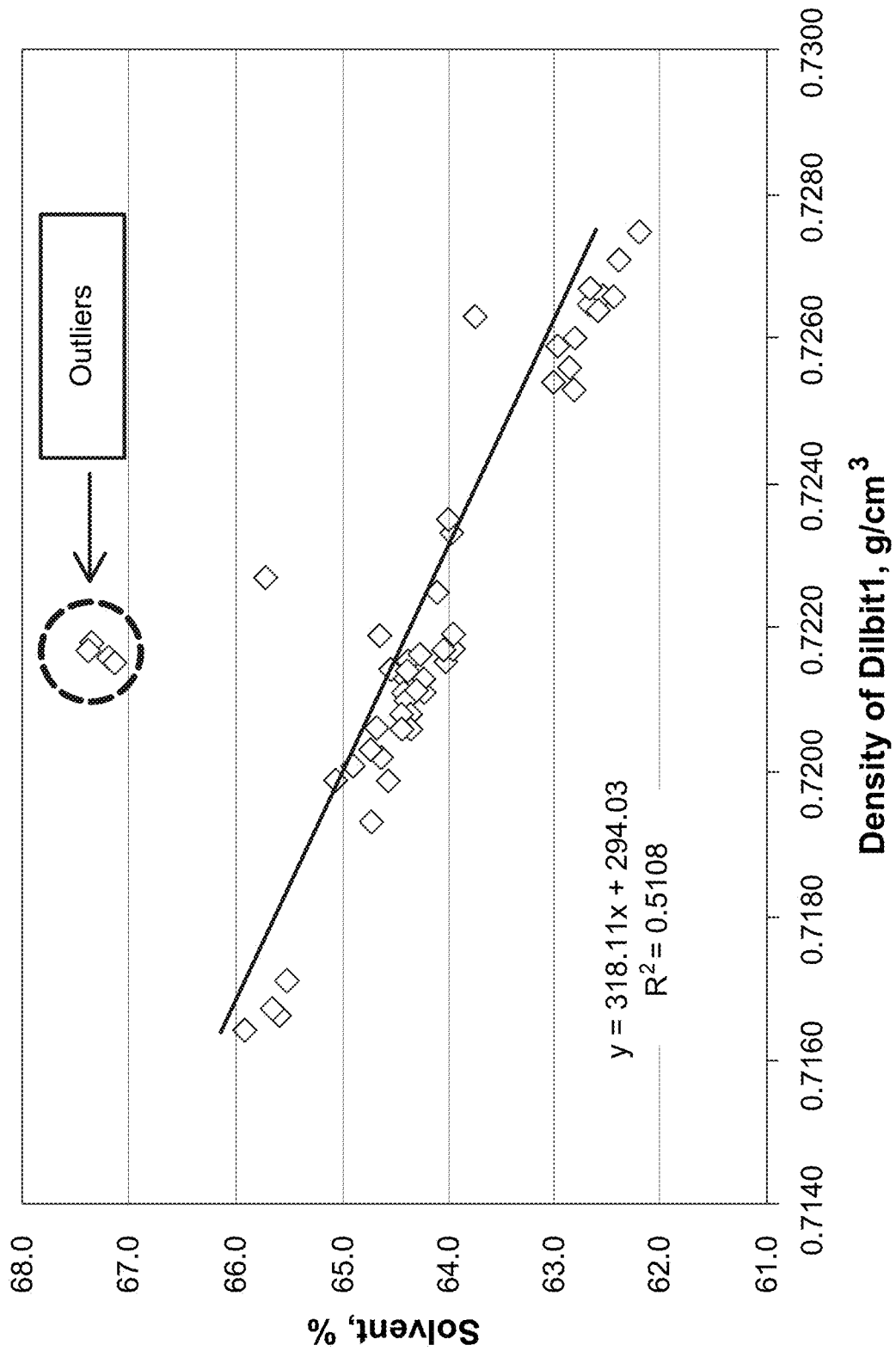
FIG. 5 is a graph showing the correlation of density vs. % of solvent in diluted bitumen.
Figure 6:
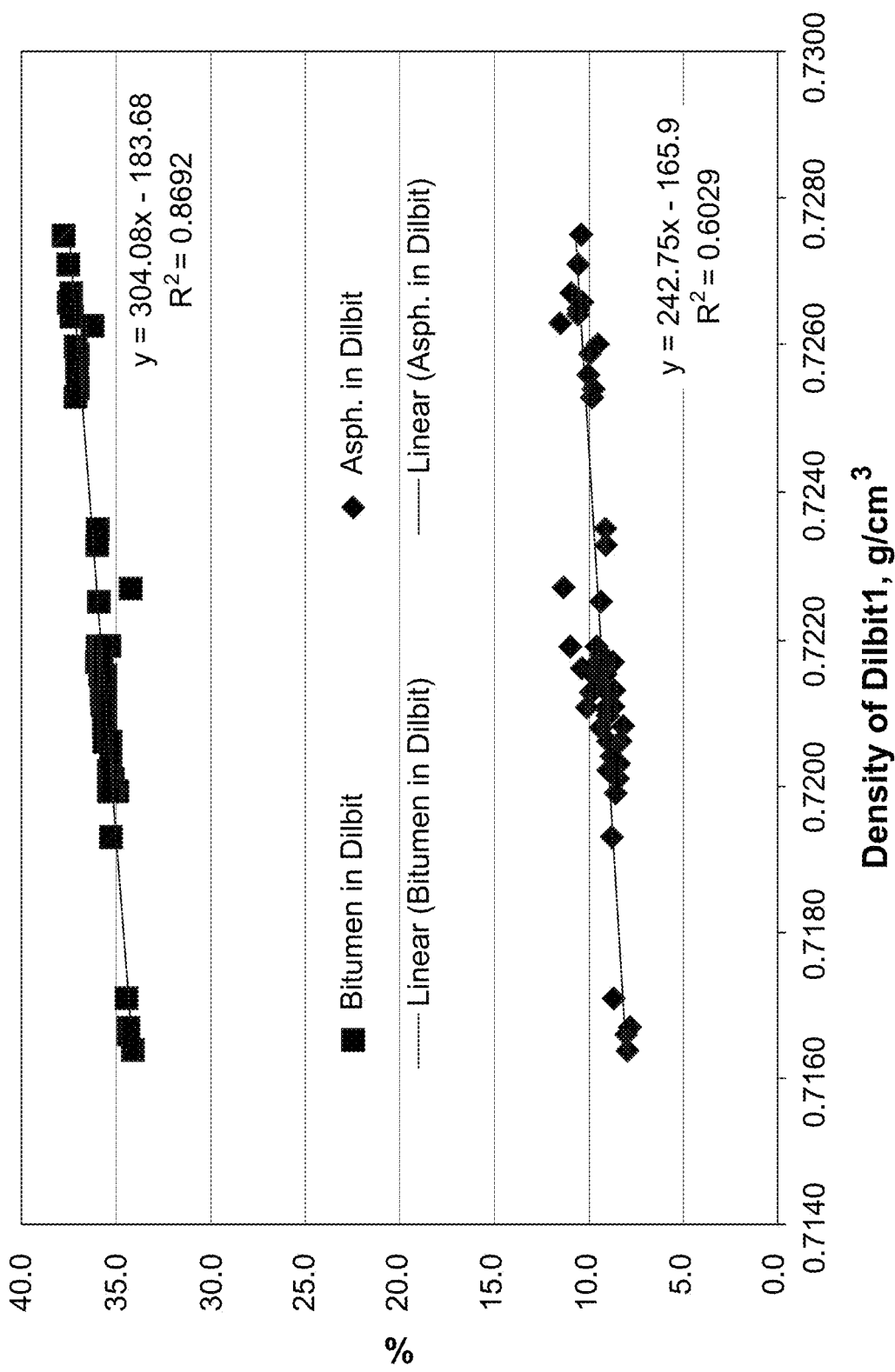
FIG. 6 is a graph showing the updated correlation of density vs. % of bitumen and % of asphaltenes in diluted bitumen.
Figure 7:
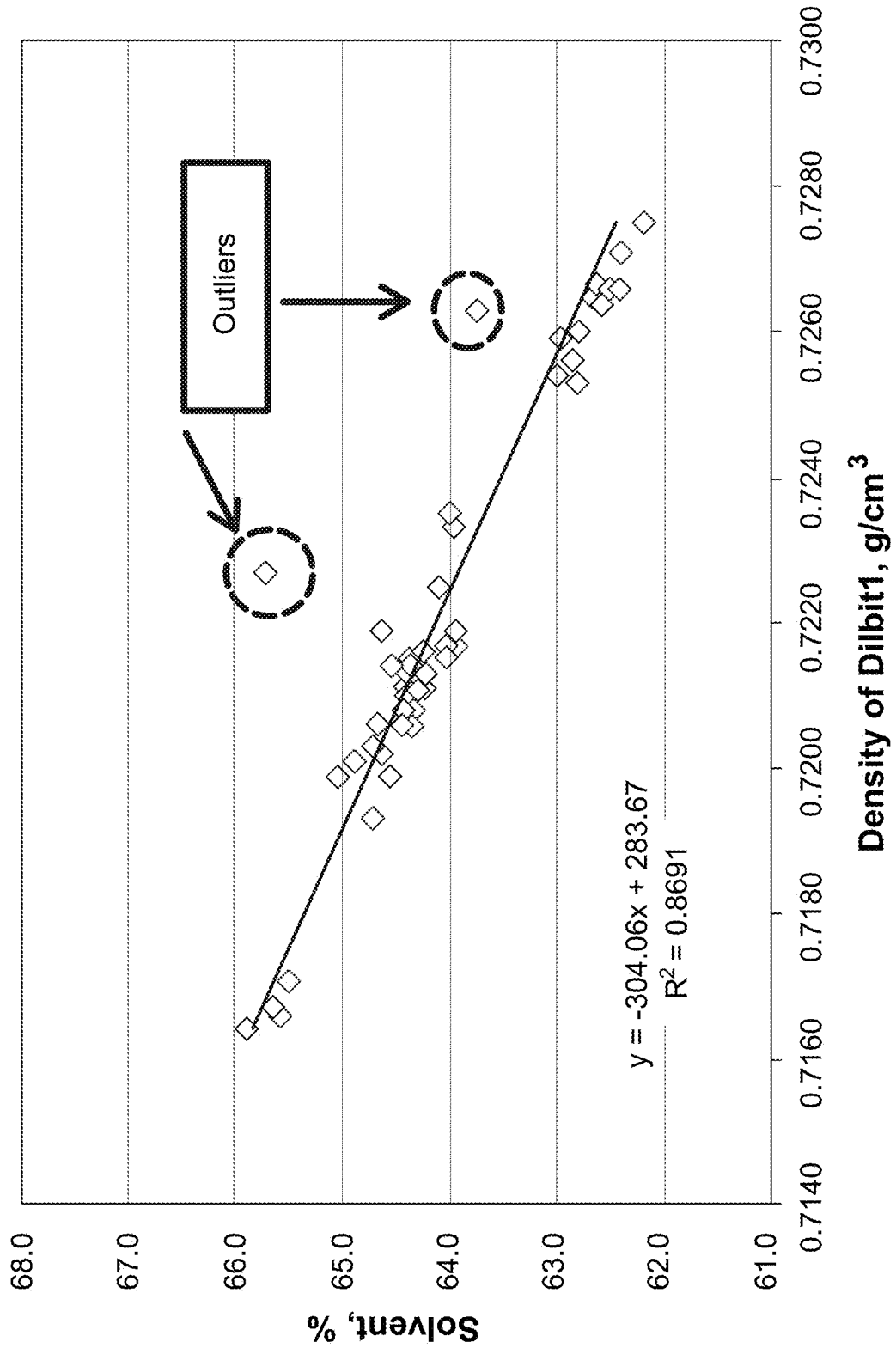
FIG. 7 is a graph showing the updated correlation of density vs. % of solvent in diluted bitumen.

FIGS. 4 and 5 illustrate the correlations between density and bitumen content, solvent content, and asphaltenes content of diluted bitumen of mass balance samples. They show that, in a first step, weak correlations were obtained between the density of diluted bitumen versus its bitumen content, solvent content, and asphaltenes content. Because density data were measured twice, they were more reliable. Four data points of bitumen content, and solvent content were treated as outliers and would not be used for building NIR models and RI correlation. FIGS. 6 and 7 show that much better correlations were obtained after four data points of bitumen content, and solvent content were removed.

Although four data points of solvent content were removed in FIG. 5, there were two other data points scattered far away from the correlation curve in FIG. 7. They were outliers, so these solvent data points were removed. FIG. 8 shows an even stronger correlation after two data points of solvent content were removed. After removing all outliers, final correlations between density and bitumen content, and asphaltenes content were obtained as shown in FIG. 9.

Sampling Method

During the trials, there were two methods used for sample collection. Most samples were collected in the glass jar through a cooling coil, and some samples were collected in the sample bomb. Comparing the compositional analysis of samples collected in two kinds of containers at the same time, higher asphaltenes content were obtained in samples collected by the sample bomb. Table 1 summarizes the discrepancy of the composition of these samples.

TABLE 1

Comparison of the Composition of Diluted bitumen Collected in the Glass Jar and the Sample Bomb

| Sample ID | Method collected | Asphaltenes, % | Bitumen, % | Solvent, % | Discrepancy[2], % | | |
|---|---|---|---|---|---|---|---|
| | | | | | Asphaltenes | Bitumen | Solvent |
| 6.1.2 | CC[1] | 9.1 | 36.0 | 64.0 | −23.1 | −0.7 | 0.4 |
| | SB[1] | 11.5 | 36.3 | 63.7 | | | |
| 6.4.2 | CC | 8.9 | 35.6 | 64.4 | −2.9 | 0.5 | −0.3 |
| | SB | 9.2 | 35.5 | 64.5 | | | |
| 7.2.1 | CC | 8.5 | 35.1 | 64.9 | −28.9 | 2.3 | −1.2 |
| | SB | 11.3 | 34.3 | 65.7 | | | |
| 7.3.1 | CC | 9.5 | 37.2 | 62.8 | −11.9 | −0.4 | 0.2 |
| | SB | 10.7 | 37.3 | 62.7 | | | |
| 7.4.1 | CC | 8.0 | 34.1 | 65.9 | −8.5 | −1.1 | 0.6 |
| | SB | 8.7 | 34.5 | 65.5 | | | |
| 7.5.1 | CC | 8.7 | 35.6 | 64.4 | −8.2 | 0.1 | 0.0 |
| | SB | 9.4 | 35.6 | 64.4 | | | |
| 7.6.1 | CC | 8.7 | 35.7 | 64.3 | −10.9 | −0.7 | 0.4 |
| | SB | 9.7 | 36.0 | 64.0 | | | |
| 7.7.1 | CC | 8.9 | 36.1 | 63.9 | −5.6 | 0.4 | −0.2 |
| | SB | 9.4 | 35.9 | 64.1 | | | |

[1]CC—Cooling coiled column; SB—Sample bomb;
[2]% of discrepancy = $(Data_{CC} - Data_{SB})/((Data_{CC} + Data_{SB})/2)*100$ Since most samples were collected by the cooling coil to glass jar, asphaltenes content obtained for the samples collected by the sample bomb were used for determining how much asphaltenes should be added in the samples collected in the cooling coil method. The adjusted asphaltenes was used for building NIR asphaltenes model. Other measurements from the samples collected by the sample bomb were not used for their NIR models.

Figure 75:
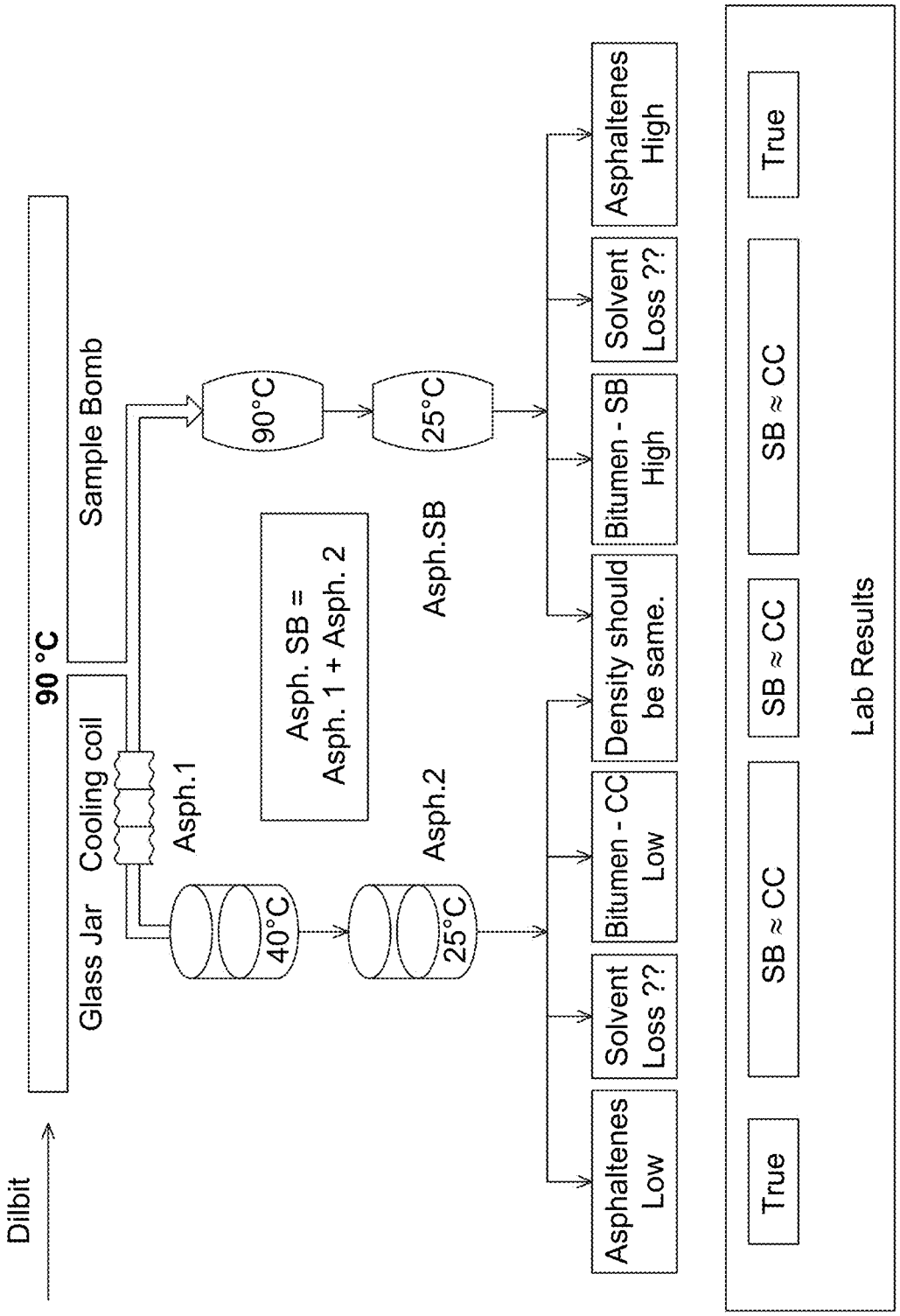
FIG. 75 is a schematic of two sample collection method.

Glass jar is the normal container for sample collection during trials. Two sample collection methods were used for comparison. Diluted bitumen was firstly cooled down through the cooling coil and then collected into the glass jar. In the second method, diluted bitumen was collected through the sample bomb directly. In order to investigate any difference between the two sample methods, ten samples were collected in both ways. FIG. 75 illustrates the detailed procedures of two sample collection methods. Considering different cooling processes in these two methods, some variability of the composition measurement in diluted bitumen were expected and lab results were used to validate the expectation shown in FIG. 75. Green font indicates the expectation matched laboratory results and red font indicates the expectation did not match laboratory results.

By comparing the two methods, it has been found that the sample collected by the sample bomb would be more representative of real samples and contain higher asphaltenes content because some asphaltenes might precipitate out and adhere on the wall of the cooling coil due to temperature dropped.

Figure 76:
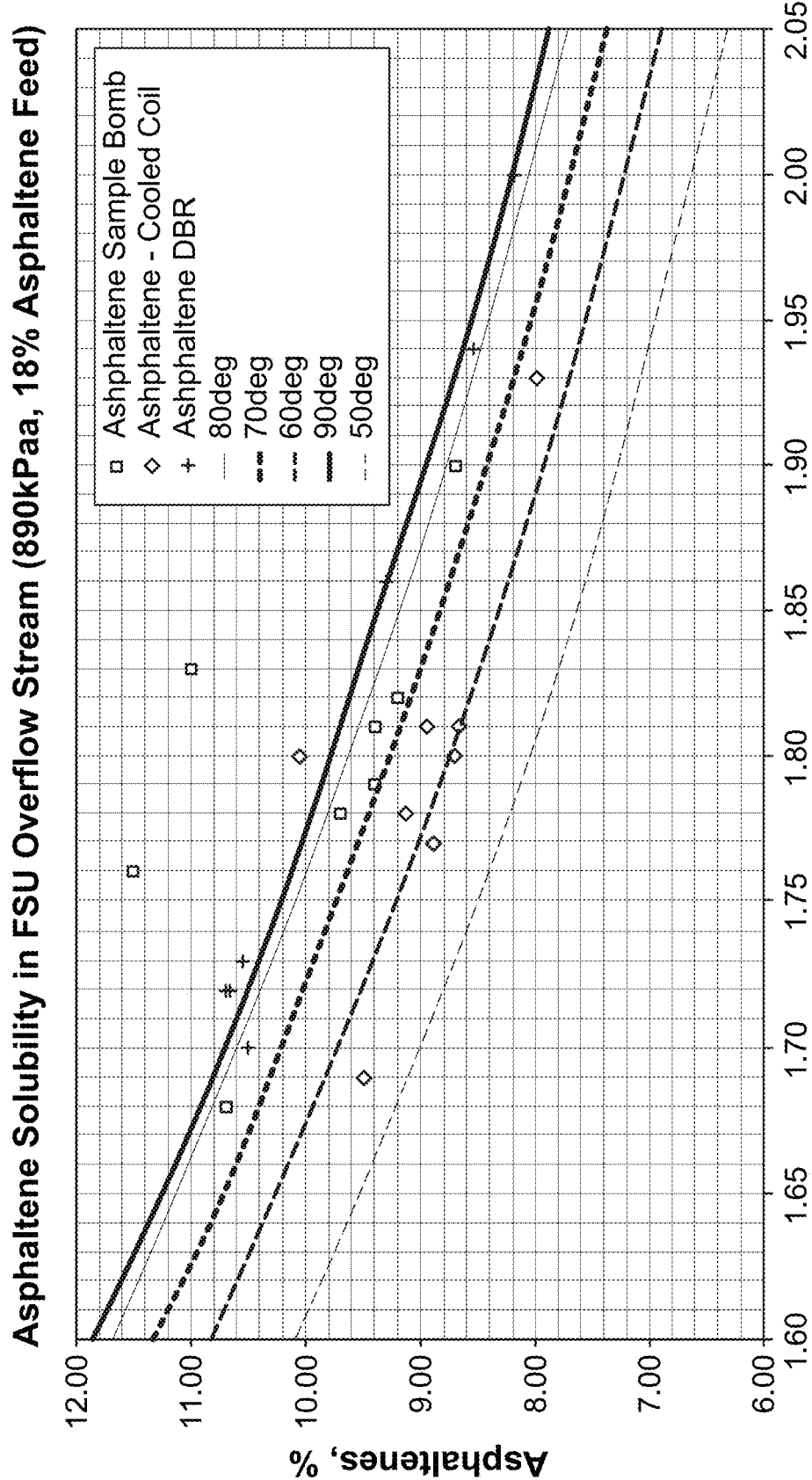
FIG. 76 is a graph of asphaltenes solubility in diluted bitumen vs. temperature.

According to the results, when the temperature of diluted bitumen reduces from 90° C. to 50° C., about 2% asphaltenes will precipitate out from diluted bitumen (FIG. 76). FIG. 77 displays bitumen content, solvent content, and asphaltenes content in diluted bitumen and the density of diluted bitumen of two samples collected at the same time. The standard deviation of the test method was shown in the data points for reference.

Figure 78:
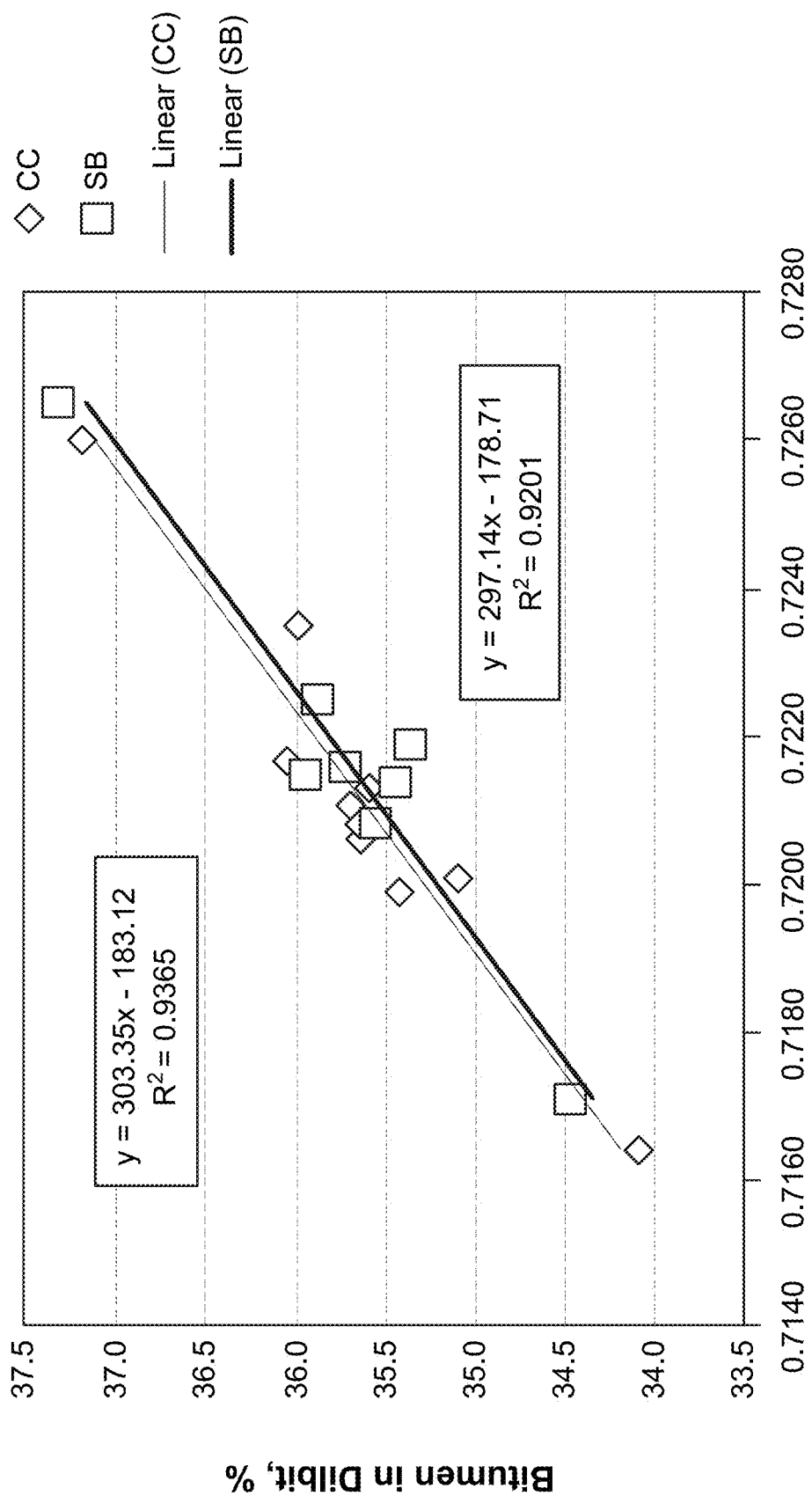
FIG. 78 is a graph showing the correlation of the density of diluted bitumen vs. bitumen content in diluted bitumen in two methods.

Results in FIG. 77 show that except for asphaltenes content in bitumen all other measurements for two sample methods were very close and the difference of most measurements fell in the range of the standard deviation of the test method. Although the difference of bitumen measurement for samples collected by two methods was in the range of the standard deviation, slightly consistently higher bitumen content measured in the sample collected in the sample bomb was observed in FIG. 78.

Figure 79:
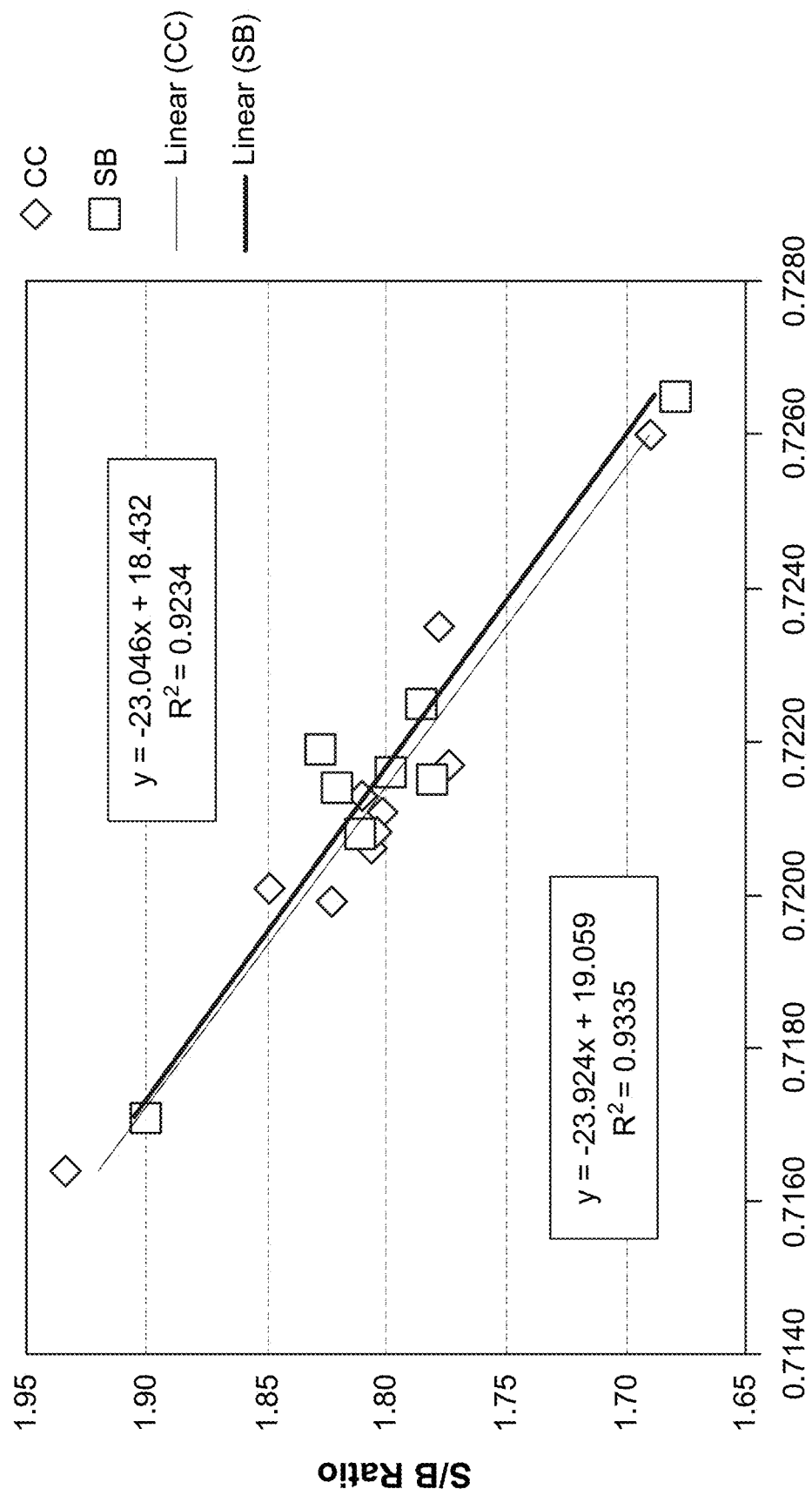
FIG. 79 is a graph showing the correlation of the density of diluted bitumen vs. S/B ratio of diluted bitumen in two methods.

FIG. 79 shows the correlation between the density of diluted bitumen and S/B. It appears that both methods give strong correlations. Considering two samples collected at the same time, although two methods show similar trend, slightly lower S/B for the sample collected by the sample bomb method when the samples were taken in the same condition. The difference of S/B of two samples is less than 0.05.

Figure 80:
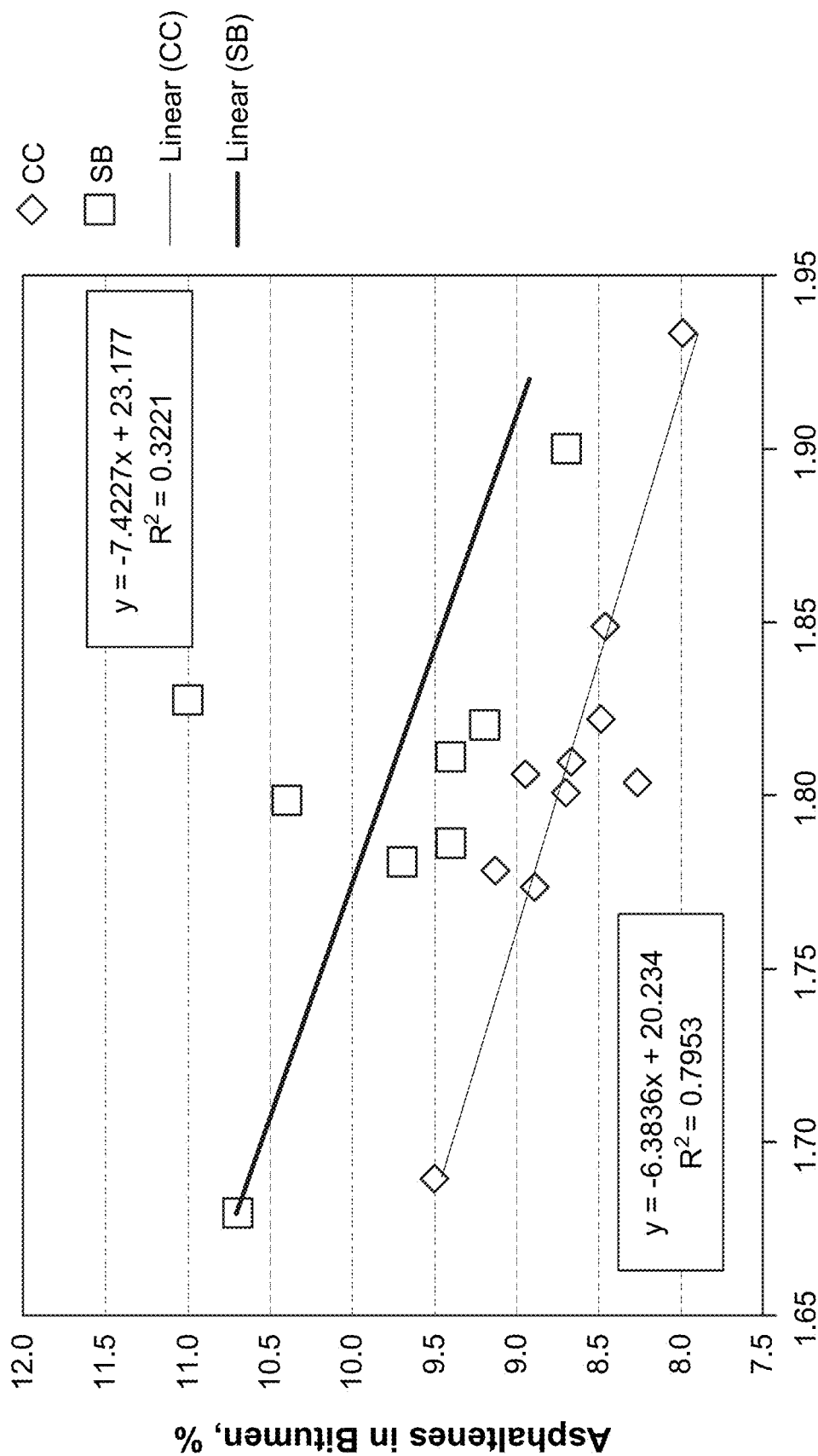
FIG. 80 is a graph showing the relationship between S/B ratio of diluted bitumen and asphaltenes contents in bitumen in two methods.
Figure 81:
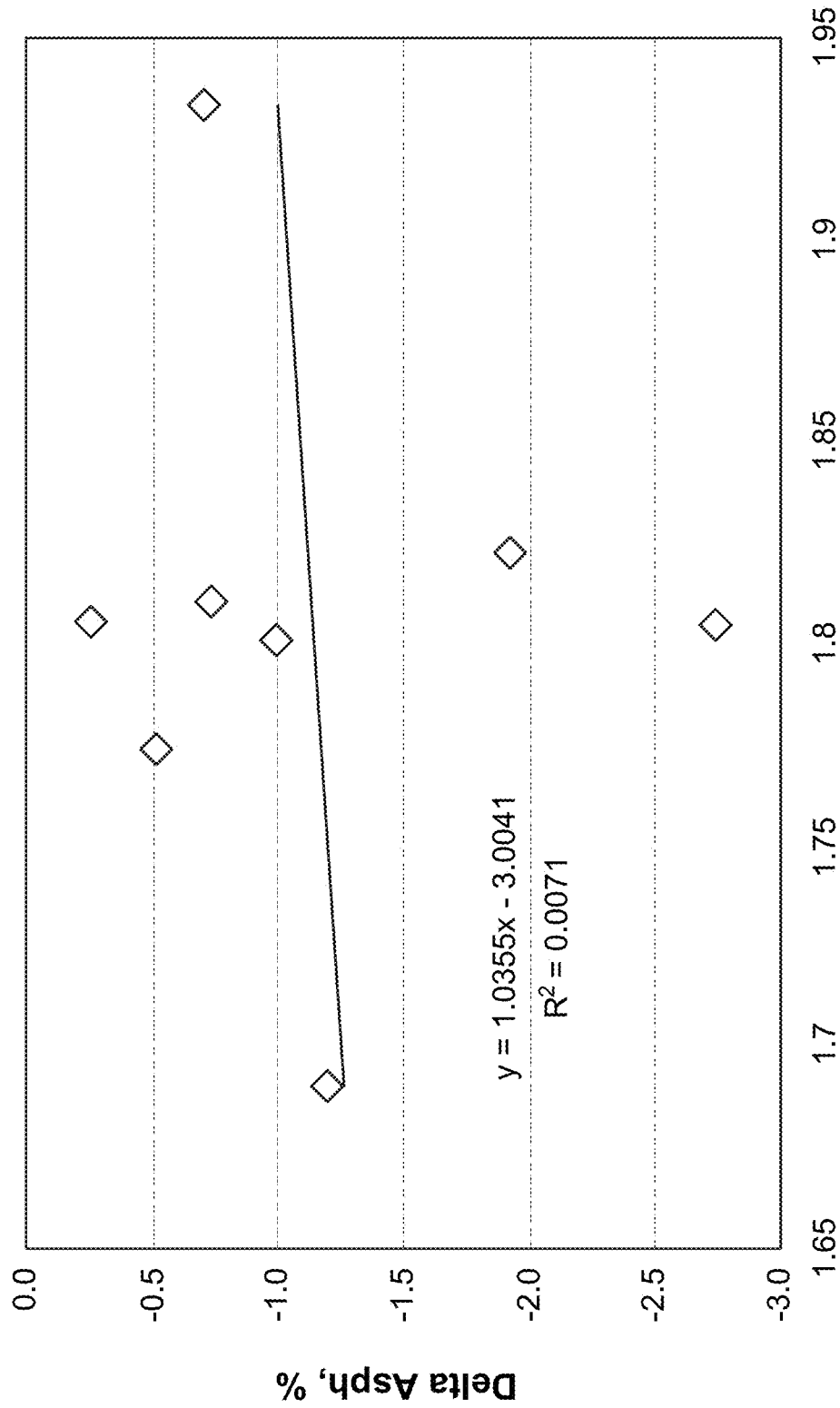
FIG. 81 is a graph showing the amount of asphaltenes adjusted vs. S/B ratio of the sample collected in the cooling coil method.

FIG. 80 shows that the relationship between S/B of diluted bitumen and asphaltenes content in bitumen measured in the samples collected by two methods. It clearly shows that at same S/B ratio, asphaltenes contents in the samples collected by the sample bomb method were 0.9-1.3% higher than those collected by the cooling coil method.

Because most samples were collected using the cooling coil method, asphaltenes contents in these samples were underestimated. So 0.9-1.3% of asphaltenes will be added for these measurements. According to the formula shown in FIG. 7A, the amount of the asphaltenes was adjusted depending on S/B of diluted bitumen.

From the above discussion, it can be concluded that 0.9-1.3% of asphaltenes precipitated out during sampling by the cooling coil method. Since most samples were collected by the cooling coil to glass jar, the asphaltenes contents in these samples were underestimated, the asphaltenes content were adjusted, and then used for building NIR asphaltenes model. Other measurements from the samples collected by the sample bomb were not used for their NIR models.

Finally, it is to be noted that the difference of asphaltenes content in diluted bitumen collected by two methods did not cause significantly the difference of S/B calculation (less than 0.05).

TABLE A1-1

Comparison of Lab measurements of diluted bitumens collected by two methods

| No. of MB | Method collected | Density, kg/m3 | Asphaltene, % | Bitumen, % | Solvent, % | S/B |
|---|---|---|---|---|---|---|
| 6.2.1 | CC | 0.7208 | 8.3 | 35.7 | 64.3 | 1.80 |
|  | SB | 0.7219 | 11.0 | 35.4 | 64.6 | 1.83 |
| 6.4.2 | CC | 0.7206 | 8.9 | 35.6 | 64.4 | 1.81 |
|  | SB | 0.7214 | 9.2 | 35.5 | 64.5 | 1.82 |
| 7.3.1 | CC | 0.726 | 9.5 | 37.2 | 62.8 | 1.69 |
|  | SB | 0.7265 | 10.7 | 37.3 | 62.7 | 1.68 |
| 7.4.1 | CC | 0.7164 | 8.0 | 34.1 | 65.9 | 1.93 |
|  | SB | 0.7171 | 8.7 | 34.5 | 65.5 | 1.90 |
| 7.5.1 | CC | 0.7213 | 8.7 | 35.6 | 64.4 | 1.81 |
|  | SB | 0.7208 | 9.4 | 35.6 | 64.4 | 1.81 |
| 7.6.1 | CC | 0.7211 | 8.7 | 35.7 | 64.3 | 1.80 |
|  | SB | 0.7215 | 9.7 | 36.0 | 64.0 | 1.78 |
| 7.7.1 | CC | 0.7217 | 8.9 | 36.1 | 63.9 | 1.77 |
|  | SB | 0.7225 | 9.4 | 35.9 | 64.1 | 1.79 |
| 8.2.1 | CC | 0.7199 | 8.5 | 35.4 | 64.6 | 1.82 |
|  | SB | 0.7216 | 10.4 | 35.7 | 64.3 | 1.80 |

In PFT, usually less than 0.1 wt. % of filterable solids and water are left in diluted bitumen, which brings a significant challenge to determine their contents. Generally speaking, solids content and water content in diluted bitumen are directly attributed to the amount of asphaltenes rejected. In other words, more asphaltenes are rejected, less solids and water left in diluted bitumen. FIG. 10 (*a*) displays the relationship between asphaltenes content and solids content in diluted bitumen from the lab results. According to previous studies, one outlier was identified.

FIG. 10 (*b*) shows the relationship between asphaltenes content versus water content in diluted bitumen from lab results. Although a weak correlation was observed, one data point was scattered far away from majority data, so this data was marked as an outlier.

Figure 82:
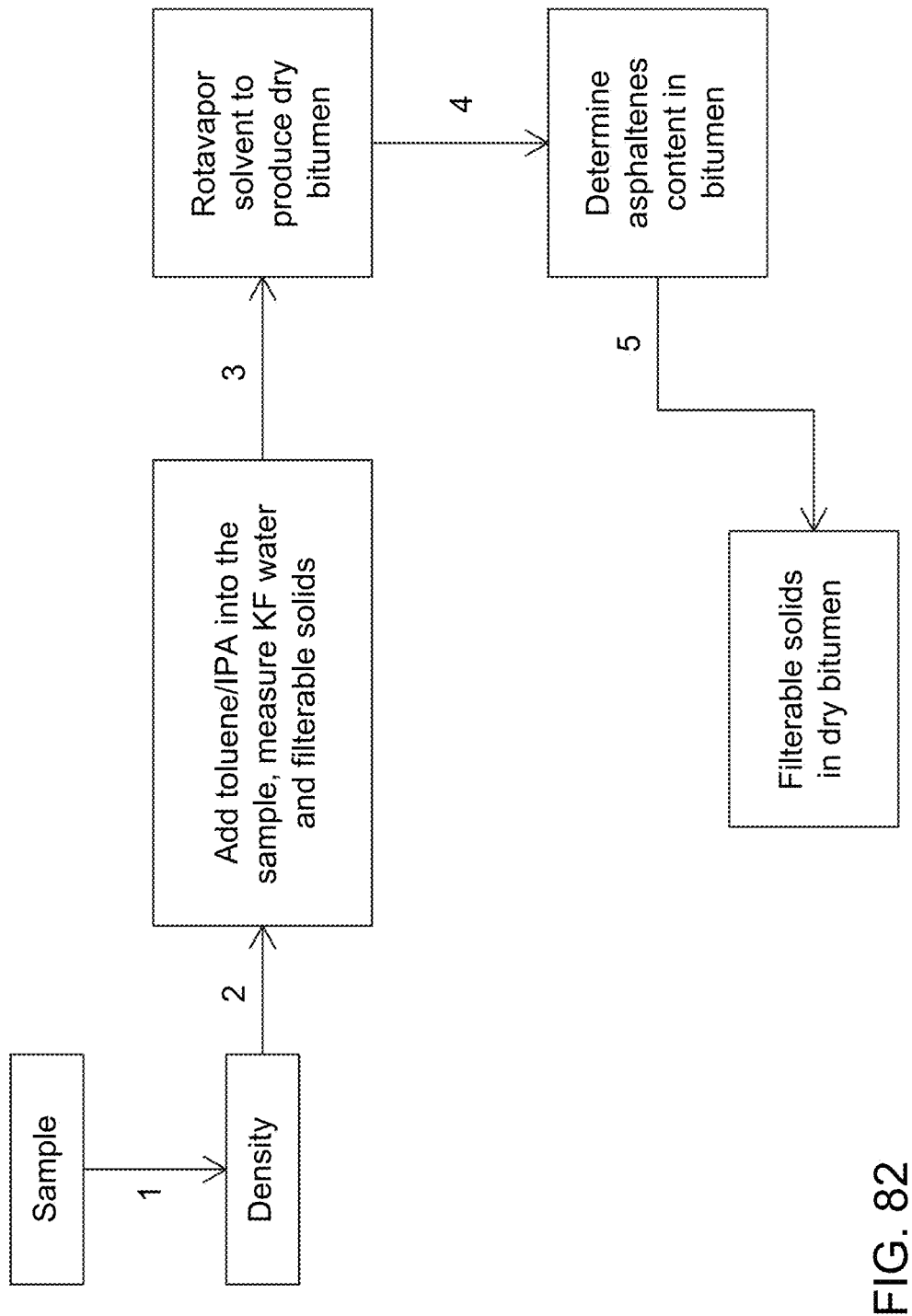
FIG. 82 is a block diagram showing order of the sample analysis.

A method was developed and used to assess water and solids collected in settling tests, as shown in FIG. 82. It was found that there is a good correlation between KFW and filterable solids in supernatant phase.

Table 2 summarizes mass balance data whether or not used for building the calibration of the NIR measurement.

TABLE 2

Summary of Lab Data Used for calibrating NIR measurements.

| No. | MB | FSU1 OF density | FSU1 OF Asph by probe (%) | FSU1 OF Bitumen (wt. %) | FSU 1 OF Solvent (wt. %) | FSU1 OF solids (wt. %) | Karl Fisher Water, ppm | S/B | Note |
|---|---|---|---|---|---|---|---|---|---|
| 1 | 6.1.1 | 0.7233 | 9.05 | 36.03 | 63.97 | 0.087 | 245 | 1.78 | |
| 2 | 6.1.2 | 0.7235 | 9.13 | 35.99 | 64.01 | 0.113 | 278 | 1.78 | |
| 3 | 6.1.2 BS | 0.7263 | Outliers determined by the correlation between density vs. solvent, bitumen, asphaltenes contents | | | | | | |
| 4 | 6.2.1 | 0.7208 | 8.26 | 35.66 | 64.34 | 0.017 | 278 | 1.80 | |
| 5 | 6.2.2 BS | 0.7219 | Outliner | 35.37 | 64.63 | 1.005 | n.a. | 1.83 | |
| 6 | 6.2.3 | 0.7211 | 10.05 | 35.77 | 64.23 | Outliner | 2095 | 1.80 | |
| 7 | 6.2.4 | 0.7211 | 9.05 | 35.57 | 64.43 | 0.085 | 185 | 1.81 | |
| 8 | 6.3.1 | 0.721 | 8.89 | 35.58 | 64.42 | 0.04 | 228 | 1.81 | |
| 9 | 6.3.2 | 0.7208 | 9.23 | 35.55 | 64.45 | 0.091 | 185 | 1.81 | |
| 10 | 6.3.3 | 0.7216 | 9.38 | 35.76 | 64.24 | 0.124 | 182 | 1.80 | |
| 11 | 6.3.4 | 0.7215 | 9.17 | 35.61 | 64.39 | 0.049 | 242 | 1.81 | |
| 12 | 6.3.5 | 0.7214 | 9.24 | 35.63 | 64.37 | 0.042 | 211 | 1.81 | |
| 13 | 6.3.6 | 0.7216 | 9.53 | Outliers determined | | 0.05 | 246 | n.a. | |
| 14 | 6.3.7 | 0.7218 | 9.45 | by the correlation | | 0.052 | 229 | | |
| 15 | 6.3.8 | 0.7217 | 9.35 | between density vs. | | 0 047 | 316 | | |
| 16 | 6.3.9 | 0.7215 | 9.15 | bitumen, solvent. | | 0.047 | 286 | | |
| 17 | 6.4.1 | 0.7202 | 8.99 | 35.36 | 64.64 | 0.125 | 320 | 1.83 | |
| 18 | 6.4.2 | 0.7206 | 8.94 | 35.64 | 64.36 | 0.044 | 426 | 1.81 | |
| 19 | 6.4.2 BS | 0.7214 | 9.20 | 35.46 | 64.54 | 0.055 | n.a. | 1.82 | |
| 20 | 6.4.3 | 0.7204 | 8.83 | See above note. | | 0.012 | 426 | n.a. | |
| 21 | 7.2.1 | 0.7201 | 8.45 | 35.10 | 64.90 | 0.012 | 245 | 1.85 | |
| 22 | 7.2.1 BS | 0.7227 | Outliers determined by the correlation between density vs. solvent, bitumen, asphaltenes contents | | | | | | |
| 23 | 7.2.2 | 0.7203 | 8.42 | 35.28 | 64.72 | 0.015 | 198 | 1.83 | |
| 24 | 7.2.3 | 0.7206 | 8.37 | 35.33 | 64.67 | 0.036 | 256 | 1.83 | |
| 25 | 7.2.4 | 0.7193 | 8.79 | 35.28 | 64.72 | 0.093 | n.a. | 1.83 | |
| 26 | 7.2.5 | 0.7199 | 8.73 | 34.95 | 65.05 | 0.035 | n.a. | 1.86 | |
| 27 | 7.3.1 | 0.726 | 9.50 | 37.18 | 62.82 | 0.029 | 216 | 1.69 | |
| 28 | 7.3.1 BS | 0.7265 | 10.70 | 37.32 | 62.68 | 0.085 | n.a. | 1.68 | |
| 29 | 7.3.2 | 0.7254 | 9.69 | 37.01 | 62.99 | 0.084 | 255 | 1.70 | |
| 30 | 7.3.3 | 0.7259 | 9.92 | 37.03 | 62.97 | 0.059 | 427 | 1.70 | |
| 31 | 7.4.1 | 0.7164 | 7.99 | 34.09 | 65.91 | 0.018 | 218 | 1.93 | |
| 32 | 7.4.1 BS | 0.7171 | 8.70 | 34.48 | 65.52 | 0.139 | n.a. | 1.90 | |
| 33 | 7.4.2 | 0.7166 | 8.11 | 34.40 | 65.60 | 0.057 | 252 | 1.91 | |
| 34 | 7.4.3 | 0.7167 | 7.85 | 34.35 | 65.65 | 0.017 | Outlier | 1.91 | |
| 35 | 7.5.1 | 0.7213 | 8.66 | 35.59 | 64.41 | 0.022 | 347 | 1.81 | |
| 36 | 7.5.1 BS | 0.7208 | 9.40 | 35.57 | 64.43 | 0.058 | n.a. | 1.81 | |
| 37 | 7.5.2 | 0.7213 | 8.70 | 35.74 | 64.26 | 0.027 | 185 | 1.80 | |
| 38 | 7.5.3 | 0.7206 | 8.84 | 35.56 | 64.44 | 0.017 | Outlier | 1.81 | |
| 39 | 7.6.1 | 0.7211 | 8.70 | 35.70 | 64.30 | 0.015 | 344 | 1.80 | |
| 40 | 7.6.1 BS | 0.7215 | 9.70 | 35.96 | 64.04 | 0.107 | n.a. | 1.78 | |
| 41 | 7.6.2 | 0.7214 | 9.21 | 35.62 | 64.38 | 0.118 | 379 | 1.81 | |
| 42 | 7.7.1 | 0.7217 | 8.89 | 36.05 | 63.95 | 0.022 | 379 | 1.77 | |
| 43 | 7.7.1 BS | 0.7225 | 9.40 | 35.89 | 64.11 | 0.053 | n.a. | 1.79 | |
| 44 | 7.7.2 | 0.7217 | 8.73 | 35.96 | 64.04 | 0.019 | n.a. | 1.78 | |

TABLE 2-continued

Summary of Lab Data Used for calibrating NIR measurements.

| No. | MB | FSU1 OF density | FSU1 OF Asph by probe (%) | FSU1 OF Bitumen (wt. %) | FSU 1 OF Solvent (wt. %) | FSU1 OF solids (wt. %) | Karl Fisher Water, ppm | S/B | Note |
|---|---|---|---|---|---|---|---|---|---|
| 45 | 8.3.2 | 0.7253 | 9.84 | 37.17 | 62.83 | 0.026 | 353 | 1.69 | |
| 46 | 8.3.3 | 0.7275 | 10.43 | 37.81 | 62.19 | 0.046 | 370 | 1.64 | |
| 47 | 8.4.1 | 0.7264 | 10.57 | 37.42 | 62.58 | 0.02 | 271 | 1.67 | |
| 48 | 8.4.2 | 0.7267 | 10.94 | 37.35 | 62.65 | 0.16 | 318 | 1.68 | |
| 49 | 8.4.3 | 0.7266 | 10.57 | 37.48 | 62.52 | 0.021 | 302 | 1.67 | |
| 50 | 8.5.1 | 0.7266 | 10.31 | 37.57 | 62.43 | 0.021 | 320 | 1.66 | |
| 51 | 8.6.1 | 0.7271 | 10.62 | 37.60 | 62.40 | 0.02 | 367 | 1.66 | |
| 52 | 8.2.1 | 0.7199 | 8.48 | 35.43 | 64.57 | 0.026 | 217 | 1.82 | No NIR |
| 53 | 8.2.1 BS | 0.7216 | 10.40 | 35.73 | 64.27 | 0.104 | n.a. | 1.80 | spectra |
| 54 | 8.2.2 | 0.7213 | 9.75 | 35.77 | 64.23 | 0.161 | 386 | 1.80 | |
| 55 | 8.2.3 | 0.7219 | 9.64 | 36.05 | 63.95 | 0.037 | 371 | 1.77 | |
| 56 | 8.3.1 | 0.7256 | 9.98 | 37.14 | 62.86 | 0.024 | 317 | 1.69 | |
| 57 | 7.1.1 | | | | | | | | |
| 58 | 7.1.1BS | | | | | | | | |
| 59-65 | 8.1.1-8.1.5 | | | | | | | | |

Rows 57-58: Operated in the counter mode. This group of data will be used as test data to validate the calibration curves generated using above data.

Developing NIR Models

Chemometrics method was used to build the following models in the OPUS/QUANT Spectroscopy Software which was provided by Bruker.

The modeling process shown in FIG. 12 was completed for all required measurements. The first four steps only show the S/B model as an example. However the theoretical process was the same for other measurements.

a) Organization of NIR Spectra According to Pilot Mass Balance and Lab Data

Figure 13:
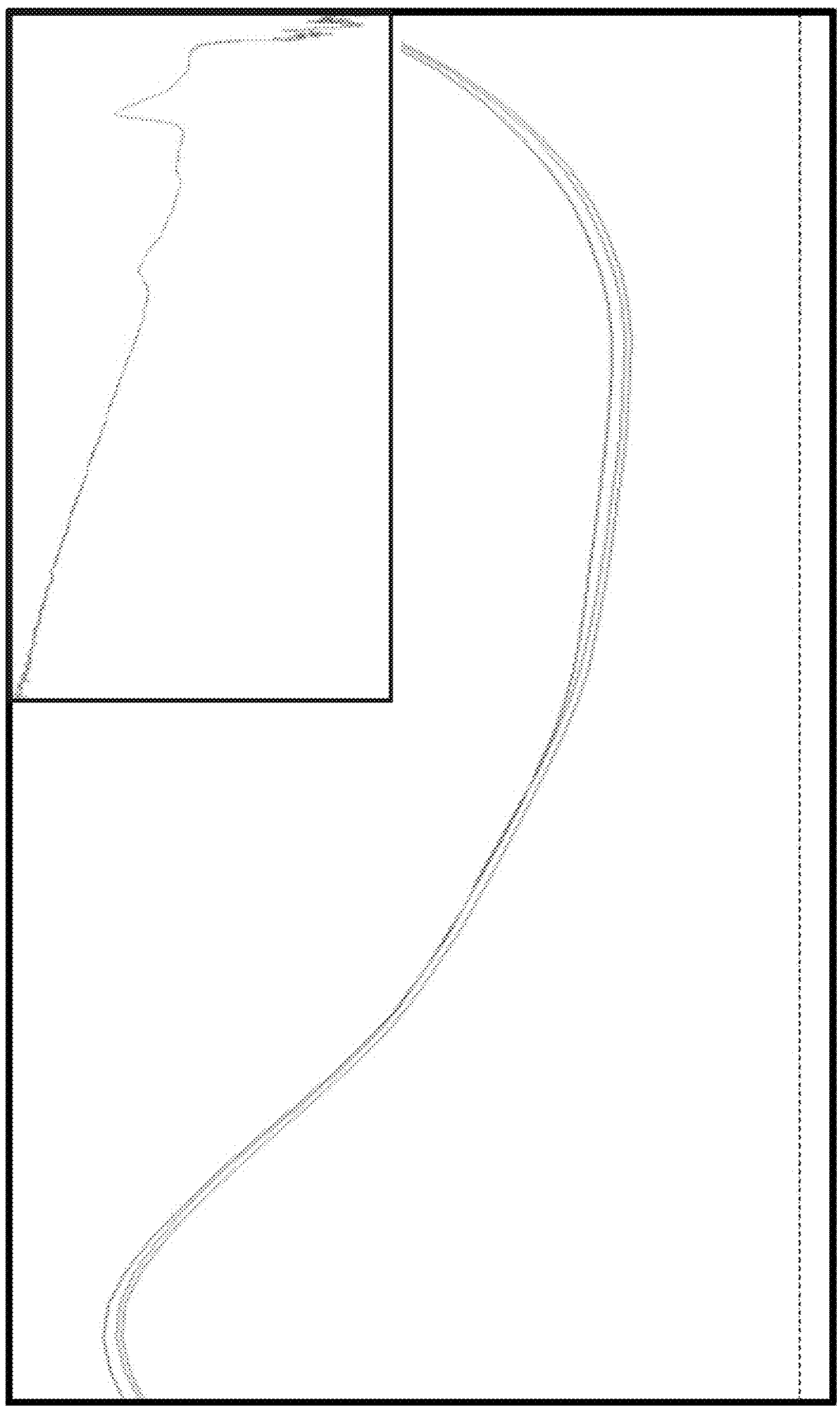

A series of NIR spectra were selected and organized according to the time which the lab samples were collected for mass balance calculation. In order to account for possible deviations in sample collecting times, three spectra covering a five minute window over the sample time would be used. At a high level, the three spectra change negligibly in this window. However, they changed noticeably on a micro scale (FIG. 13). This allows for an accurate average over the sample window to be used for each data point in the model. An example of the spectra organization used for several points in the models for Week A is shown below in Table 3, with the points used in FIG. 13 highlighted.

b) Development of Preliminary NIR Models

Figure 14:
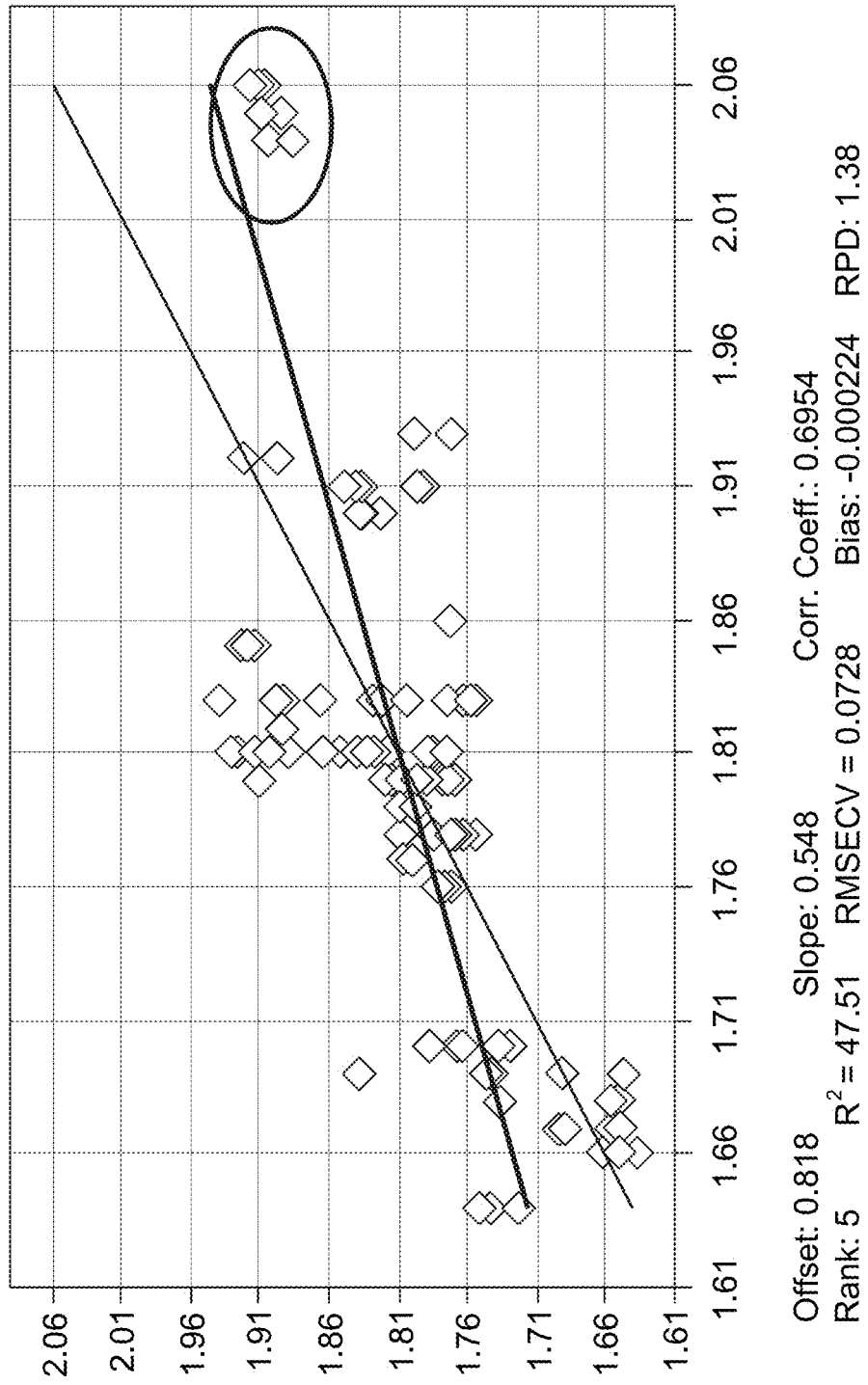
FIG. 14 is a cross validation for an Initial calibration model for S/B ratio.

After compiling the relevant spectra, all of the spectra with available lab data were loaded into the OPUS/QUANT software in order to understand whether NIR software itself can identify the outliers which were removed based on QA/QC analysis. A series of the models (referred as baseline models) were obtained. One can see these models did not trend with high correlation, which indicated that NIR software can pick up poor data points. FIG. 14 shows the initial model for the S/B with the green line representing the 1/1 line between the predicted and true values, and the blue line representing the correlation line.

TABLE 3

An example of respective NIR spectra organized for week A

| No | MB# | Sample Time | S:B | Lab Data | | | | | | Flux (mm/min) | OPUS File Numbers Reflectance | OPUS File Time |
| | | | | Asphaltene by probe (%) | Bitumen (wt %) | Solvent (wt %) | Solids (wt %) | Water (KFW) | Density | | | |
|---|---|---|---|---|---|---|---|---|---|---|---|---|
| 1 | 6.1.1 | 12:15 | 1.78 | 9.05 | 36.03 | 63.97 | 0.087 | 245 | 0.7233 | 338 | 297 | 12:14 |
| | | 12:15 | 1.78 | 9.05 | 36.03 | 63.97 | 0.087 | 245 | 0.7233 | 338 | 301 | 12:16 |
| | | 12:15 | 1.78 | 9.05 | 36.03 | 63.97 | 0.087 | 245 | 0.7233 | 338 | 309 | 12:19 |
| 2 | 6.1.2 | 13:35 | 1.78 | 9.13 | 35.99 | 64.01 | 0.113 | 278 | 0.7235 | 354 | 519 | 13:34 |
| | | 13:35 | 1.78 | 9.13 | 35.99 | 64.01 | 0.113 | 278 | 0.7235 | 354 | 525 | 13:36 |
| | | 13:35 | 1.78 | 9.13 | 35.99 | 64.01 | 0.113 | 278 | 0.7235 | 354 | 533 | 13:39 |
| 3 | 6.1.2(SB) | 13:35 | 1.76 | 11.51 | 36.25 | 63.75 | 0.549 | | 0.7263 | 342 | 523 | 13:35 |
| | | 13:35 | 1.76 | 11.51 | 36.25 | 63.75 | 0.549 | | 0.7263 | 342 | 527 | 13:37 |
| | | 13:35 | 1.76 | 11.51 | 36.25 | 63.75 | 0.549 | | 0.7263 | 342 | 537 | 13:40 |
| 17 | 6.4.1 | 10:45 | 1.83 | 8.99 | 35.36 | 64.64 | 0.125 | 320 | 0.7202 | 530 | 4081 | 10:44 |
| | | 10:45 | 1.83 | 8.99 | 35.36 | 64.64 | 0.125 | 320 | 0.7202 | 530 | 4087 | 10:46 |
| | | 10:45 | 1.83 | 8.99 | 35.36 | 64.64 | 0.125 | 320 | 0.7202 | 530 | 4095 | 10:49 |
| 18 | 6.4.2 | 11:15 | 1.81 | 8.94 | 35.64 | 64.36 | 0.044 | 426 | 0.7206 | 513 | 4165 | 11:14 |
| | | 11:15 | 1.81 | 8.94 | 35.64 | 64.36 | 0.044 | 426 | 0.7206 | 513 | 4171 | 11:16 |
| | | 11:15 | 1.81 | 8.94 | 35.64 | 64.36 | 0.044 | 426 | 0.7206 | 513 | 4179 | 11:19 |
| 19 | 6.4.2(SB) | 11:15 | 1.82 | 9.2 | 35.46 | 64.54 | 0.055 | | 0.7214 | 515 | 4169 | 11:15 |
| | | 11:15 | 1.82 | 9.2 | 35.46 | 64.54 | 0.055 | | 0.7214 | 515 | 4173 | 11:17 |
| | | 11:15 | 1.82 | 9.2 | 35.46 | 64.54 | 0.055 | | 0.7214 | 515 | 4181 | 11:20 | c) Improvement of NIR Models Using QA/QC Processed Data

Figure 15:
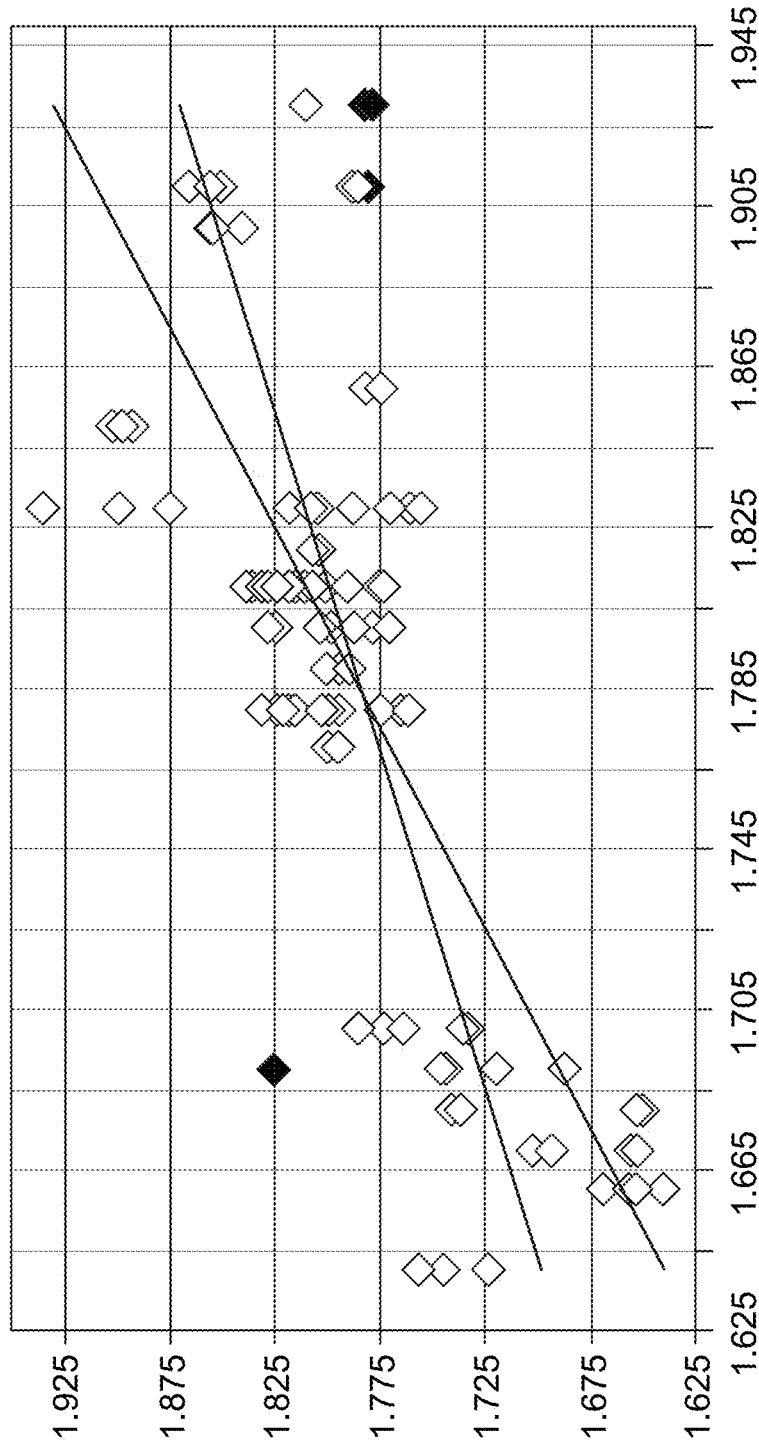
FIG. 15 is a cross validation for a calibration model for S/B ratio with QA/QC data points removed.
Figure 16:
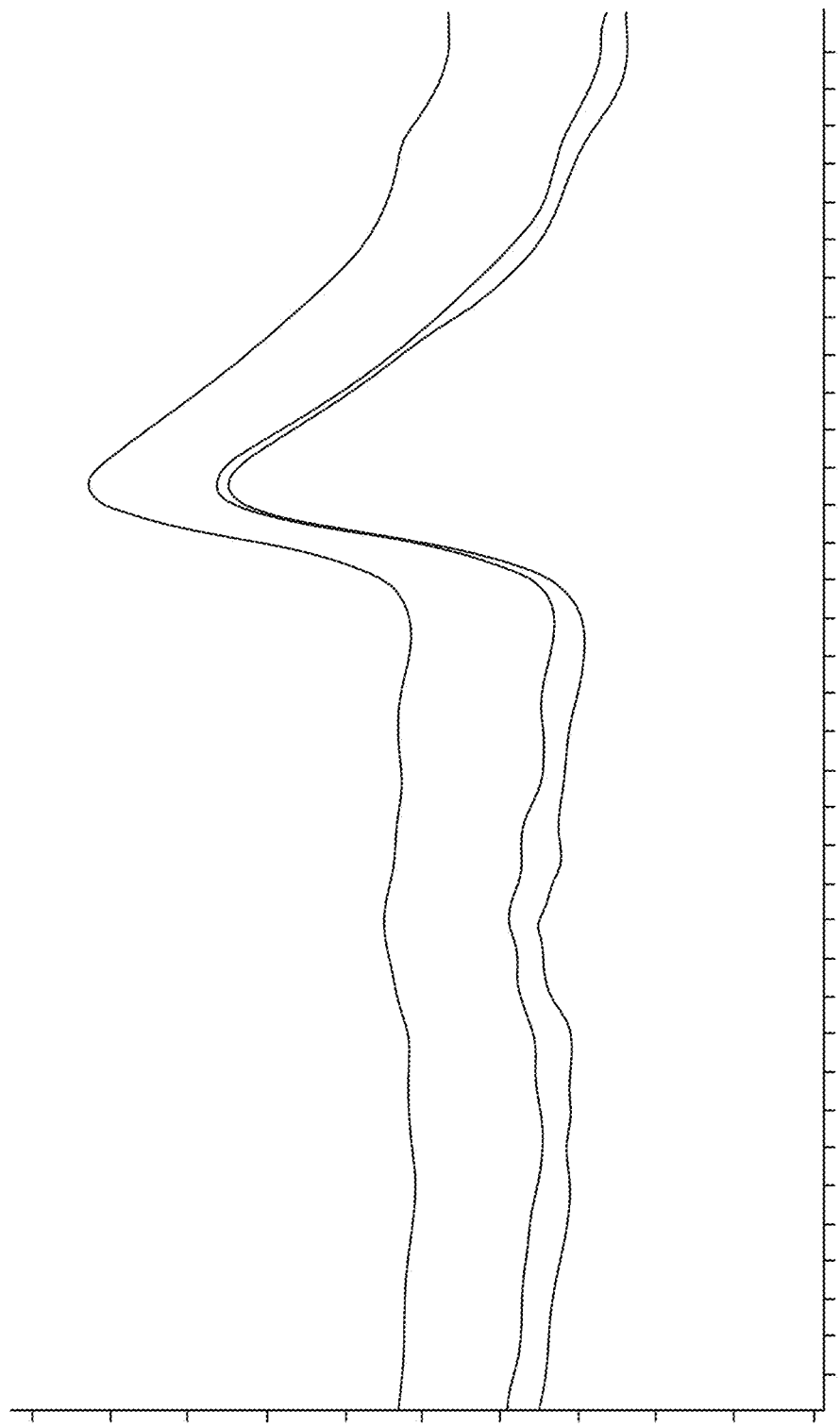
FIG. 16 is spectra of outlier data from sample 33 from Table 6 showing uncharacteristically shifting due to unknown factor.
Figure 17A:
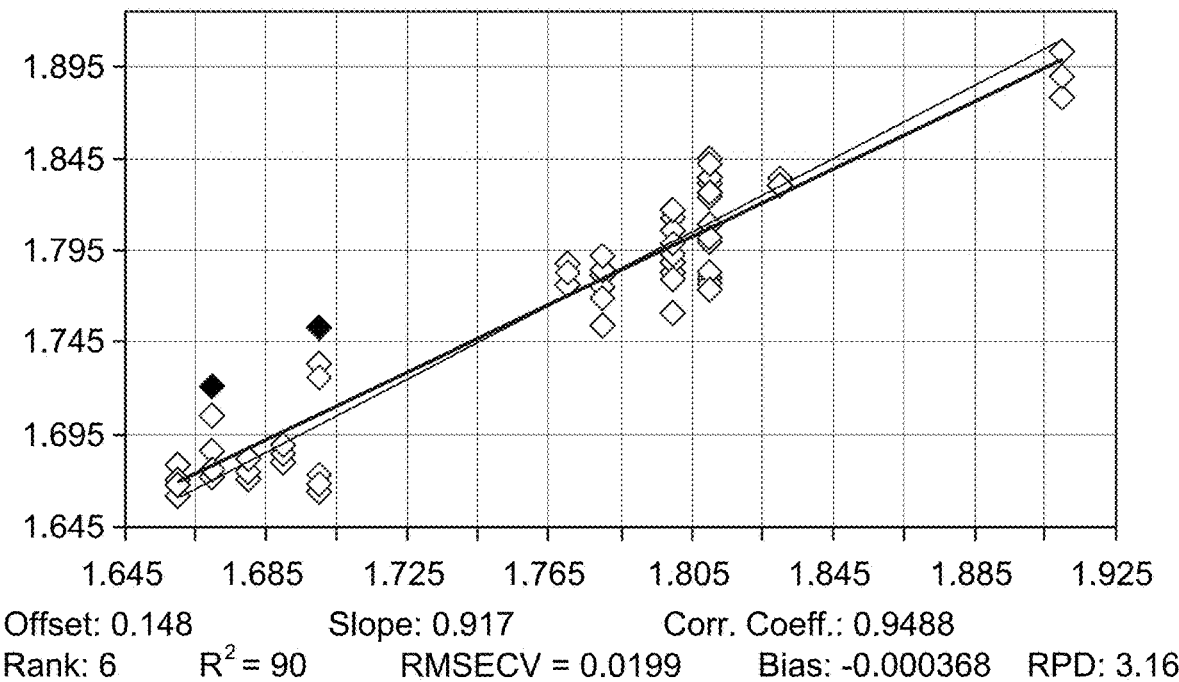
FIGS. 17(a-e) are final NIR models for S/B ratio, density, bitumen, solvent, and asphaltenes contents.
Figure 17B:
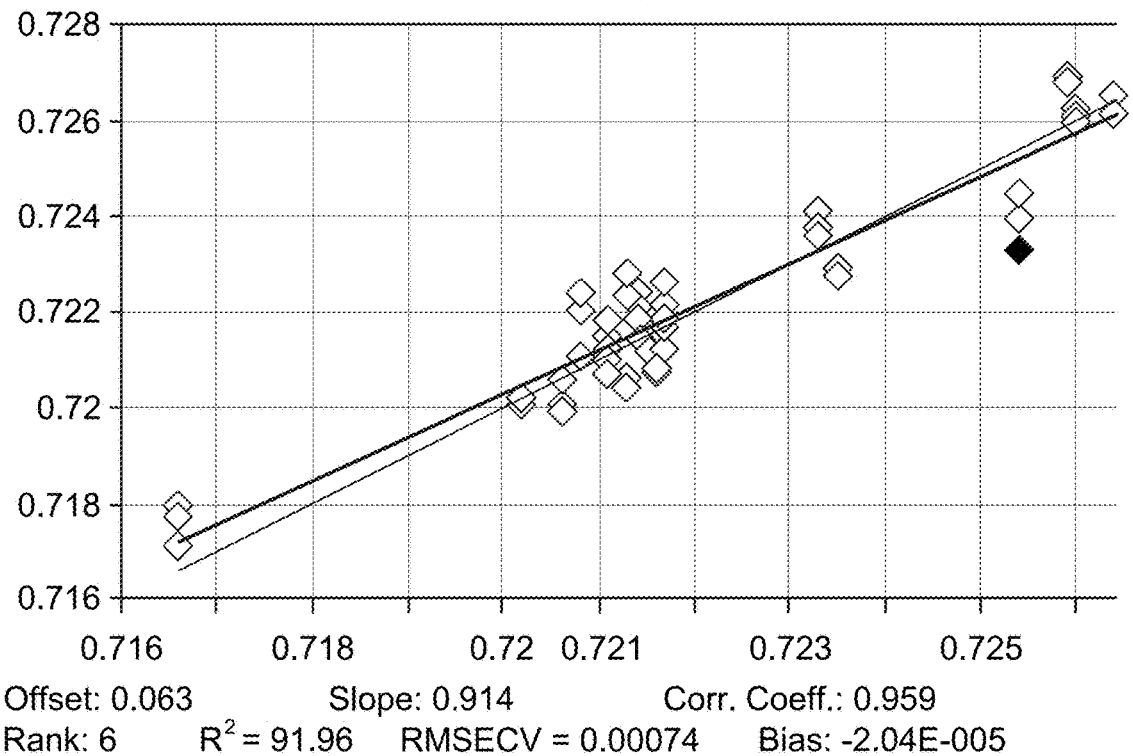
Figure 17C:
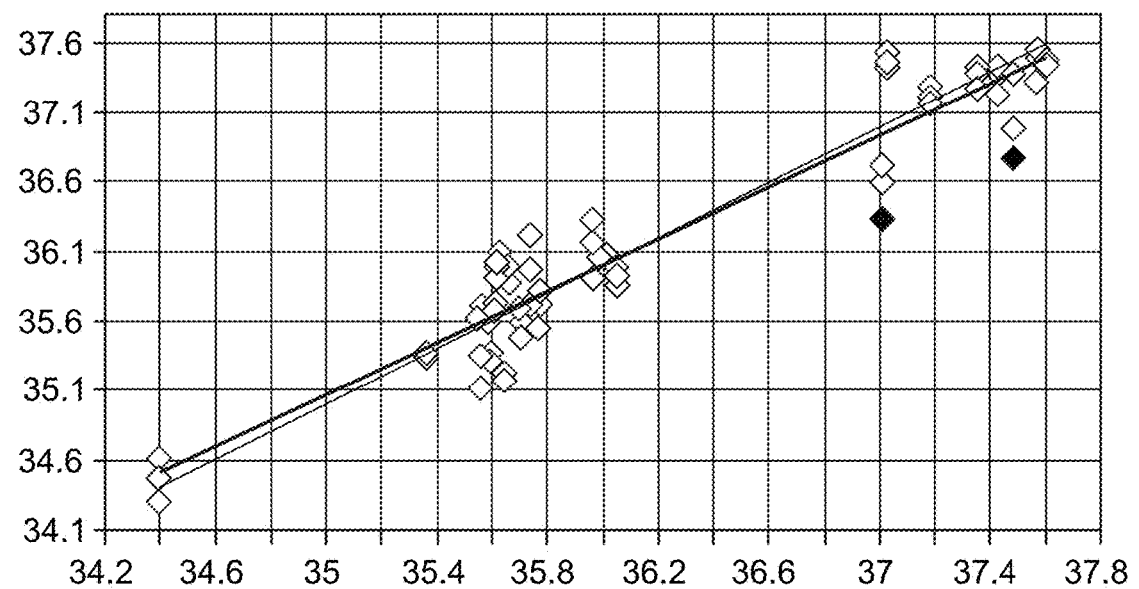
Figure 17D:
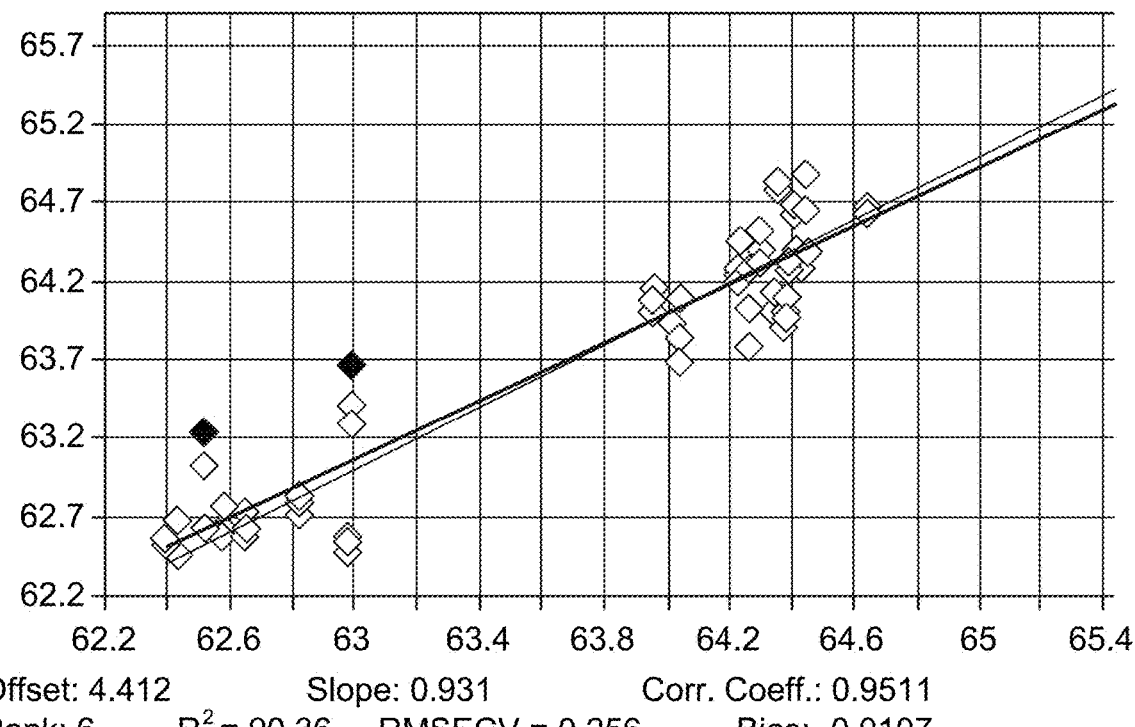
Figure 17E:
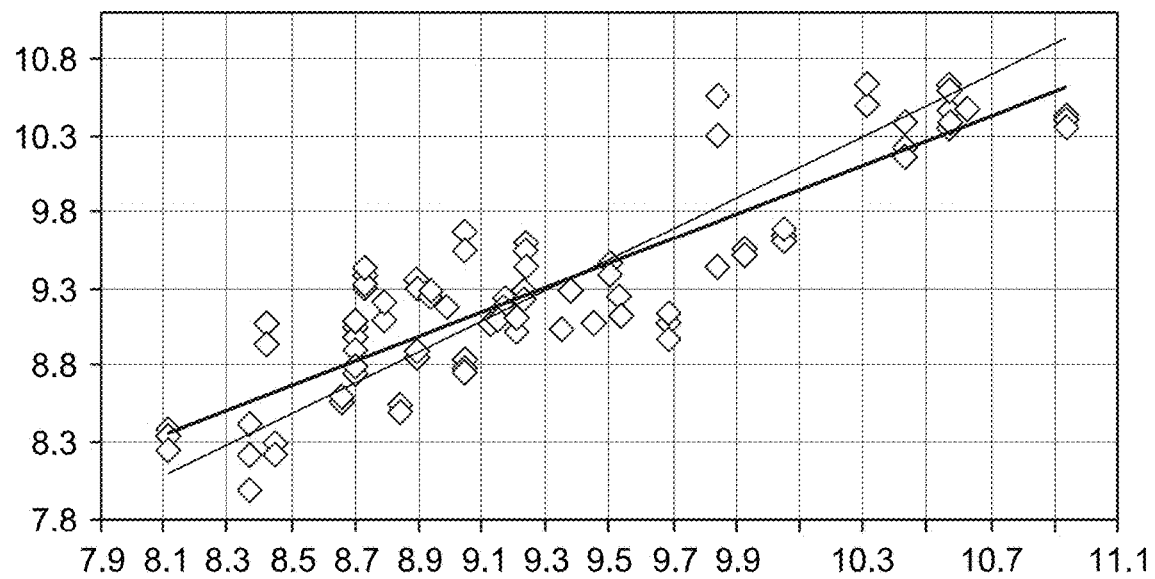

The integrity of the lab data was verified using a density correlation. Six outlier points were identified as being inconsistent with the data set and were dismissed as lab errors. Upon the removal of these six outliers, the models improved. The QA/QC improved model for S/B is shown in FIG. 15, and Table 4 summarizes the points removed with respect to above Table 3.

TABLE 4

Summary of Data points removed during the QA/QC analysis

| MB Data Removed (QA/QC) | Reason |
| --- | --- |
| 3 | Inconsistent with Density Data |
| 13 | Inconsistent with Density Data |
| 14 | Inconsistent with Density Data |
| 15 | Inconsistent with Density Data |
| 16 | Inconsistent with Density Data |
| 21 | Inconsistent with Density Data | d) Recalibration of Models by Removing Outliers Identified by NIR Software

After removing the outliers identified in the lab data QA/QC, the NIR software was identifying other outlier data points. Verified with operational conditions and sampling methods, these outliers occur either at operational upset or the lab results from both sample methods to correlate one NIR spectra. A summary of the excluded points for S/B is shown below in Table 5, with reference to above Table 3.

TABLE 5

Summary of outliers identified by the NIR

| Point Removed (NIR Identified) | Operational Condition |
| --- | --- |
| 6 | Sample Bomb-No relation to Cool Coil Model |
| 19 | Sample Bomb-No relation to Cool Coil Model |
| 20 | Residual asphaltenes dispersant present in system. |
| 22 | Residual asphaltenes dispersant present in system. |
| 23 | Residual asphaltenes dispersant present in system. |
| 24 | Residual asphaltenes dispersant present in system. |
| 25 | Residual asphaltenes dispersant present in system. |
| 27 | Sample Bomb-No relation to Cool Coil Model |
| 30 | Plugged contact section for first stage (Low confidence measurement) |
| 31 | Sample Bomb-No relation to Cool Coil Model |
| 33 | Uncharacteristics shift in spectra (See FIG. 17 below). Potential sample time deviation. |
| 35 | Sample Bomb-No relation to Cool Coil Model |
| 39 | Sample Bomb-No relation to Cool Coil Model |
| 42 | Sample Bomb-No relation to Cool Coil Model |
| 44 | Large differential pressure (high deviation from target) |
| 45 | Large differential pressure (high deviation from target) |

After removal of all outliers identified by QA/QC and NIR software, the final models for S/B, density, bitumen content, solvent content, and asphaltenes content are shown in FIGS. 17 a, b, c, d, and e.

Figure 18A:
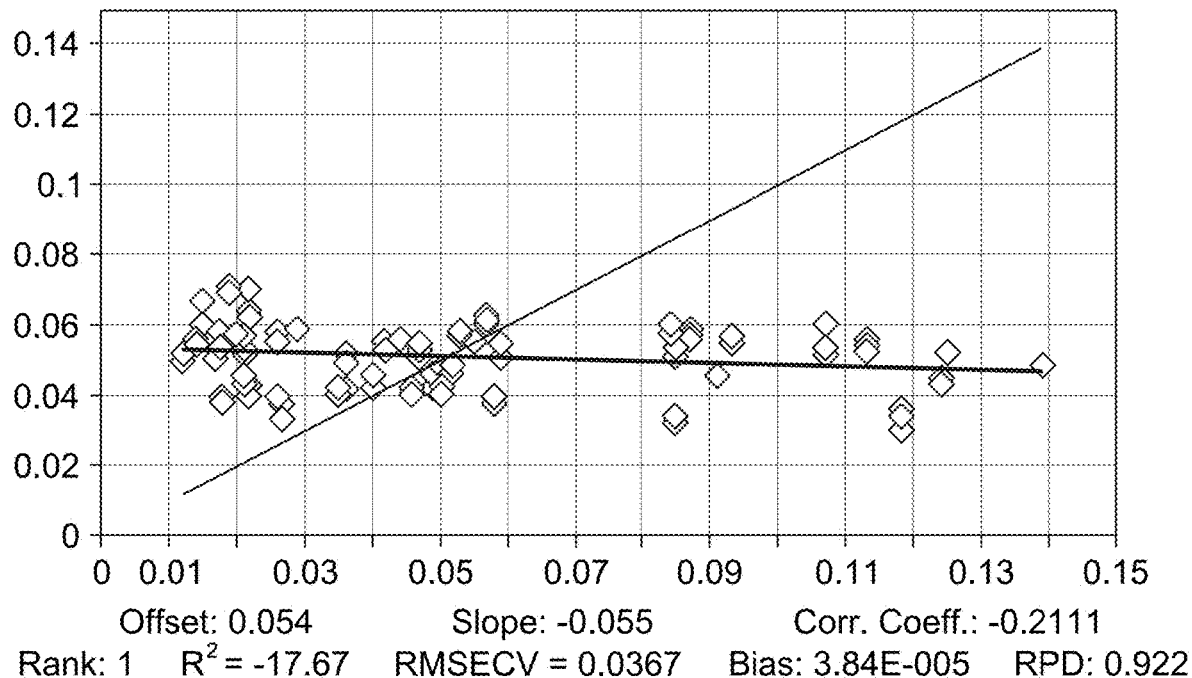
FIGS. 18a and 18b are final NIR models for water content and solids content.
Figure 18B:
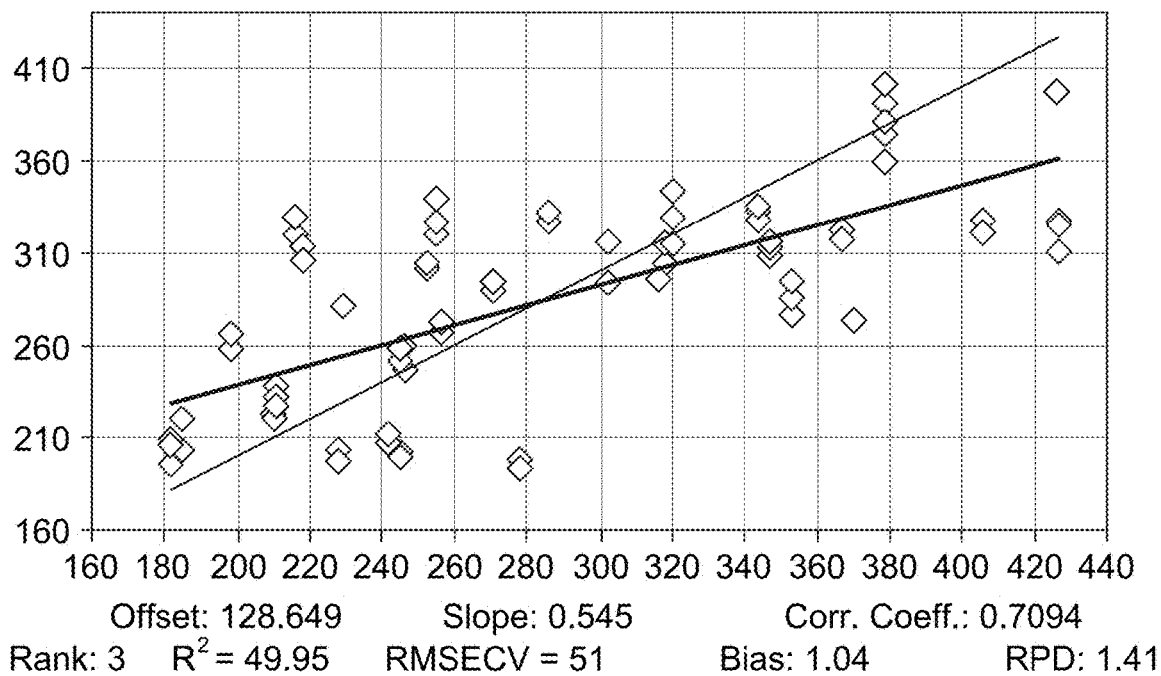

Early in the modeling process, it was observed that the models showed a strong correlation for density, bitumen content, and solvent content (and thus S/B), and a moderate correlation of asphaltene content. However, the models for water content and solids content were relatively weak. Since water and solids were present in the product stream in small quantities, it is challenging to obtain the accurate laboratory measurements. This made the reduced overall reliability for using this lab data to build NIR models. These models are shown below in FIG. 18, but were not used for progressing further in the work process.

e) Improve Model with Different Data Preprocessing Method

The OPUS/Quant software contains ten data preprocessing methods, but the two of focus for this project are the Multiple Scatter Correction (MSC) and the First Derivative (1D) based on the recommendation of Suncor NIR expert. According to the principle of data processing provided by the OPUS software, MSC method is suitable to the NIR spectra generated by light scattering of the colloidal particles in the medium. Asphaltenes/water/solids agglomerates exist in diluted bitumen, and they will affect the apparent NIR absorption. First Derivative method will emphasize the chemical information of diluted bitumen such as bitumen, solvent and asphaltenes in NIR spectra. In the meantime, this method could eliminate the temperature impact on the spectra. However, it could eliminate the NIR absorption generated by light scattering from the particles in the medium.

Considering chemical characteristic of diluted bitumen, after obtaining these NIR models processed by the MSC method, the First Derivative method was used to compare whether or not the models can be further improved.

As stated above, to ensure the reproducibility of the calibration samples, multiple spectra were used for each sample in the calibration. As these samples are not identical, a data preprocessing procedure can be used to bring them into line with each other. Data preprocessing can eliminate any variations in offset or different linear baselines by normalizing the spectra.

Figure 19:
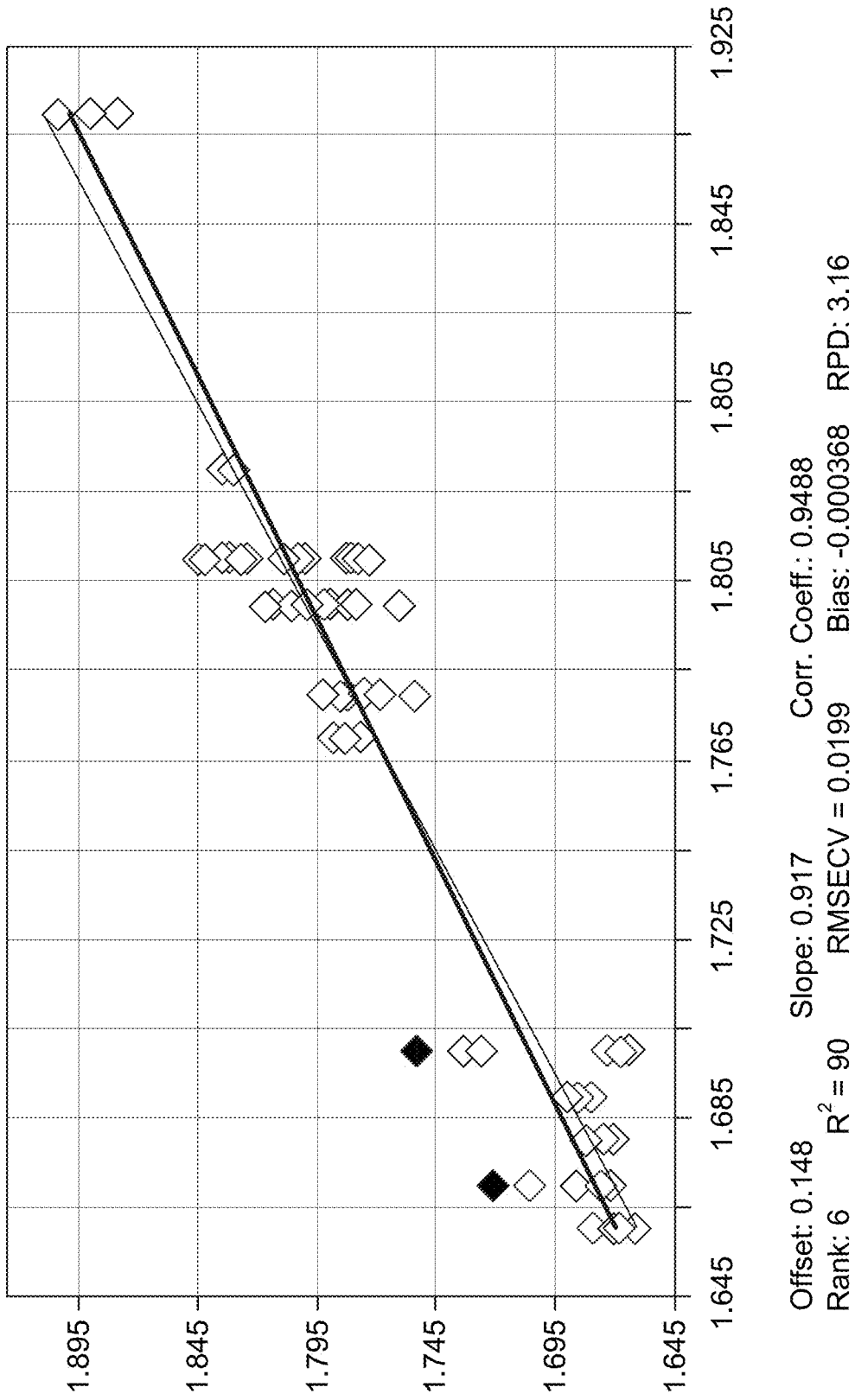
FIGS. 19 to 21 are the comparison of NIR models for S/B ratio with MSC Preprocessing (FIG. 19), for S/B ratio with 1st derivative preprocessing—full (FIG. 20), for S/B with 1st derivative preprocessing—lower (FIG. 21).

The MSC procedure is used to correct signals from noise and background effects which cause baseline shifting and tilting. It performs a linear transformation of each spectrum for it to best match the mean spectrum of the whole set, and often used for spectra measured in diffuse reflection, this preprocessing at its optimized data range yielded a very accurate model which is shown below in FIG. 19 for S/B.

Figure 21:
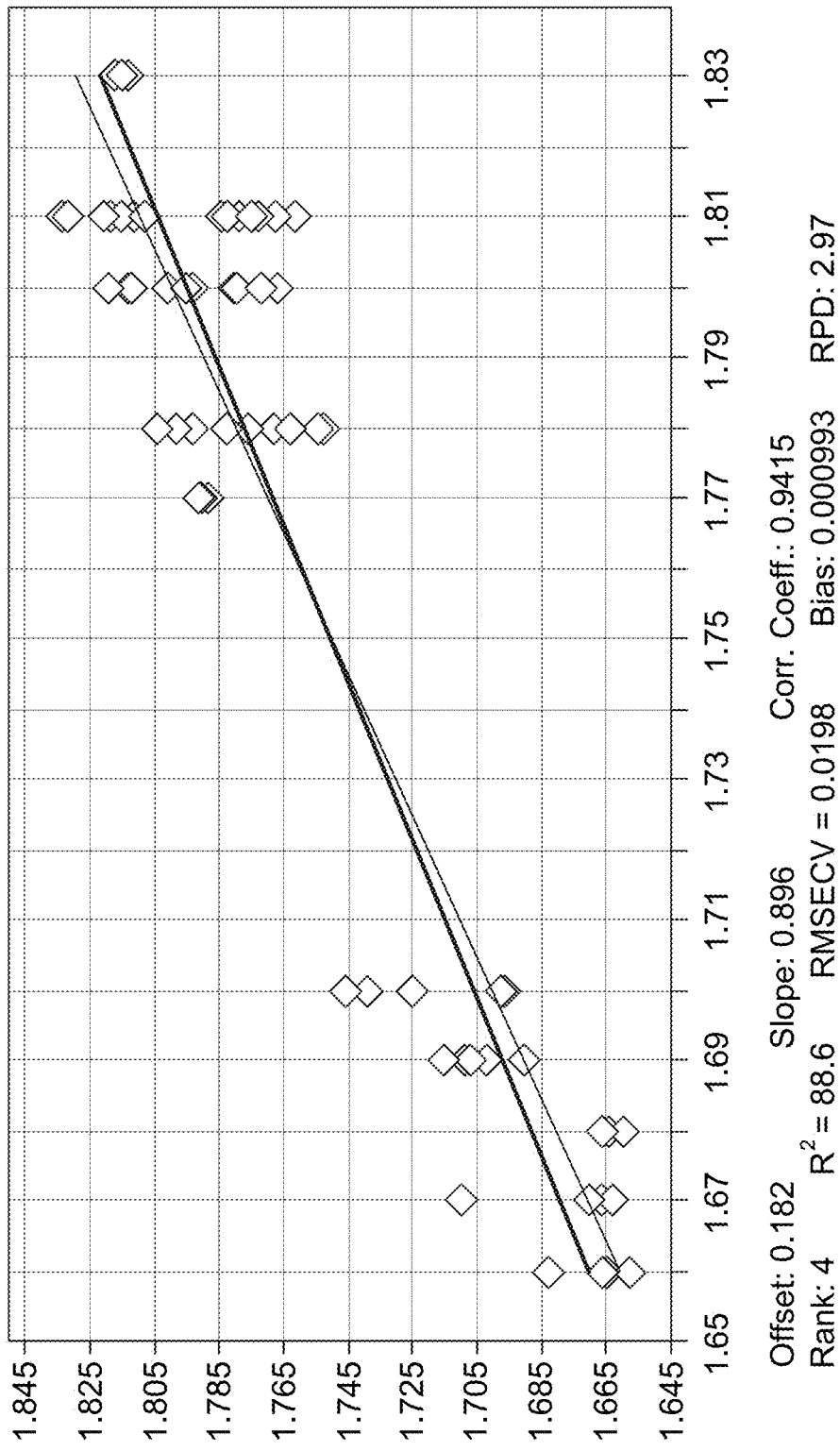

The First Derivative method was used to provide a comparative model shown below in FIG. 21 for S/B. This method involves calculating the first derivative of the spectrum, and emphasizes steep edges of a peak which are attributed to the chemical characteristic of bitumen, asphaltenes and solvent in diluted bitumen. However spectral noise is also enhanced.

Figure 20:
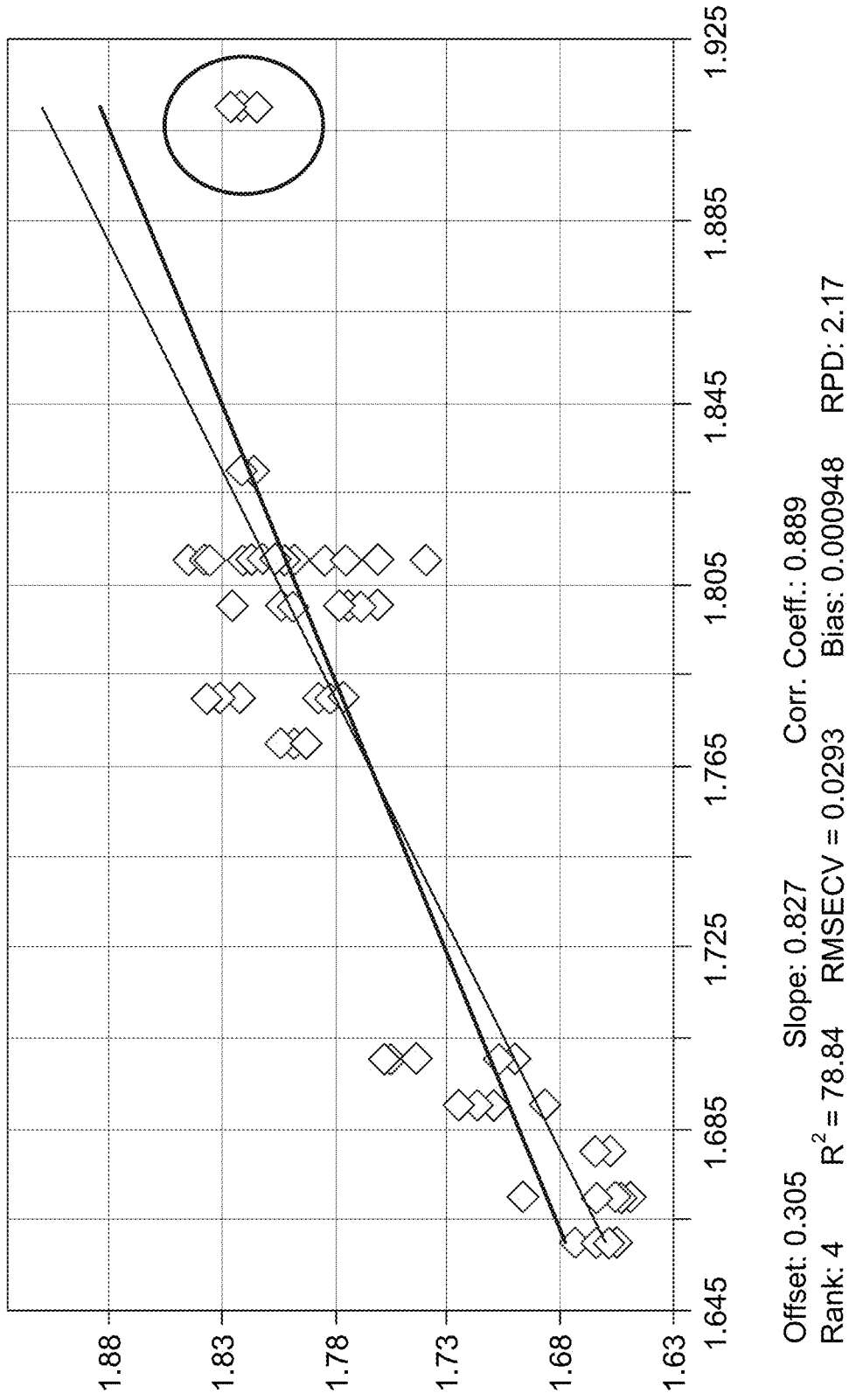

In FIG. 20, a relatively accurate model is shown overall. However, the calibration points on the higher end of the line are identified as outliers by the NIR software. FIG. 21 shows the calibration range exclusive of the outliers and shows an accurate correlation over the mid-lower ranges. These two data preprocessing methods (MSC and 1D) are both reasonably accurate. However, MSC appears slightly more reliable for this data set at higher values. These results indicated that both chemical characteristics of diluted bitumen and physical sizes of asphaltenes/water/solids agglomerates in diluted bitumen play important roles in their NIR absorption. However, the physical size of asphaltenes/water/solids agglomerates in diluted bitumen seems more dominate this reflectance NIR absorption.

Figure 22:
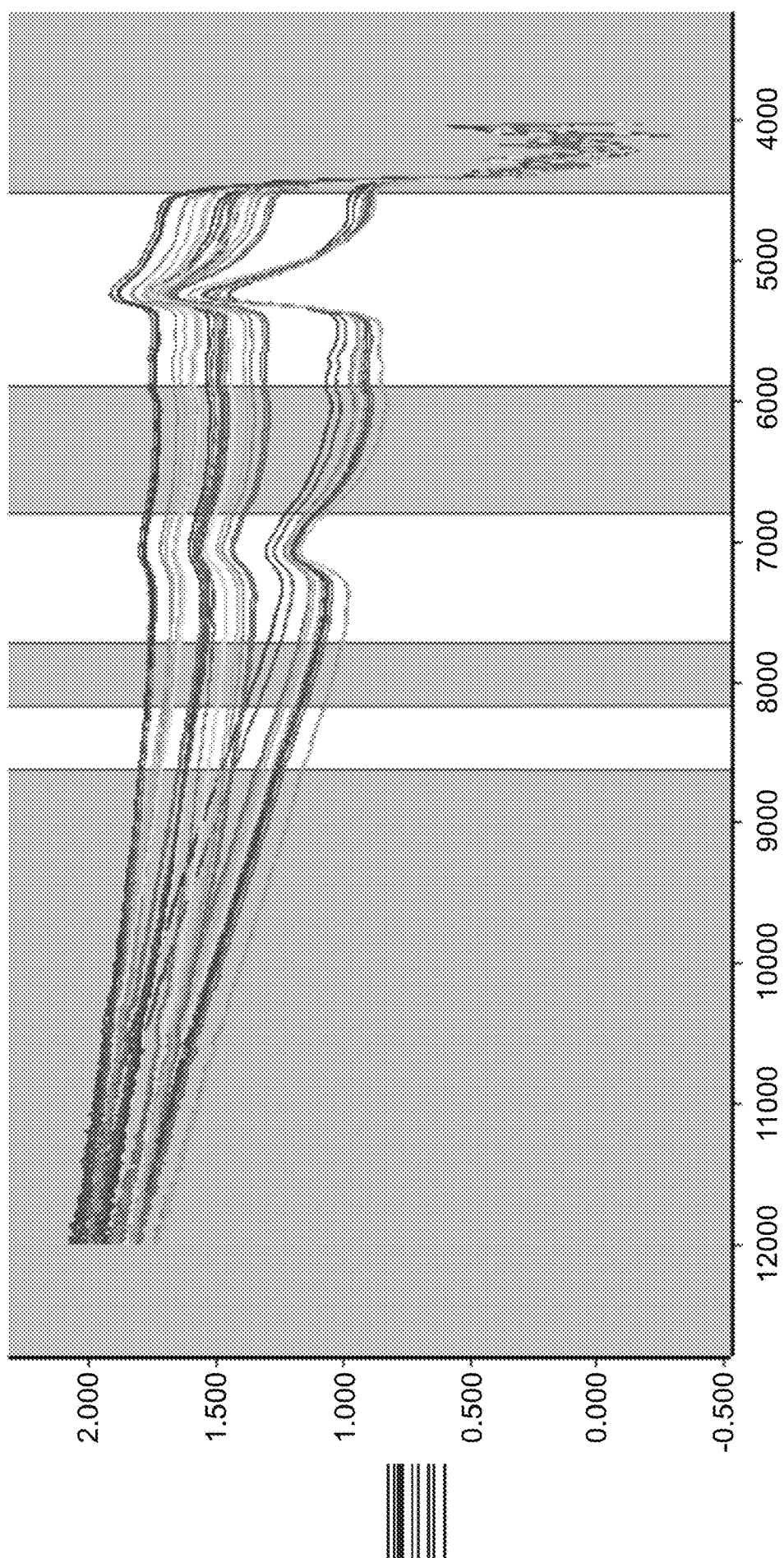
FIG. 22 is a group of spectra showing effective frequency ranges on calibrating NIR spectra.

With respect to the frequency region, the PLS regression is a full spectrum method, meaning that the model generally improves as the amount of data points increases. However, as seen in FIG. 22 below, there are areas of the spectra (grey areas) that show either a lot of spectral noise, or no information. By excluding these areas, and optimizing effective frequencies (white areas), there is an increase in accuracy for the chemometric model. These ranges reflect water absorption (5200 cm$^{-1}$ and 7200 cm$^{-1}$), bitumen absorption (5500-6000 cm$^{-1}$), and particle size information (the shift of NIR spectra toward low absorption).

The OPUS/QUANT software includes a frequency optimization tool that automatically checks common frequency regions in combination with several data preprocessing methods, and generates a list of frequency ranges with their respective rank and RMSECV (root mean square error of cross validation). From this, the appropriate range to validate the model can be chosen. This populated optimization tool is shown in FIG. 23.

Figure 24:
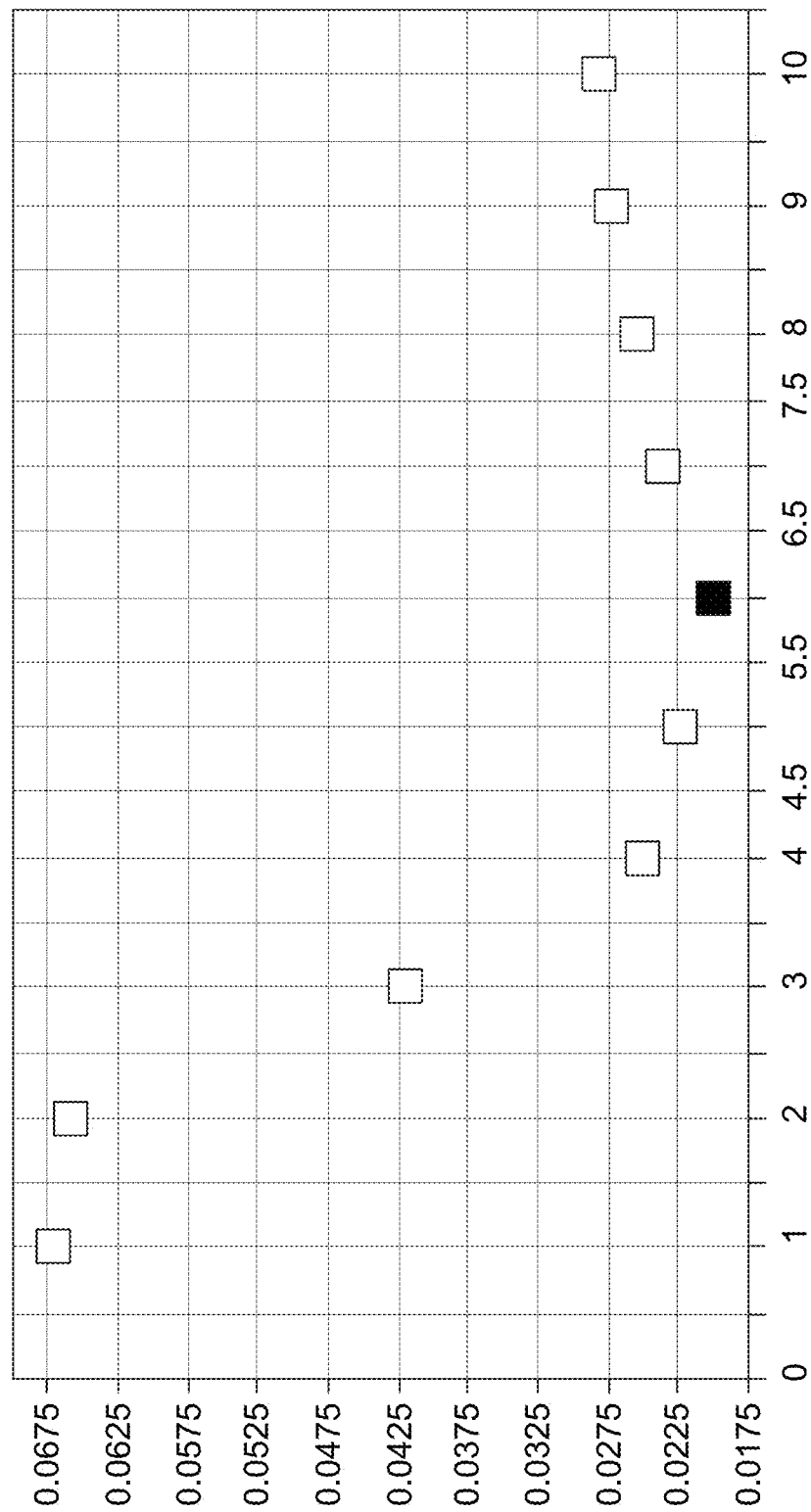
FIG. 24 is a graph showing the RMSECV for each rank.

For each frequency range, for each data processing method, there is a rank with an associated RMSECV. By plotting RMSECV with respect to the rank as seen in FIG. 24, the optimal rank for the model can be determined.

The root mean square error of cross validation is a measure of the error of the model and is used as criterion to judge the quality of the method. The rank is the number of factors used to represent the model. Too few factors results in an under fit model where many features are not explained. On the other hand, over fitting the model only adds noise and degrades the model. Choosing the optimal rank is tied to the quality of the overall model. Residual Prediction Deviation (RPD) is another parameter to judge the reliability of the prediction.

Residual Prediction Deviation (RPD) is the important parameter to judge the reliability of the prediction. Table 7 lists the value of RDP to evaluate the models. A summary of $R^2$, and RPD, and data used in the final models for bitumen content, solvent content (S/B), asphaltenes content, and density of diluted bitumen is listed in Table 6 for both MSC and 1D models.

TABLE 6

Guideline of NIR models used for prediction

| RPD | Classification | Application |
|---|---|---|
| <1.0 | very poor | not recommended |
| 1.0-2.4 | poor | not recommended |
| 2.5-2.9 | fair | rough screening |
| 3.0-3.9 | reasonable | screening |
| 4.0-5.9 | good | QC |
| 6.0-7.9 | very good | QA |
| 8.0-10.0 | excellent | any application |
| >10.0 | superior | as good as reference |

Figure 25:
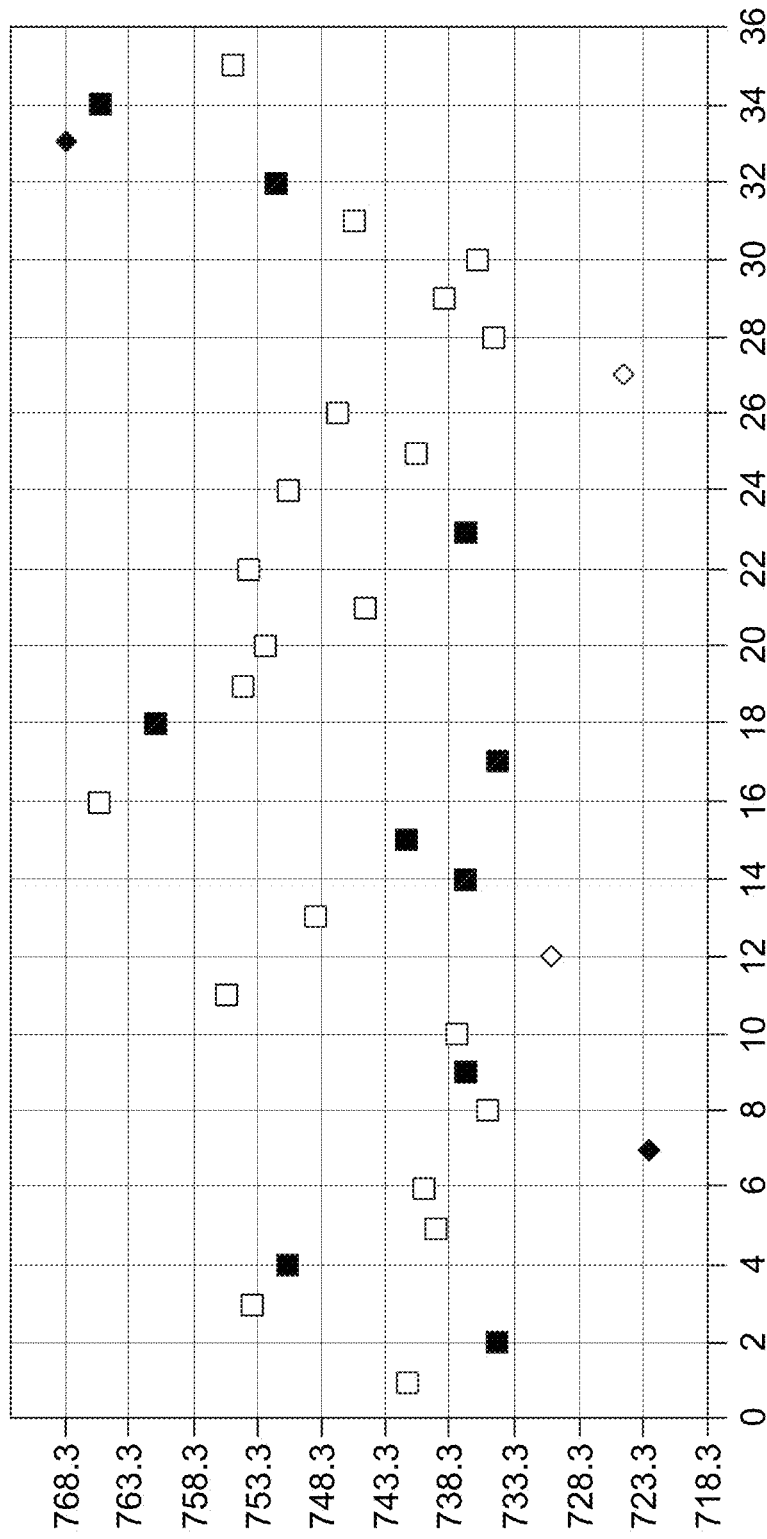
FIG. 25 is a profile of prediction points shown in OPUS graph.
Figure 26:
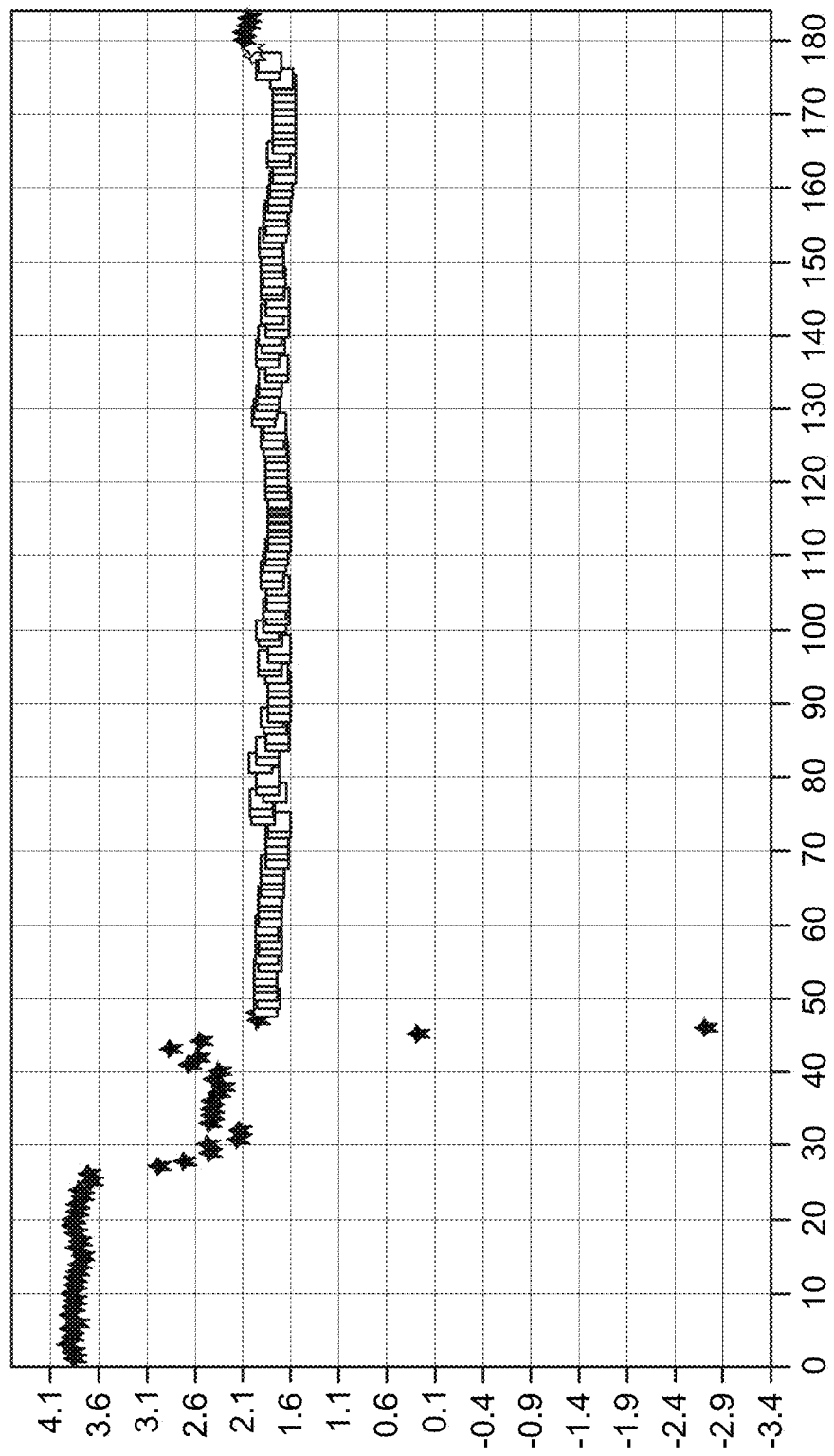
FIG. 26 is a profile of predicted S/B ratio generated by NIR S/B ratio model for Week C.
Figure 27:
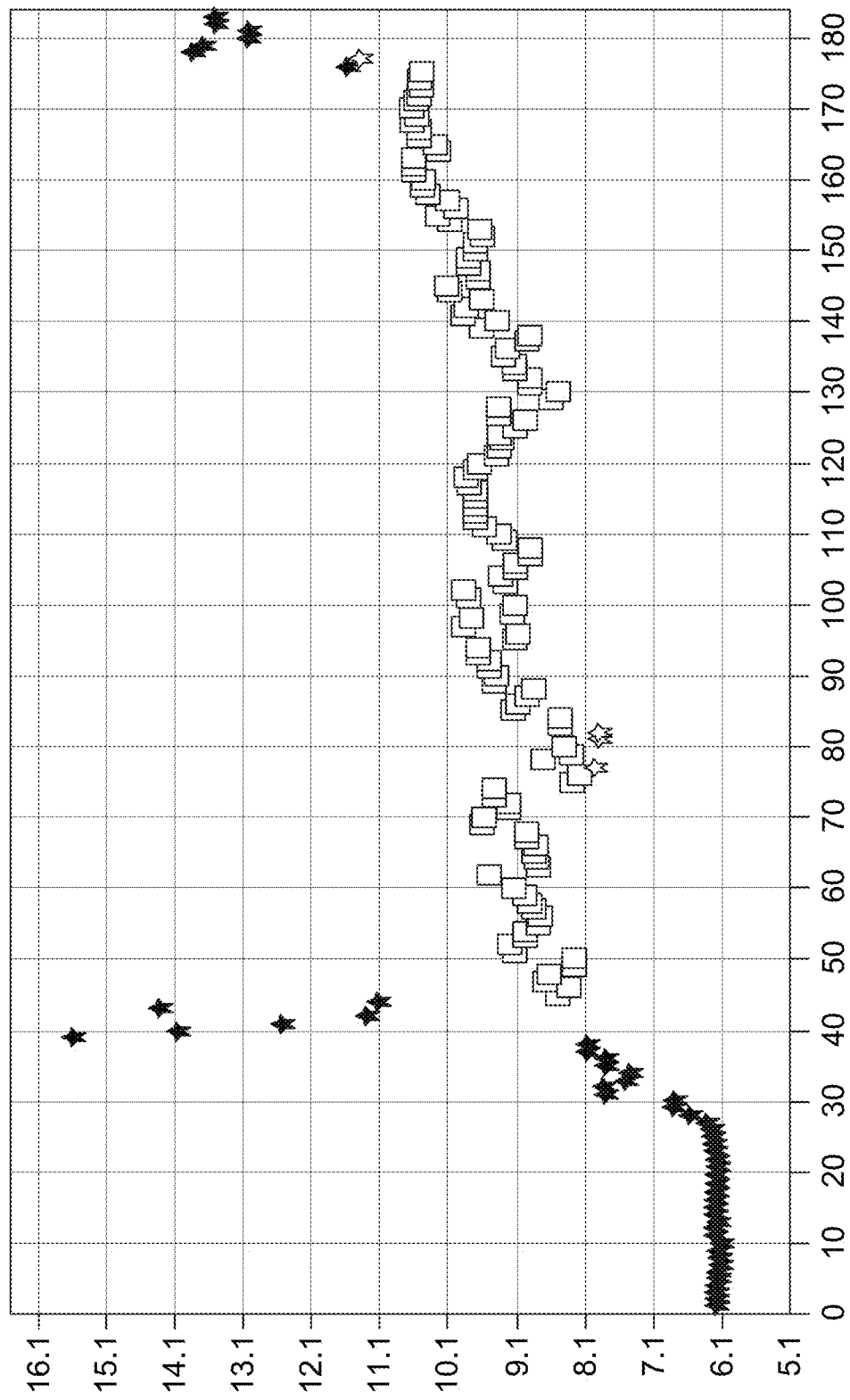
FIG. 27 is a profile of predicted asphaltenes content generated by NIR asphaltenes model for Week C.

Experimentation 2: Quantitative Analyses of Unknown Samples; S/B, Density, and Composition of Diluted Bitumen in a Three-Week Pilot Quantitatively Analysis of Spectra Collected in Three-Week Pilot After finalizing two sets of models (MSC and 1D), they were used to predict S/B, density, and the composition of diluted bitumen over the timeline of each week in the pilot. Two spectra were selected every 30 minutes during the operational weeks. From this, the OPUS/Quant software analyzed the spectra with respect to the loaded model (MSC and 1D), and provided predictions for each measurement. FIGS. 25 and 26 respectively display the profiles of S/B and asphaltenes content for the MSC model-Week C generated by the software, as an example of the software output. The x-axis represents the time point with points taken every 30 mins. The y-axis represents the weight % of the asphaltenes.

In running a quantitative analysis, the NIR model produces a prediction based on the spectra inputted. The prediction points are displayed in green square, green star, red square and red star as shown in FIG. 25. If the date point is shown as a green square, it means this prediction is above 95% confidence level in the perspective of statistical analysis. The confidence level reduces in the order of green square, green star, and red square, which can be broken down into outside ranges, and outliers. When a value is predicted to be outside of that certainty range it is in the NIR software. The analysis will still provide prediction for this value, with lower accuracy, such as shown in green star and red square. If the point is flagged by a red star, it means this prediction will be no more trustful.

Overall, the predictions trend well within the accuracy margin of the model used, with the stronger models (density, S/B) providing more accurate results then the weaker models (asphaltenes). Many red stars (corresponding to outlier data) are displayed in FIGS. 25 and 26. After verifying with the operational team, it was confirmed that these outliers were attributed to major operational upsets in the pilot, and summarized below in Table 8. It means that these stars potentially can be used to identify if any upset occurs and which time frame of the operation.

TABLE 8

Summary of Operational Conditions and the Resulting NIR Outliers

| Outlier | Condition |
|---|---|
| Test 40229-40563 | Flushing out system with water in solvent, error in NIR asphaltenes readings; SB model predicts adjusted levels in the system |

TABLE 7

Summary of final calibration model details

| Measurement | $R^2$- MSC | $R^2$- 1D | Total Lab Data | Data Used for MSC | % Used for MSC | Data Used for 1D Model | % used for 1D | RPD MSC | RPD 1D |
|---|---|---|---|---|---|---|---|---|---|
| Density | 92.0 | 90.4 | 37 | 28 | 76 | 27 | 73 | 3.53 | 3.23 |
| S:B | 90.0 | 88.6 | 37 | 28 | 76 | 27 | 73 | 3.16 | 2.97 |
| Solvent | 90.4 | 89.0 | 37 | 28 | 76 | 27 | 73 | 3.22 | 3.02 |
| Bitumen | 90.4 | 89.0 | 37 | 28 | 76 | 27 | 73 | 3.22 | 3.02 |
| Asphaltenes | 76.2 | 68.1 | 41 | 38 | 93 | 38 | 93 | 2.2 | 1.77 |
| Water | 50.0 | 39.7 | 38 | 33 | 87 | 33 | 87 | 1.41 | n.a. |
| Solids | −17.7 | 2.8 | 41 | 38 | 93 | 38 | 93 | 0.92 | n.a. |

TABLE 8-continued

Summary of Operational Conditions and the Resulting NIR Outliers

| Outlier | Condition |
| --- | --- |
| Test 64461-65377 | Pilot not in operation; blank data |
| Test 65457-66269 | Pilot operating in 2 stage mode with chemical addition; condition is not incorporated in the calibration model |
| Test 71581-71655 | Pilot not in operation; blank data |

When verifying the accuracy of the components (with respect to density) and operational upsets, removing these outlier points significantly improves result integrity and the overall correlation, especially in Week A and C where the first several hours of NIR recordings for each week occurred when the pilot was not in operation.

FIGS. 28 and 29 show the NIR generated data using for each week (MSC) for S/B and density and bitumen content, solvent content, and asphaltenes content respectively are shown minus the rejected data points. The dashed lines represent the change in weeks. It is to be noted that all NIR models were developed based on the data collected when FSU was operated in a single stage mode. However these models were well applied to generate reasonable prediction for the composition of diluted bitumen when the FSU was operated in a counter mode. This indicates the generally application of NIR measurement which naturally captures the information related to the composition of diluted bitumen regardless how to operate FSU.

Verification of the Correlation Predicted NIR Models

As mentioned herein, there is a strong correlation between the density and bitumen content, solvent content, and asphaltenes content in diluted bitumen, and this correlation exists naturally regardless of analytical methods or data processing methods. It is therefore possible to use this correlation to determine the accuracy of the independently built models. The accuracy of the NIR calibration model was validated by checking this correlation of the density predicted vs. individual component predicted from individual model. The comparisons between NIR prediction values and lab data are seen below in FIGS. 30 to 33 for S/B and asphaltenes content for the MSC and 1D models respectively.

Density vs. S/B or asphaltenes content generated values by NIR models for the full pilot timeline Density vs. S/B or asphaltenes content of lab data at the lab sampling times For the MSC model, the modeled density calibration was very strong for modeled S/B, and matched the lab measurement very well. The 1D model showed similar trends at marginally less accuracy. This shows that with adequate accuracy, an S/B trend over the course of the pilot can be monitored by NIR.

The other major component is asphaltenes. With a less accurate (R2) model, there was less confidence in predicting these values accurately, which shows in the density correlation. The 1D model shows similar accuracy: there is still a positive trend showing increased asphaltenes content as the density increases. Overall, given the weaker model, the asphaltenes results were concluded as adequate.

Experimentation 3: Water and Solids Contents in FSU Overflow

Building NIR Calibration Model for Water and Solids Contents in Diluted Bitumen Using NIR Spectra Collected in Week A As described above, relatively weak water and solids models were obtained based on lab results of water and solids analyses. It was found that the water content reported in the FSU overflow was consistently below the solubility limit for water in pentane at the pilot operational condition. The lower water content was found to be attributed to the rapid precipitation of water in diluted bitumen during sample cooling from plant operation condition to lab analysis condition. However, NIR was installed online; and its measurement should capture real water content in diluted bitumen.

Figure 36:
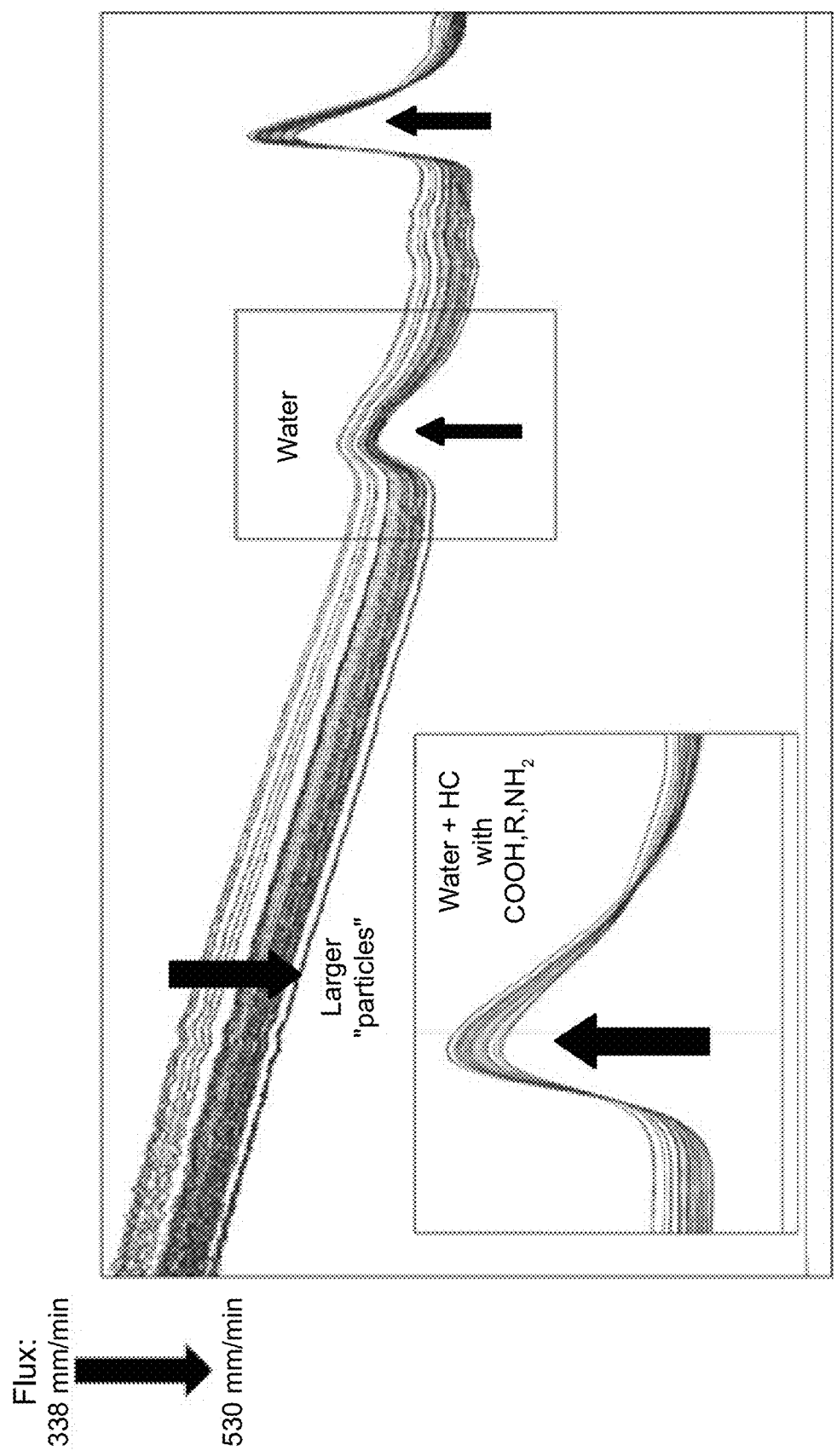
FIG. 36 is a group of NIR spectra of diluted bitumen collected during Week A.

In Week A operation, S/B of the overflow was fixed at 1.77, and only changed parameter was the flux of FSU. FIG. 36 displays the NIR spectra of diluted bitumen collected in Week A. The pattern of these spectra were similar, however, the absorbance of NIR spectra declined corresponding with the increase of the flux. In the meantime, water peaks at 5200, and 7200 cm$^{-1}$ gradually increased. According to the absorption peaks of water and the shift of NIR spectra, higher water content and larger size of asphaltenes/water/solids agglomerates in diluted bitumen were determined.

Typical froth is approximately 60% of bitumen, 30% of water, and 10% of solids. Most water in the froth is free water, and easily to precipitate out. Less than 10% of water is in emulsified water droplets. In 10% of solids, majority of solids are dominated by clays, carbonates and heavy minerals, which particle size is less than 10 micron.

In PFT, when the froth is diluted with pentane at S/B of 1.6, and a portion of the asphaltenes is precipitated out from hydrocarbon phase as agglomerates along with water droplets and fines. However, the size of these agglomerates will directly affect their removal from diluted bitumen and the quality of diluted bitumen. In the pilot operational condition, the Reynolds number of the order of 0.9, this value of Re is well within the range of applicability of the so call "creeping flow" regime, in which inertial effects can be neglected and the Stokes Law is suitable for describing the flow. According to Stocks Law, the critical size (dc) of the agglomerates released from diluted bitumen can be calculated based on the density ($\rho f$) and viscosity ($\mu f$) of diluted bitumen, and the density ($\rho c$) of agglomerates. The calculated critical size of agglomerates increased with increasing flux shown in Table 8.

Figure 37:
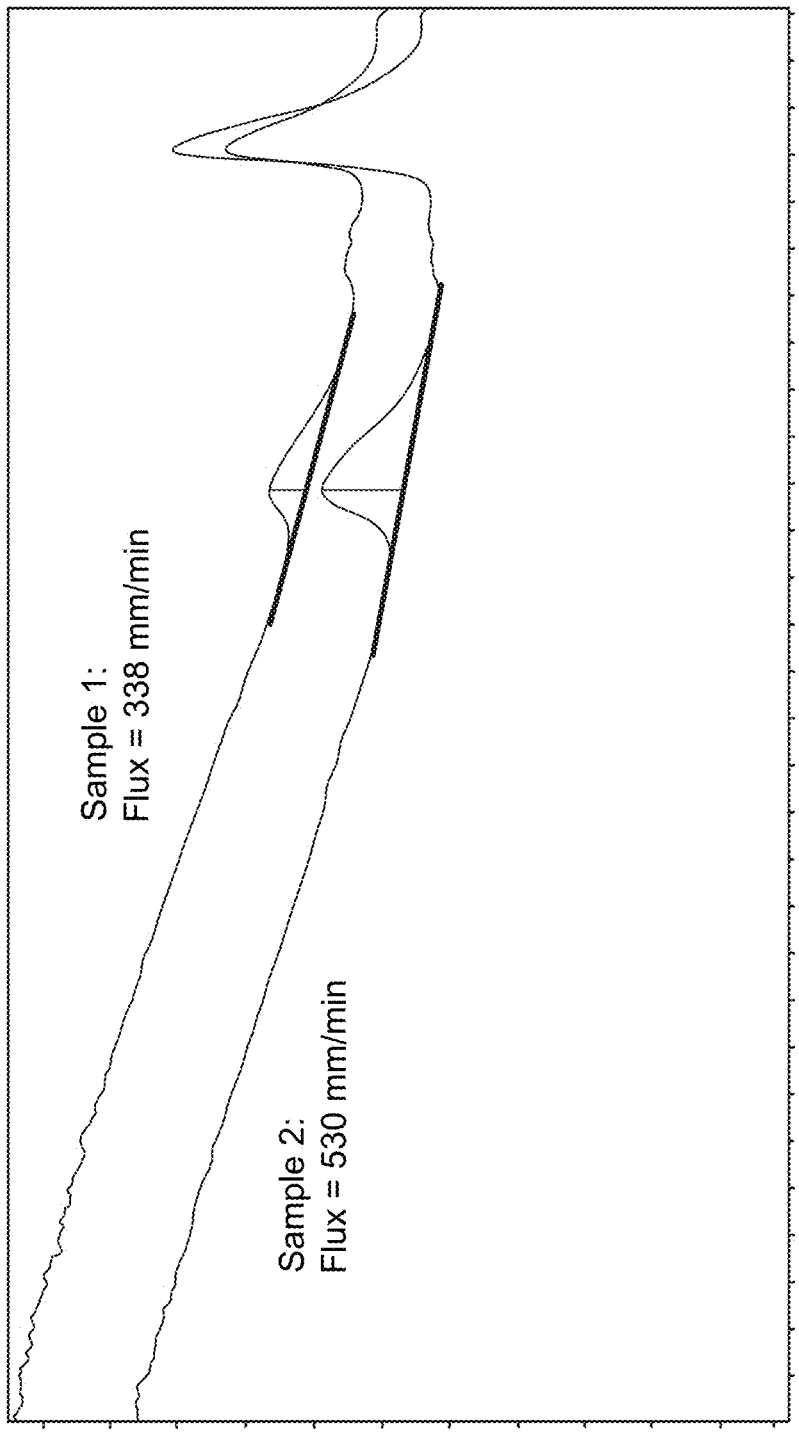
FIG. 37 is a comparison of NIR spectra of diluted bitumen collected in the lowest flux and the highest flux during Week A.

Comparing NIR spectrum collected in the lowest flux with that in the highest flux shown in FIG. 37, it seems approximately three times of water differences between these two samples. In water solubility study, it was determined that the minimum water content in diluted bitumen should be around 0.11% at 90° C. If one assumed the lowest water content was 0.11%, the highest water content should be at 0.33%.

Most solids analyses fell in the range of 0.04-0.07%, and did not show any trend with the variation of operational condition. Many studies show that fines removal was correlated to water removal in froth treatment process. Water-to-solids ratio is obtained based on the lab results shown in FIG. 11. Herein, it was assumed that the lowest solids content corresponded to the lowest water content. All lab results and calculated water and solids values are listed in Table 9.

Figure 38A:
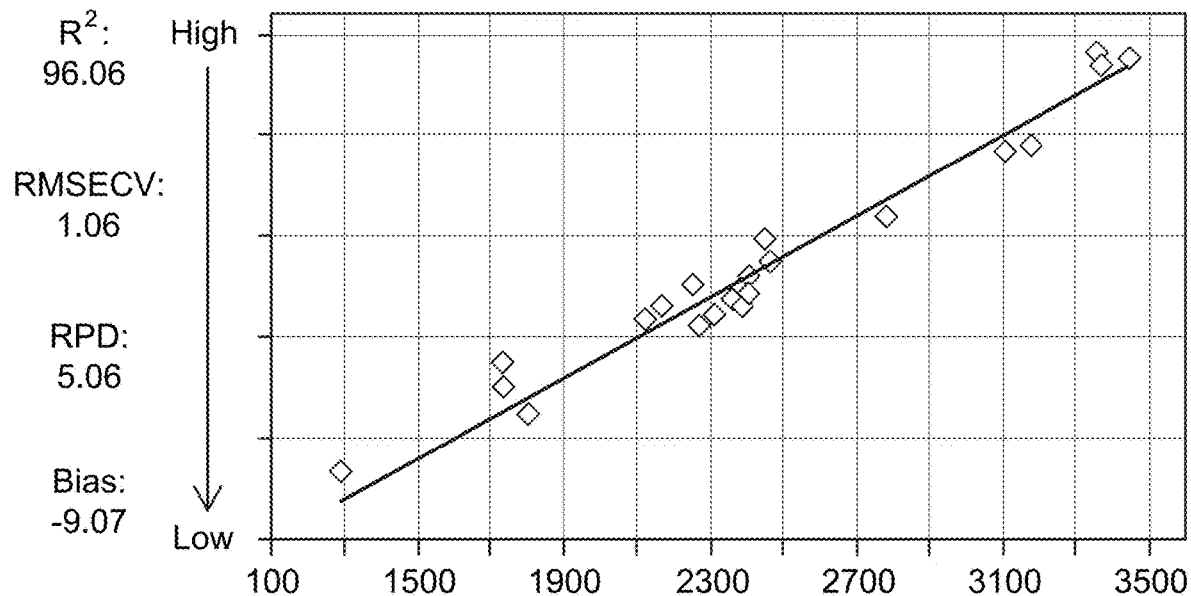
FIG. 38 are cross validations of developed NIR water and solids models based on theoretical water and solids contents
Figure 38B:
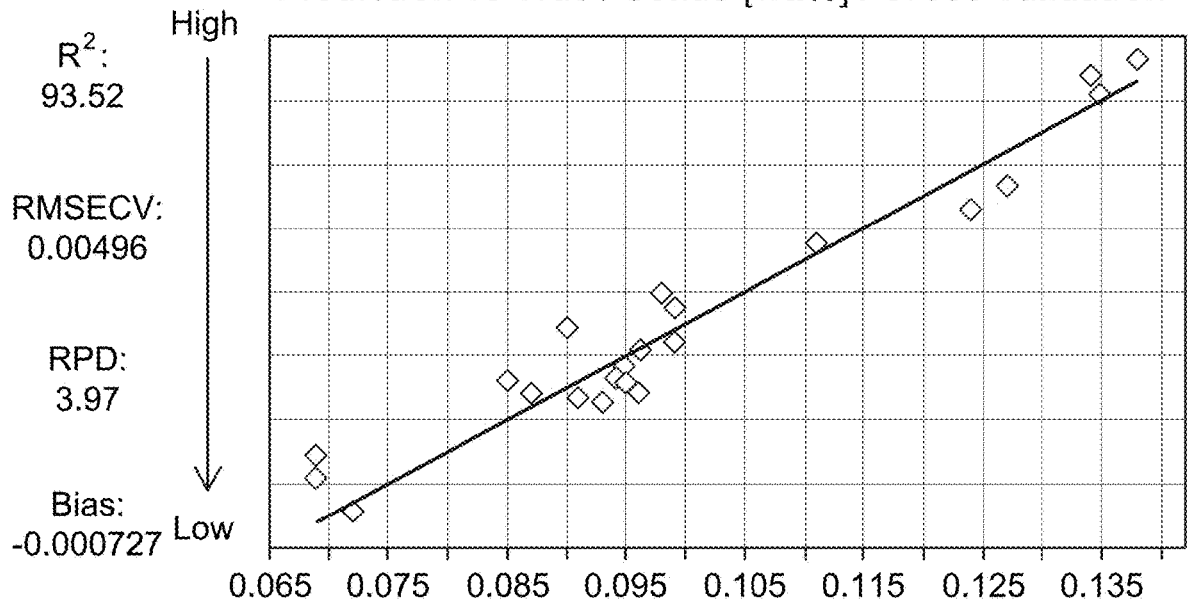

The MSC data process method was used to process NIR spectra collected in Week A. As shown in FIG. 38, when the calculated water content and solids content were used to build NIR models, it was found very strong NIR water model and solids model obtained (high $R^2$ and high RPD). Because the OPUS software was built on complex mathematic and statistical analysis, the strong models reflect reasonable correlation between theoretical water and solids values versus their NIR spectra.

Figure 39:
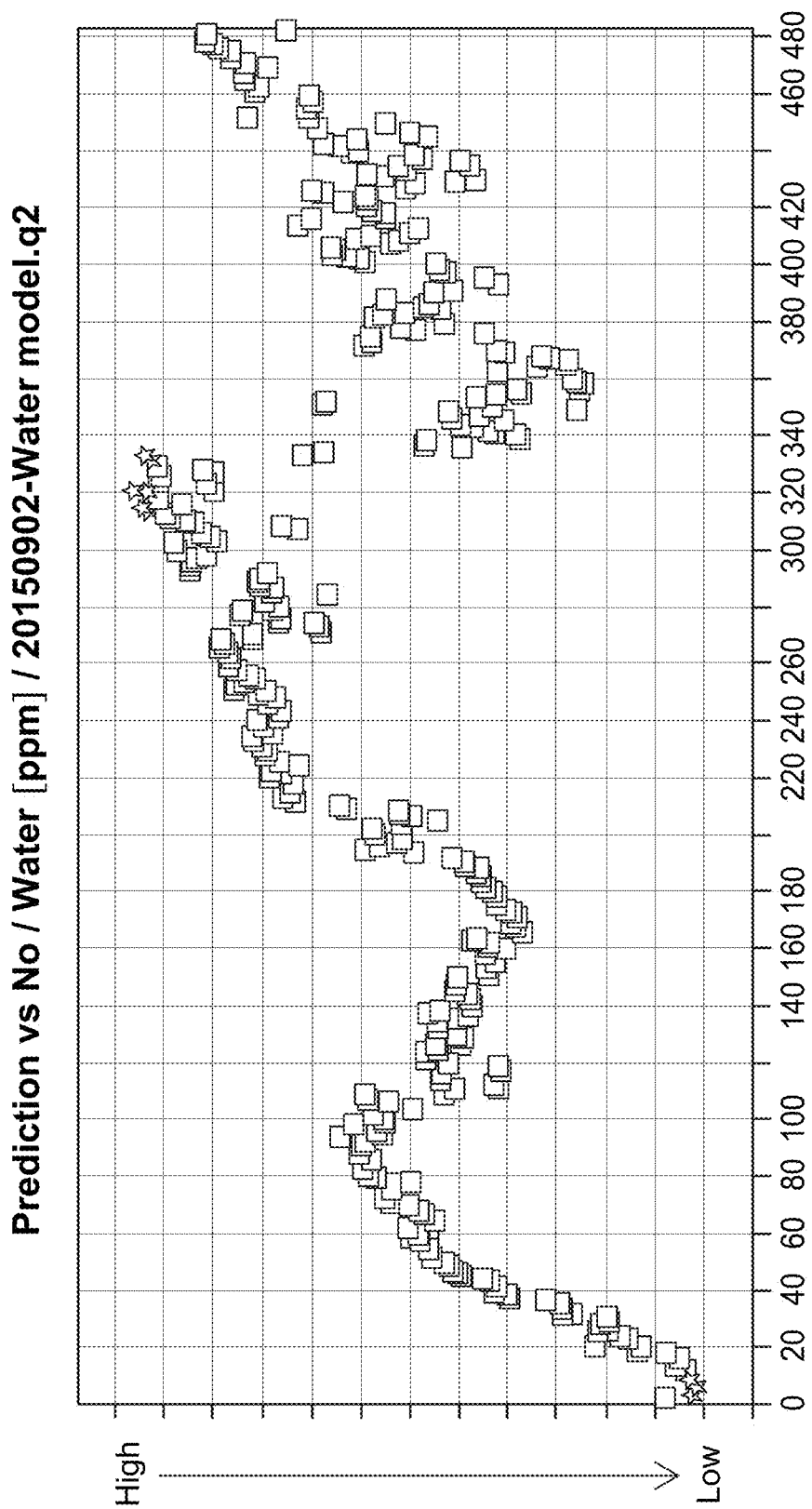
FIGS. 39 to 47 are graphs showing predicted water or solids during Week A, B and C.
Figure 40:
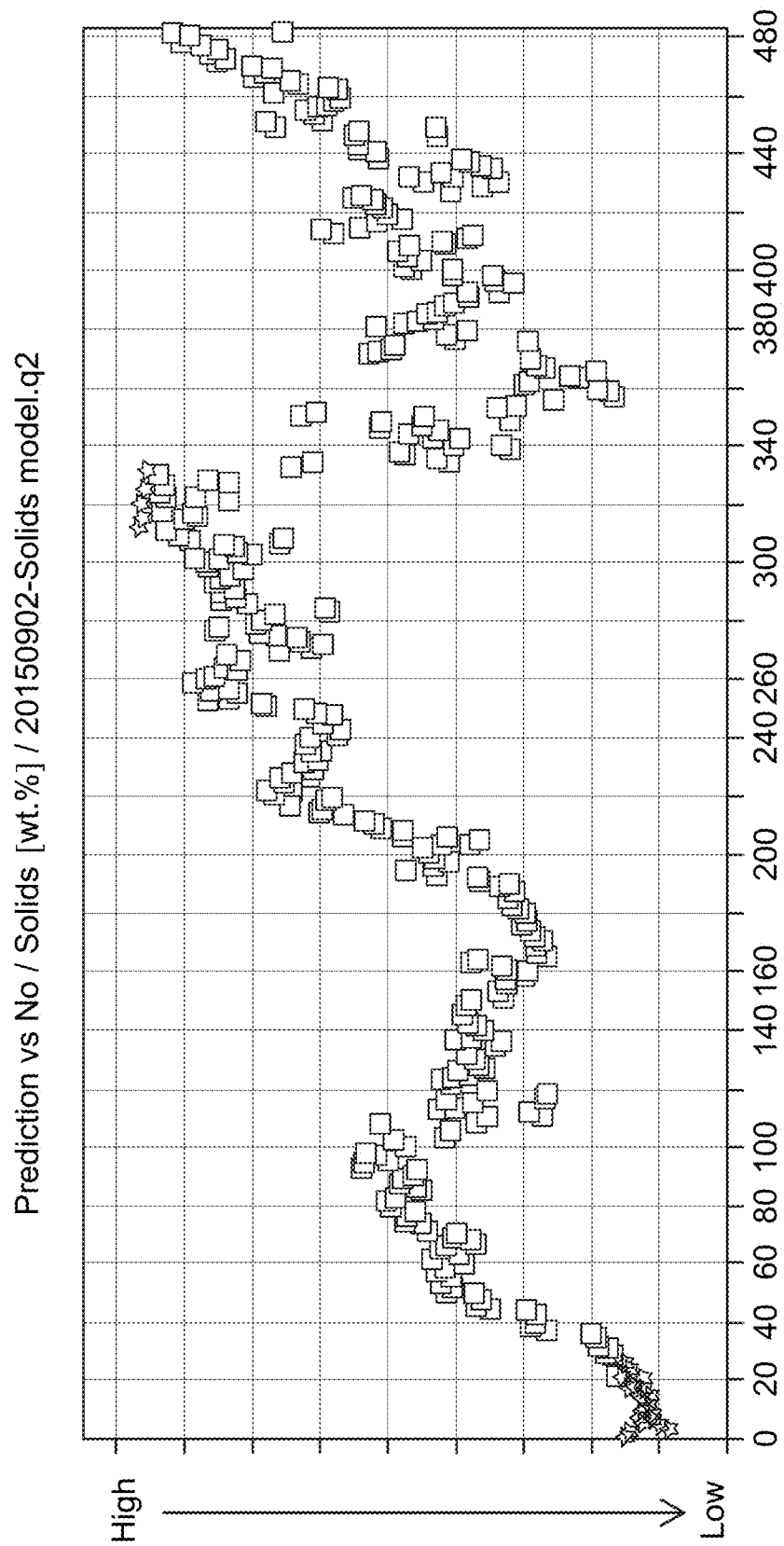
Figure 45:
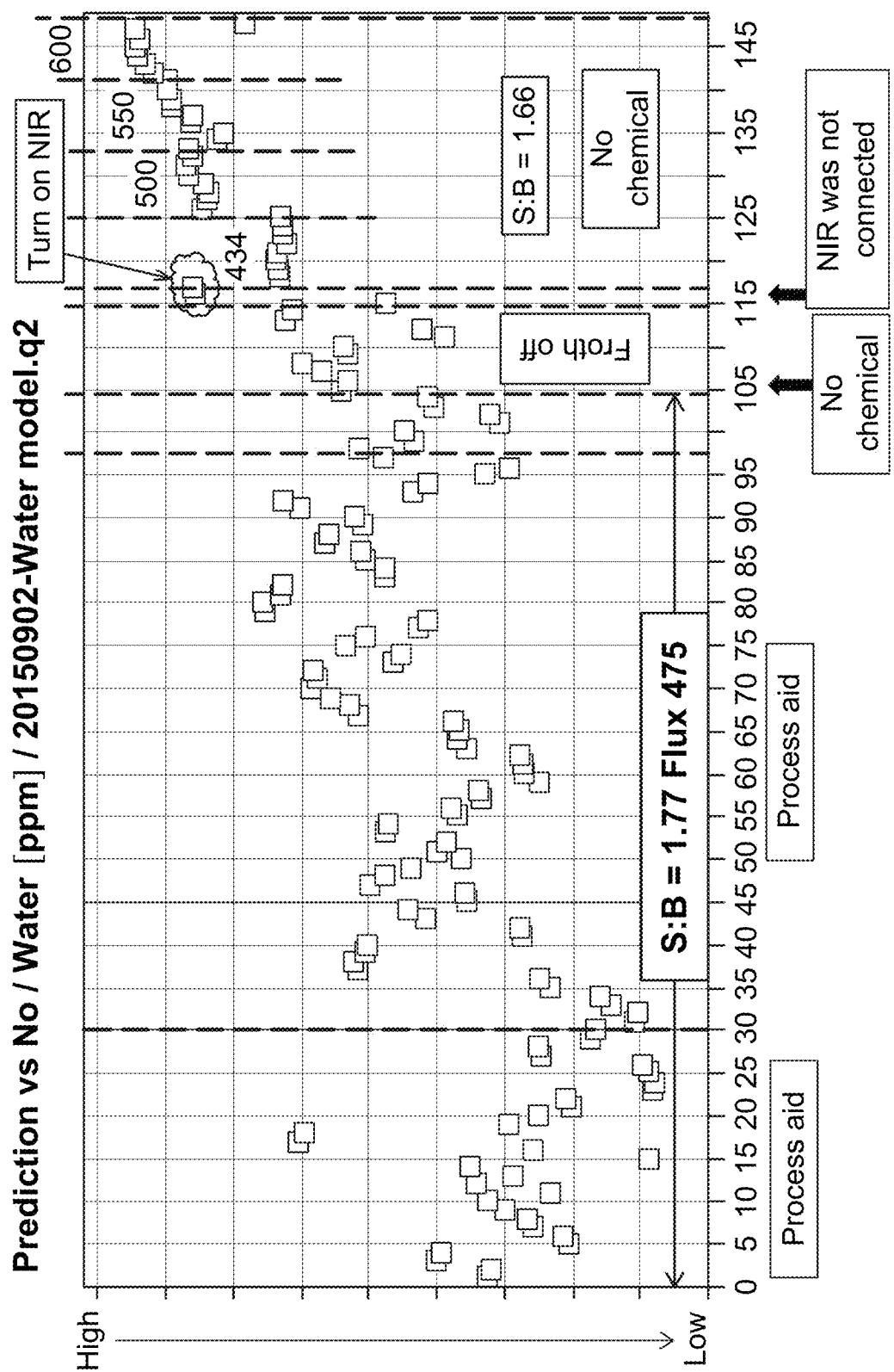
Figure 46:
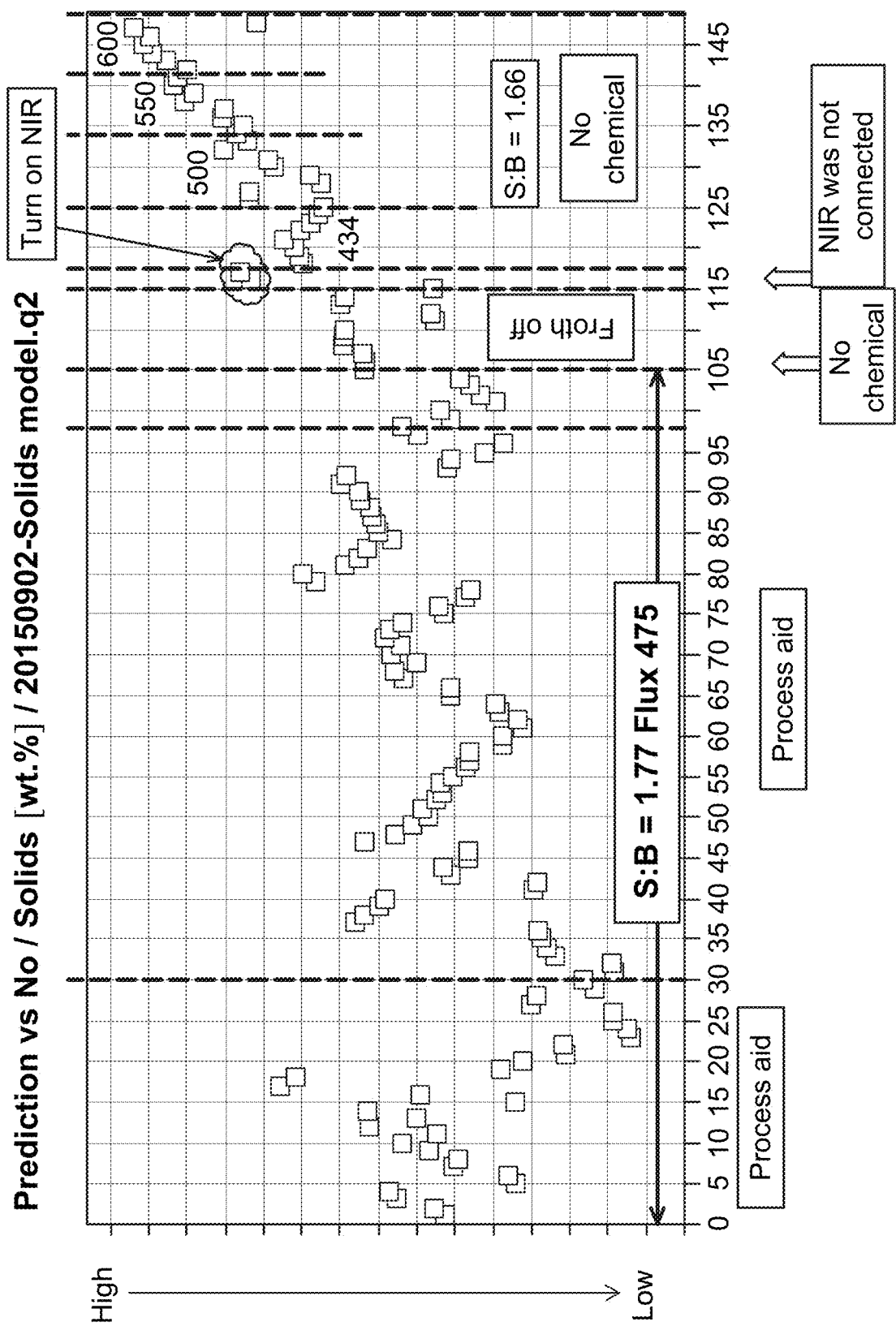

Although NIR water model and solids model were developed based on Week A spectra, these models were used to predict water and solids contents in diluted bitumen in the whole pilot period, and the predicted results are displayed in FIGS. 39 and 40. The results show that both water model and solids model can well predict water content and solids content in diluted bitumen for the whole period of the pilot.

and result in higher water content and solids contents in diluted bitumen, as shown in FIGS. 45 and 46 in the range of the data points from 30-95.

Figure 47:
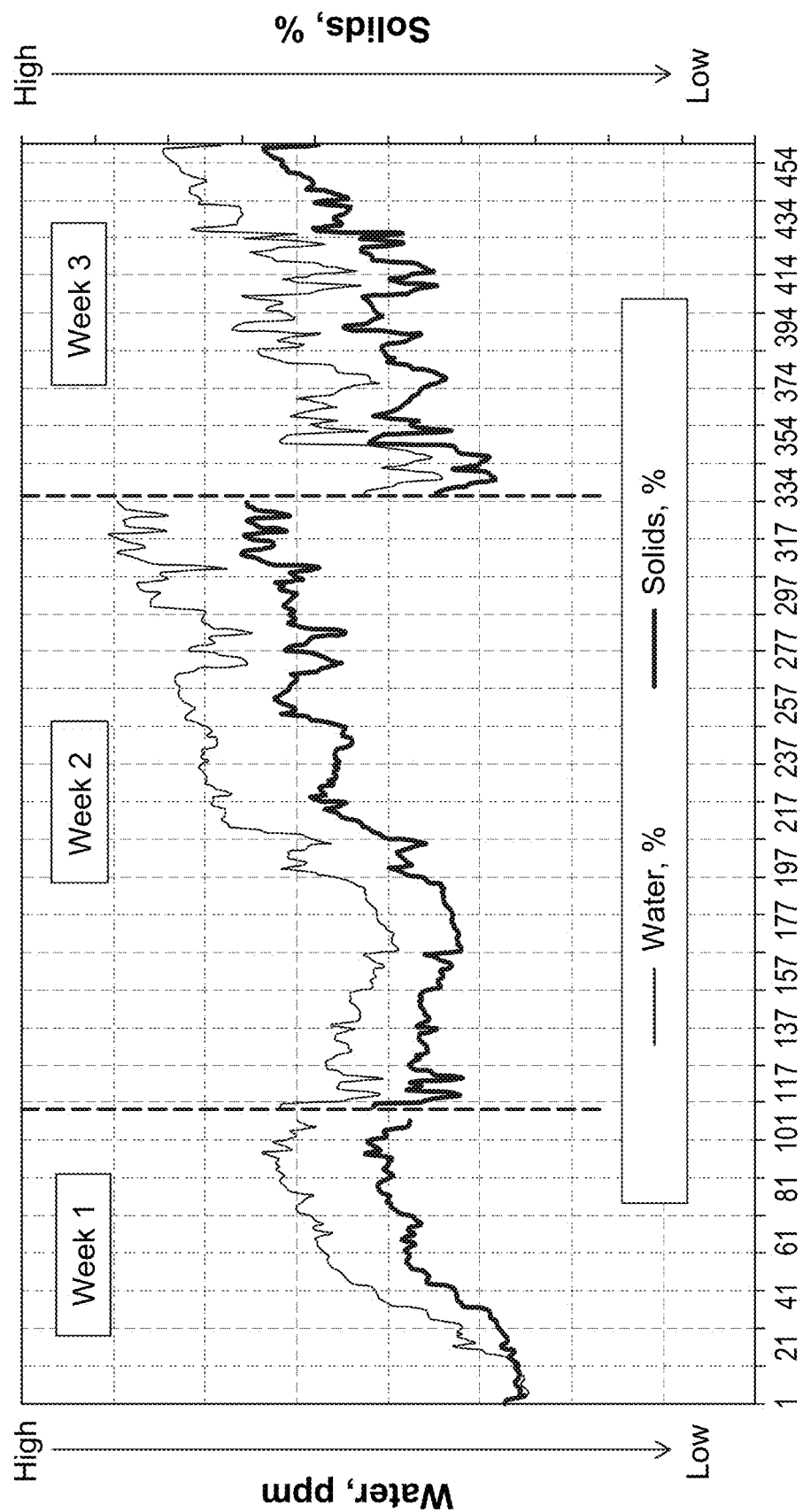

FIG. 47 maps the water content and solids content in diluted bitumen in three week of pilot period. The results show that NIR can be used for measuring water content and solids content in diluted bitumen to control the product

TABLE 9

Water and Solids Contents in Dibit and Parameters for Calculating Critical Size of Agglomerates

| No | MB # | Lab Solids (wt. %) | Lab Water (KFW) | S/B | Flux (mm/min) | Theoretical water, PPM | Theoretical Solids % | Density of asph agglomerates | Density at 90 C. | Viscosity, Pa.s | Critical Size of Agg. for settling, Micron | Reflectance File Number |
|---|---|---|---|---|---|---|---|---|---|---|---|---|
| 1 | 6.1.1 | 0.087 | 245 | 1.78 | 338 | X = 2.3846 * Y-525.28 | Y | 1542 | 689 | 0.000322 | 61 | 297 |
| 2 | 6.1.2 | 0.113 | 278 | 1.78 | 354 | X = 2.3846 * Y-525.28 | Y | 1542 | 689 | 0.000322 | 62 | 521 |
| 3 | 6.2.1 | 0.017 | 278 | 1.8 | 399 | X = 2.3846 * Y-525.28 | Y | 1542 | 687 | 0.000317 | 65 | 1265 |
| 4 | 6.2.3 | 1.005 | 209 | 1.8 | 393 | X = 2.3846 * Y-525.28 | Y | 1542 | 687 | 0.000317 | 65 | 1389 |
| 6 | 6.2.4 | 0.085 | 185 | 1.81 | 389 | X = 2.3846 * Y-525.28 | Y | 1542 | 687 | 0.000314 | 64 | 1599 |
| 7 | 6.3.1 | 0.04 | 228 | 1.81 | 444 | X = 2.3846 * Y-525.28 | Y | 1542 | 687 | 0.000314 | 69 | 1939 |
| 8 | 6.3.2 | 0.091 | 185 | 1.81 | 450 | X = 2.3846 * Y-525.28 | Y | 1542 | 687 | 0.000314 | 69 | 2107 |
| 9 | 6.3.3 | 0.124 | 182 | 1.8 | 450 | X = 2.3846 * Y-525.28 | Y | 1542 | 687 | 0.000317 | 69 | 2275 |
| 10 | 6.3.4 | 0.049 | 242 | 1.81 | 452 | X = 2.3846 * Y-525.28 | Y | 1542 | 687 | 0.000314 | 69 | 2443 |
| 11 | 6.3.5 | 0.042 | 211 | 1.81 | 448 | X = 2.3846 * Y-525.28 | Y | 1542 | 687 | 0.000314 | 69 | 2611 |
| 12 | 6.3.6 | 0.05 | 246 | 1.79 | 452 | X = 2.3846 * Y-525.28 | Y | 1542 | 688 | 0.000318 | 70 | 2779 |
| 13 | 6.3.7 | 0.052 | 229 | 1.79 | 457 | X = 2.3846 * Y-525.28 | Y | 1542 | 688 | 0.000319 | 70 | 2949 |
| 14 | 6.3.8 | 0.047 | 316 | 1.80 | 457 | X = 2.3846 * Y-525.28 | Y | 1542 | 688 | 0.000319 | 70 | 3117 |
| 15 | 6.3.9 | 0.047 | 286 | 1.80 | 456 | X = 2.3846 * Y-525.28 | Y | 1542 | 688 | 0.000318 | 70 | 3285 |
| 16 | 6.4.1 | 0.125 | 320 | 1.83 | 530 | X = 2.3846 * Y-525.28 | Y | 1542 | 685 | 0.00031 | 74 | 4081 |
| 17 | 6.4.2 | 0.044 | 426 | 1.81 | 513 | 3X | 3Y | 1542 | 687 | 0.000314 | 74 | 4165 |

Figure 41:
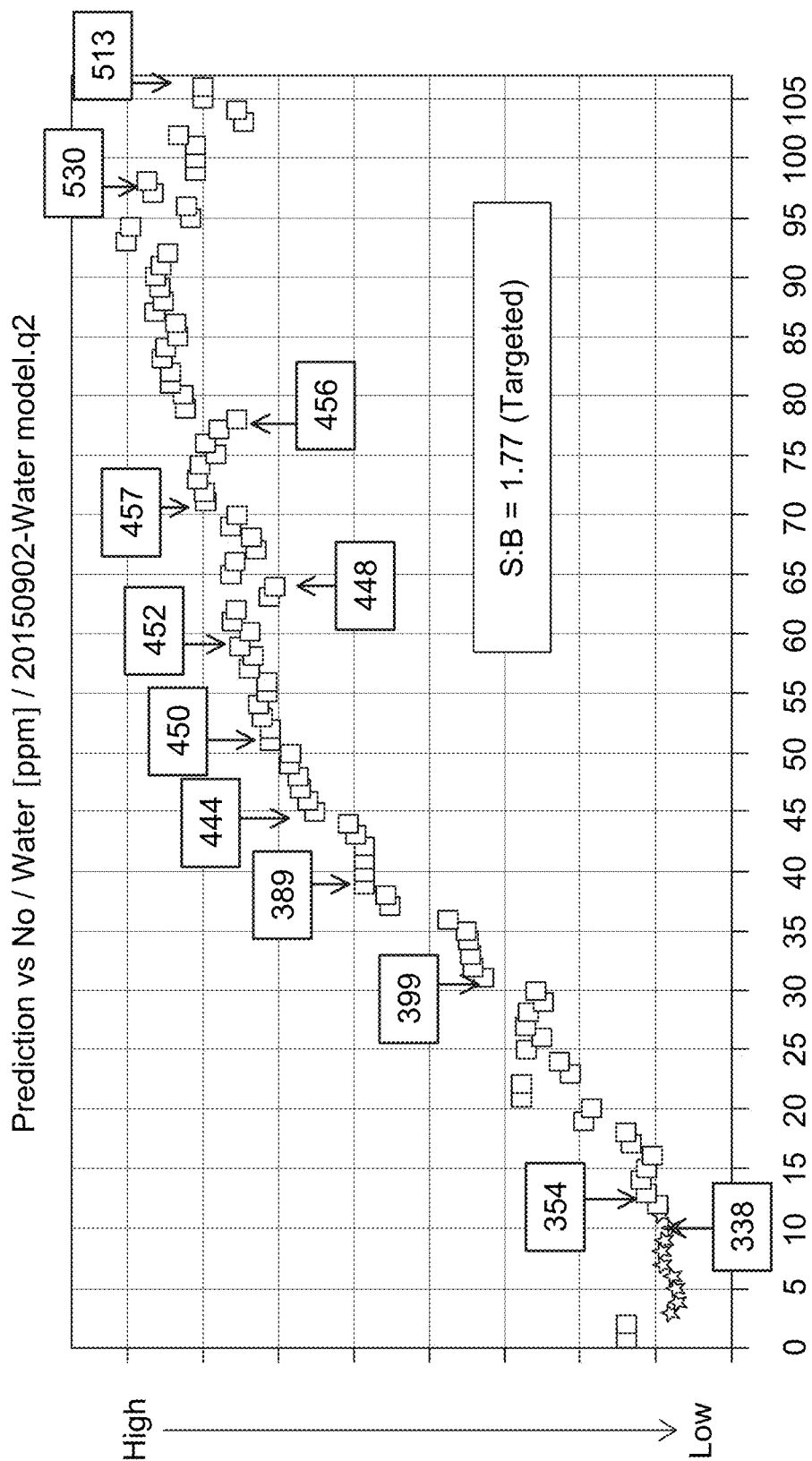
Figure 42:
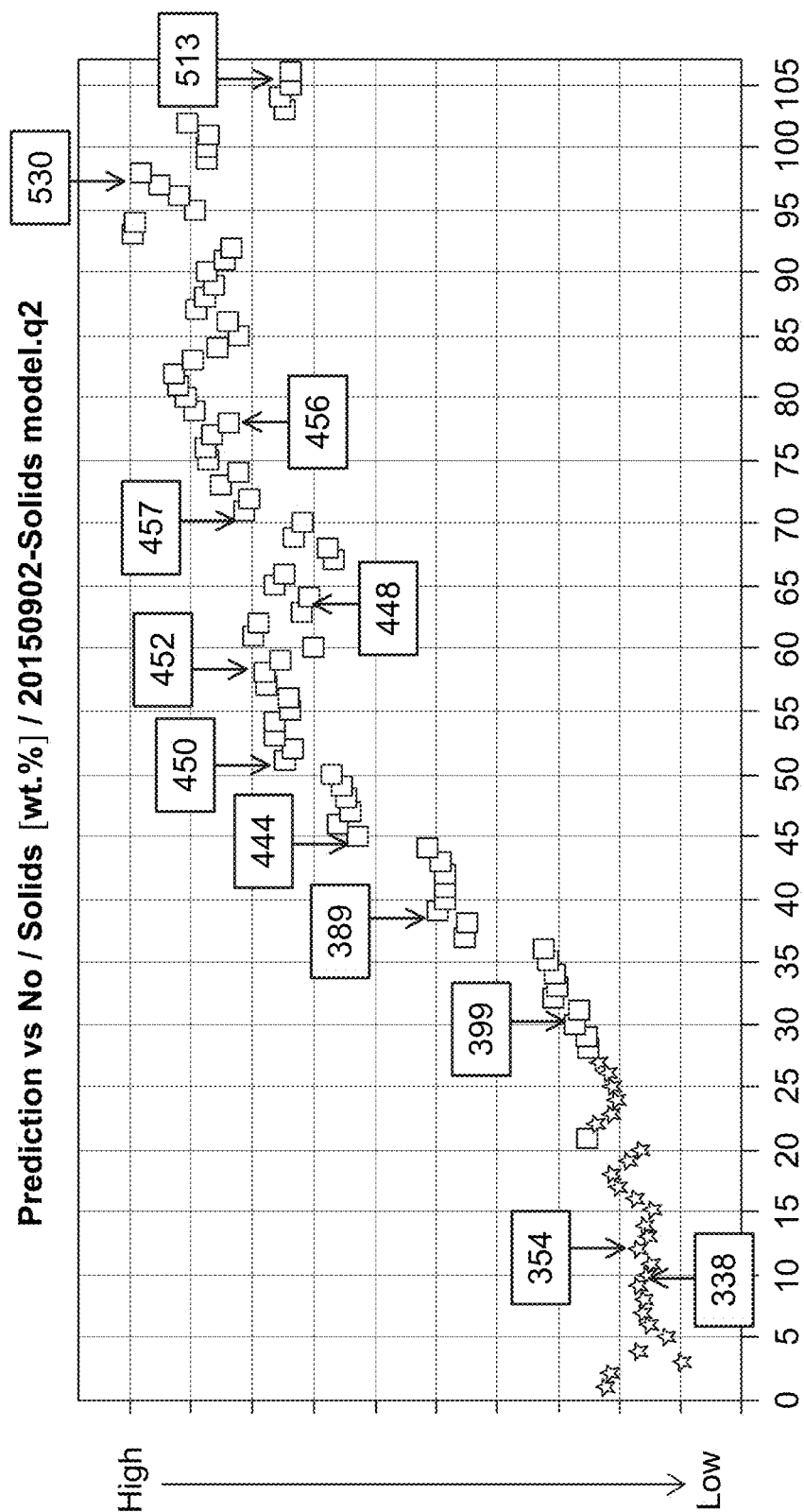

Investigation of Water and Solids Contents in Diluted Bitumen with the Variety of Operational Conditions in Detail FIGS. 41 and 42 show water content and solids content in diluted bitumen in Week A. Since S/B was kept consistently at 1.77, water content and solids content gradually increased with the flux, which trend was reasonable as what was deduced above.

Figure 43:
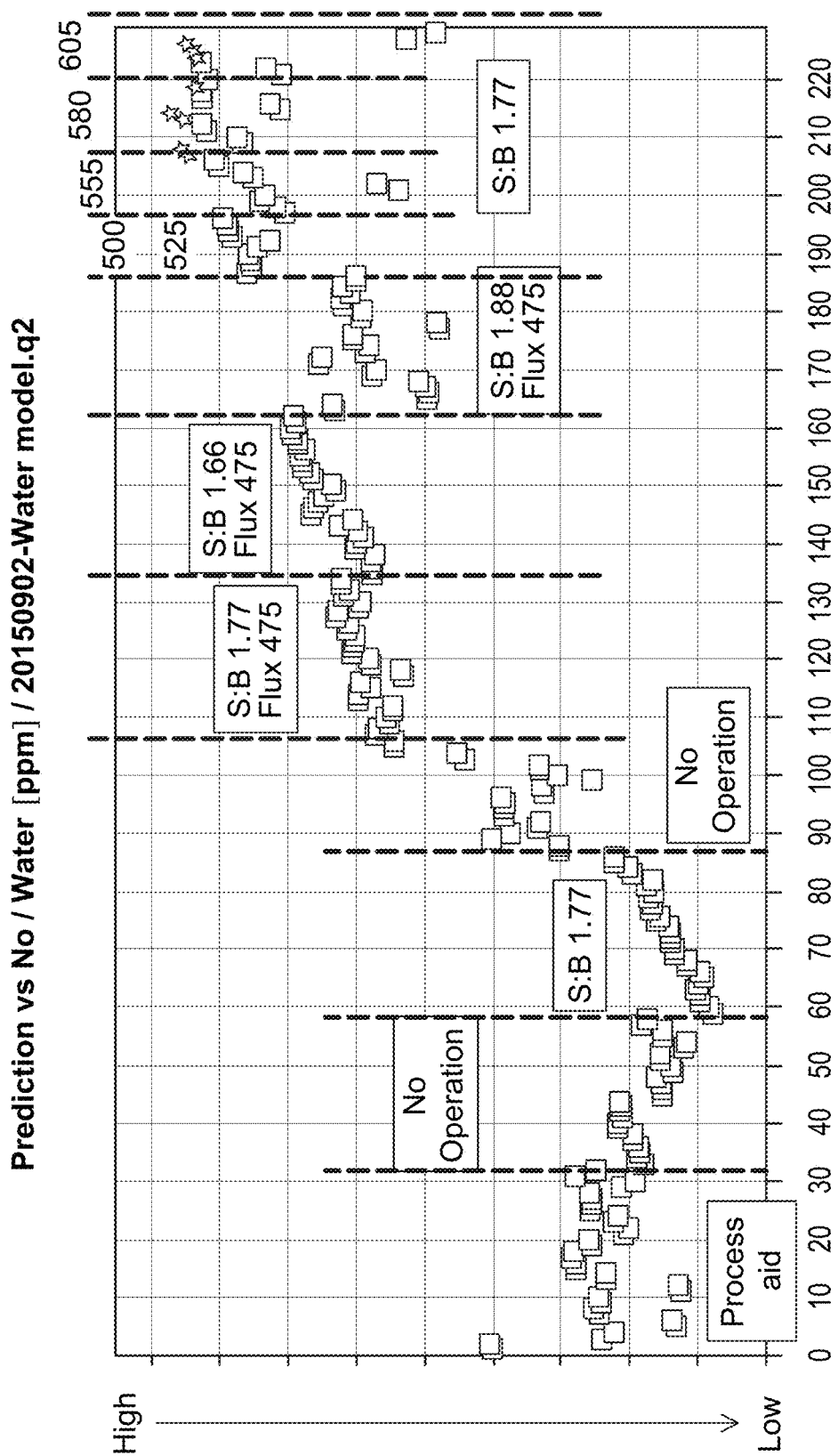
Figure 44:
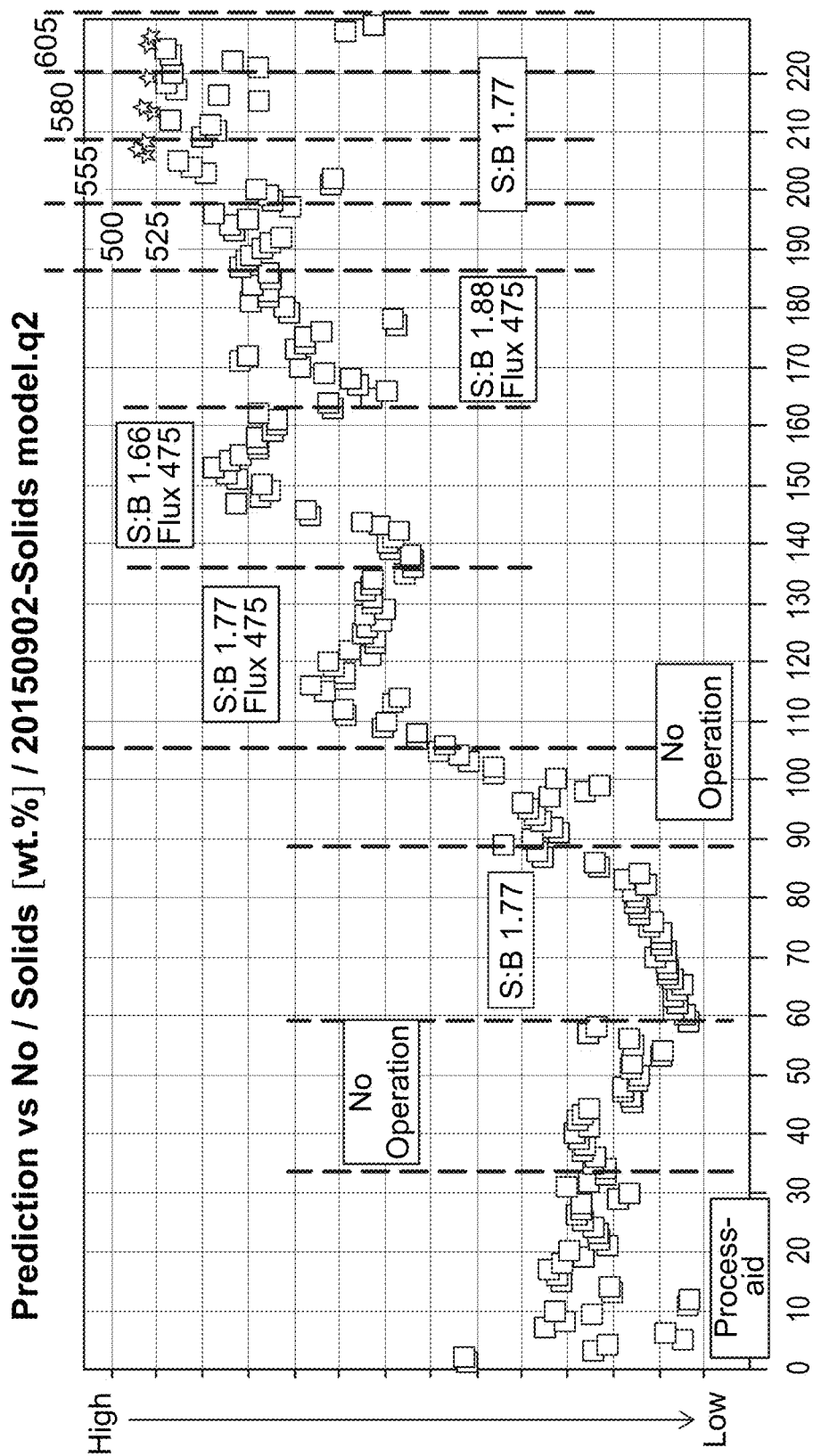

In Week B, operational parameters were various from the application of asphaltenes dispersant, S/B, and the flux. FIGS. 43 and 44 show water content and solids content in diluted bitumen in Week B. By comparing operational condition and water content and solids content in diluted bitumen, it was found that the trend of the variation of water and solids reasonably reflected the change of the operational condition, such as higher S/B produced better quality of diluted bitumen (lower water content and solids contents).

Week C's prediction further confirmed that operational changes could be captured by NIR spectra which were align well with the water content and solids content in diluted bitumen. Even the change of the dosage of asphaltenes dispersant was detected by NIR spectra because its addition affects the size of asphaltenes/water/fines agglomerates. Overdosing of asphaltenes dispersant could emulsify water quality. In the meantime, in accordance to the variation water content and solids content in diluted bitumen, the operational conditions could be monitored simultaneously.

Figure 48:
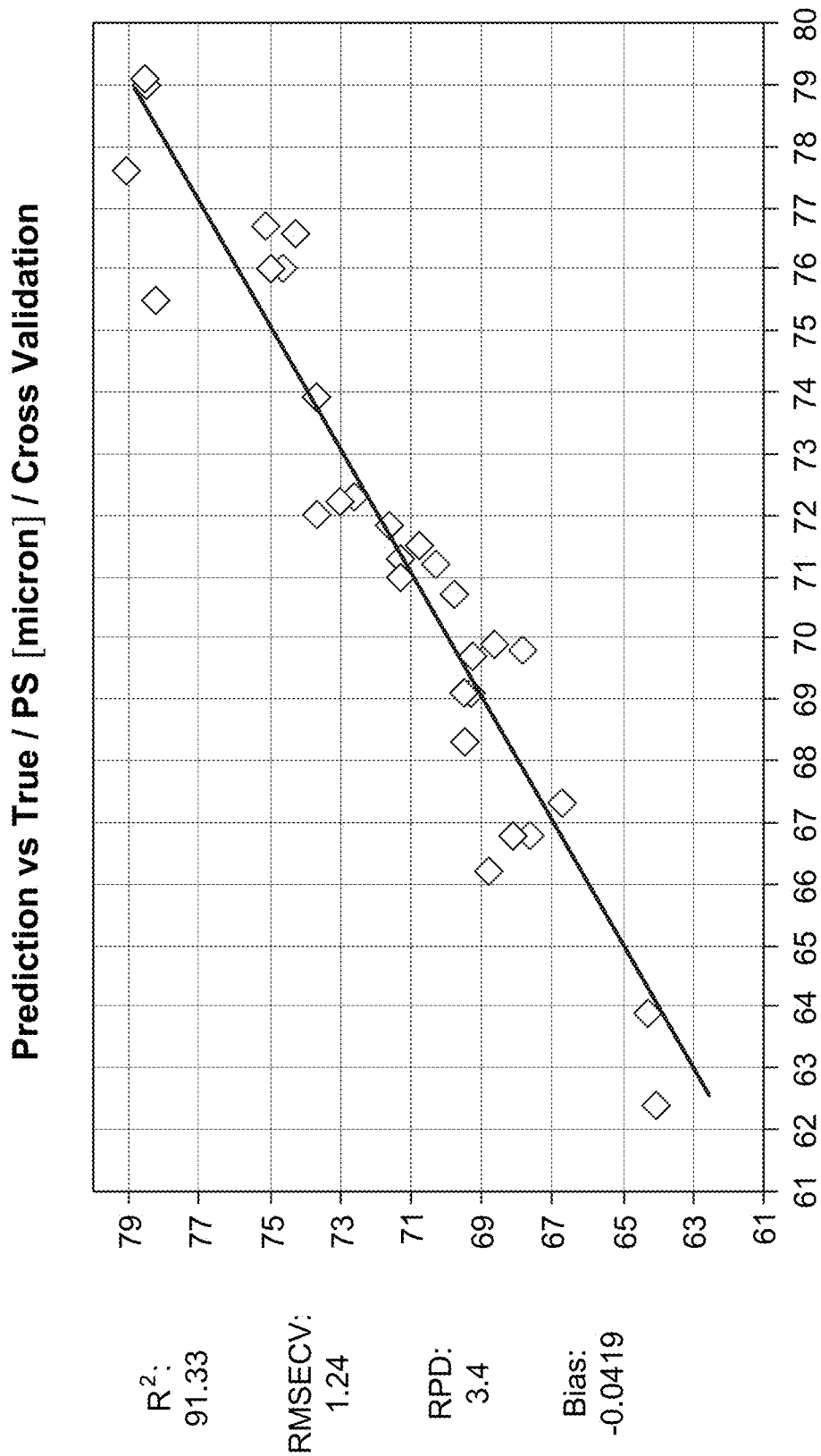
FIG. 48 is a cross validation for a NIR model of critical size of asphaltenes/water/solids agglomerates.
Figure 49:
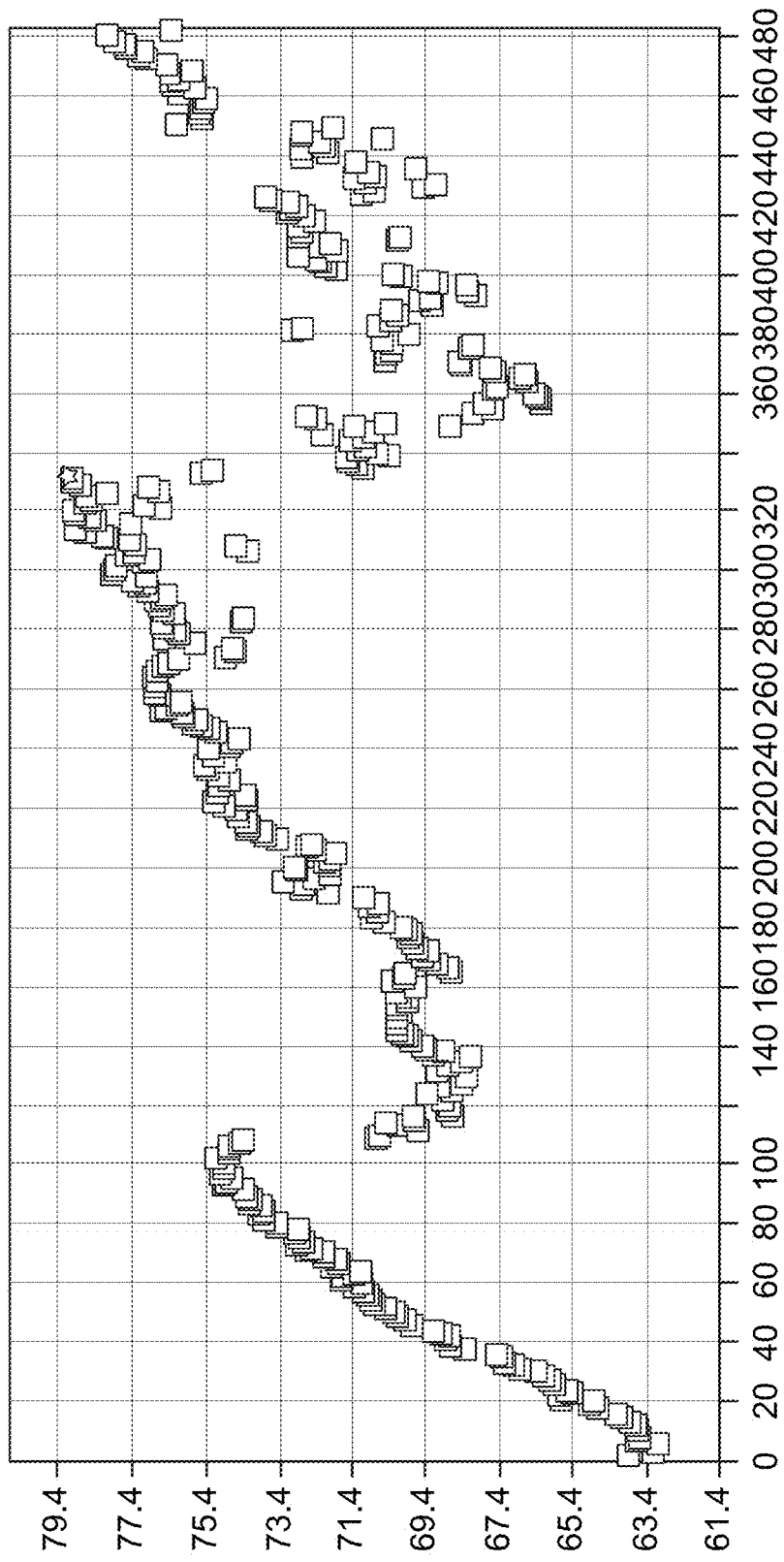
FIG. 49 is a graph showing predicted critical size of asphaltenes/water/solids agglomerates in diluted bitumen for three weeks.

The critical size of asphaltenes/water/solids agglomerates for precipitating out hydrocarbon phase also can be modeled based NIR spectra. Very strong NIR model was built for measuring the critical size of aspahtlenes/water/solids agglomerates, as shown in FIG. 48. FIG. 49 displays the predicted critical size of asphaltenes/water/solids agglomerates in the whole pilot. The critical size is in the range of 63 μm-78 μm.

Experimentation 4: Residual Pentane in Diesel, Diluted Bitumen or Bitumen

Figure 68:
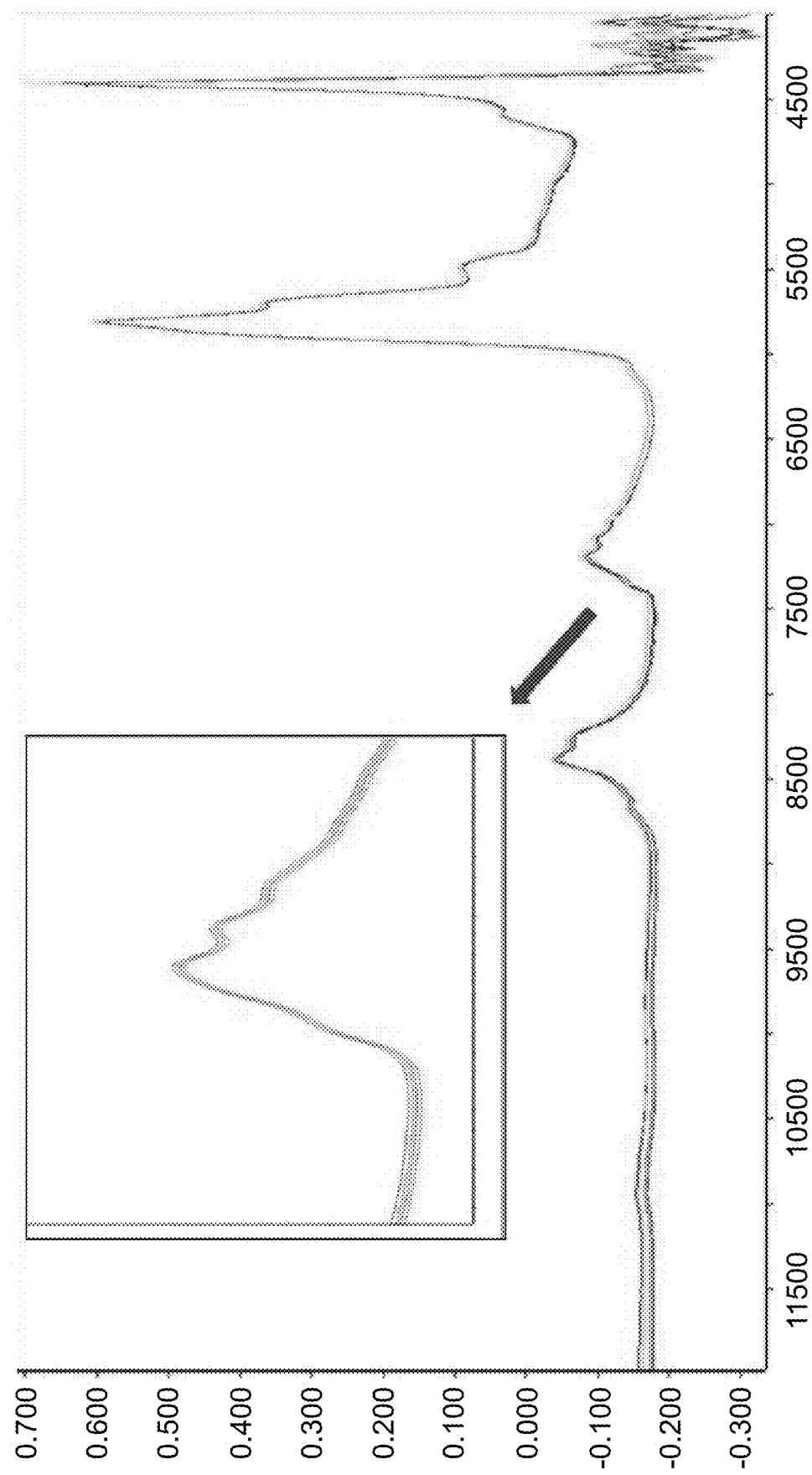
FIG. 68 is NIR spectra of less than 1000 ppm pentane in diesel.

A series of pentane-in-diesel solutions were prepared. The concentration of pentane was less than 1000 ppm. Their concentration was determined by gas chromatography which is widely used with high accuracy. The results measured by GC were used as references for modeling and validation. Their NIR spectra were recorded as shown in FIG. 68. Although the variation between spectra is not easily distinguishable by human eye, the difference is significant enough for NIR with chemometrics to identify.

Figure 69:
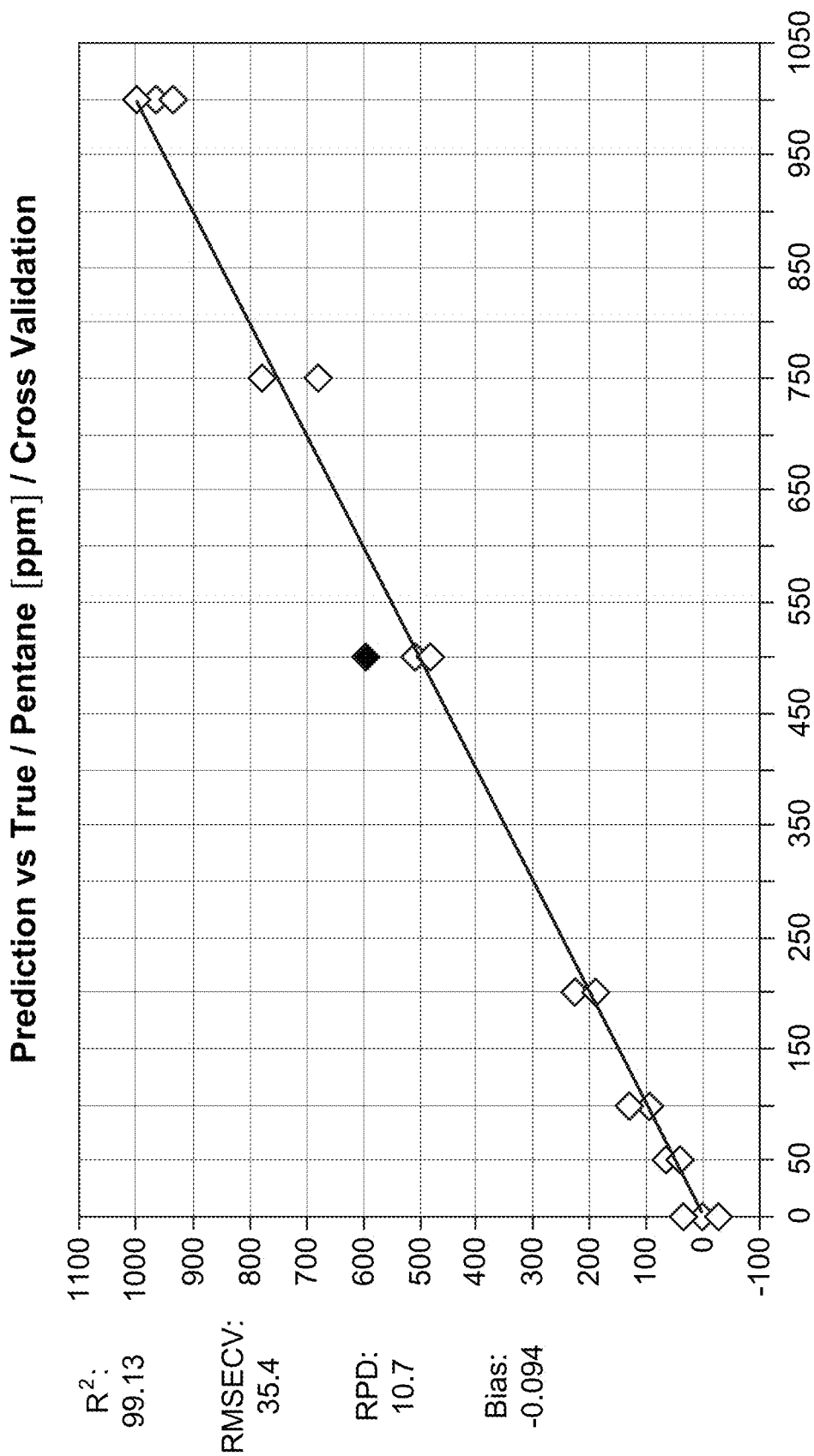
FIG. 69 is a cross validation for NIR model for <1000 ppm pentane in diesel.
Figure 70:
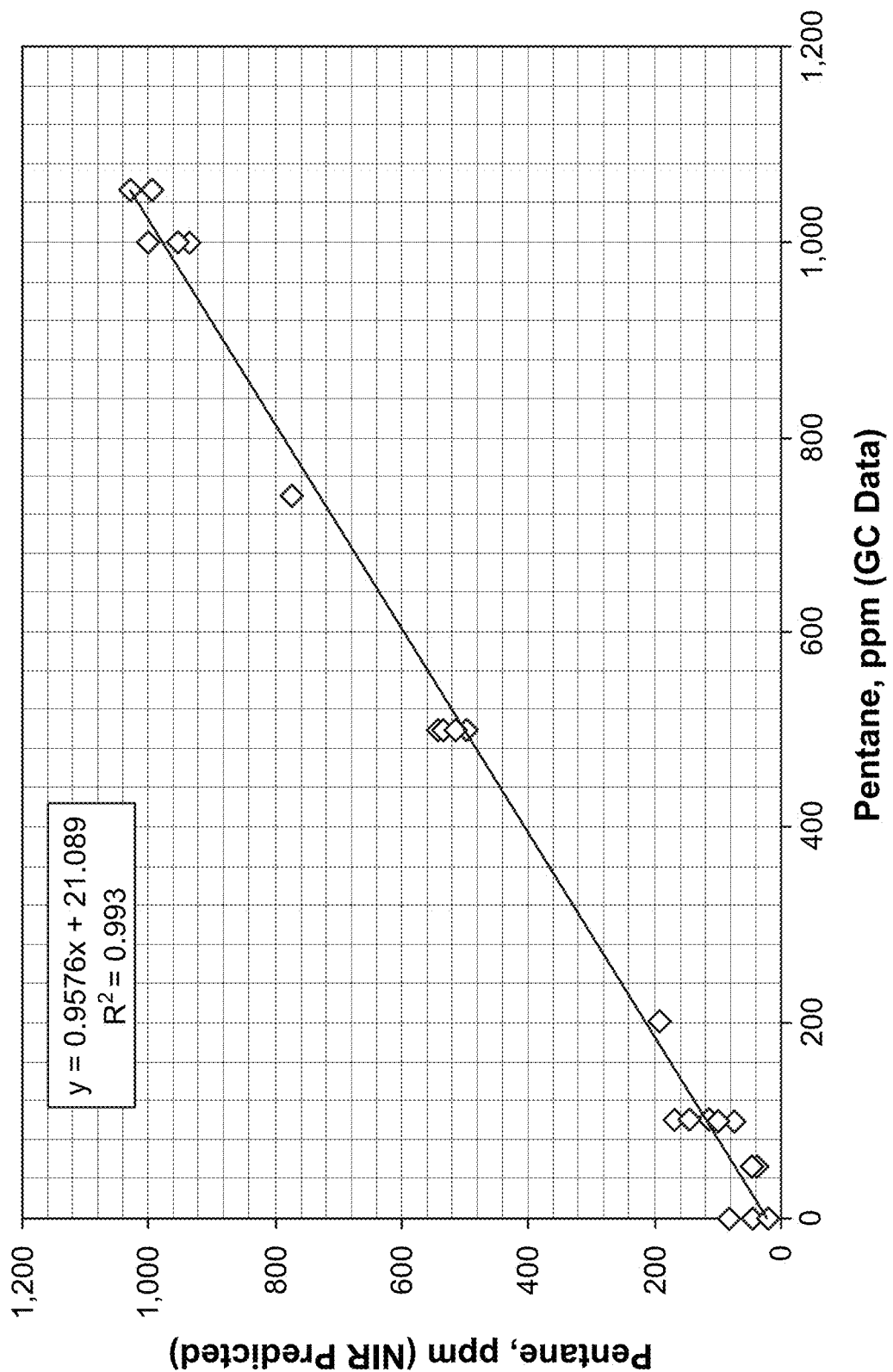
FIG. 70 is a graph for validation of predicted pentane concentration by NIR model vs. GC results.

These spectra were processed by applying chemometrics to calibrate the pentane concentration in diesel using references. A very strong calibration was established. The standard deviation (SD) of this model is 35.4 ppm shown in FIG. 69. This accuracy is good enough to meet the detection limit requirement of this stream. FIG. 70 shows excellent agreement between predicted values by the NIR model and the actual analytical results measured by GC.

Figure 71:
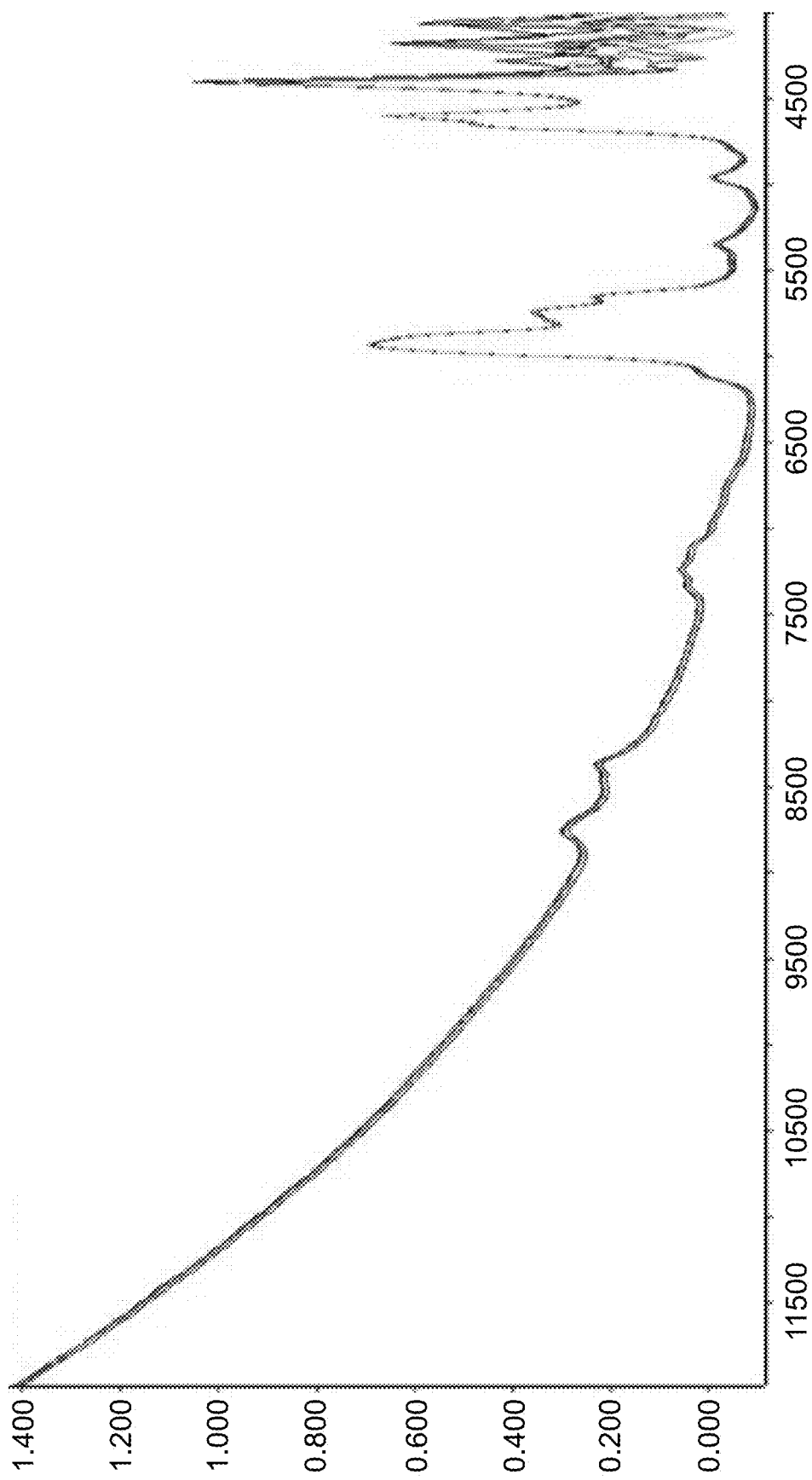
FIG. 71 is NIR spectra of <1000 ppm pentane in 10% bitumen toluene solutions.

Similar measurements were conducted for pentane in 10% bitumen toluene solutions. The concentration of pentane in solutions was determined by GC analysis. The results measured by GC were used as the reference for modeling and validation. The NIR spectra were recorded for less than 1000 ppm pentane in 10% bitumen toluene solutions shown in FIG. 71.

Figure 72:
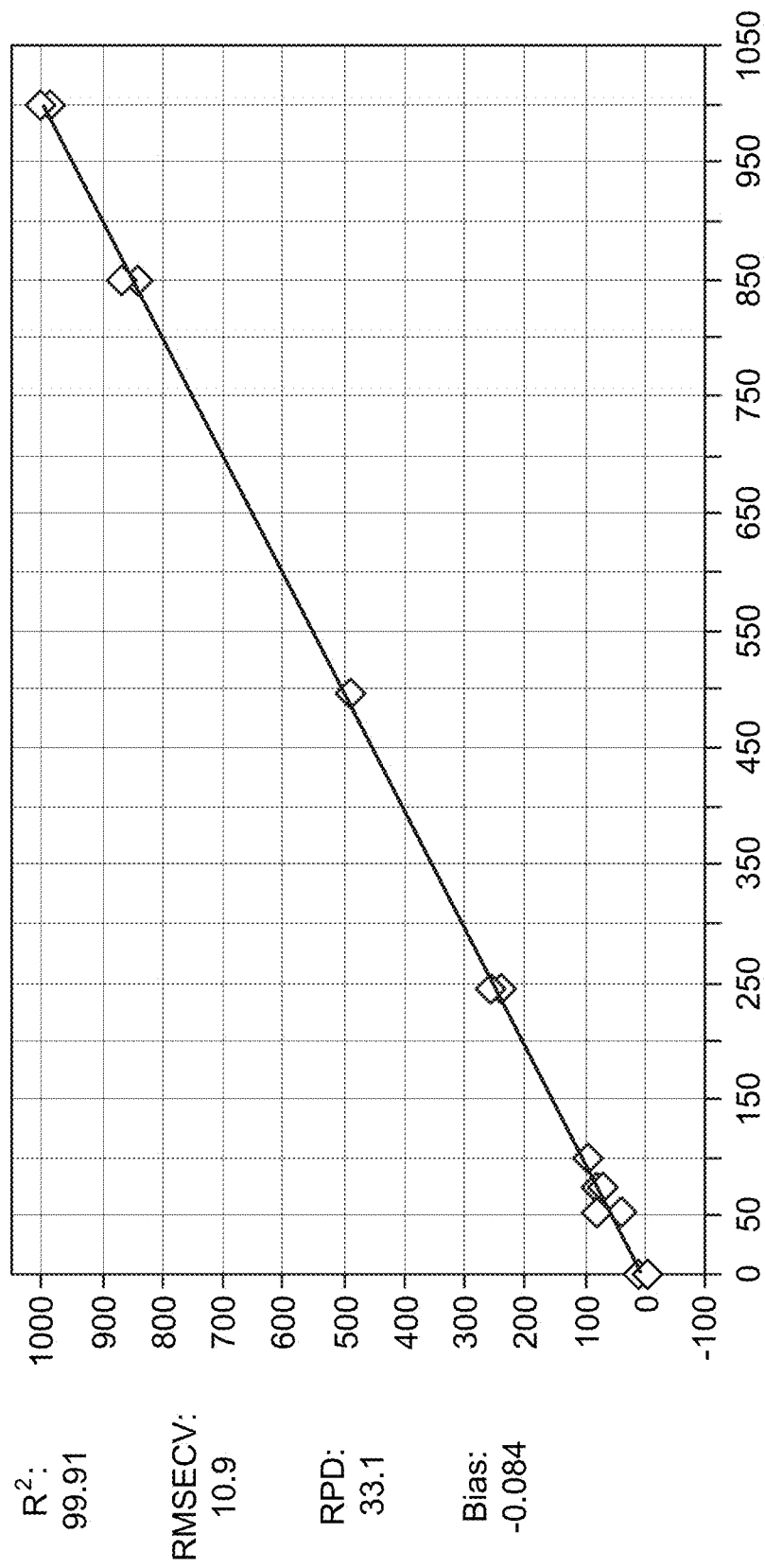
FIG. 72 is a cross validation for NIR model for <1000 ppm pentane in 10% bitumen in toluene solution.
Figure 73:
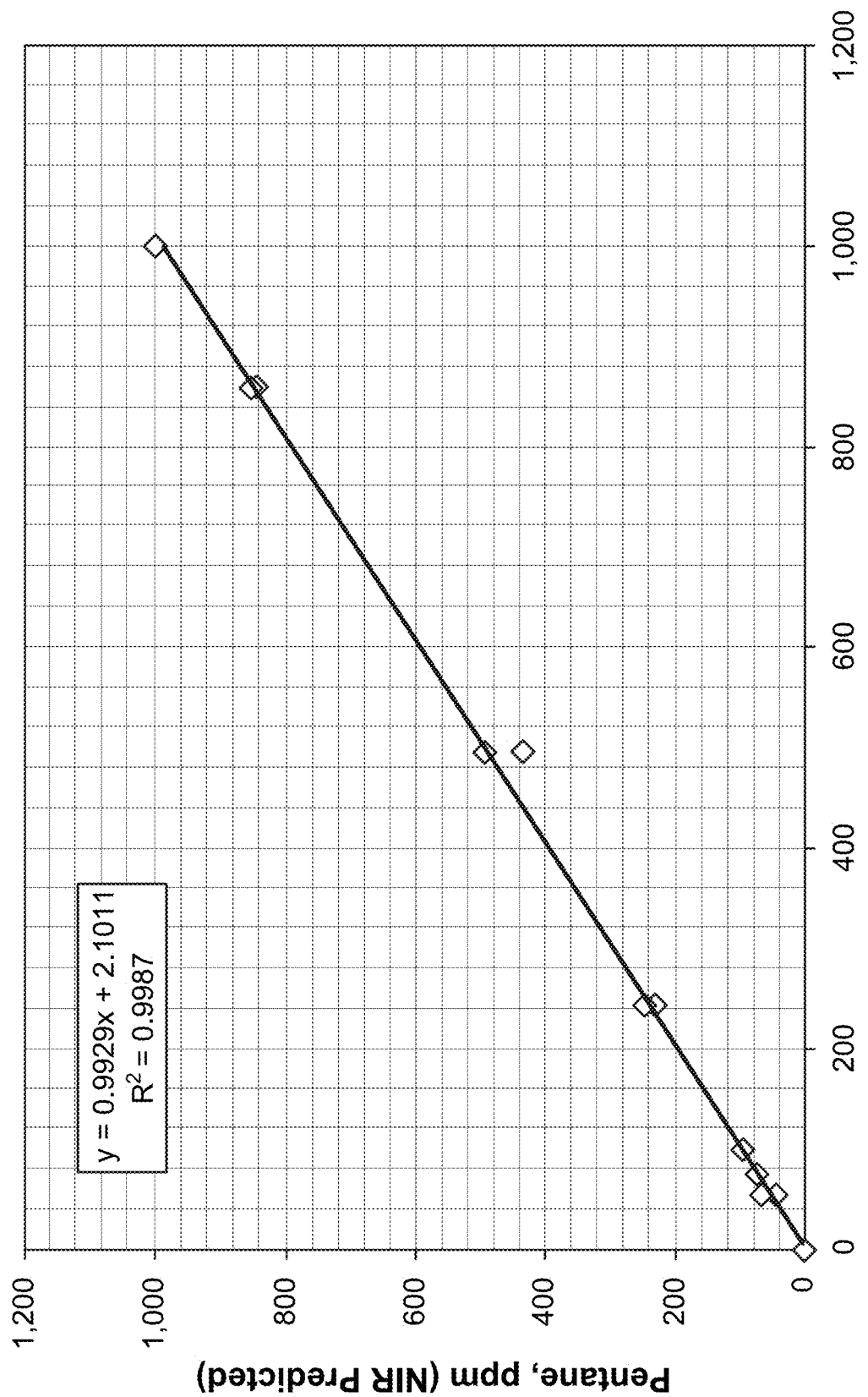
FIG. 73 is a graph for validation of predicted pentane concentration by NIR model vs. GC results.

These spectra were processed by applying chemometrics to calibrate the pentane concentration in 10% bitumen toluene solutions using references. An even stronger calibration was established. The standard deviation of this model is 10.9 ppm shown in FIG. 72. This accuracy can meet the detect limit requirement of this stream. FIG. 73 shows that excellent agreement between predicted values by the NIR model and the actual analytical results measured by GC.

Tables 10 and 11 give a summary of NIR technique application in PFT process (Table 10), and more particularly on residual solvent analysis (Table 11).

Experimentation 5: NIR Based Techniques for Free, Emulsified, Soluble Water

Figure 83:
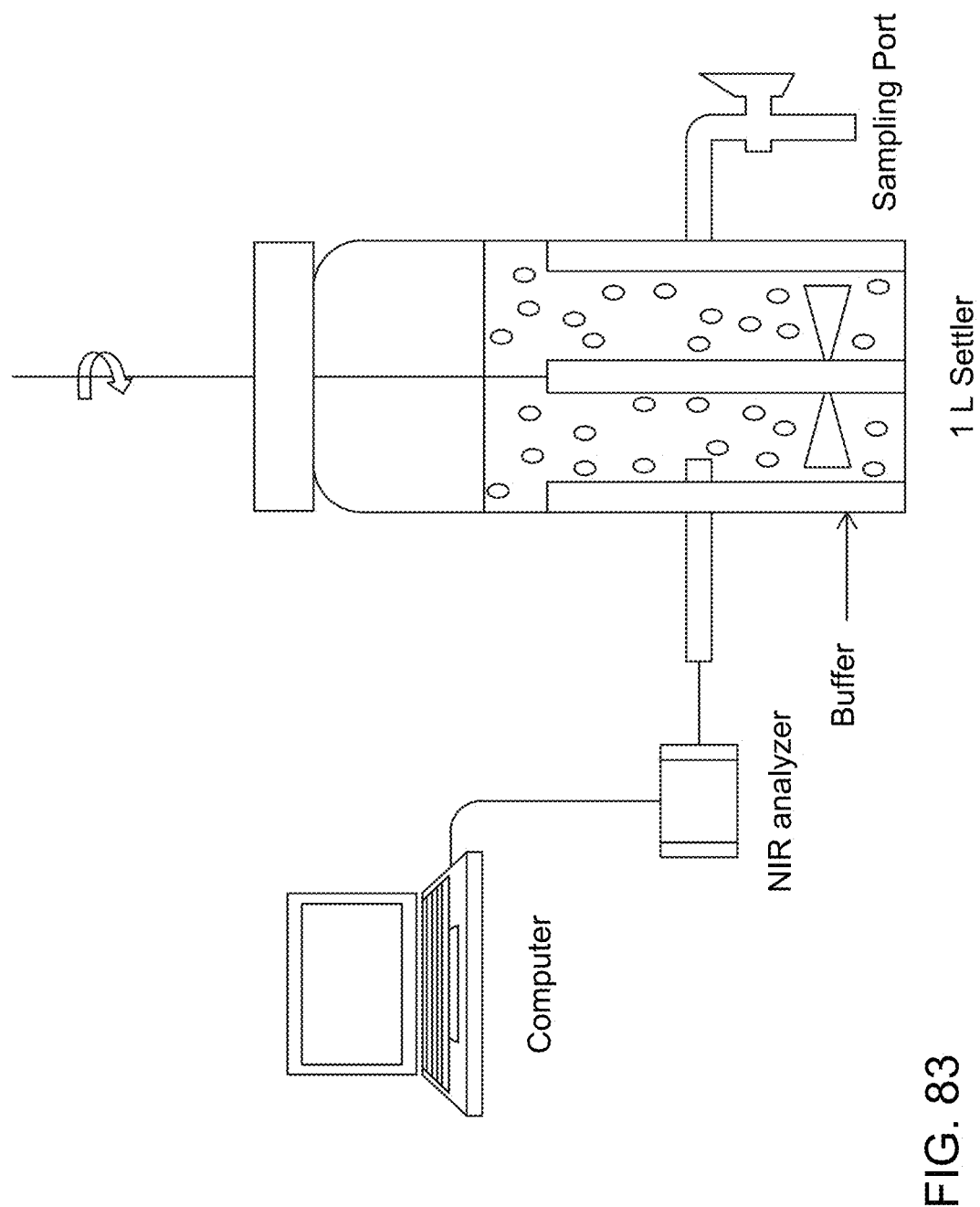
FIG. 83 is a diagram showing a setup of NIR to detect composition of the supernatant in a settling test.
Figure 84:
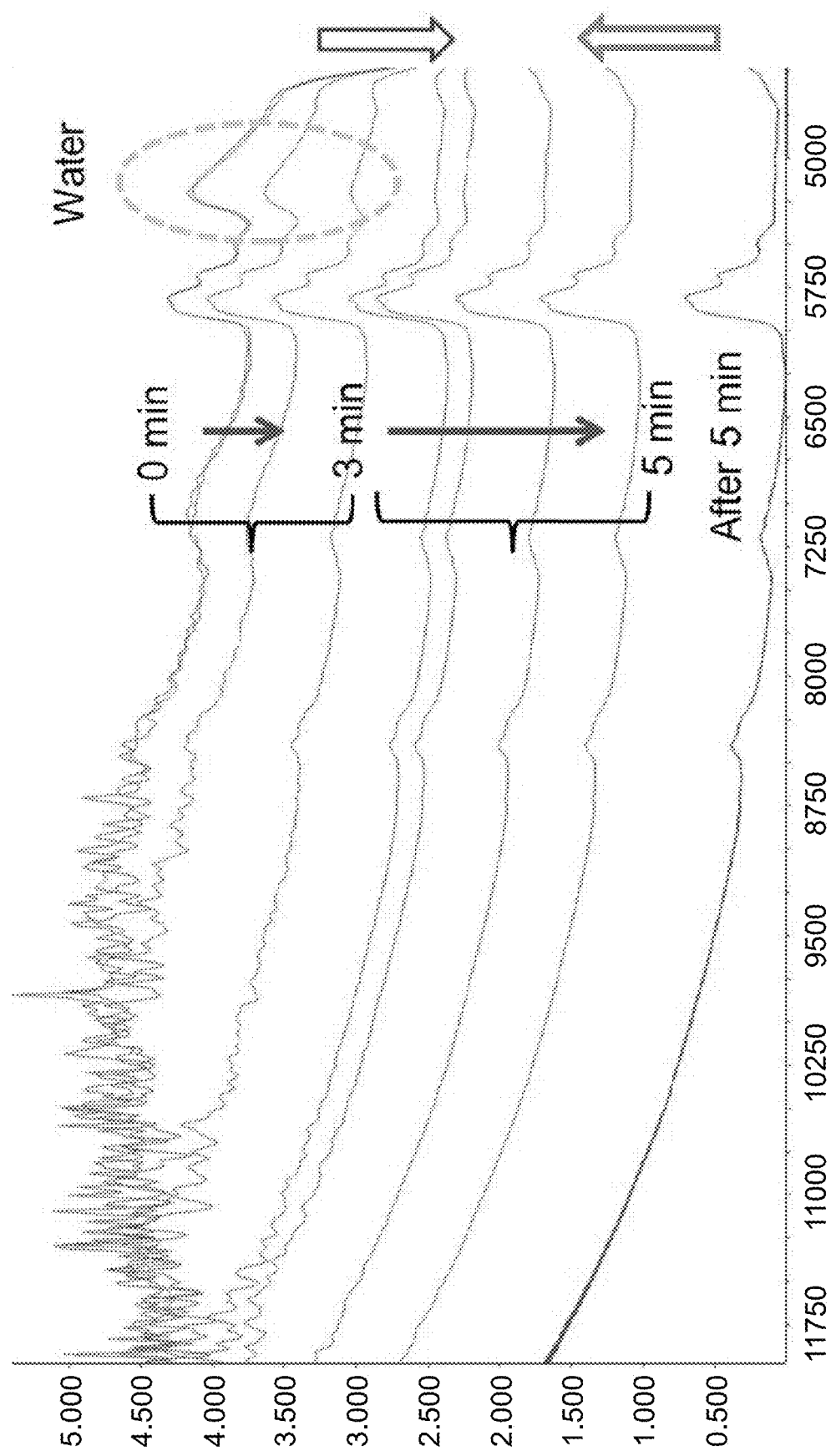
FIG. 84 is a graph showing transmission NIR spectra of supernatant phase versus time in a settling test.
Figure 85:
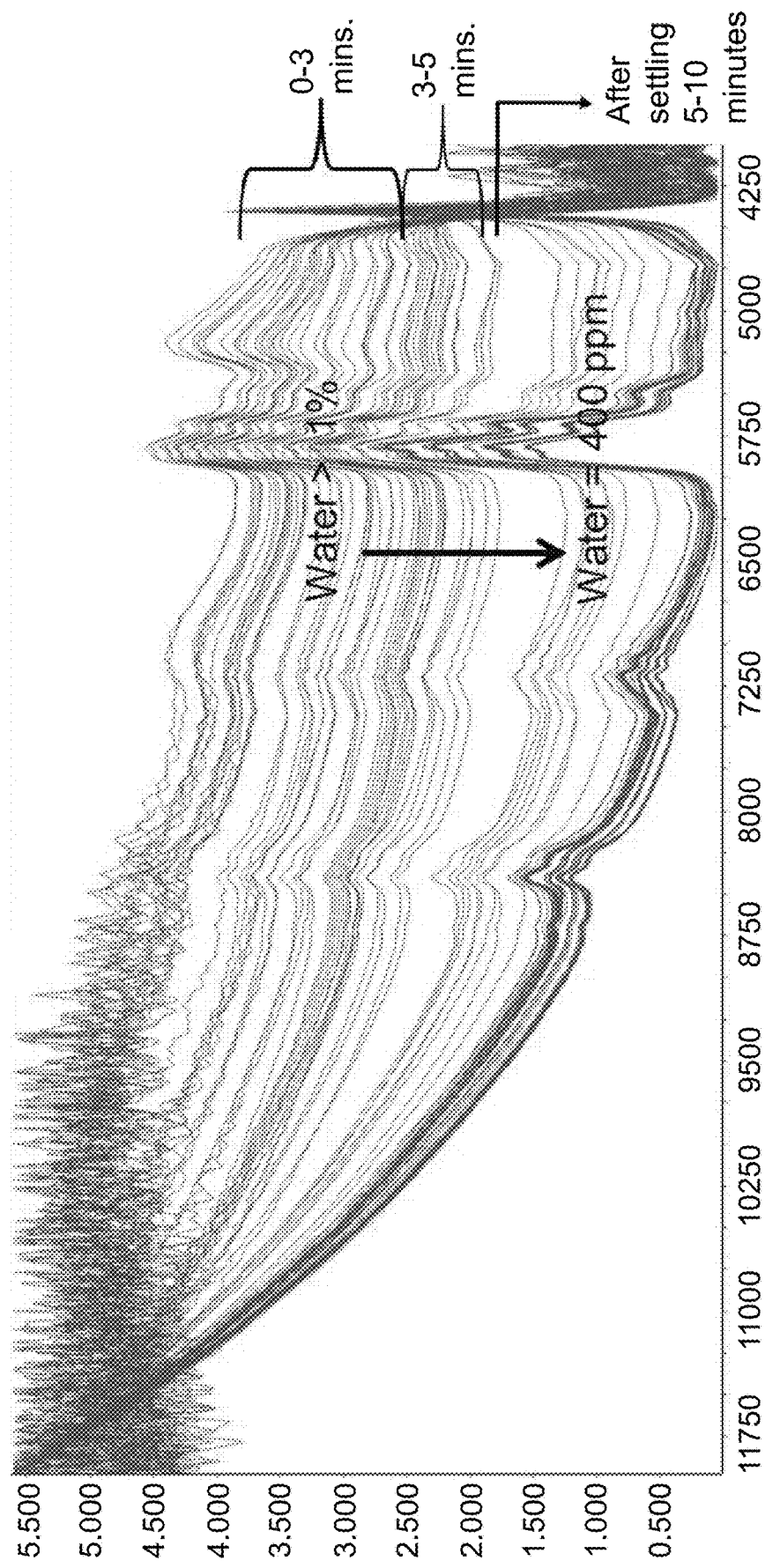
FIG. 85 is another graph showing transmission NIR spectra of supernatant phase versus time in eight settling tests.
Figure 86:
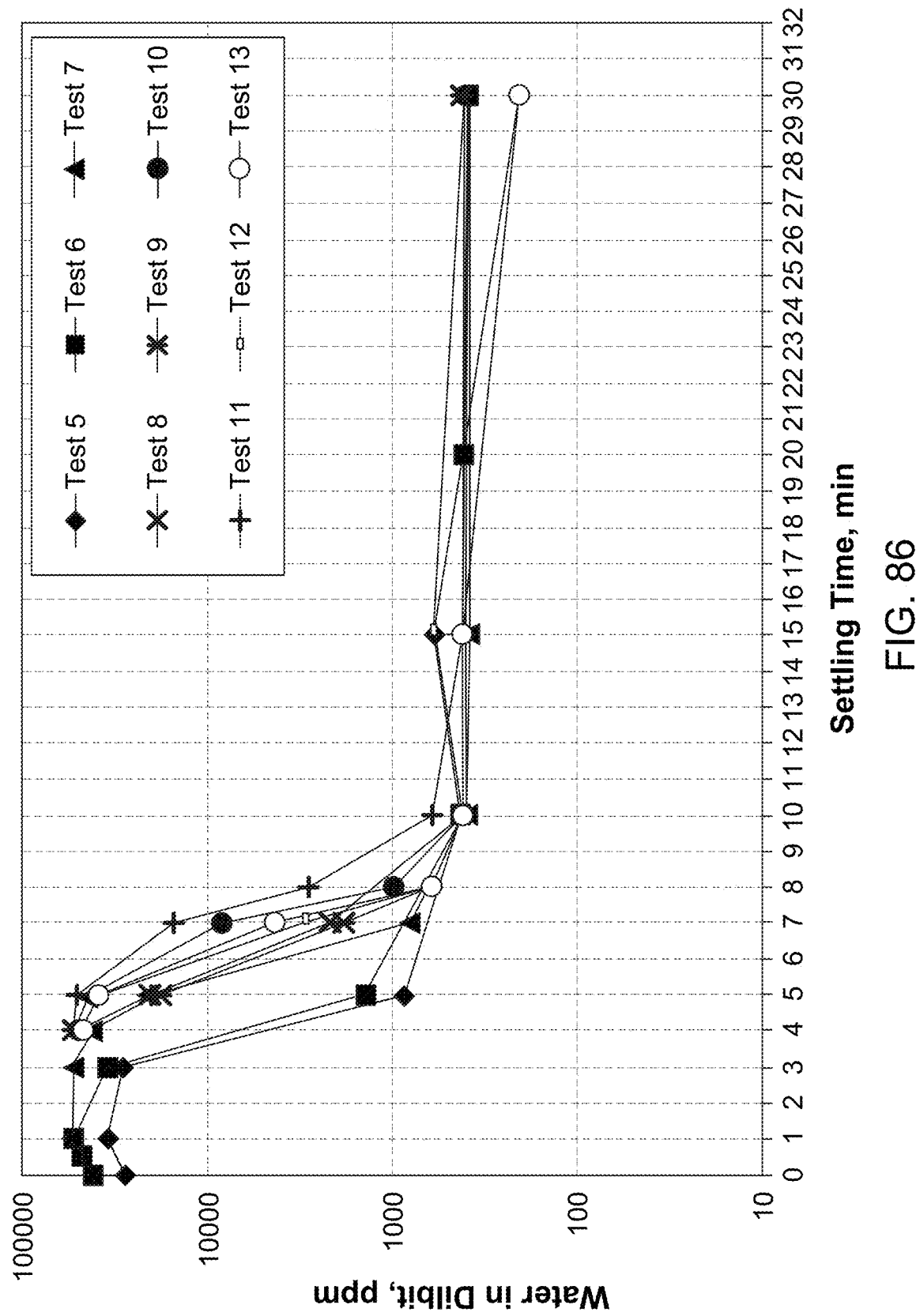
FIG. 86 is a graph showing water content in the supernatant versus settling time.

Experiments were performed to detect the composition of the supernatant in a settling test. FIG. 83 shows the test setup. FIGS. 84 and 85 show the NIR spectra of the supernatant with settling time. It was clearly observed the spectra change with time, for example: (i) water peak in 5000-5600 nm from high to disappeared; (ii) the orientation of the tail of NIR spectra about 4500 nm changed from downward to upward; (iii) NIR spectra shifts from top to bottom when water reduces with time; and (iv) when water content <400 ppm in dilbit (reach soluble water level in dilbit), all NIR spectra group at the bottom. FIG. 86 shows water content in the supernatant with time based on laboratory results. According to laboratory results and the shape and location of NIR spectra, one can interpret that the type of water in the supernatant changes from free-water and emulsified-water toward only soluble water left in the dilbit.

TABLE 10

Summary of NIR Technology Application in PFT Process

| Application | NIR Probe Tested | | Findings |
| --- | --- | --- | --- |
| | Reflectance | Transmission | |
| FSU Overflow | Yes, stable spectra recorded | Yes, spectra with noise background | Reflectance probe was implemented in the plant. NIR can be used for the measurement of S/B, composition of bitumen, solvent, asphaltenes, density and flux of FSU. NIR can extend to detect water, solids and potentially water chemistry analysis. NIR can detect zone settling behavior. |
| FSU Vessel | Yes | Yes | NIR can detect zone settling behavior in the FSU. NIR can be used for monitoring the interface between diluted bitumen and aqueous phase with asphaltene agglomerates and for the measurement of S/B, composition of bitumen, solvent, asphaltenes, water and solids and density. |
| Water solubility in pentane | Yes | No | NIR can detect soluble water in pentane. Due to the limitation, only the reflectance probe was tested, but based on the principal of NIR technology, transmission NIR will give even better detection. |
| SRU Feed Pentane in Diesel | Yes | Yes | Stable spectra were collected; Dependent on the concentration of pentane or diluted bitumen in diesel, different NIR models should be used to get right analysis, for reflectance probe: ≤1% of pentane or diluted bitumen, SD <± 0.08%; 0-100% of pentane or diluted bitumen, SD <± 2.3%. |
| Diluted bitumen in Diesel | Yes | Was not tested; it can detect the composition of these. streams. | |
| Bitumen in Diesel | Yes | | Stable spectra were collected for <15% of bitumen in diesel; Dependent on the concentration of bitumen in diesel, different NIR models should be used to get right analysis: ≤1% of bitumen, SD <± 0.02%; <15% % of bitumen, SD <± 1%. No stable spectra recorded when bitumen is >15% in diesel (suspected bitumen ppt. in diesel) |

TABLE 11

NIR Application on Residual Solvent Analysis

| Sample | NIR Probe Tested Reflectance | Transmission | Findings |
|---|---|---|---|
| 0-1000 ppm pentane in diesel | Yes | Yes | Both probes recorded stable spectra; Transmission spectra provided more reliable and accuracy analysis when pentane is <0.1%; Transmission probe can directly measure <1000 ppm pentane in diesel, SD is <70 ppm; Detailed results were included in this ppt. |
| 0-1000 ppm pentane in 10% bitumen toluene solution | Not tested | Yes | Transmission probe was selected for this measurement; Transmission probe can directly measure; <1000 ppm pentane in diluted bitumen, SD is ~15 ppm; Detailed results were included in this ppt. |
| 0-1000 ppm pentane in 20% bitumen diesel solution | | Yes | Transmission probe can directly measure <1000 ppm pentane in diluted bitumen, SD is ~11 ppm. |
| 0-1000 ppm pentane in bitumen | | Yes | Transmission probe can directly measure <1000 ppm pentane in diluted bitumen, SD is ~190 ppm. High SD is attributed to the challenge to make the homogenized sample. |

Experimentation 5: RI Measurement Versus NIR Measurement

Verify RI Data Vs. Lab Data

Figure 50:
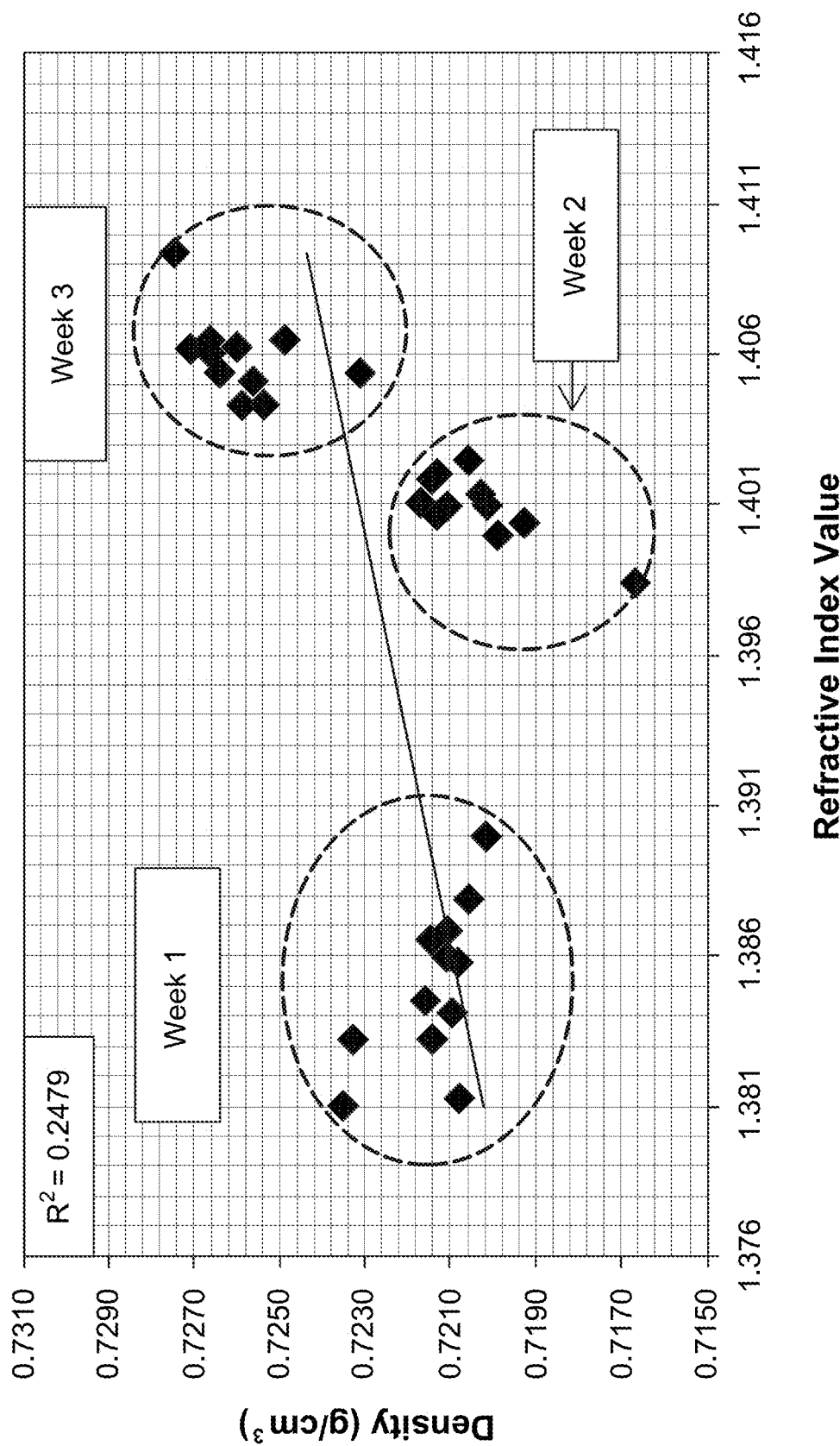
FIGS. 50 to 53 are graphs showing Refractive Index (RI) data vs. lab data for density and S/B, during week A, B and C.
Figure 51:
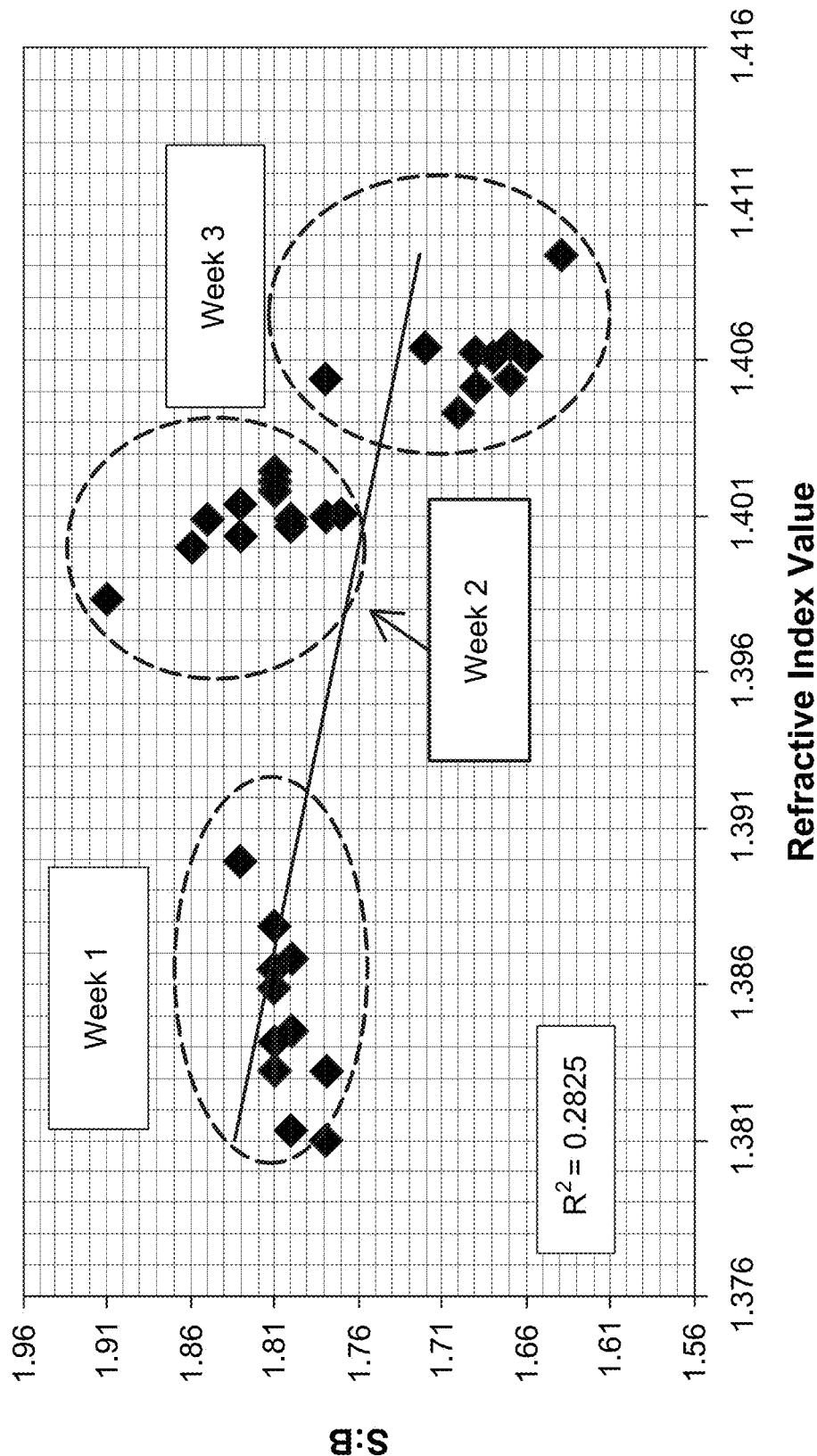

Comparison of values of S/B generated by NIR measurement and refractive index (RI) measurement was done by first verifying the reliability of RI measurement data using the lab data. It is important to note that the RI also identifies outliers as bad data points and excludes them. The major sections of data excluded by the NIR as shown in Table 7, match the major section of data excluded by the RI. The relationship between the Lab and RI data is established in FIGS. 50, and 51 for density, and S/B respectively. It can clearly be seen that the data form into 3 clusters, for Week A, B and C. The Week A cluster is isolated and does not have any clear relation to the other weeks potentially due to the readings being insensitive during that test period.

Figure 52:
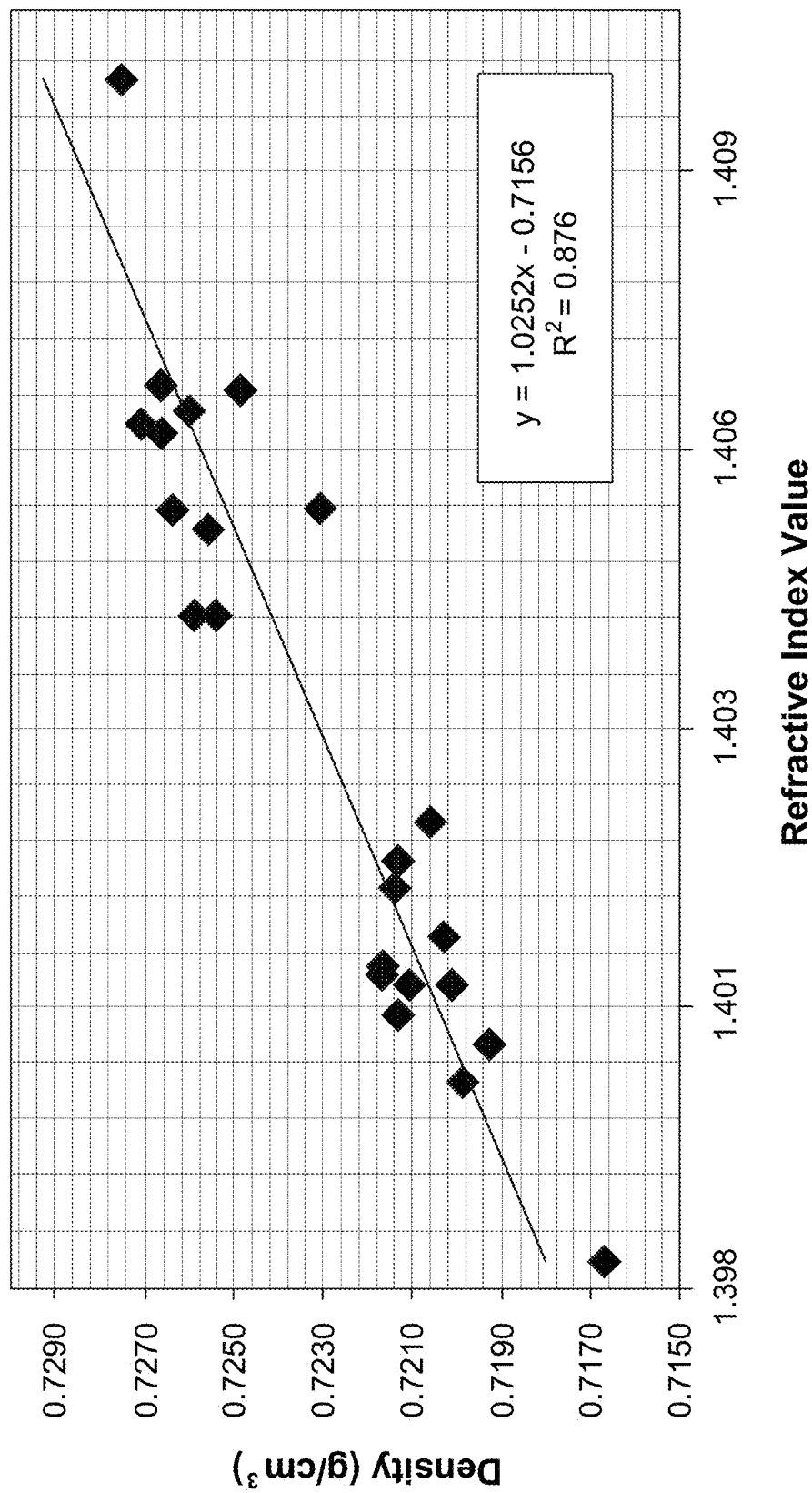
Figure 53:
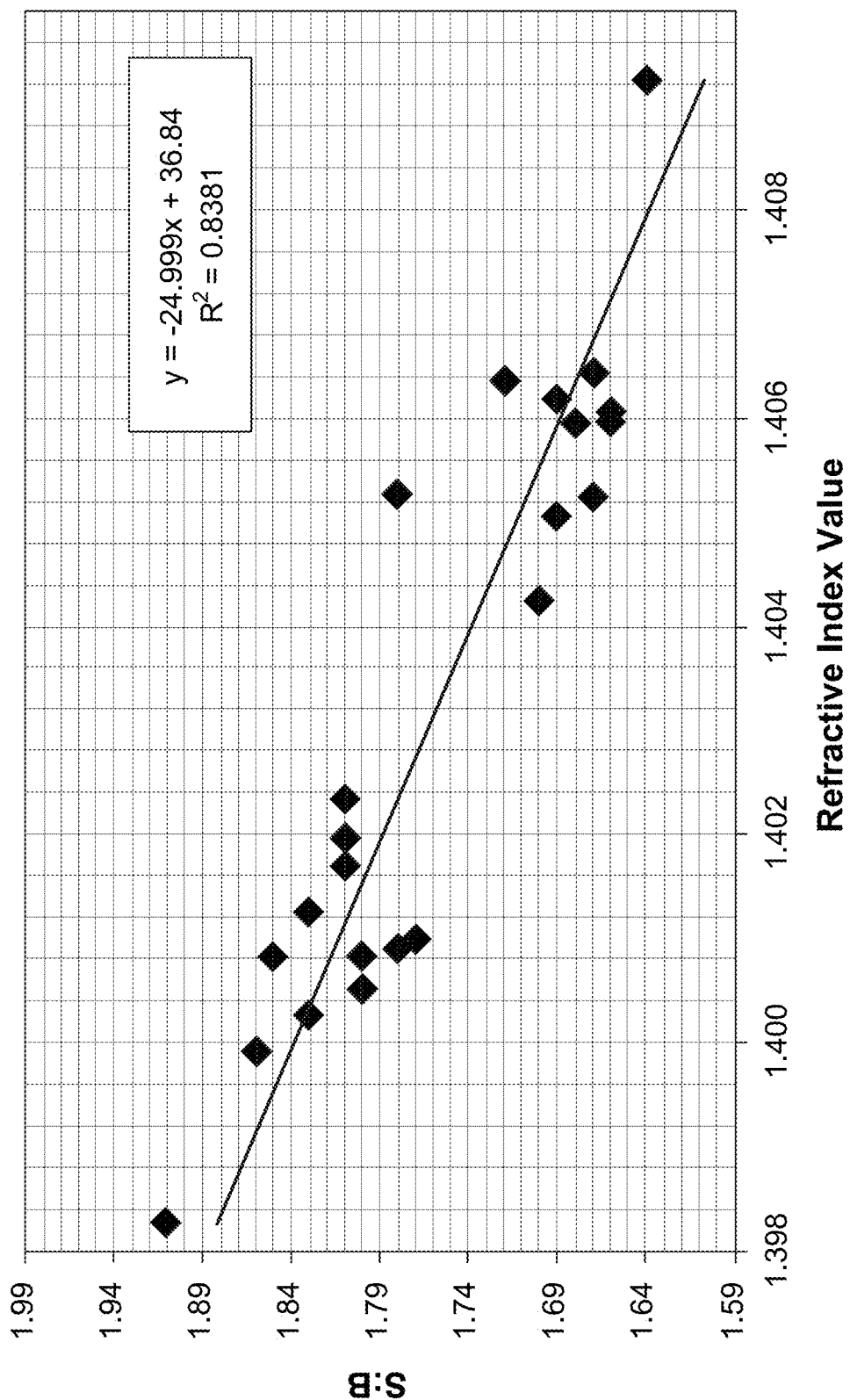

For the next examination, Week A data were removed, as it was degrading the overall value of the correlation. This is shown in FIGS. 52, and 53 for density, and S/B respectively. The correlation significantly improved for all components, and trended in the expected direction. It was concluded that there was a discrepancy in the Week A data, and the Week B and C correlations would be used to compare with the NIR values. The below figures show that there is a correlation between RI and density/S/B (2).

Comparison of NIR Prediction and RI Prediction

Figure 54:
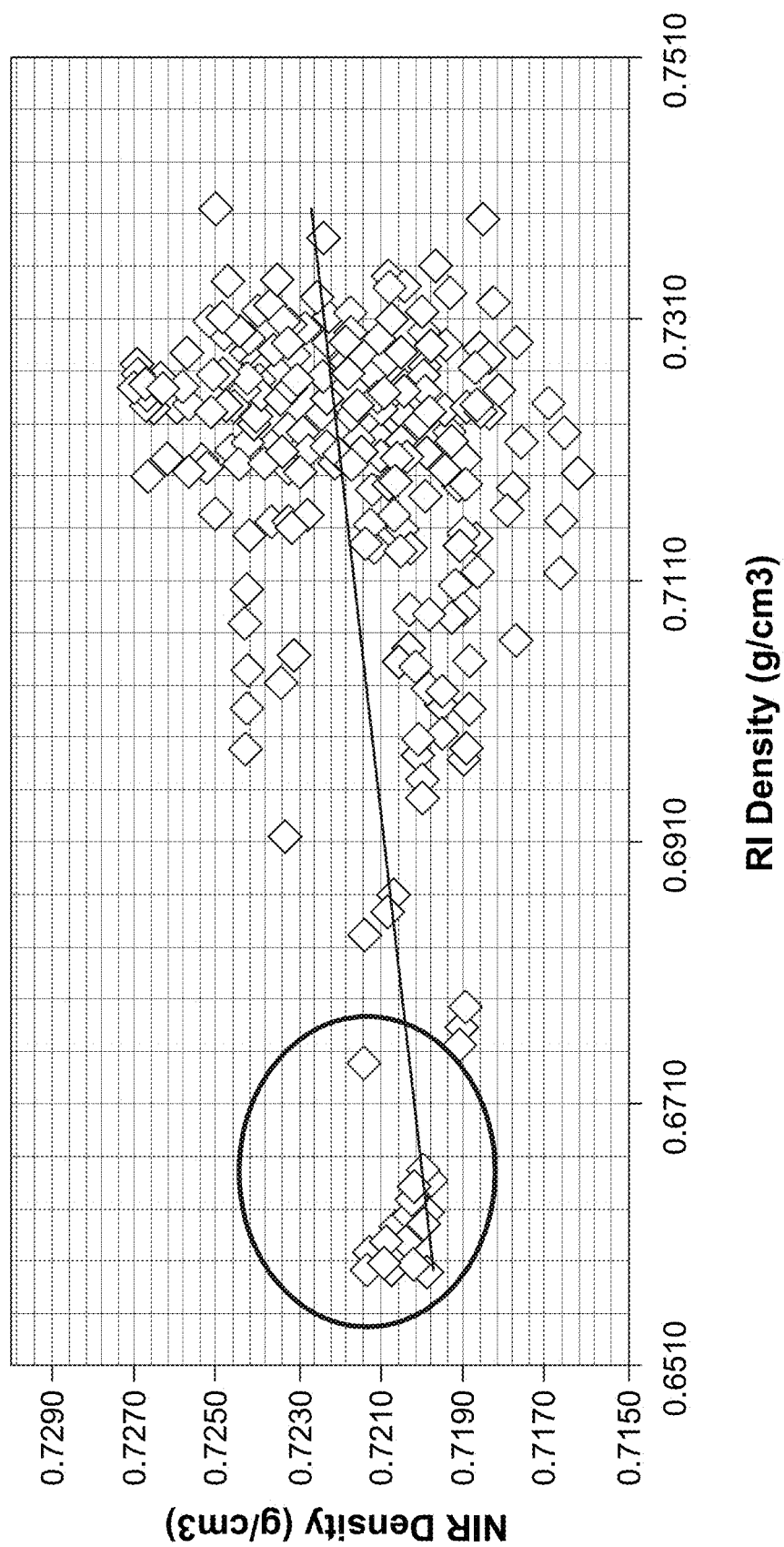
FIG. 54 is a comparison of RI data and NIR data for density for Week B and C.
Figure 55:
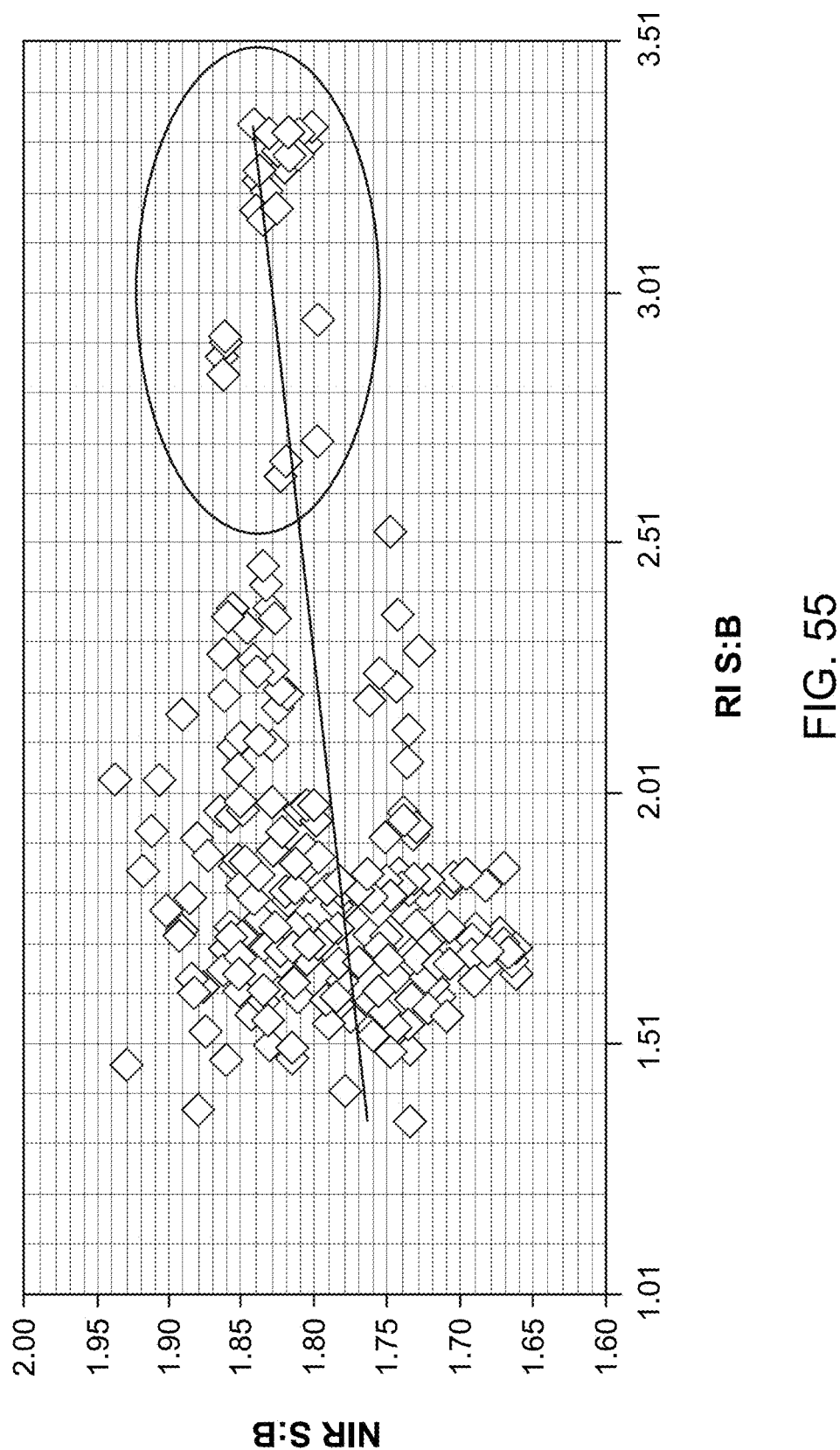
FIG. 55 is a comparison of RI data and NIR data for S/B for Week B and C.

Due to the reasonable calibration between laboratory data and RI data for Week B and C, the scale of data was increased to include the entire pilot range, except for Week A. This is shown in FIGS. 54, and 55 for density, and S/B respectively. The results showed that there was no clear correlation between NIR prediction and RI measurement over the pilot range for Week B and C. It can easily be identified which values are the obvious outliers (circled). However, the RI does not reject this data as bad in its initial internal screening. The ranges show no conclusive trend and a high magnitude of fluctuation. This is due to the RI being irresponsive at lower flow rates (2). This further shows that there is a large degree of inconsistency with the RI measurement and a controlled study on the relationship between RI and density should be completed in order to account for these inconsistencies.

Figure 56:
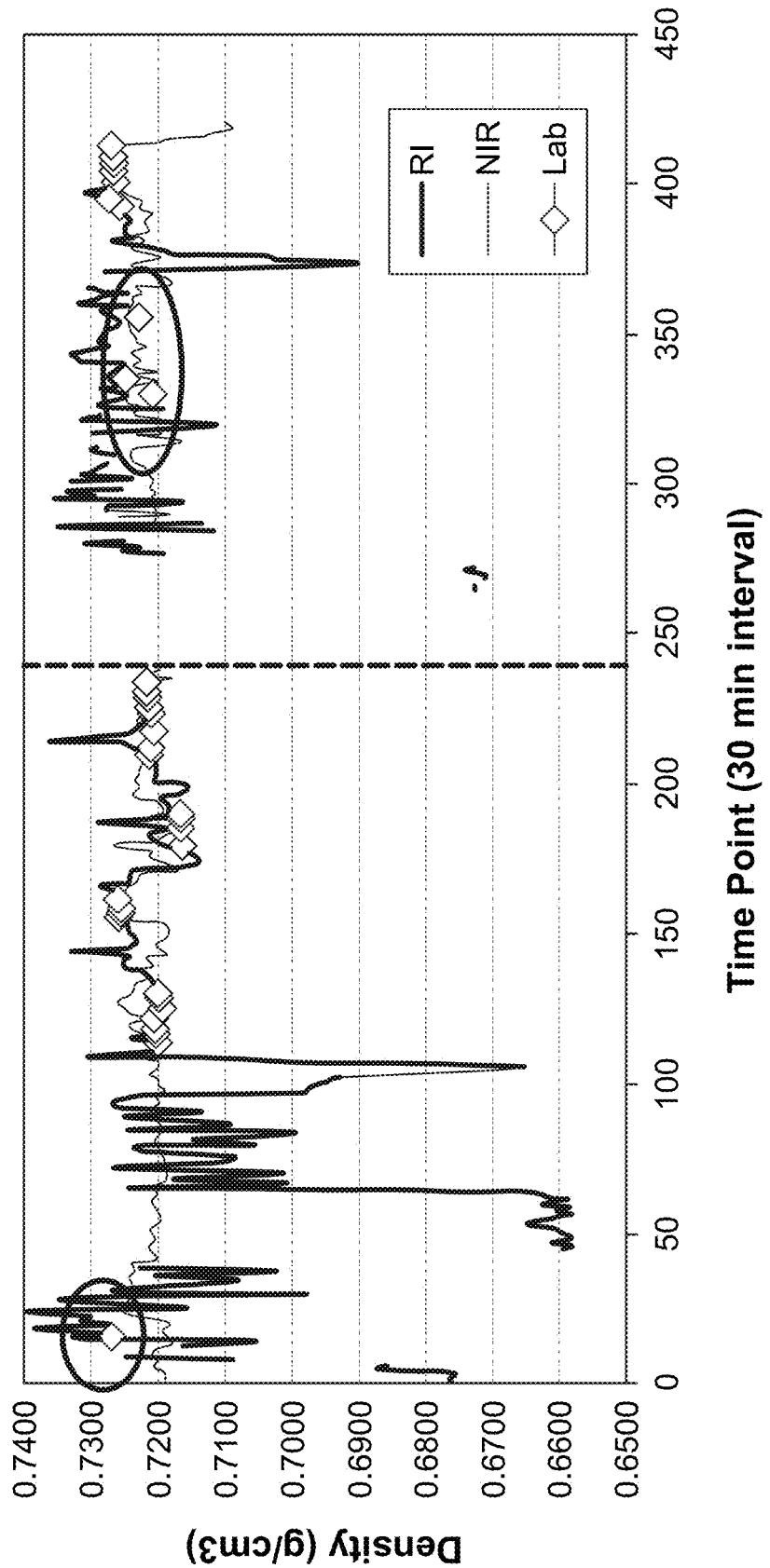
FIG. 56 is a graph showing density for each measurement method (RI, NIR and lab) for Week B and C.
Figure 57:
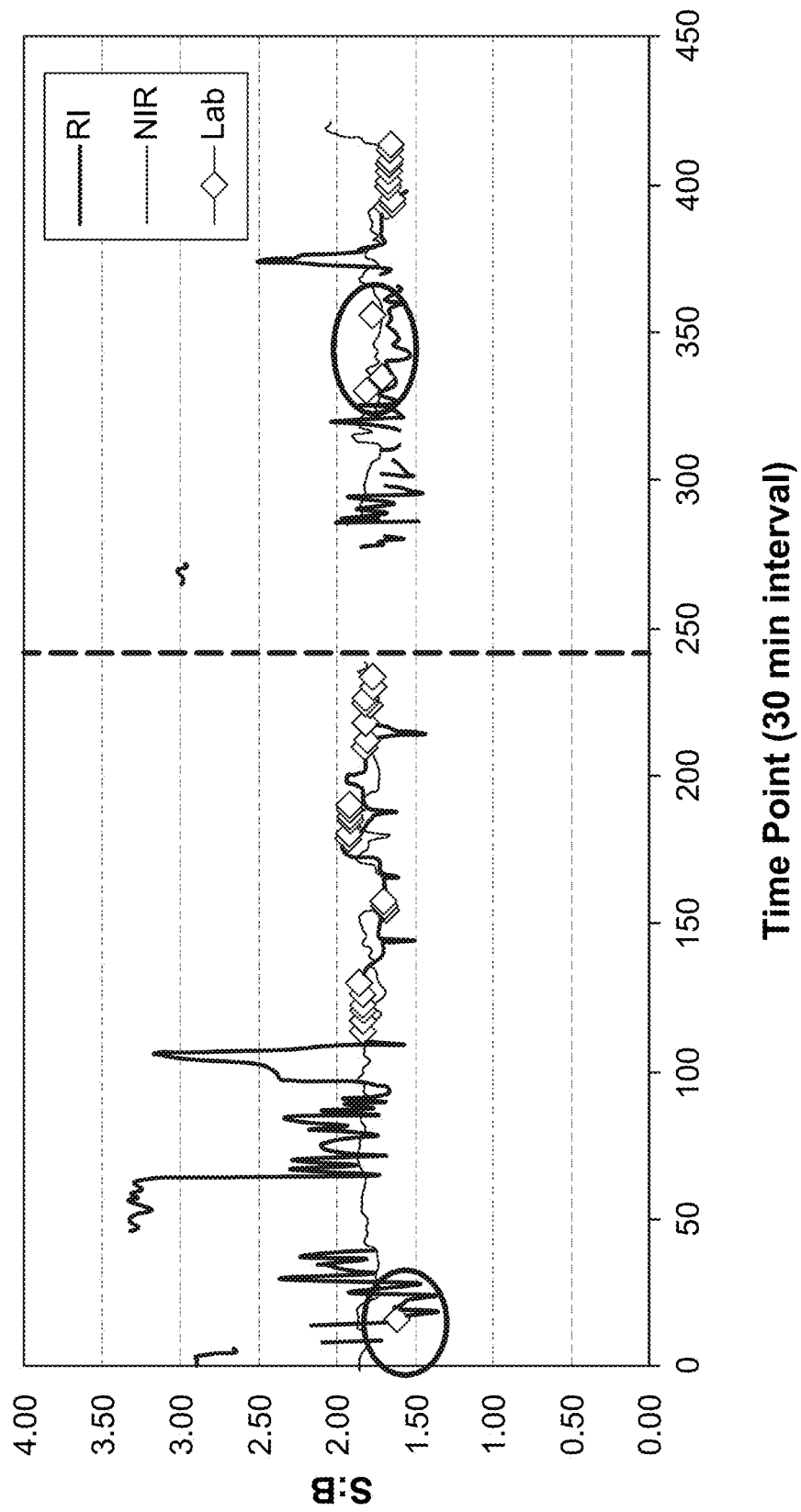
FIG. 57 is a graph showing S/B ratio for each measurement method (RI, NIR and lab) for Week B and C.

The values for NIR, RI, and laboratory data are compared along the same time domain in FIGS. 56 and 57 below for Weeks B and C and show that the NIR prediction matched laboratory data reasonably throughout the whole pilot. Conversely, there was a large amount of scattered RI measurement points observed in the range. It should be noted that the values circled represent the period where the pilot was run in two stages with chemical injection. NIR still provided reasonable prediction although both density and S/B models were developed based on lab data collected at a single stage operational condition.

The invention claimed is:

1. A process for producing a bitumen product via a paraffinic froth treatment (PFT) operation, comprising:
   adding a paraffinic solvent to a bitumen froth to produce a solvent diluted bitumen froth;
   feeding the solvent diluted bitumen froth into a settling vessel wherein solvent diluted bitumen material flows upward and forms a lighter phase zone, and mineral solids and water settle downward and form a heavier phase zone;
   withdrawing a diluted bitumen overflow from the settling vessel;
   withdrawing a solvent diluted underflow from the settling vessel;
   processing the diluted bitumen overflow to produce the bitumen product;
   locating a near infrared (NIR) probe within an upper hydrocarbon phase stratum of a PFT process stream flowing continuously within a horizontal pipe section, wherein the PFT process stream stratifies inline and forms the upper hydrocarbon phase stratum in an upper region of the horizontal pipe section;
   acquiring NIR spectral measurements from the upper hydrocarbon phase stratum using the NIR probe; and
   adjusting the PFT operation for producing the bitumen product based on the NIR spectral measurements.

2. The process of claim 1, wherein the NIR probe is located at or proximate an inner wall of the horizontal pipe section.

3. The process of claim 2, wherein the NIR probe is located within an upper semi-circle section of the horizontal pipe section.

4. The process of claim 3, wherein the NIR probe is located in spaced relation away from a top 12 o'clock location of the horizontal pipe section.

5. The process of claim 4, wherein the NIR probe is located in between a 10 o'clock and an 11 o'clock location of the horizontal pipe section.

6. The process of claim 1, wherein the horizontal pipe section has a diameter of 6 to 8 inches.

7. The process of claim 1, wherein the horizontal pipe section is spaced away downstream from flow impediments and unit operations.

8. The process of claim 1, wherein the PFT process stream comprises an aqueous phase that forms a lower aqueous stratum in a lower region of the horizontal pipe section.

9. The process of claim 1, wherein the PFT process stream comprises a vapour component that accumulates at a top region above the upper hydrocarbon phase stratum.

10. The process of claim 1, wherein the NIR probe is a reflectance probe.

11. The process of claim 1, wherein the NIR probe is a transmittance probe.

12. The process of claim 1, wherein the PFT process stream comprises the bitumen froth, the diluted bitumen froth, the diluted bitumen overflow, the solvent diluted underflow, or a solvent diluted tailings stream derived from the solvent diluted underflow.

13. The process of claim 1, wherein:
the PFT process stream flows through a bypass line and/or a slip stream line, and the NIR probe is located within the bypass line and/or a slip stream line.

14. A process for producing a bitumen product via a paraffinic froth treatment (PFT) operation, comprising:
adding a paraffinic solvent to a bitumen froth to produce a solvent diluted bitumen froth;
feeding the solvent diluted bitumen froth into a settling vessel wherein a solvent diluted bitumen material flows upward and forms a lighter phase zone, and mineral solids and water settle downward and form a heavier phase zone;
withdrawing a diluted bitumen overflow comprising the solvent diluted bitumen material from the lighter phase zone in the settling vessel via an overflow pipeline;
withdrawing a solvent diluted underflow from the heavier phase zone in the settling vessel via an underflow pipeline;
processing the diluted bitumen overflow to produce the bitumen product;
acquiring near infrared (NIR) spectral measurements from the solvent diluted bitumen material using a probe located in the overflow pipeline;
determining upward velocity within the lighter phase zone in the settling vessel according to a pre-determined direct relationship between the upward velocity and an NIR spectral profile based on the NIR spectral measurements; and
adjusting the PFT operation based on the determined upward velocity within the lighter phase zone.

15. The process of claim 14, wherein the settling vessel comprises a first stage froth separation vessel and wherein the NIR spectral measurements are obtained using an NIR probe located within the settling vessel.

16. The process of claim 14, further comprising determining water content or solids content of the solvent diluted bitumen material based on the upward velocity.

17. The process of claim 14, further comprising determining settling characteristics of the settling vessel other than the upward velocity based on the NIR spectral measurements, wherein determining the settling characteristics of the settling vessel based on the NIR spectral measurements comprises developing an NIR calibration model, and wherein the NIR calibration model is a multivariable calibration model developed by: processing both laboratory measured data and associated NIR data using a chemometric method; and using at least one of quality assurance and quality control (QA/QC) analyses, a multiple scatter correction data processing method, a first derivative data processing method, a vector normalization data processing method, and a combination thereof.

18. The PFT process of claim 14, wherein the pre-determined direct relationship between the upward velocity and the NIR spectral profile is obtained by a test procedure comprising:
measuring a set of different upward velocities on a test solvent diluted bitumen stream;
acquiring test NIR spectral measurements on the test stream to obtain a test NIR spectral profile for each of the measured upward velocities; and
correlating the measured upward velocities with the acquired test NIR spectral profiles.

19. The PFT process of claim 18, wherein the measured upward velocities are within a range of 338 mm/min and 530 mm/min.

* * * * *